(12) United States Patent      (10) Patent No.:    US 8,408,107 B2
Carrier et al.                                      (45) Date of Patent:      Apr. 2, 2013

(54) POWER TOOL SAFETY MECHANISMS

(75) Inventors: David A. Carrier, Aberdeen, MD (US); Peter Chaikowsky, Bel Air, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 13/441,057

(22) Filed: Apr. 6, 2012

(65) Prior Publication Data

US 2012/0260785 A1     Oct. 18, 2012

Related U.S. Application Data

(60) Continuation of application No. 12/889,855, filed on Sep. 24, 2010, now Pat. No. 8,186,256, which is a division of application No. 11/901,296, filed on Sep. 14, 2007, now Pat. No. 7,827,889, which is a division of application No. 10/753,845, filed on Jan.

(Continued)

(51) Int. Cl.
*B23Q 15/00*      (2006.01)

(52) U.S. Cl. .............. 83/63; 83/DIG. 1; 83/72; 83/76.1; 83/76.8; 83/370; 192/129 R

(58) Field of Classification Search ................ 83/DIG. 1, 83/58, 62, 62.1, 63, 72, 76.7, 788, 581, 471.2, 83/477.1, 477.2, 522.12, 526, 397.1; 144/154.5, 144/356, 384, 391, 427, 286.5; 29/708, 254, 29/413; 324/550, 424; 408/5; 56/10.9, 11.3; 192/192 A, 129 R, 130; 102/202.7; 89/1.56; 137/68.12, 72, 76; 188/5, 6, 110, 189; 169/57, 169/59, 42, DIG. 3; 74/2; 403/2, 28; 411/2, 411/39, 390; 335/1, 242, 132; 318/362; 241/32.5; 337/239, 148, 1, 5, 10, 17, 140, 337/170, 190, 237, 401, 290, 404, 405; 218/2, 218/154; 307/639, 328, 115, 326, 142, 117, 307/126, 131; 451/409; 280/806; 297/480; 187/69, 77, 89, 189, 216, 166, 72.3; 340/679, 340/680, 686.1, 687, 686.3, 686.6

See application file for complete search history.

(56) References Cited

U.S. PATENT DOCUMENTS
(Continued)

FOREIGN PATENT DOCUMENTS

| | | |
|---|---|---|
| EP | 0340467 | 11/1989 |
| GB | 1180458 | 2/1970 |

(Continued)

OTHER PUBLICATIONS

Operator Injury Mitigation Using Electronic Sensing and Mechanical Braking and Decoupling Devices in Handheld Circular Saws, Erin F. Eppard, May 2006.

*Primary Examiner* — Jason Daniel Prone

(74) *Attorney, Agent, or Firm* — Harness, Dickey & Pierce, P.L.C.

(57) ABSTRACT

A sensing mechanism (12) for detecting user contact with an active portion (26) of the power tool (10) is provided. In addition, a safety mechanism (14) for preventing prolonged user contact with the active portion (26) of a power tool (10) is provided. The safety mechanism (14) is configured to actuate upon receipt of a signal from the sensing mechanism (12). According to a first aspect, the safety mechanism (14) is arranged to rapidly displace the active portion (26) away from a user extremity. Alternatively, according to a second aspect, the safety mechanism (14) is arranged to rapidly urge an extremity of the user away from the active portion (26) of the power tool (10).

15 Claims, 86 Drawing Sheets

Related U.S. Application Data 8, 2004, now Pat. No. 7,373,863, which is a continuation of application No. PCT/US02/21790, filed on Jul. 11, 2002.

(60) Provisional application No. 60/304,614, filed on Jul. 11, 2001, provisional application No. 60/309,352, filed on Aug. 1, 2001, provisional application No. 60/323,511, filed on Sep. 19, 2001, provisional application No. 60/340,191, filed on Dec. 14, 2001, provisional application No. 60/340,612, filed on Dec. 14, 2001.

(56) References Cited

U.S. PATENT DOCUMENTS

| | | | |
|---|---|---|---|
| 3,547,232 | A | 12/1970 | Fergie |
| 3,785,230 | A | 1/1974 | Lockey |
| 3,805,658 | A | 4/1974 | Scott et al. |
| 3,858,095 | A | 12/1974 | Friemann et al. |
| 3,953,770 | A | 4/1976 | Hayashi |
| 4,026,177 | A | 5/1977 | Lockey |
| 4,048,886 | A | 9/1977 | Zettler |
| 4,117,752 | A | 10/1978 | Yoneda |
| 4,470,046 | A | 9/1984 | Betsill |
| 4,528,488 | A | 7/1985 | Susemihl |
| 4,653,189 | A | 3/1987 | Andreasson |
| 4,958,547 | A | 9/1990 | Low |
| 5,081,406 | A | 1/1992 | Hughes et al. |
| 5,148,053 | A | 9/1992 | Dubois, III |
| 5,377,571 | A | 1/1995 | Josephs |
| 5,667,152 | A | 9/1997 | Mooring |
| 5,942,975 | A | 8/1999 | Sorensen |
| 6,148,504 | A | 11/2000 | Schmidt et al. |
| 6,418,829 | B1 | 7/2002 | Pilchowski |
| 6,889,585 | B1 | 5/2005 | Harris et al. |
| 7,000,514 | B2 | 2/2006 | Gass et al. |
| 7,373,863 | B2 | 5/2008 | O'Banion et al. |
| 7,827,889 | B2 | 11/2010 | Carrier |
| 8,051,758 | B2 | 11/2011 | Eppard |
| 8,079,292 | B2 * | 12/2011 | Gass et al. ............ 83/62 |
| 8,186,256 | B2 * | 5/2012 | Carrier ............ 83/63 |
| 8,191,450 | B2 * | 6/2012 | Gass ............ 83/62.1 |
| 8,196,499 | B2 * | 6/2012 | Gass ............ 83/62.1 |
| 8,291,797 | B2 * | 10/2012 | Gass et al. ............ 83/63 |
| 2002/0017180 | A1 | 2/2002 | Gass et al. |
| 2002/0020263 | A1 | 2/2002 | Gass et al. |
| 2002/0059853 | A1 | 5/2002 | Gass et al. |
| 2002/0170399 | A1 | 11/2002 | Gass et al. |
| 2002/0170400 | A1 | 11/2002 | Gass |
| 2003/0005588 | A1 | 1/2003 | Gass et al. |
| 2003/0019341 | A1 | 1/2003 | Gass et al. |
| 2003/0020336 | A1 | 1/2003 | Gass et al. |
| 2003/0037651 | A1 | 2/2003 | Gass et al. |
| 2004/0163514 | A1 | 8/2004 | Gass et al. |
| 2005/0039586 | A1 | 2/2005 | Gass et al. |
| 2005/0139058 | A1 | 6/2005 | Gass et al. |
| 2005/0155473 | A1 | 7/2005 | Gass |

FOREIGN PATENT DOCUMENTS

| | | |
|---|---|---|
| WO | WO 93/06961 | 4/1993 |
| WO | WO 97/12174 | 4/1997 |
| WO | WO 01/26064 | 4/2001 |
| WO | WO 03006213 | 1/2003 |

* cited by examiner

POWER TOOL SAFETY MECHANISMS

CROSS-REFERENCE TO RELATED APPLICATIONS

This application is a continuation application of U.S. patent application Ser. No. 12/889,855 filed Sep. 24, 2010 now U.S. Pat. No. 8,186,256 which is a divisional of U.S. patent application Ser. No. 11/901,296 filed on Sep. 14, 2007, now issued U.S. Pat. No. 7,827,889 which is a divisional application of U.S. patent Ser. No. 10/753,845 filed on Jan. 8, 2004, now issued U.S. Pat. No. 7,373,863 which is a continuation of International Application No. PCT/US02/21790 filed Jul. 11, 2002. PCT/US02/21790 claims benefit of U.S. Provisional Application No. 60/304,614 filed Jul. 11, 2001; U.S. Provisional Application No. 60/309,352 filed Aug. 1, 2001; U.S. Provisional Application No. 60/323,511 filed Sep. 19, 2001, U.S. Provisional Application No. 60/340,191 filed Dec. 14, 2001 and U.S. Provisional Application No. 60/340,612 filed Dec. 14, 2001.

FIELD OF INVENTION

The present invention relates generally to a safety system for a power tool and, more particularly to various improved safety systems for a woodworking power tool that prevents or reduces potentially injurious contact between an active portion of the power tool and a portion of the operators body.

BACKGROUND OF THE INVENTION

The advent of modern power tools has allowed many material removal and material forming processes that were typically performed by hand to be performed with greater efficiency, greater precision and typically at a lower cost. The modern power tool is typically comprised of three main systems, the power system, the tool system and a safety system. The power system transfers a first energy type to a second energy type that the tool system is able to use. The tool system performs the material removal or material forming processes using the energy from the power system. Lastly, the safety system prevents dangerous conditions between the tool system and the operator of the power tool.

Many devices utilize power systems to convert an energy source into a useable form. In modern power tools, the power systems typically convert either hydrocarbon based fuels or electrical energy into mechanical energy. Hydrocarbon fuel power systems are normally on such devices as chain saws and trimmers; whereas electrical power systems are found on such devices as drills and table saws.

In many instances, the tool system of a power tool resembles the hand tool that was originally utilized to perform wood working operations. For example, a hand drill and a power drill both utilize a drill bit to remove material in a circular shape from a workpiece. In other instances, modern power tools utilize tool systems that are unique. For example, a circular saw utilizes a circular shaped saw blade having a plurality of teeth disposed around the circumference of the blade. While the teeth of the circular saw blade are similar to the ones formed on a hand saw, the circular configuration on the blade facilitates rotational motion of the blade as it engages a workpiece.

Since many of the safety systems set forth herein are described in relation to either a table saw or a miter saw, each of these power tools are further described below. A typical table saw generally includes a base that supports a generally flat table top having a longitudinally extending throat slot or opening through which a saw blade or other cutting tool protrudes above the table for engaging a workpiece. A motor is mounted beneath the table top, and the cutting tool, typically a circular saw blade, is mounted for rotation to the output shaft of the motor. The saw blade is positioned to effect cutting of the workpiece as it is moved longitudinally along the table. The saw blade can be lowered or raised with respect to the table top to accommodate workpieces of varying thicknesses as well as adjusted to various angular orientations relative to the plane of the table top in order to cut bevels or other such angular cuts on the workpiece.

Additionally, a typical miter saw generally includes a base member having a slot formed therethrough for receiving a saw blade and a pivotal support arm coupled to the base member. A saw is mounted to the distal end of the support arm. When the arm is lowered, the saw blade engages the workpiece, thereby cutting the workpiece. Additionally, the miter saw may include a mechanism for rotating the support arm around a z-axis (upward) relative to the base member for performing angled cutting operations.

Various safety systems have been developed to minimize the risk of injury during the operation of such power tools. Exemplary power tool safety systems may include guard mechanisms and operator detection systems. A guard physically prevents the operator from making physical contact with the active portions of the tool, such as belts, shafts, blades, etc. However, some power tools preclude the use of a guard that would effectively prevent the operator from making contact with the active portion of the tool. In these instances, operator detection systems have been developed to prevent and/or reduce injurious contact between the operator and the active portion of the power tool.

A conventional operator detection system for a power tool is generally comprised of three primary subsystems: a detection subsystem, a control subsystem and a reaction subsystem. The detection subsystem or sensing mechanism tracks the proximity of the operator in relation to the active portion of the power tool. The control subsystem determines the appropriate response to input received from the detection subsystem. Lastly, the reaction system or safety mechanism may initiate a protective operation, if applicable, that prevents and/or reduces potentially injurious contact between the operator and the active portion of the power tool. Each of these subsystems are further described below.

Detection subsystems operatively determine the location of the operator's body to the active portion of the power tool. Three known types of detection means are currently employed. First, fixed detection subsystems utilize various sensing techniques to determine if a particular portion of an operator's body is located in a certain position proximate to the power. For example, a trigger mechanism may be located on the handle portion of a miter saw. The trigger mechanism ensures that the power tool is only operated when the operator's hand is grasping the handle. If the operator's hand does not engage the trigger mechanism, the power tool will not operate, thereby preventing injury to the operator of power tool. If the trigger is disengaged when the power tool is operating, the trigger mechanism may cut power to the active portion of the tool.

Second, proximate detection subsystems utilize various sensing techniques to determine the proximity of the operator to the active portion of the power tool. In one known approach, an electrical signal is transmitted through the active portion of the power tool. A receiver is coupled to the operator's body to receive the signal. When the active portion of the power tool is brought in close proximity to the receiver, the received signal is increased. As the intensity of the received signal increases, the control system determines if the signal intensity exceeds some predetermined threshold level. If so, the control subsystem may initiate some protective operation to prevent and/or reduce operator injury.

Third, contact detection subsystems generally employ various capacitive sensing techniques to determine when the operator physically touches the active portion of the power tool. In one known approach, an electrical signal is transmitted from a transmitter to a receiver, where the transmitter is capacitively coupled via the active portion of the tool to the receiver. When the operator touches the active portion, there is a sudden decrease in the signal level detected at the receiver. Accordingly, if the sensed signal level drops below some predetermined threshold level, the control subsystem may initiate some protective operation to prevent and/or reduce operator injury.

Control subsystems determine an appropriate response to input received from the detection subsystem. When the control system determines that the operator's body is in dangerous proximity to the active portion of the power tool, it may initiate some protective operation to prevent and/or reduce operator injury.

The control subsystem may then interact, if applicable, with the reaction subsystem to carry out a protective operation that prevents and/or reduces potentially injurious contact between the operator and the active portion of the power tool. The reaction system may prevent and/or reduce the potential of operator injury in one of a variety of ways. For example, a braking mechanism may be employed to slow or stop movement of the active portion of the tool. Alternatively, an active retraction mechanisms may operatively moves the active portion of the tool away from of the operator's body, thereby prevent injurious contact.

The present application sets forth numerous improved safety mechanisms for preventing and/or reducing potentially injurious contact between an operator and active portion of a power tool. At least one known safety system for power tools is set forth in International Publication No. WO 01/26064 which is incorporated by reference herein. It is to be understood that the safety mechanisms set forth below may be integrated with this exemplary safety system and/or other known power tool safety systems. For a more complete understanding of the present invention, its objects and advantages, reference may be had to the following specification and to the accompanying drawings.

BRIEF DESCRIPTION OF THE DRAWINGS

FIG. 63b is a side view of the friction stopping device of FIG. 63a;

FIG. 67b is a side view of the safety mechanism of FIG. 67a;

FIG. 86 is a perspective view of a safety mechanism according to a fifty-first embodiment of the present invention;

FIG. 87 is a perspective view of a safety mechanism according to a fifty-second embodiment of the present invention;

FIG. 88 is a perspective view of a safety mechanism of FIG. 87 employing a bumper stop;

FIG. 89 is a perspective view of a safety mechanism according to a fifty-third embodiment of the present invention;

FIG. 90 is a perspective view of a safety mechanism according to a fifty-third embodiment of the present invention;

FIG. 91 is a side view of a safety mechanism according to a fifty-fourth embodiment of the present invention;

FIG. 92 is a side view of the braking system of the safety mechanism of FIG. 91;

FIG. 93 is a partial top view of a braking system constructed in accordance to a second embodiment of FIG. 91;

FIG. 94 is a partial top view of a braking system constructed in accordance to a third embodiment of FIG. 91;

DETAILED DESCRIPTION OF THE PREFERRED EMBODIMENTS

Figure 1:
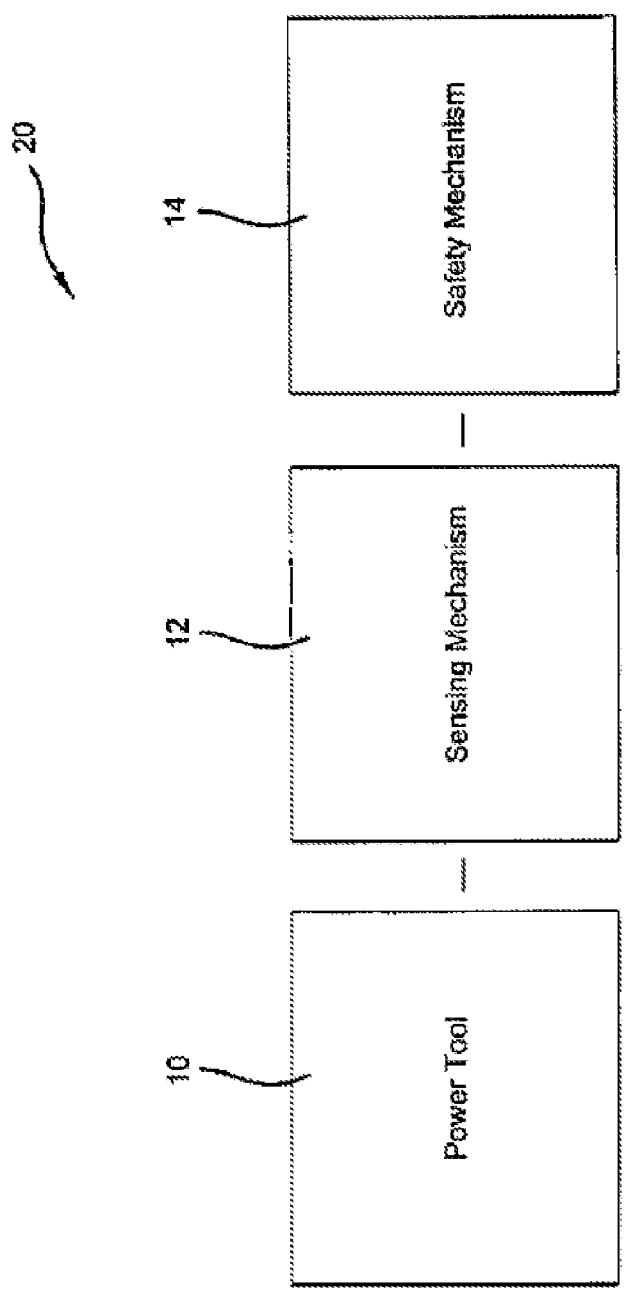
FIG. 1 is a block diagram of the sensing mechanism and safety mechanism configuration of the present invention.

With reference to FIG. 1, the plurality of safety systems 20 set forth in the following embodiments generally include three main subsystems, namely a power tool 10, sensing mechanism 12 and safety mechanism 14. Each subsystem disclosed herein includes a variety of configurations employing several components for each subsystem. As will be further described below, these subsystems may be used in conjunction or in various combinations to achieve specific safety advantages. For clarity, each power tool 10, sensing mechanism 12 and safety mechanism 14 described herein will include a unique suffix such as a, b, c etc.

It will be understood that the various safety mechanisms 14 set forth herein may be integrated with this or other well known power tool safety systems. Moreover, while a preferred embodiment of a safety mechanism 14 may be shown in conjunction with a particular power tool 10, it is envisioned that the various safety mechanisms may be adapted for use with other types of power tools.

Safety Guard Switch

Figure 2:
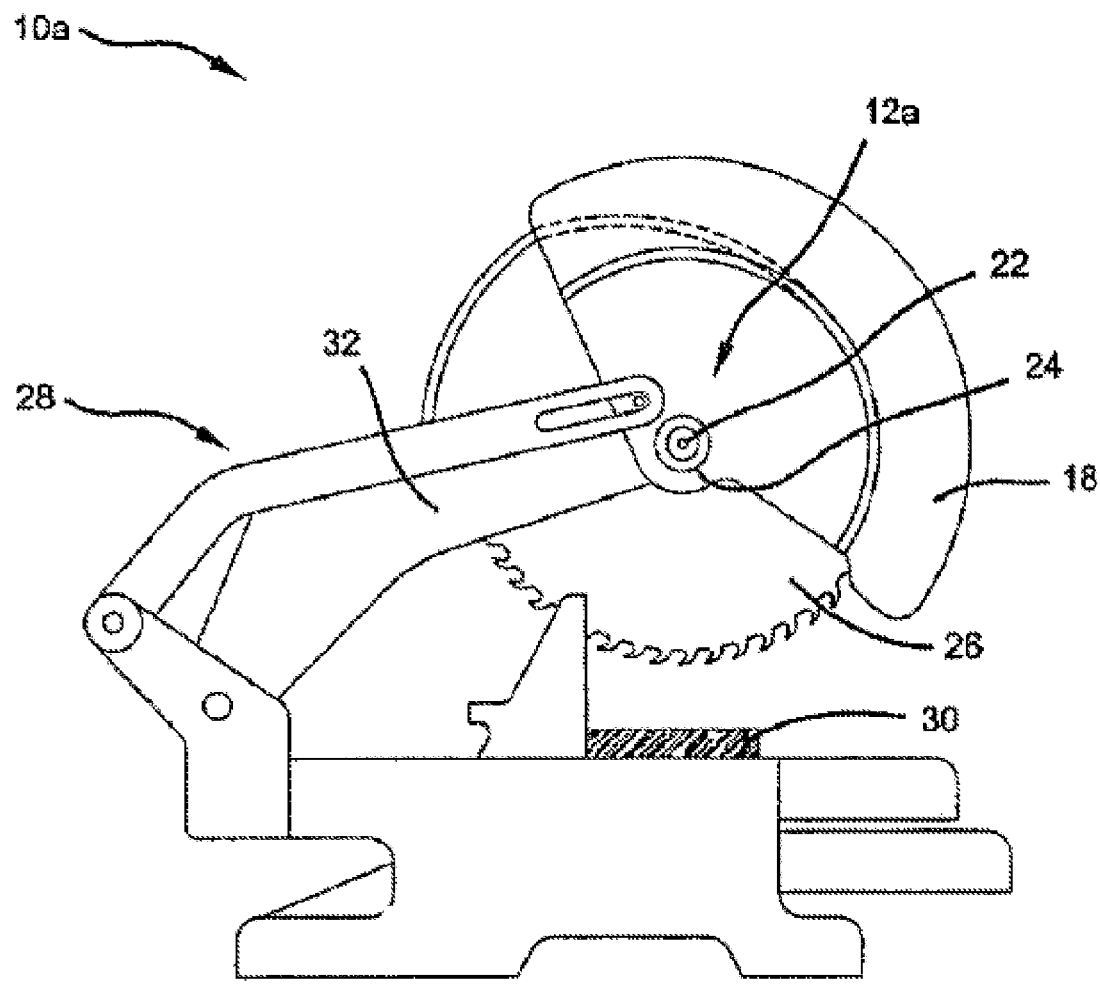
FIG. 2 is view of a sensing mechanism according to a first embodiment of the present invention.

As shown generally in FIG. 2, power tool 10a includes a miter saw having a circumferential guard 18. Although the following description is directed to a miter saw, it will be appreciated that the safety device described herein may also be used in conjunction with other power tools employing a safety guard. Miter saw 10a has a circular saw blade 26 which is shielded by the guard 18. The guard 18 is pivotally attached to miter saw 10a, and also has a pivot arm assembly 28 linked between the miter saw arm 32 and the guard 18 to help ensure proper articulation of the guard 18 throughout the range of movement of the miter saw 10a. Prior to or during a cutting procedure on workpiece 30, it may be necessary for the operator to change the saw blade 26. To gain sufficient access to the saw blade 26, the user typically removes the safety guard 18.

According to a preferred embodiment, sensing mechanism 12a includes a switch or sensing device 22 disposed on the safety guard 18 to detect the position of the guard 18. When the guard 18 is not installed, or installed improperly, the sensing device 22 precludes operation of the electric motor (not specifically shown) thereby disabling blade 26. Likewise, if the guard 18 is positioned in the proper orientation, the switch 22 enables operation of the electric motor and consequently rotation of saw blade 26. Switch 22 preferably includes a pair of electrical contacts, one positioned on guard 18 and one positioned on a guard mounting hub 24 disposed on pivot arm 32. In this regard, when guard 18 is properly mounted on hub 24, the electrical contacts form a complete electrical loop allowing switch 22 to permit operation of the electric motor. It will be appreciated that switch 22 may comprise alternate sensing mechanisms which adequately identify a proper orientation of guard 18.

Dual Safety Switch System

Figure 3:
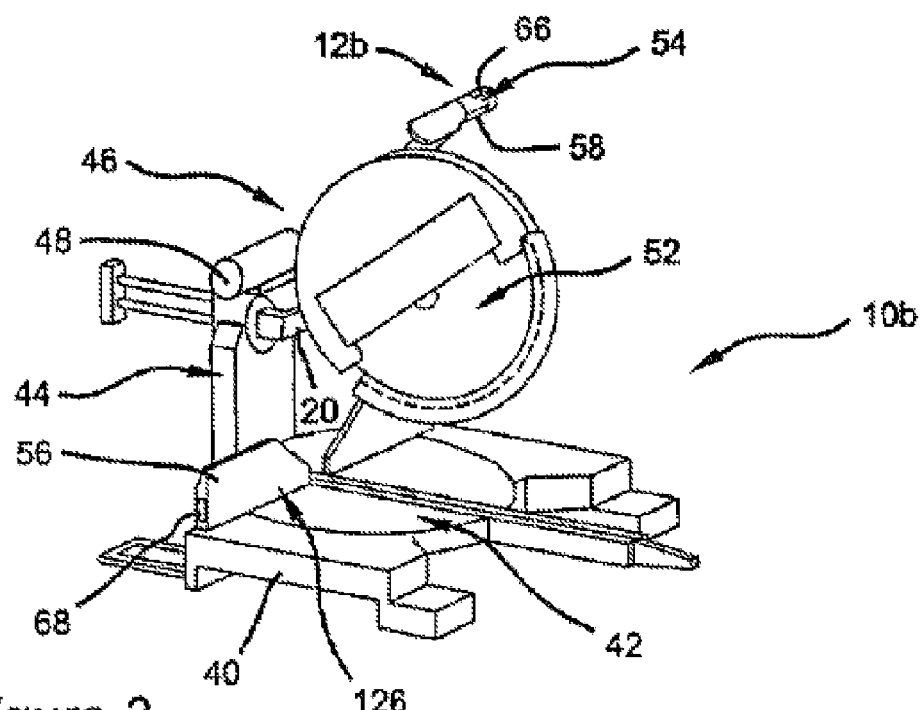
FIG. 3 is a perspective view of a sensing mechanism employed in an exemplary miter saw according to a second embodiment of the present invention.

With reference to FIG. 3 a power tool 10*b* employing a sensing mechanism 12*b* according to a second embodiment of the present invention is shown. The exemplary power tool embodied herein is a miter saw, however it is appreciated that the safety system of the present invention may be adapted for use with a variety of power tools. Miter saw 10*b* generally comprises a base portion 40, an angularly movable table assembly 42, and an angularly movable housing assembly 44 having a pivotally attached drive assembly 46. The drive assembly 46 is generally comprised of an electrical motor 48 drivingly coupled by way of an extension arm 50 to saw blade 52. Positioned at the distal end of the arm 50 is saw blade 52 and a handle portion 54 for controlling articulation of the saw blade 52 to engage a workpiece. The base portion 40 of the miter saw 10*b* includes a fence portion 56 for positioning a workpiece relative to the saw blade 52. The electrical motor 48 of the power tool 10*b* is activated by a trigger mechanism 58 located in the handle portion 54 of the arm 50

In operation, an operator positions a workpiece along the fence 56 of the base portion 40 and activates the trigger mechanism 58 to operate the saw blade 52. During operation, the operator articulates the saw blade 52 into engagement with the workpiece to remove a portion of the workpiece. According to the present invention, a sensing mechanism 12*b* operatively detects the location of the operator's first and second hand during operation of the power tool 10*b* to ensure that the operator's first and second hands are away from the saw blade 52 of the power tool 10*b* to reduce the chance of injurious contact between a portion of the operator's body and the active portion of the power tool 10*b*.

The sensing mechanism 12*b* generally includes a first switch or sensor 66 positioned in the handle portion 54 of the power tool 10*b* operable to detect an operator's first hand, a second switch or sensor 68 positioned in a second location operable to detect an operator's second hand and a controller coupled to the first and second sensors operable to prevent operation of the power tool 10*b* when either the first or the second sensors do not detect an operator's hand. The sensing mechanism 12*b* reduces/prevents potentially injurious situations between the operator's hands and the active portion of the power tool 10*b* by ensuring that the operator's hands are located away from the saw blade 52 during operation of the power tool 10*b*.

The first sensor 66 of the sensing mechanism 12*b* is located in the handle portion 54 of the power tool 10*b*. The first sensor 66 ensures that the operator's first hand is placed on the handle 54. As shown in FIG. 3, the first sensor 66 is located along an upper portion of the handle 54. The first sensor is preferably oriented to allow the operator to easily activate the first sensor 66 during normal operation of the power saw 10*b*. It is appreciated that first sensor 66 may be located at other locations on handle 54.

The second sensor 68 of the sensing mechanism 12*b* is positioned to prevent injurious contact between the operator's second hand and the active portion of the power tool 10*b*. As shown in FIG. 3, the second sensor 68 is located along the left side of the fence portion 68 of the power tool 10*b*. In this location, the second hand of the operator will be positioned away from the active portion 60 of the power tool 10*b*. It is appreciated that the second sensor 68 may be located at various positions on the power tool 10*b* to ensure that the second hand of the operator is safely away from the saw blade 52 of the power tool 10*b*. For example, in an alternate embodiment shown in FIG. 4, power tool 10*b'* includes a second sensor 68' located along the front of the base portion 42 of the miter saw to ensure that the operator's second hand is safely away from the active portion of the power tool 10*b'*. This configuration allows a user to depress sensor 68 with a thumb while manipulating the workpiece with fingers safely away from active portion 60 of power tool 10*b'*.

Returning to FIG. 3, it is contemplated that a plurality of second sensor's may be used with the sensing mechanism 12*b* of the present invention to allow for alternative configurations of the operator's hands. For example, second sensors may be positioned along the left side and the right side of the fence 56. In this configuration a left or right handed operator could utilize the safety system of the present invention during operation of the power tool 10*b*.

The controller (not specifically shown) is coupled to the first and second sensors 66, 68 and the electric motor of the power tool 10*b*. The controller is operable to allow operation of the power tool 10*b* when the first and the second sensors 66, 68 detect the first and second hands of the operator, respectively. If the controller detects that the operator's hands are in the correct position, the saw blade 52 of the power tool 10*b* is allowed to be operated. The controller of the present invention may be any of a variety of controllers, microcomputers or other devices suitable to detect activation of the first and second sensors 66, 68 and in turn allow operation of the saw blade 52.

The controller is preferably coupled to the first sensor 66 and the second sensor 68 in a series type configuration. In the series type configuration the controller includes a single input and single output connected to the controller. The first and second sensors 66, 68 are connected to the single input and single output to form a loop. The controller detects the desired positioning of the operator's hands when the first and the second sensors 66, 68 are both activated, allowing a completion of the circuit from the input to the output. When the controller detects that the first and second hands of the operator are in the desired position, the controller allows operation of the power saw 10*b*.

The controller may also be coupled to the first and second sensors 66, 68 in a parallel type configuration. In a parallel configuration, each of the first and the second sensors are coupled to a separate input and a separate output on the controller. The parallel configuration requires that the controller determine that both the first and the second sensors 66, 68 are activated at the same time to allow operation of the saw blade 52 of the power tool 10*b*.

In a preferred embodiment, the first sensor 66 is located in the handle portion 54 of the miter saw 10*b* and is activated while the operator is grasping the handle portion 54 of the miter saw and the second sensor 68 is located along the fence 56 of the miter saw 10*b*. In operation, the operator of the miter saw 10*b* activates the first switch 66 while grasping the handle portion 54 and activates the second switch 68 while holding a workpiece against the fence portion 56. In this configuration, both the operator's first and second hands are located away from the saw blade 52 of the power tool 10b. The first and second sensors 66, 68 may be any of a variety of sensors that detect the presence of an operator's hand. A preferred sensor is a electrical switch sensor that is activated when a portion of the operator's hand depresses a plunger or other device to indicate physical presence of the operator's hand.

Another type of sensor that may be used for the first and the second sensors are electromagnetic signal sensors. The electromagnetic signal sensor transmits an electrical signal from a transmitter. A receiver, typically adjacent to the transmitter receives the transmitted electromagnetic signal. The received electromagnetic signal is compared to a threshold value to determine if the operator's hand is proximal to the sensor. The electromagnetic signal sensor signals the controller to the presence of the operator's hand. Some commonly known electromagnetic signal sensors are proximity switches, light curtains or hall effect sensors.

Yet another type of sensor that may be used for the first and second sensors 66, 68 are electrical capacitance sensors. Electrical capacitance sensors are typically comprised of a capacitance measuring device that determines the electrical capacity around the sensor. The electrical capacitance sensor monitors the electrical capacity and compares it to a threshold value. Generally, when a portion of the operator's hand comes in close proximity or touches the sensor, the electrical capacity increases. If the capacitance exceeds a threshold value, the electrical capacitance sensor signals the controller to the presence of the operator's hand.

During many operations, the operator will utilize one of his/her hands to guide the workpiece relative to the saw blade 60 or restrain the workpiece relative to the saw blade 60. Therefore, it is desirable to locate the second switch 68 in a position that the operator normally utilizes to guide or restrain the workpiece. In a first configuration, the operator's other hand is utilized to restrain a workpiece to the guide fence 56 of the power tool 10b. The guide fence 56, as described above typically extends outward from a first and second side of the saw blade 52 to provide a guide that is relatively perpendicular to the saw blade 52. In this configuration, an operator may hold the workpiece to the fence 56 by gripping the workpiece with their thumb and back of the fence with their fingers to clamp them together. In this configuration, a second switch 68 could be located along the rear of the fence 56 (as shown in FIG. 3, switch 68 is accessible from the front of fence 56 but may alternatively be accessible at a location on the rear of fence 56) to allow the fingers of the operator to positively engage the second switch 68 when positioned away from the saw blade of the power tool.

Figure 4:
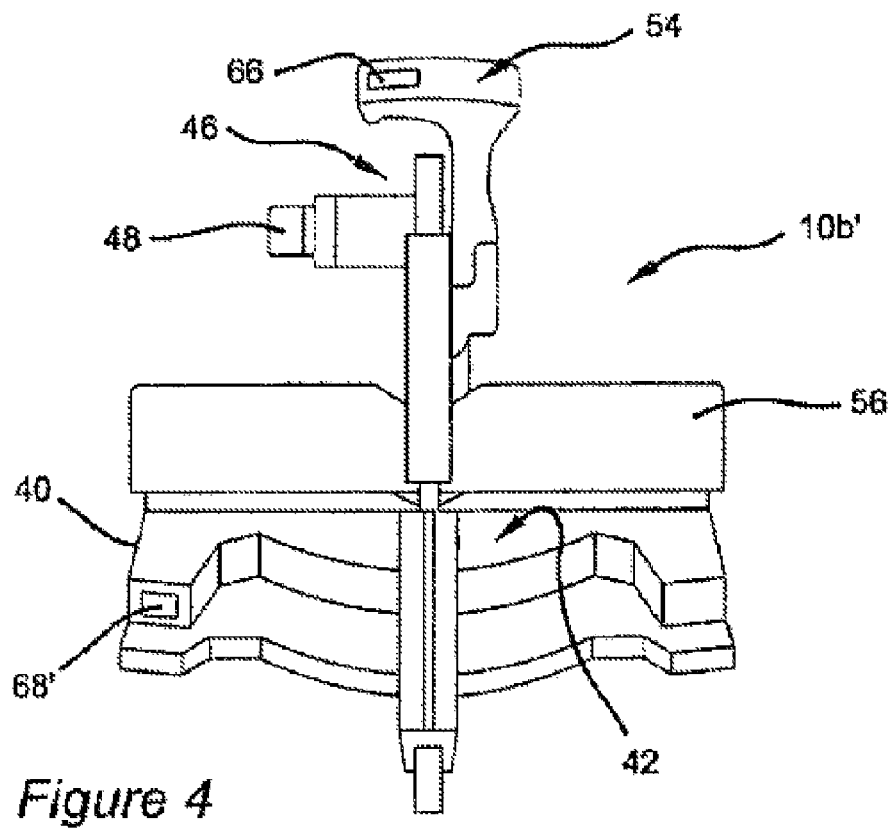
FIG. 4 is a front view of the sensing mechanism of FIG. 3 shown according to an alternative embodiment.

Turning to FIG. 4, in a second configuration, a workpiece having a relatively large width is restrained to the table portion 42 of the power tool 10b' by an operator. In this configuration, the fingers of the operator are typically used to push downward on the workpiece to restrain it relative to the saw blade causing the thumbs of the operator typically overhang the front edge of the table portion. In this configuration, a switch is being mounted along the front edge of the table portion of the miter saw. In this configuration, the operator would positively secure the second safety switch 68' to indicate that his first and second hands are not located within dangerous proximity of the saw blade 52 of the power tool 10b'.

Figure 5:
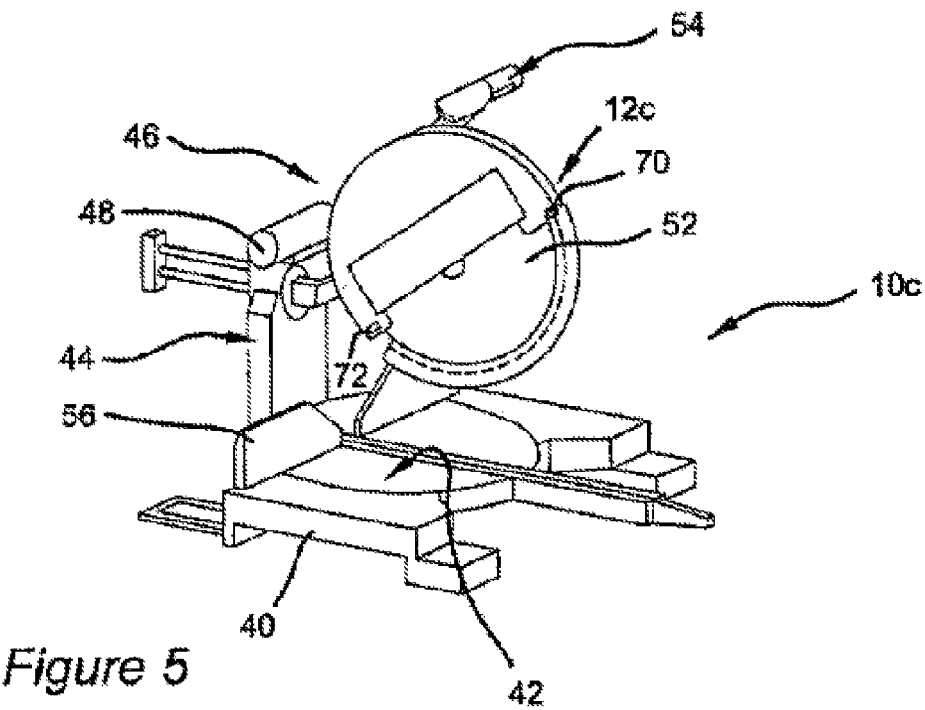
FIG. 5 is a perspective view of a sensing mechanism employed in an exemplary miter saw according to a third embodiment of the present invention.

FIG. 5 shows a sensing mechanism 12c in the form of a light switch that prevents a power tool 10C from being operated if a foreign object is near the saw blade 52. Like reference numerals associated with miter saw 10c are used to denote like components identified in relation to miter saw 10b. Sensing mechanism 12c is composed of at least one light emitting panel 70 and at least one light receiving panel 72 in operative communication. Light emitting panel 70 is preferably positioned at either the front or rear portion of the saw blade 52 and oriented to emit light along the planar direction of saw blade 52. Light receiving panel 72 is preferably positioned at the other of the front or rear portion of the saw blade and oriented to receive light emitted along the planar portion of saw blade 52. If an object prevents light from the light emitting panel 70 from being received by light receiving panel 72, saw blade 52 is stopped to prevent contact of the blade 52 with a foreign object, namely a human extremity.

Light emitting and light receiving panels 70, 72 are connected to a controller (not specifically shown) as well as electric motor 48. When light is not received by light receiving panel 72, the controller shuts down power to electric motor 48.

Capacitive Sensing

1. Variable Limit Setting Based on Parasitic Load

Figure 6:
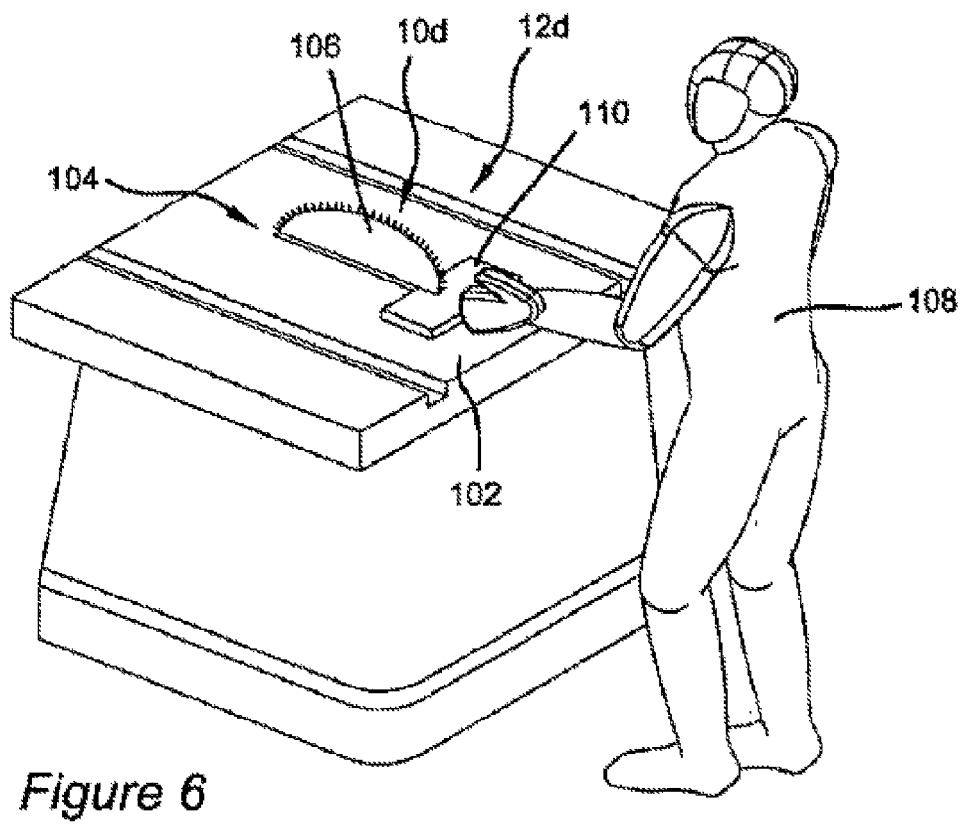
FIG. 6 is a diagram of an exemplary table saw which may employ a sensing mechanism according to a fourth embodiment of the present invention.

FIG. 6 illustrates an exemplary table saw 10d, which may employ a sensing mechanism 12d in accordance with the present invention. The table saw 10d generally includes a table portion 102 having a slot 104 therethrough for receiving a saw blade 106. The saw blade 106 is in driving engagement with a motor assembly (not shown) as is well known in the art. To cut a workpiece, the operator 108 guides a workpiece 110 into contact with the saw blade 106 as shown in FIG. 6. While the following description is provided with reference to a table saw, it is readily understood that the sensing mechanism 12d of the present invention is applicable to a variety of power tools and/or woodworking tools, including (but not limited to) miter saws, radial arm saws, circular saws, band saws, joiners, planers, nailers, drills, etc.

Sensing mechanism 12d is configured to minimize and/or prevent serious injury to the operator of the table saw 10d as will be more fully described below. Briefly, the sensing mechanism 12d is operable to detect the proximity of the operator 108 to the saw blade 106. Upon detection of a dangerous condition, the sensing mechanism 12d will trigger a protective operation intended to reduce the potential for operator injury.

Figure 7:
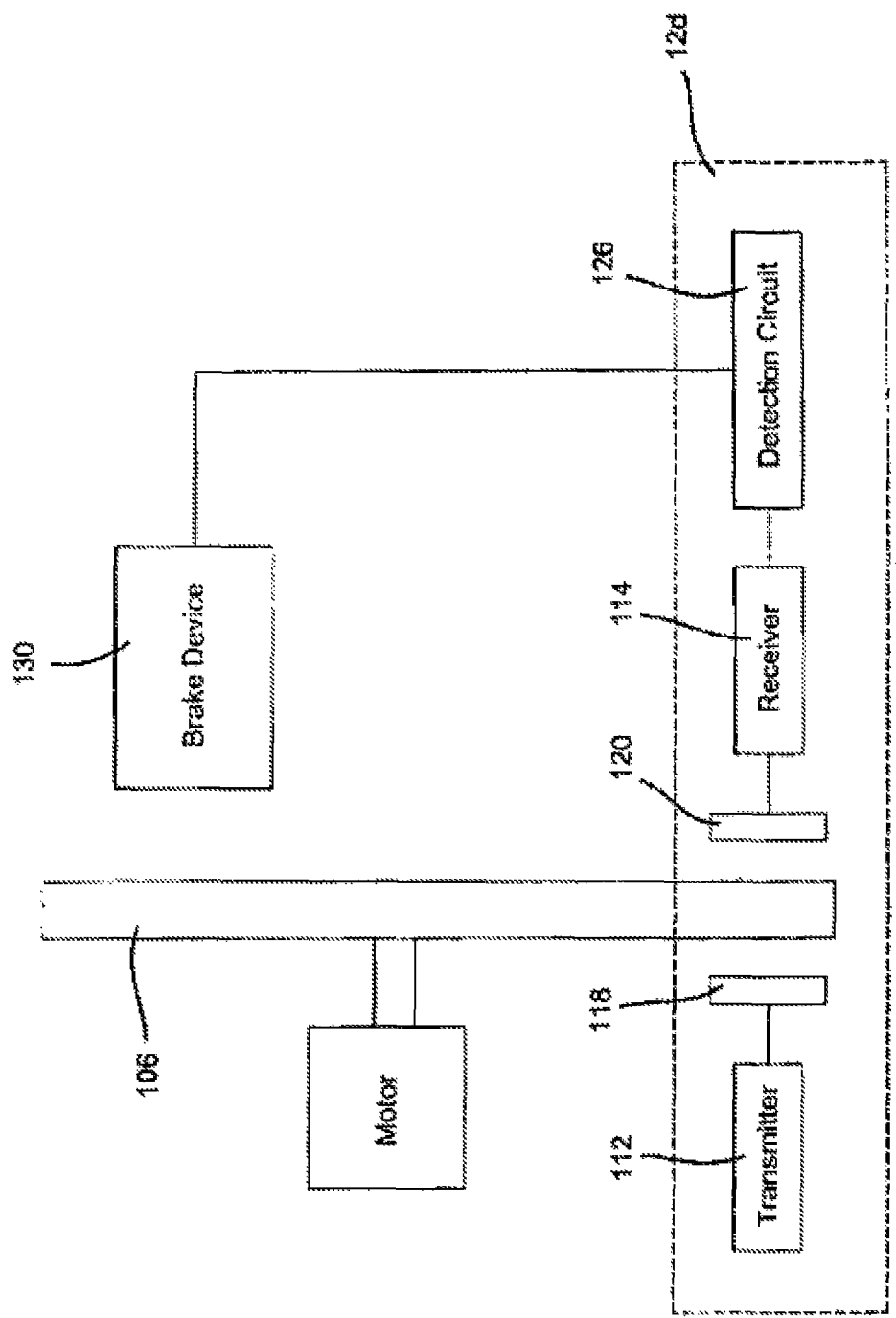
FIG. 7 is a block diagram of a preferred embodiment of the sensing mechanism of FIG. 6.

FIG. 7 illustrates the sensing mechanism 12d of the present invention in the context of the above-described table saw 10d. The sensing mechanism 12d is intended to determine if a human operator of the saw has made contact with an active portion of the saw 10d. The active portion should be a conductive object that is inherently dangerous, such as a saw blade, punch, press, router/drill bit or other mechanically moving device. In this case, the active portion of the saw is the saw blade 106.

To determine if the operator has touched the saw blade, an AC signal coupled through the saw blade 106 is monitored for changes. To do so, the sensing mechanism 12d includes a transmitter 112 capacitively coupled to the electrically isolated saw blade 106 (or arbor shaft) which in turn is capacitively coupled to a receiver 114. More specifically, the transmitter 112 is electrically coupled to a transmitting plate 118 disposed adjacent to the saw blade 106. The transmitting plate 118 is capacitively coupled to the saw blade 106, such that a charge on the transmitting plate 118 is mirrored to the saw blade 106. Likewise, a receiver plate 120 is capacitively coupled to the saw blade 106 (or arbor shaft) in a similar manner as the transmitter 112, so that this differential charge is also mirrored to the receiver plate 120. The receiver plate 120 is then electrically coupled to a receiver 114. In this way, the receiver 114 is configured to sense the AC signal from the transmitter 112.

When the human 108 touches the saw blade 106, it will cut into their skin. As the blade 106 touches the moist conductive tissue just beneath the dry layer of skin cells, the electric charge on the blade 106 will be shared with the human body 108. The sensed signal level at the receiver 114 suddenly drops when the human operator comes into contact with the saw blade 106. The human operator 108 is essentially shorting out the receiver 114. When there is such a rapid change in the detected signal intensity, it is assumed that the operator 108 has touched the saw blade 106.

Referring to FIG. 7, a detection circuit 126 is used to monitor the signal intensity at the receiver 114. It is envisioned that the detection circuit 126 may be constructed using well-known analog circuit components or implemented in software embodied in a programmable controller. In any event, the detection circuit 126 is operable to detect a sudden drop in the signal intensity and, in response to such signal drop, to activate a protective operation such as a safety mechanism 14 disclosed herein which may prevent and/or reduce the risk of injury to the operator 108. For instance, the protective operation may be a mechanical braking mechanism 130 that is actuated to stop the rotation of the saw blade. It is to be understood that other protective operations (e.g., visible or audible alarms) are also within the broader aspects of the present invention.

Figure 8:
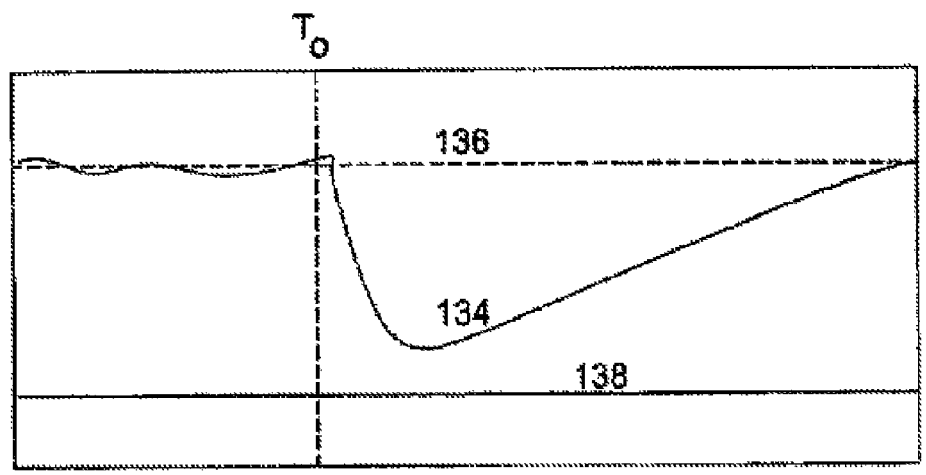
FIG. 8 is a graph illustrating a parasitic load making contact with a blade of the table saw of FIG. 6.

Referring now to FIGS. 7 and 8, in order to maintain a measurable signal at the receiver, feedback control may be utilized to control the magnitude of the signal level detected at the receiver 114. Since the magnitude of the sensed signal may be attenuated by various impedance factors associated with the operation of the saw, the magnitude of the transmitted signal (also referred to as the drive signal) is adjusted based on the signal level detected at the receiver 114. Specifically, the detection circuit 126 continually monitors the magnitude of the sensed signal 134 in relation to a reference signal value 136. When the magnitude of the sensed signal 134 is above the reference value 32, the magnitude of the transmitted signal is reduced proportionally. On the other hand, when the magnitude of the sensed signal 134 is below the reference value 32, the magnitude of the transmitted signal is increased. It is envisioned that feedback control is done at a low frequency so as not to interfere with the detection of operator contact with the saw blade 106 As seen in FIG. 8, a sudden parasitic load makes contact with the blade 106 at time T0 causing signal 134 to drop away from calibration line 136. As FIG. 8 shows, increasing the transmitted output magnitude compensates for the drop in signal 134 and eventually the signal 134 will match the reference 138. Note that the signal 134 did not cross the threshold 138 so the circuit never triggered a safety mechanism.

Figure 9:
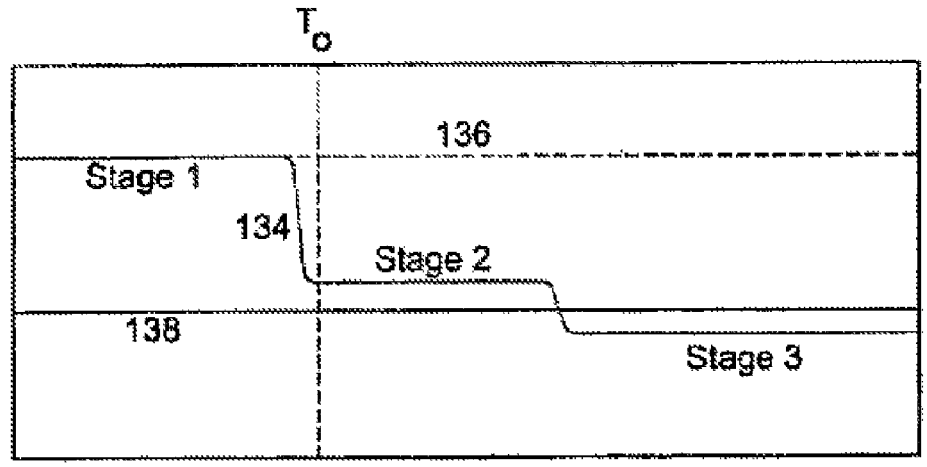
FIG. 9 is a graph illustrating three exemplary impedance loading conditions on the blade of the table saw of FIG. 6.

Referring to FIG. 9, a simulation shows three different impedance loading conditions on the blade. In Stage 1, the signal 134 is calibrated to the reference voltage 138. Neglecting feedback and applying typical wet wood impedance to the blade would produce a drop in the signal 134 as seen in Stage 2. The third stage of the simulation, is a result of only the human touching the blade without the parasitic load. For simplicity, the signal 134 is not compensated to display the different attenuation levels between human and wood impedance loads. In this situation, the system will allow the impedance load in stage 2 but will trigger in stage 3.

Figure 10:
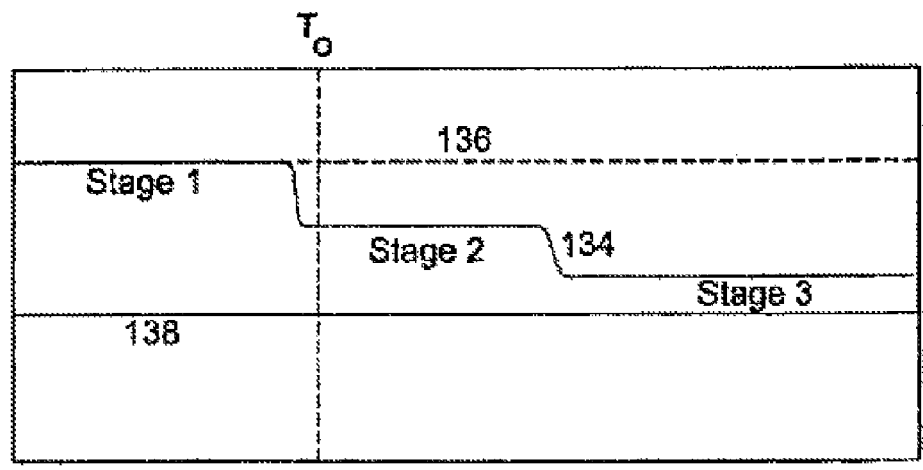
FIG. 10 is a graph illustrating the three exemplary impedance loading conditions according to FIG. 9 having added constant parasitic load.

FIG. 10 represents the same simulation but with added constant parasitic load to all three stages. The system was initially allowed to compensate for the new parasitic load (not shown before stage 1) as a result, stage 1 is identical to FIG. 9. Stages 2 and 3, however, act in the same manner as before but with different attenuation levels. In this case, none of the stages will trigger the safety mechanism. In this situation, the threshold level 138 should have been increased above the Stage 3 level but below the Stage 2 level.

Figure 11:
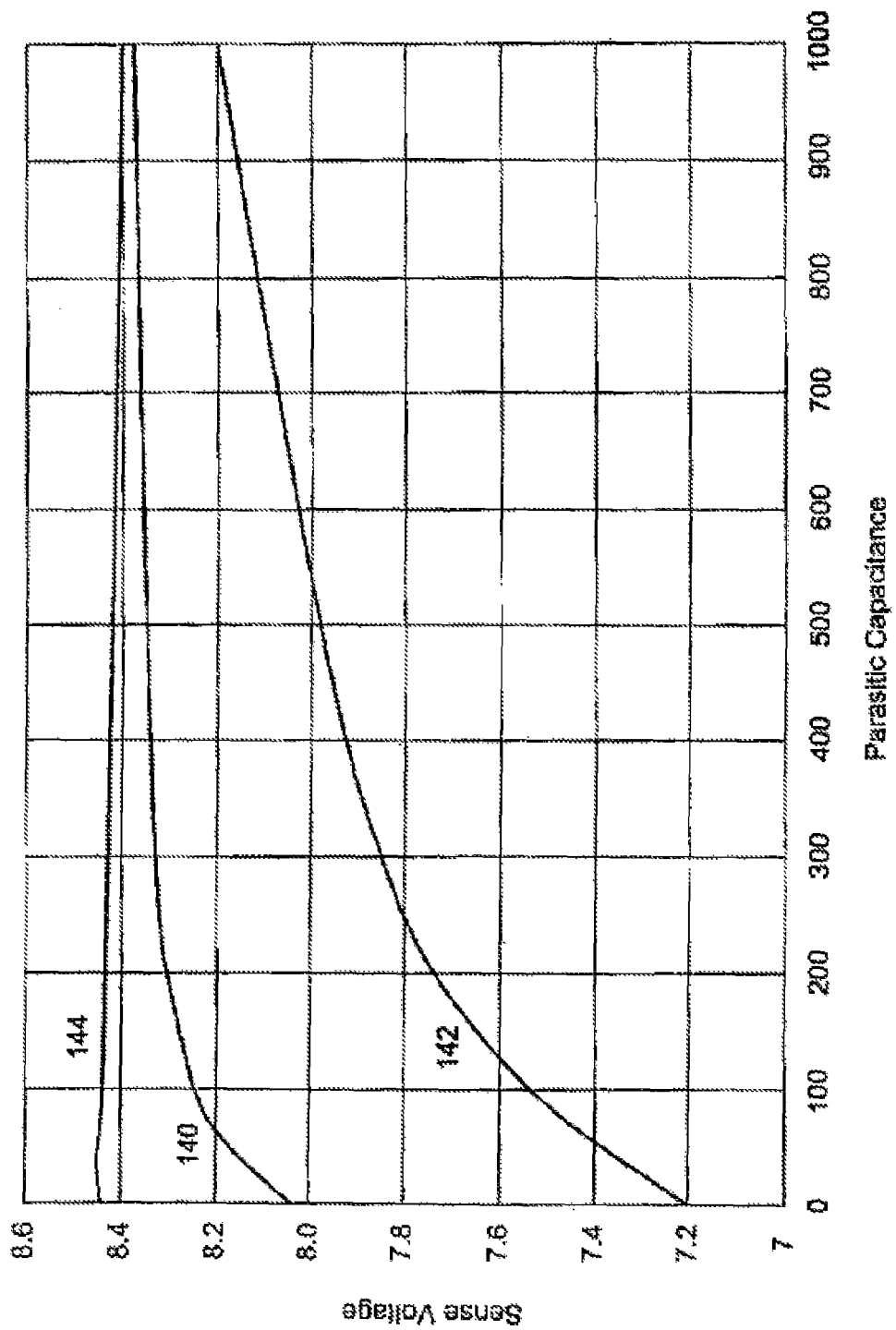
FIG. 11 is a graph illustrating the detected signal level in relation to varying parasitic loads which may be associated with the operation of the table saw of FIG. 6.

Turning now to FIG. 11, to determine the best place for the threshold level, the minimum impedance for stage 2 and the maximum impedance for stage 3 are used across a wide range of nominal parasitic capacitance. The minimum impedance is used for wood in stage 2 to keep the curve 140 as low as possible (worst case.) The maximum human impedance is used in stage 3 to keep the curve 142 as high as possible (worst case.) Between these two curves is the ideal threshold level. FIG. 11 represents these curves plotted against the parasitic capacitance. Clearly, a constant threshold voltage level would be prone to false trip and miss fire.

To illustrate this point, assume that the threshold voltage is set at 8.0 volts in FIG. 4. For stage 1 curve 144 & stage 2 curve 142, the sensing mechanism 12d properly operates across a wide range of parasitic capacitive loads. However, when capacitive loads associated with the saw exceed 400 pF, the sensing mechanism 12d may not detect operator contact with the saw blade 106. In other words, after human contact, the voltage level for stage 3 curve 142 does not drop below the 8.0-volt threshold. Conversely, if the threshold value is set at 8.3 volts, the sensing mechanism 12d would accurately detect operator contact with the saw blade 106 when capacitive loads exceed 400 pF, but may inaccurately initiate protective measures when capacitive loads are below 75 pF. Accordingly, the threshold value for the sensing mechanism 12d should vary based on the parasitic capacitance associated with the operation of the saw.

Figure 12:
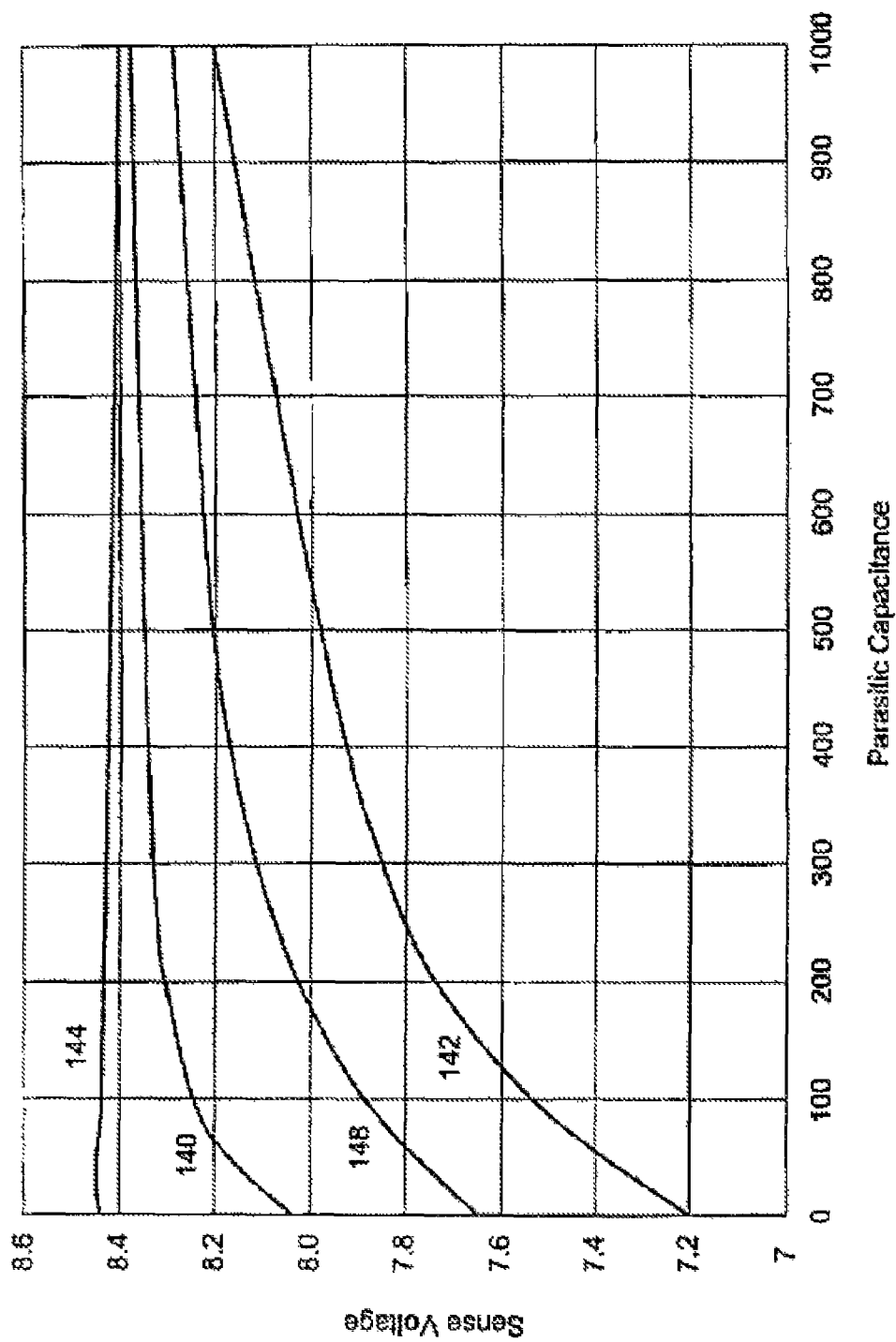
FIG. 12 is a graph illustrating the detected signal level of FIG. 11 including an ideal curve and the basis for the adjustable threshold value.

FIG. 12 illustrates the basis for an exemplary dynamically adjustable threshold value. The ideal curve 148, which is the basis for the adjustable threshold value, is preferably plotted halfway between stage 2 curve 42 and stage 3 curve 40 in order maximize sensitivity of the detection system and yet minimize occurrence of false triggers.

Figure 13:
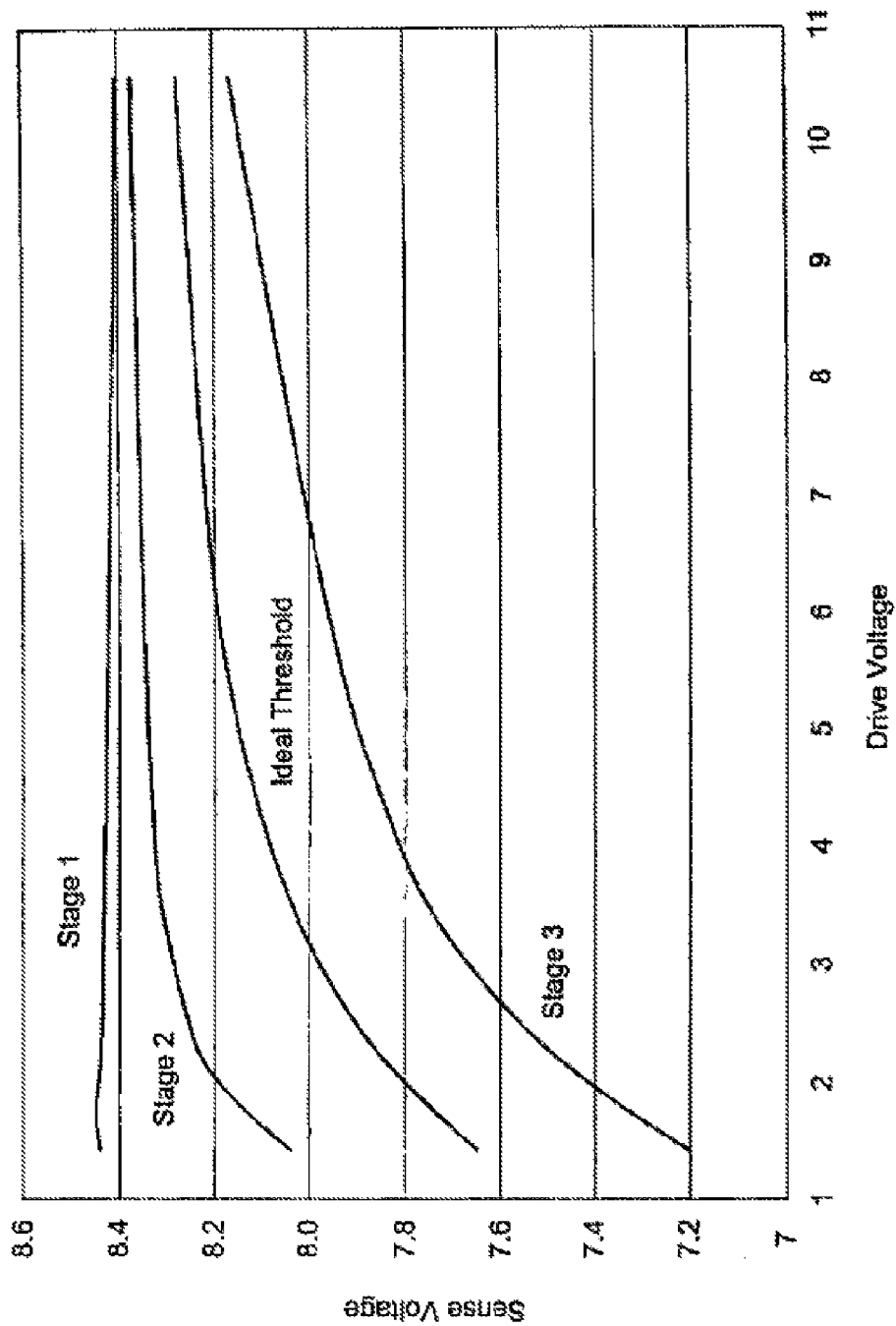
FIG. 13 is a graph of the drive voltage of the transmitter in relation to the voltage detected at the receiver for each of the operating conditions of FIG. 12.

Since the parasitic capacitance associated with the operation of the saw is not easily determined, it is envisioned that the adjustable threshold value may be derived from another operational parameter of the saw. For each of the operating conditions described above, FIG. 13 plots the drive voltage of the transmitter 112 in relation to the voltage detected at the receiver 114. One skilled in the art will readily recognize that the curve for each different operating condition correlates to the corresponding curves in FIGS. 8-12. In other words, the parasitic capacitance associated with the operation of the saw correlates to the drive voltage of the transmitter. Therefore, the desired threshold value may also be correlated to the drive voltage of the transmitter 112.

Figure 14:
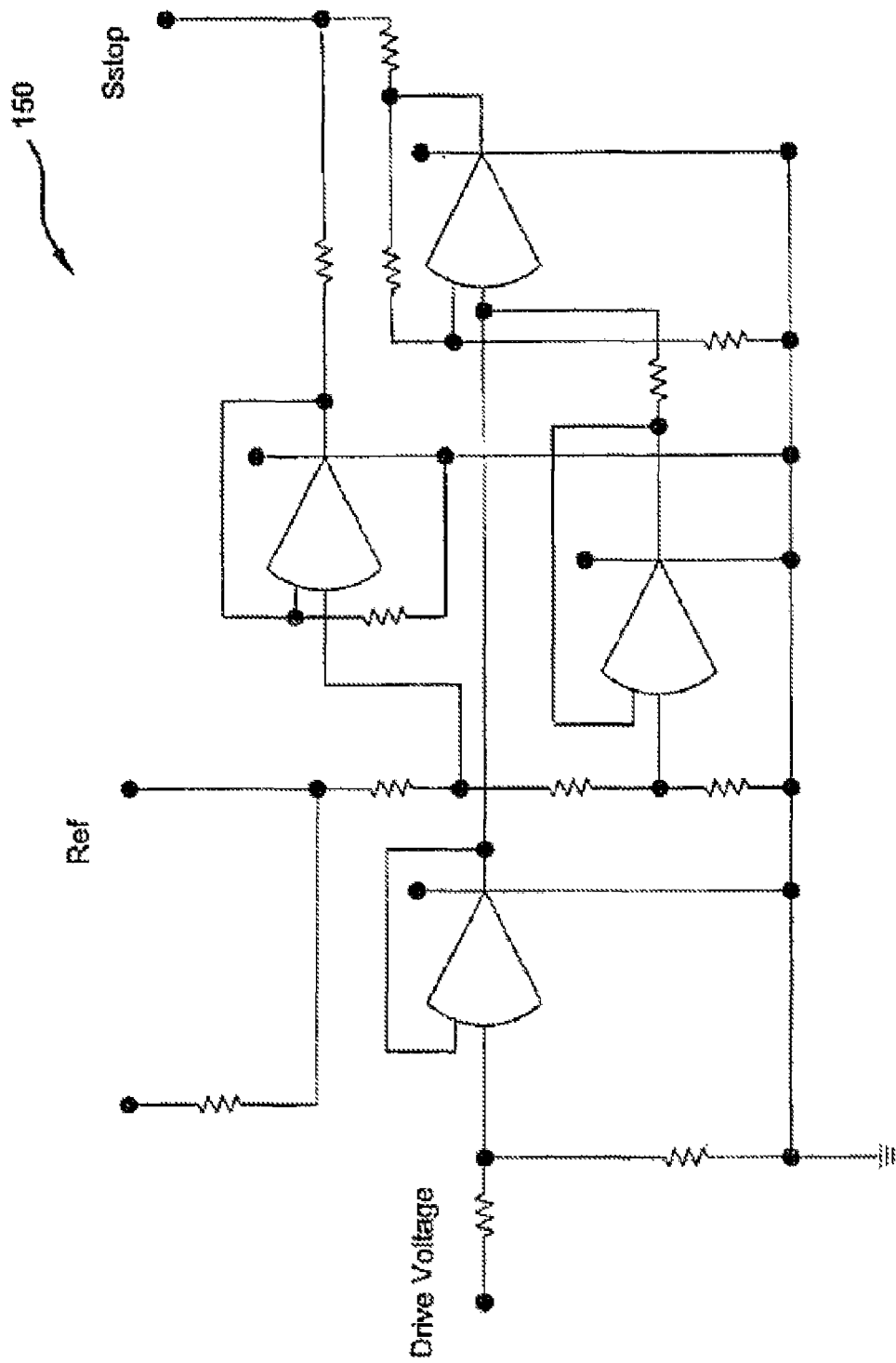
FIG. 14 is a schematic of an exemplary circuit used to derive a dynamically adjustable threshold value in accordance with the present invention.

FIG. 14 illustrates an exemplary analog circuit 150 that may be used to derive the adjustable threshold value in accordance with the drive voltage of the present invention. While one exemplary embodiment has been provided with specific components having specific values and arranged in a specific configuration, it will be appreciated that this function may be constructed with many different configurations, components, and/or values as necessary or desired for a particular application. The above configurations, components and values are presented only to describe one particular embodiment that has proven effective and should be viewed as illustrating, rather than limiting, the present invention.

2. Handle Mounted Transmitter/Receiver Pair for Proximity Sensing

Figure 15:
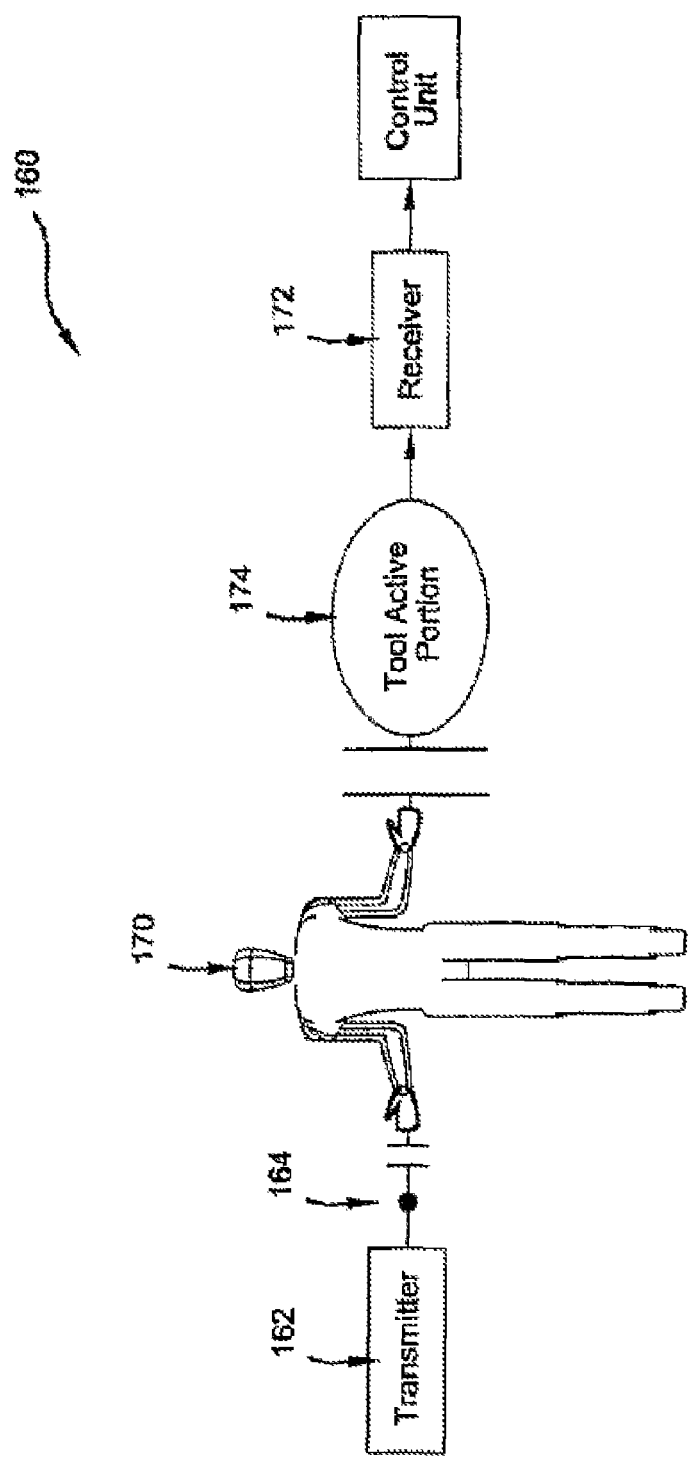
FIG. 15 illustrates a known capacitive sensing system.

Contrary to the first embodiment, the following is a description of an alternate sensing mechanism 12e hereinafter referred to as proximity sensing. Whereas the previous circuit triggered on the lack of a signal, the following will trigger on the presence of a signal. FIG. 15 illustrates a known capacitive sensing system 160. In system 160 a transmitter 162 is connected to the handle or trigger portion of the tool 164 and broadcasts a signal. The signal is capacitively coupled to the operator 170. The receiver 172 is connected to the active portion of the tool 174. When the operator 170 is holding the tool correctly, the signal is transmitted through the person 170 to the receiver 172. As the operator 170 approaches the active portion of the tool 174, the signal intensity on the receiver 172 increases until some predetermined level is reached. At that point a predetermined action is performed, such as braking of motor/blade or other safety mechanism 14 disclosed herein to prevent and/or reduce bodily injury.

The improvement of the present invention, lies in the fact that if the operator 170 is touching a grounded object (table surface 102 of FIG. 6) the signal path is essentially shorted out. With the operator 170 touching both the transmitter 162 and the grounded object, the signal intensity in the operator 170 is very low. Even when accidental operator contact with the active portion of the tool 174 has occurred, the signal amplitude picked up by the receiver 172 might not be high enough to trigger an employed safety mechanism 14.

Figure 16:
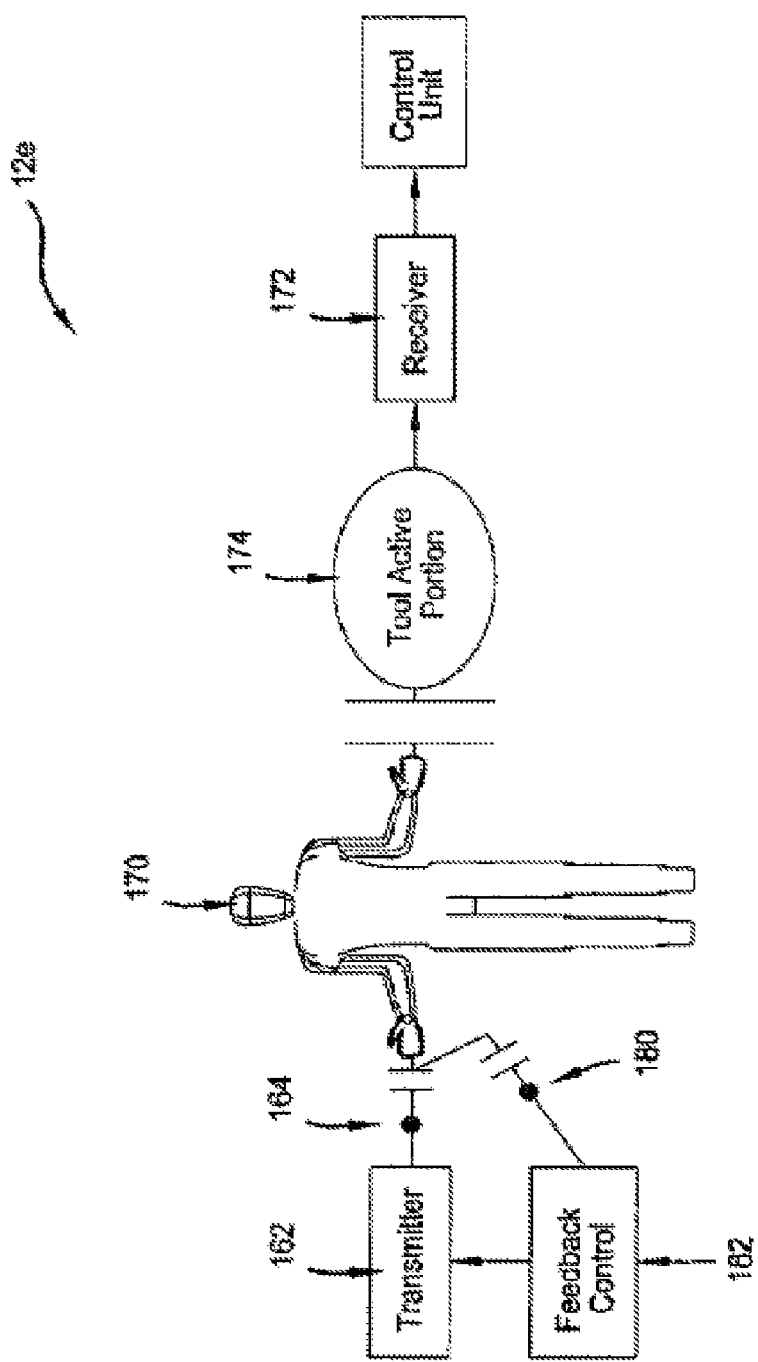
FIG. 16 illustrates a block diagram of a sensing mechanism according to a fifth embodiment of the present invention.
Figure 17:
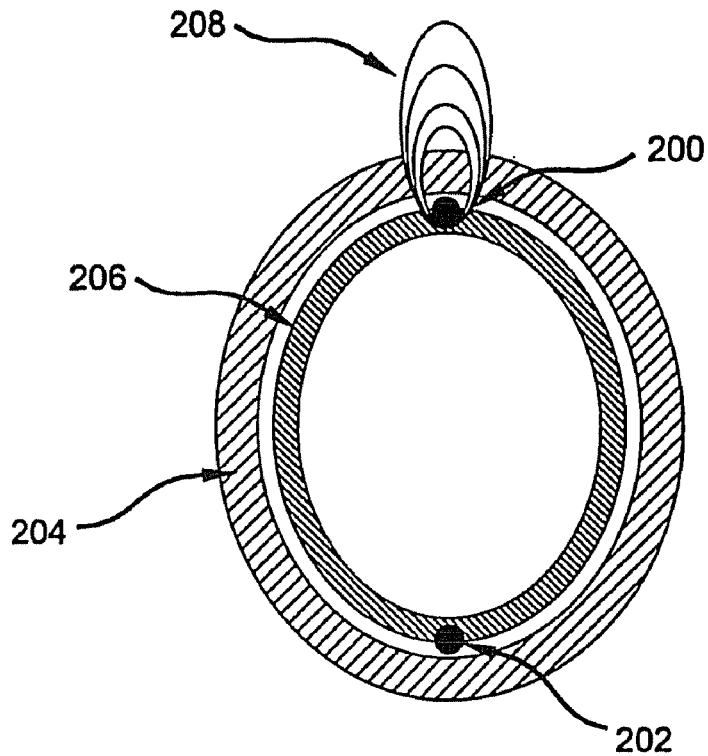
FIG. 17 is a signal representation of the sensing mechanism of FIG. 16 having a signal amplitude near zero.
Figure 18:
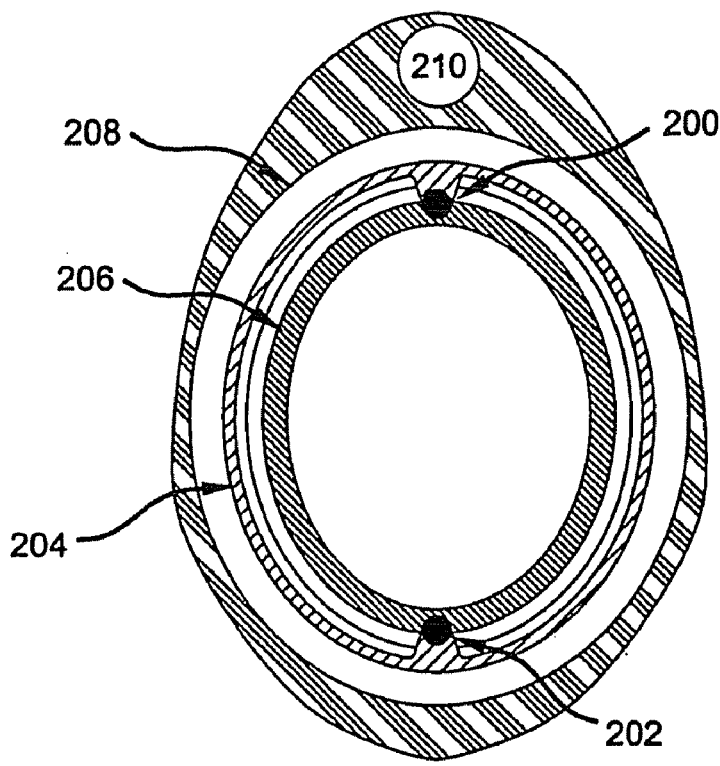
FIG. 18 is a signal representation of the sensing mechanism of FIG. 17 shown with an operator's hand touching a handle of the power tool.

To correct this situation, a second receiver is needed. Referring to FIG. 16, sensing mechanism 12e is shown. The addition of second receiver 180 and feedback control circuit 182 provide a constant signal level in the operator 170 regardless of operator grounding. The receiver 180 is mounted in relation to the transmitter 162 such that no coupling exists until the user 170 is grasping the handle or trigger portion of the tool. Only then, does the receiver 180 receive a signal. To those skilled in the art of antenna theory, it is easily recognized that the received signal amplitude will be proportional to the signal amplitude in the operator's body. FIG. 17 visually describes this system. Transmitter 200 and receiver 202 are located just inside the handle 204 of the tool. A ground plane 206 is placed to cancel any signal that would naturally propagate from transmitter 200 to receiver 202. As shown by the electric field lines 208, the receiver signal amplitude is near zero. In FIG. 18, the operator's hand 210 is wrapped around handle 204. The electric field lines picked up by the operator 170 are continuous around the handle 204 because the human body is conductive. The field lines 206 now can reach the receiver 202 and provide signal amplitude proportional to the amplitude in the operator 170.

The feedback control 182 regulates the transmitted signal amplitude. If the signal on the receiver 180 is greater than some predetermined reference level, it is assumed that the level in the operator 170 is greater than the desired amount as well. The feedback control 182 then decreases the amplitude of the transmitted signal until the signal strength on receiver 180 reaches the predetermined level. In contrast, if the operator 170 holding the tool suddenly touches a grounded object, the signal strength in the operator 170 would drop. Accordingly, the signal on the receiver 180 would also drop. The feedback control 182 recognizes this and compensates by increasing the transmitter amplitude. By keeping the signal in the operator 170 constant, the signal received by the active portion of the tool 174 is proportional only to the distance from the operator 170 to the active portion of the tool 174.

It is additionally possible to change the feedback control 182. Instead of modifying the transmitted amplitude, the feedback control could modify the threshold value. When the signal on the receiver 180 is dropping, the circuit would have the same sensitivity if the threshold of original receiver 172 were lowered as well.

3. Lowered EMI on Capacitive Sensing

Figure 19:
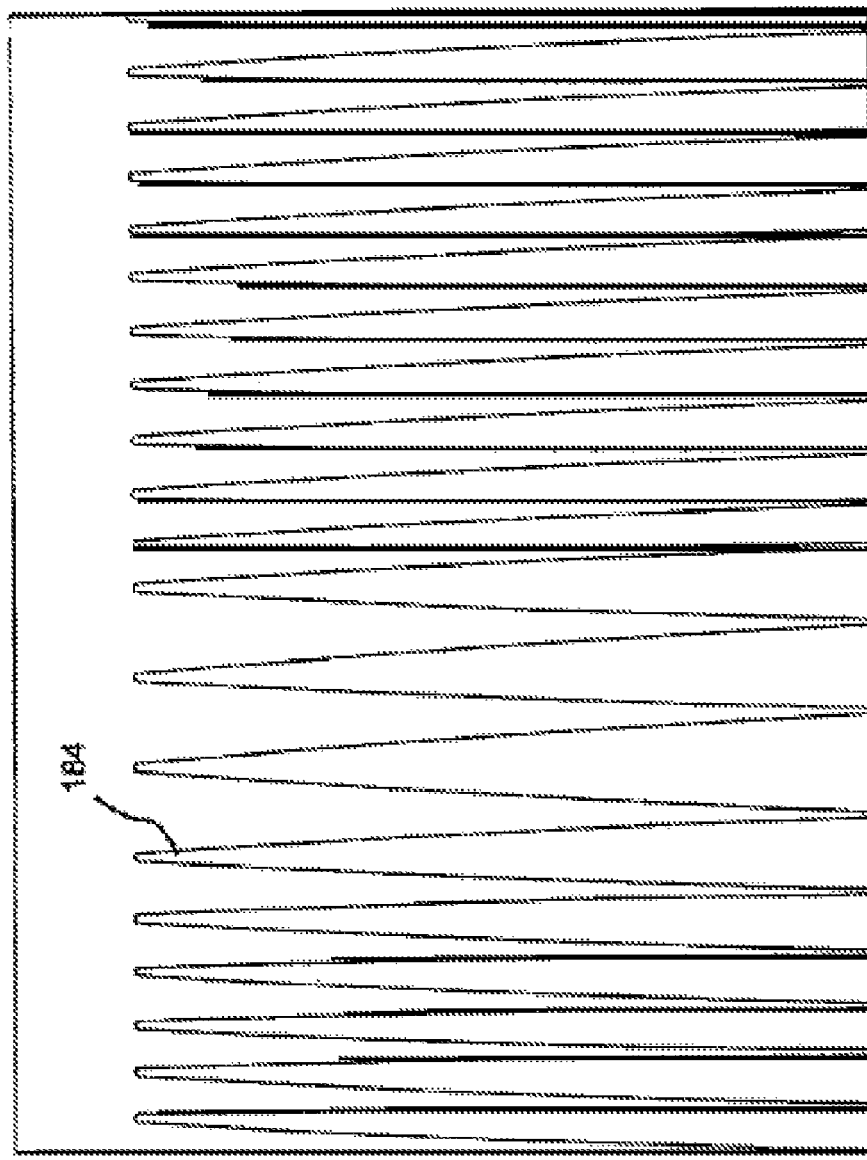
FIG. 19 is a graph of an exemplary sinusoidal voltage employed to reduce the amount of EMI radiation emitted from the capacitive sensing system of FIG. 16.

FIG. 19 illustrates a method of reducing the amount of electromagnetic interference (EMI) radiation that is emitted from a capacitive sensing system. Outputting a sinusoidal voltage 184 on a piece of metal and detecting the received signal is the basis for capacitive sensing. The greater the frequency and the greater the amplitude, the more sensitive the system is. Unfortunately, any conductive object of changing voltage produces radiated EMI. Global compliance standards limit the amount of both conducted and radiated fields from most electronic/electrical devices and machines. By varying the frequency of oscillation, there is not a single frequency radiated. Instead, there will be a band of frequencies with an elevated radiated emission. Since the energy radiated will be the same in a single frequency versus a band of frequencies, the measured amplitude of the band will be much lower than the amplitude of the single frequency. The lower the amplitude, the more likely the signal is below the required limits.

Additionally, as is generally known any signal such as the AC signal of the sensing mechanism 12d when coupled to an electrically conductive body such as a saw blade of the sensing mechanism 12d, emits radiated electromagnetic interference. The frequency of the radiated electromagnetic interference is directly related to the frequency of the AC signal that is transmitted to the active portion of the power tool. Also, the magnitude of the radiated electromagnetic interference is related to the magnitude AC signal that is transmitted to the active portion of the power tool. Additionally, the capacitive sensing system of the present invention generally increases in sensitivity as the amplitude and the frequency of the AC signal that is transmitted from the transmitter to the saw blade is increased. The electrical signal field strength of radiated emissions in devices not intended to be radiation devices is limited by the Code of Federal Regulations for the protection of operators and electromagnetic compatibility with other electronic devices. The Code of Federal Regulations 47 C.F.R.15.109 limits the amount of radiated emission based on the band of the frequency of emission. Therefore, it is desirable to vary the frequency of AC signal from the transmitter to allow a signal having large field strength to be dispersed over multiple different emission bands. The variation of the frequency allows the relatively high amplitude of the AC signal to be dispersed over a broad band of frequencies to reduce the peak radiated electromagnetic interference in a single frequency. The broad band of frequencies allows the capacitive sensing system of the present invention to operate at desired radiated EMI levels to conform to reduce interference with other electronic devices and provide safer operation by the operator.

The frequency of the AC signal is preferably varied by a ramp shaped function wherein the frequency is alternated between a minimum frequency and a maximum frequency in a linear pattern. It is also appreciated that the frequency of the AC signal may be varied by other patterns such as sinusoidal, step, random or others to select and disperse the level of the radiated EMI.

Alternative Sensing

Figure 20:
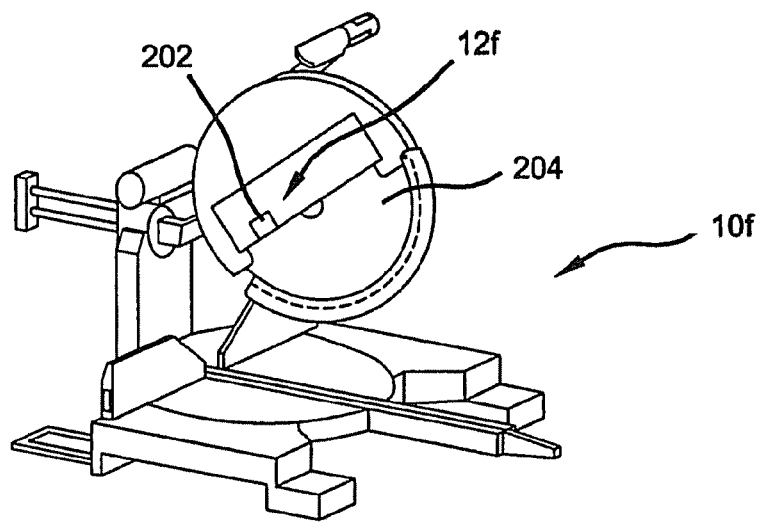
FIG. 20 is a perspective view of a sensing mechanism according to a sixth embodiment of the present invention.

FIG. 20 illustrates a safety system employing a sensing mechanism 12f according to an additional embodiment of the present invention. The sensing mechanism 12f detects when a portion of the operator's body is in dangerous proximity to the active portion of the power tool to prevent/reduce injuries. If a dangerous condition is detected, a controller operates a protective measure such as a safety mechanism 14 disclosed herein with respect to the active portion of the power tool. The sensing mechanisms 12 described according to this embodiment are shown operatively associated with a power table saw and a miter saw. It will be appreciated however, that the sensing system may also be employed to other tools such as but not limited to planers, jointers or drills.

FIG. 20 illustrates sensing mechanism 12f including generator 202 operatively associated with a miter saw 10f, for detecting when a human extremity is in close proximity to a rotating saw blade 204. Generator 202 is an electrostatic charge generator attached to the rotating saw blade 204. If a human extremity or other object having a capacitance and charge that is relatively lower than the charge on the saw blade 204, an electrostatic charge in the form of a spark will act on the human extremity. In a preferred embodiment, the generator 202 includes a Van De Graff generator to generate the electrostatic charge however, it is appreciated that other electrostatic charge generators may be employed. The transfer of the spark to the operator's hand will alert the operator that a portion of his body is too close to the saw blade 204.

Figure 21:
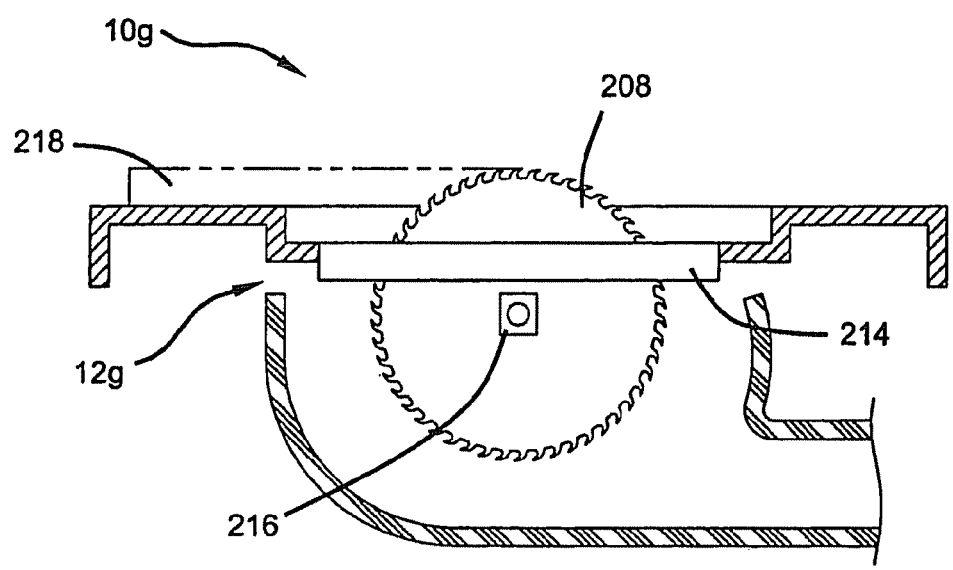
FIG. 21 is a cutaway view of a sensing mechanism according to a seventh embodiment of the present invention.

FIG. 21 shows a sensing mechanism 12g including transmitter or depth sensor 214 that senses if a human extremity is in close proximity to a rotating saw blade 208. Transmitter 214 is shown operatively associated with table saw 10g and is operable to monitor the depth (thickness) of the workpiece 218 that is being fed into saw blade 208. In most cutting operations, the thickness of the workpiece 218 that is being cut is relatively consistent. In this way, if depth sensor 214 detects a sudden change in the depth (thickness) of the workpiece 218, a switch 216 is activated to stop saw blade 208 as a precautionary measure to prevent contact of human extremities with saw blade 208. It is appreciated that switch 216 may also comprise any of the safety mechanisms 14 disclosed herein.

Figure 22:
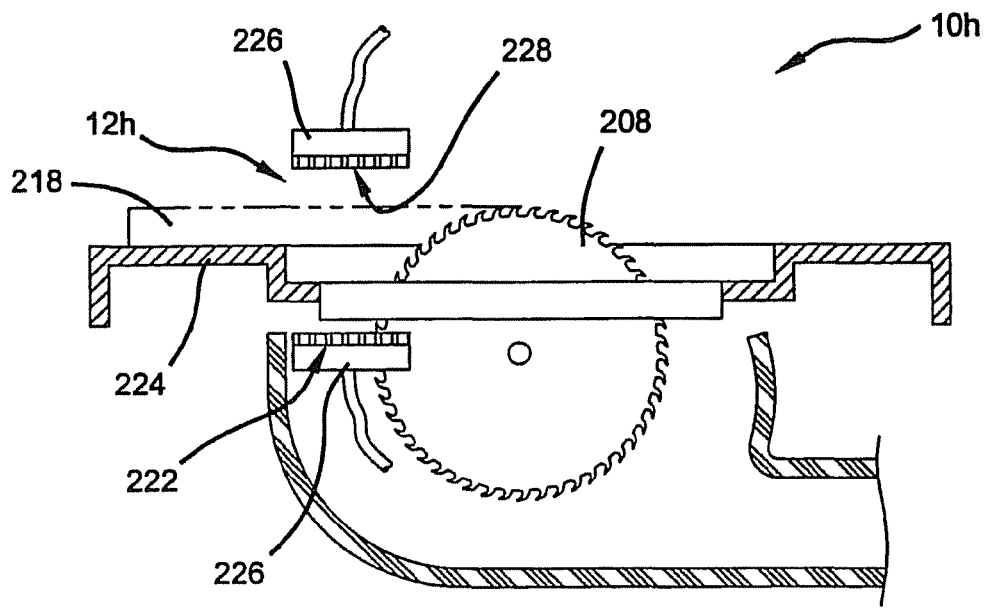
FIG. 22 is a cutaway view of a sensing mechanism according to a eighth embodiment of the present invention.

FIG. 22 shows a sensing mechanism 12h including light gate 226, which senses a change in the thickness of the workpiece 218 that saw blade 208 is cutting. Light gate 226 is shown in operative use with a table saw 10h of the type explained above. Light gate 226 includes a plurality of light emitting diodes, (LEDs), 222 mounted to the underside of table 224. Positioned above saw blade 208 for receiving the light emitted from LEDs 222 are a plurality of photo-receivers 228. Photo-receivers 228 monitor the amount of light that is emitted from LEDs 222. If the amount of light that is received by photo-receivers 228 is less than a nominal amount or there is a significant change in the amount of light received, the saw blade 208 is shut off. Saw blade 208 may be shut off by a switch or a safety mechanism 14 described herein. In operation, a human extremity or other object of thickness greater than the workpiece 218, positioned above the workpiece will affect the amount of light that is received by photo-receivers 228. In operation, a small amount of light is emitted around the side and front of the blade 208 because of the non-circular shape of the blade 208 and the enlarged width of the teeth with respect to the width of the blade 208. If an object that is thicker than the workpiece 218 comes in close proximity with the saw blade 208, a portion of the light that is emitted around the side and front of the blade 208 is not received by the photo-receivers 228.

Figure 23A:
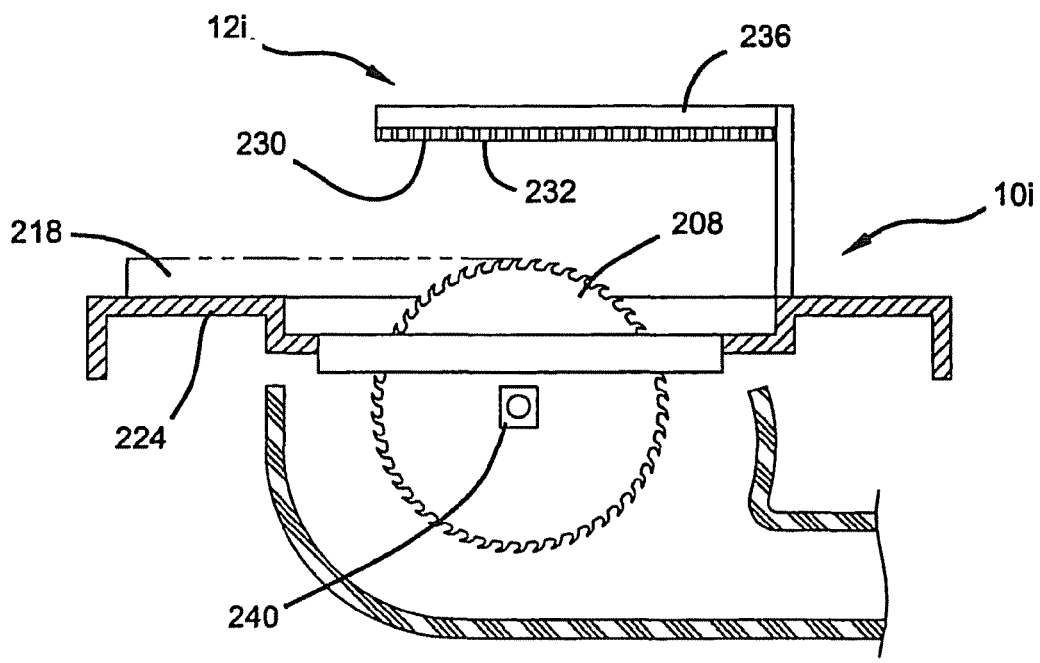
FIG. 23a is a perspective view of a sensing mechanism according to a ninth embodiment of the present invention.

FIG. 23a shows a sensing mechanism 12i having an ultrasound sensor panel 236, that senses if a human extremity, is in close proximity to a rotating saw blade 208. As shown in FIG. 23a, the present device is shown in operation with a table saw 10i as described above. Ultrasound sensor 236 is generally comprised of a plurality of ultrasound emitters 230 and receivers 232 positioned therealong. Panel 236 is positioned above the top of saw blade 208 so that panel 236 including emitters 230 and receivers 232 extend beyond the point where saw blade 208 protrudes from planar top surface 224. In operation, a workpiece 218 is moved toward a rotating saw blade 208 for selective removal of a portion of the workpiece 218. As the workpiece 218 is moved toward the saw blade 208, ultrasonic emitters 230 send out an ultrasonic signal which is echoed off of the workpiece 218 and saw blade 208 and redirected toward receivers 232. Receivers 232, monitor the ultrasonic signals to determine a profile, or height, of the workpiece 218 that is being cut. A change in the thickness, which may be caused by a human extremity, changes the signal that is received by the receivers 232. A change in the received signal activates a switch 240 which stops the saw blade 208 in order to prevent contact of the human extremity with the saw blade 208. Again it is appreciated that any safety mechanism 14 disclosed herein may be employed to stop saw blade 208 upon detection from sensing mechanism 12i.

Figure 23B:
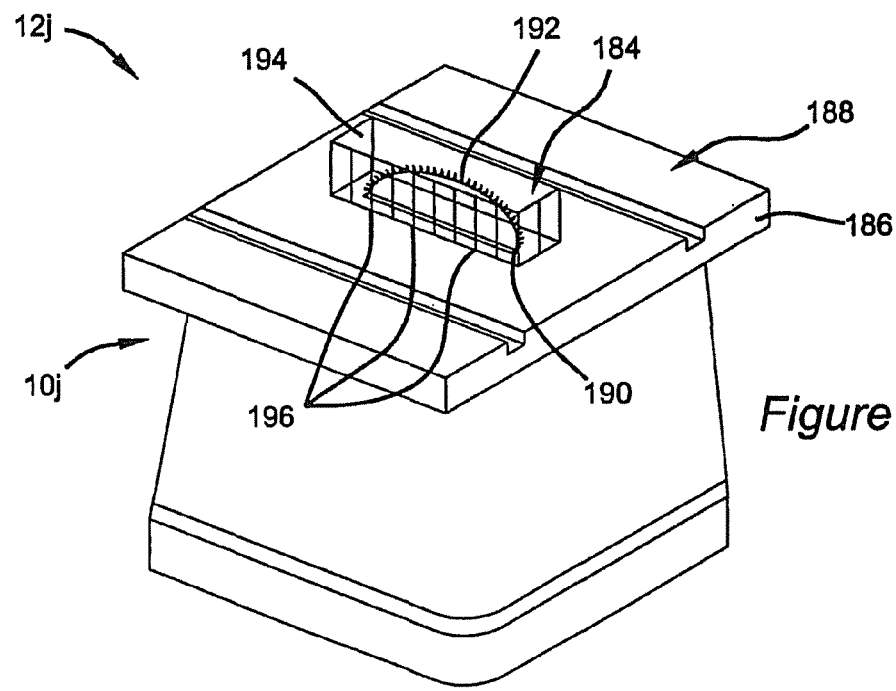
FIG. 23b is a perspective view of a sensing mechanism according to a seventh embodiment of the present invention.

Referring to FIG. 23b, a sensing mechanism 12j including proximity sensing guard 184 for a table saw 10j is shown in detail. A table saw assembly 10j, as is well known is comprised of a table 186 having a planar top surface 188. Formed in table 186 is an elongated slot 190 for receiving a rotating circular saw blade 192 which is operatively connected to a drive (not shown).

Proximity sensing guard 184 is operatively positioned above saw blade 192 to prevent accidental contact by the user with the saw blade 192. Proximity sensing guard 184 is composed of a top plate 194 that is positioned above saw blade 192 and substantially parallel planar top surface 188. Connected to top plate 194 are a plurality of flexible conductive sensing wires 196. In preferred operation, an electrical signal transmitter (not shown) emits a predetermined signal to top plate 194 and sensing wires 196. Attached to saw blade 192 is a receiver (not shown) which receives and monitors the signal that is emitted from top plate 194 and sensing wires 196. If an object with a relatively high capacitance, like the human body comes in contact or close proximity with sensing wires 196 or top plate 194, the amplitude of the signal is dramatically reduced. When the receiver receives a signal having a relatively low amplitude, indicating a high capacitance object is in close proximity, a safety mechanism 14 is applied to the saw 10j to prevent further rotation of the saw blade 192 leading to possible contact with a portion of the operator's body.

Moving Hands Away with Inertia

Figure 24:
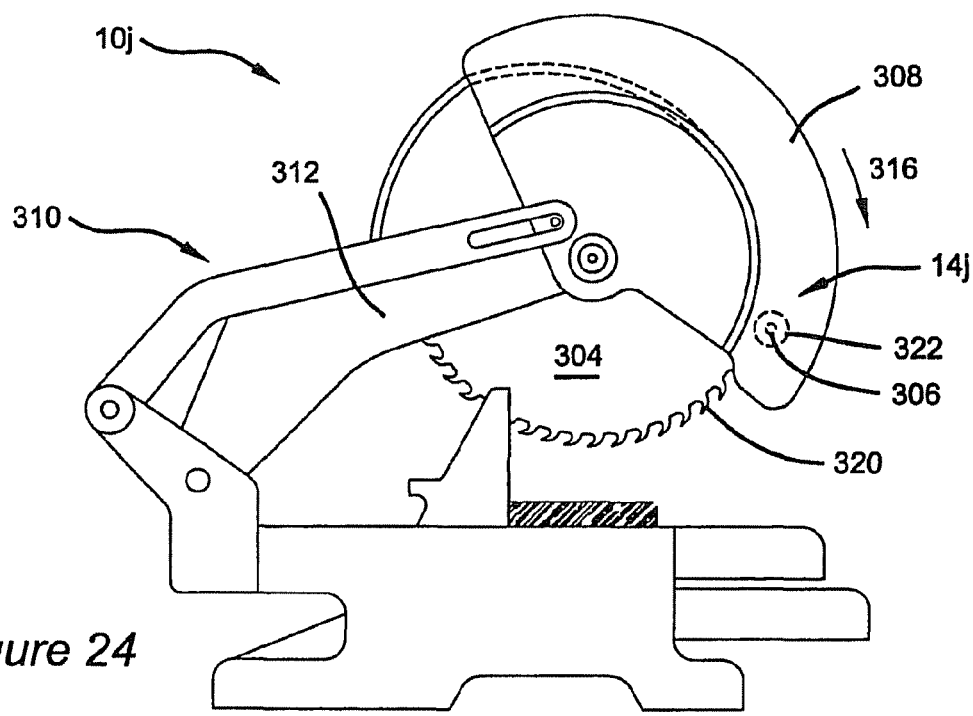
FIG. 24 is a side view of a safety mechanism according to a first embodiment of the present invention.

In many typical hand held portable circular saws, the blade is rotated in a clockwise direction as shown in FIG. 24. The direction of rotation allows the saw blade to smoothly engage the workpiece without causing the teeth of the saw blade to engage the workpiece and propel the saw forward across the wood. Many commonly available handheld portable circular saws have a guard that prevents contact between the blade and other objects. However, the nature of a circular saw prevents the guard from protecting the saw blade while the circular saw is operating. Simply, the saw blade must be exposed to engage the workpiece. Typically, the guards are rotated into engagement from the rear of the saw to the front of the saw along a path that is substantially similar to the perimeter of the blade. Many of the guards are biased toward the closed position by a biasing mechanism.

FIG. 24 shows an exemplary miter saw 10j which may employ a safety mechanism 14j in accordance with the present invention. Safety mechanism 14j limits the area of the blade 304 that is open to contact. Although the following description is directed to a miter saw 10j, it will be appreciated that the safety mechanism 14j may also be used in conjunction with other tools employing a safety guard 308. Guard 308 is pivotally attached to miter saw 10j and also includes a pivot arm assembly 310 linked between miter saw arm 312 and guard 308 to help ensure proper articulation of guard 308 throughout the range of movement of miter saw 10j.

Safety mechanism 14j includes a trigger 306 that grasps the side of saw blade 304, which is rotating clockwise, and causes the guard 308 to close further around the blade 304 to prevent contact with the blade 304. The trigger 306 is composed of a coupling mechanism 322 connected to the guard that is operable to couple the guard 308 to the circular saw blade 304. Once the coupling mechanism 322 has engaged the circular saw blade 320, the guard 308 is actuated along direction 316 as shown in FIG. 24. As the guard 308 is actuated along direction 316, the guard 308 engages any objects that are contacting the saw blade 304 or are proximate to the saw blade 304 thereby forming a barrier between the saw blade 304 and the operator.

Explained further, if an operator's fingers were detected by for example any sensing mechanism 12 described herein, as being in dangerous proximity to the saw blade 304, the guard 308 would immediately couple to the saw blade 304 causing the guard 308 to move clockwise along with the saw blade 304. As the guard 308 closes any objects that are in close proximity to the saw blade 304 are pushed along, and away from dangerous contact with the saw blade 304. It will be appreciated that trigger 306 may alternately engage teeth 320. Safety mechanism 14j may be used in conjunction with any of the sensing mechanisms 12 disclosed herein.

Figure 25:
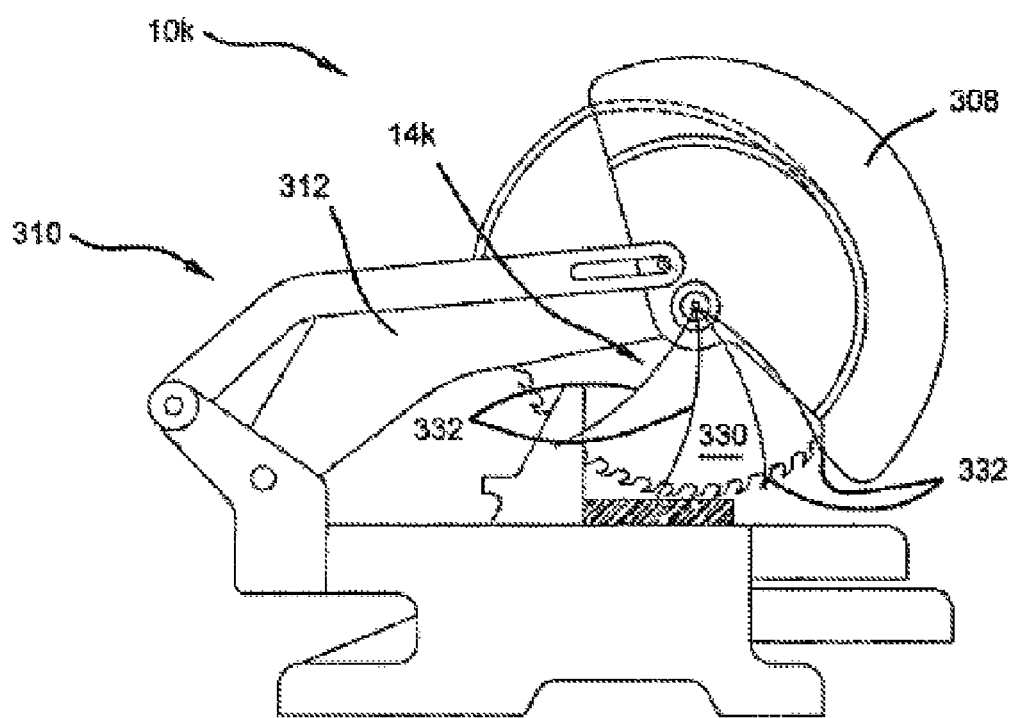
FIG. 25 is a side view of a safety mechanism according to a second embodiment of the present invention.

FIG. 25 shows an exemplary miter saw 10k which may employ a safety mechanism 14k in accordance with the present invention. Safety mechanism 14k alerts the operator of possible contact with saw blade 330. Safety mechanism 14k includes a plurality of flexible wire elements 332 extending from the center of saw blade 330. As saw blade 330 is rotated, flexible wire elements 332 are positioned radially outward by centrifugal force to form a circular pattern around the rotating saw blade 330. If the operator of the power tool makes contact with the flexible wire elements 332, the user is alerted that the rotating saw blade 330 is in close proximity.

Moving Hands Away without Inertia

An alternative to stopping the active portion of the power tool is to move the portion of the operator's body that is in dangerously close proximity to the active portion of the power tool away from the power tool. This methodology does not require a reaction system that must account for the forces associated with stopping a rotating object. However, like a braking system, a hand retraction system must perform the function of moving a portion of the operator's body away from a dangerous position with the active portion of the power tool in a very rapid period of time. In devices such as saws where rapid workpiece feed rates are possible, the portion of the operator's body must be moved away from the active portion of the power tool very rapidly to prevent and/or reduce injury.

Figure 26A:
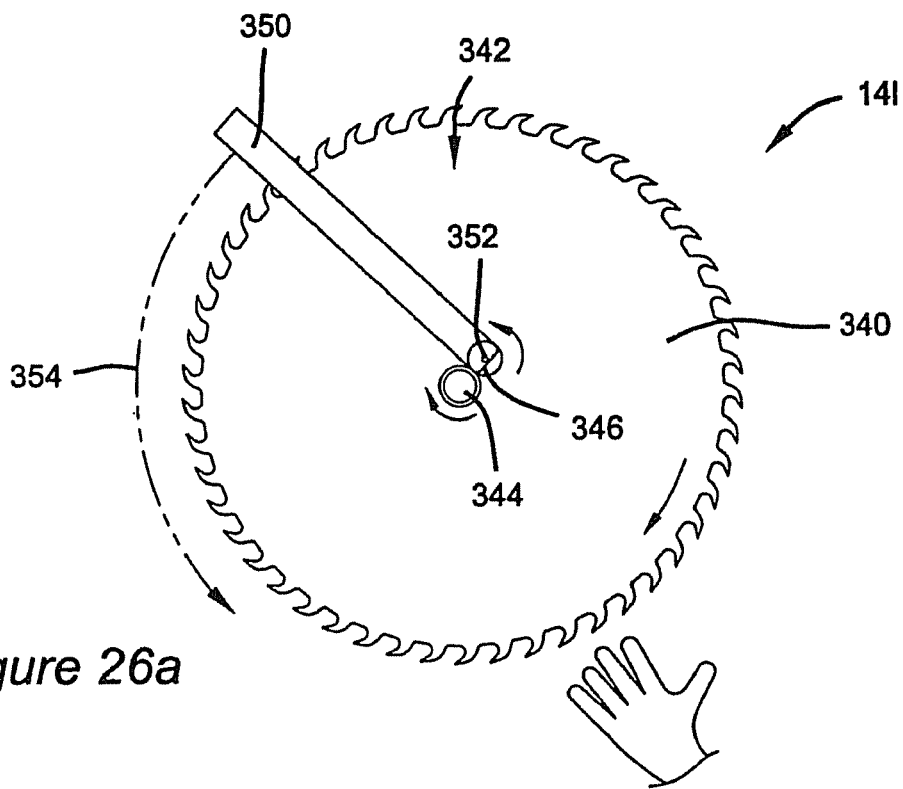
FIG. 26a is a side view of a safety mechanism according to a third embodiment of the present invention shown prior to actuation.
Figure 26B:
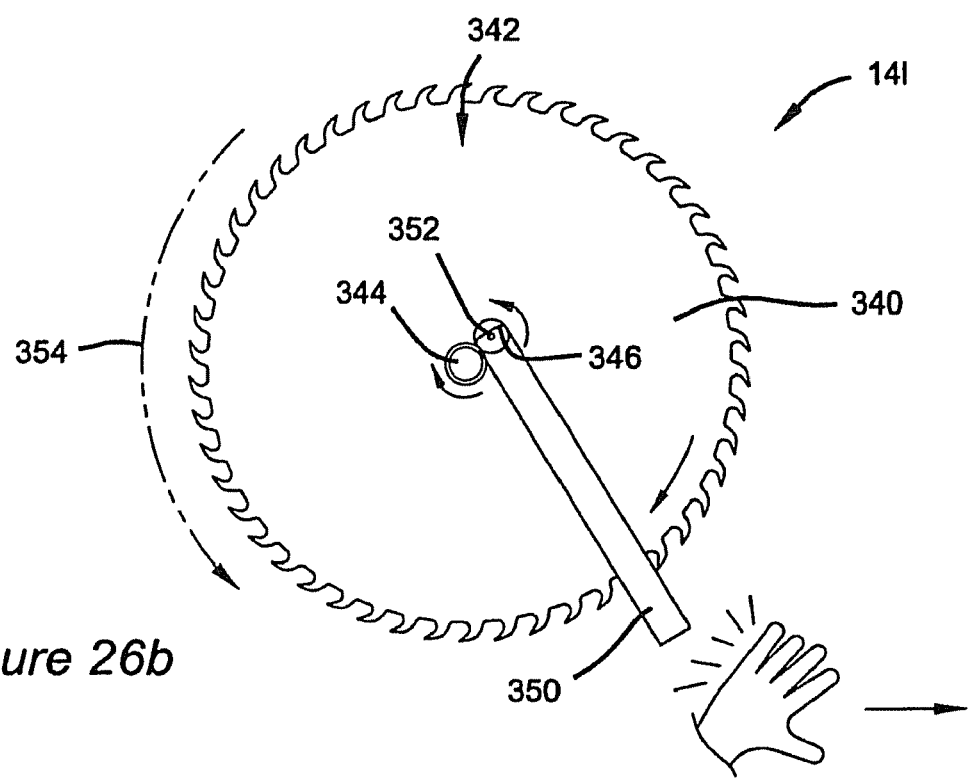
FIG. 26b is a side view of the safety mechanism of FIG. 26a shown after actuation.

FIGS. 26a and 26b illustrate a safety mechanism 14l for rapidly moving the hand of the user away from a rotating blade 340. Thrust bar 342, is generally composed of a first gear 344 rotating with the saw blade 340 and a second gear 346 selectively intermeshed with the first gear 344. In addition, a link bar 350 extends beyond the perimeter of the saw blade 340 positioned adjacent thereto. If a dangerous condition is detected by for example one of the sensing mechanisms 12 disclosed herein, and it is desirable to move the hand of the operator rapidly away from the saw blade 340, a pin 352 thrusts second gear 346 and link bar 350 into the second first gear 344. The link bar 350 consequently rotates in the opposite direction (arrow 354) as the blade 340 from a position as shown in FIG. 26a to a position shown in FIG. 26b in order to contact the hand of the operator and prevent prolonged contact with the saw blade 340. It will be understood that alternate gearing configurations may be employed having other engaging alternatives while reaching similar results.

Figure 27:
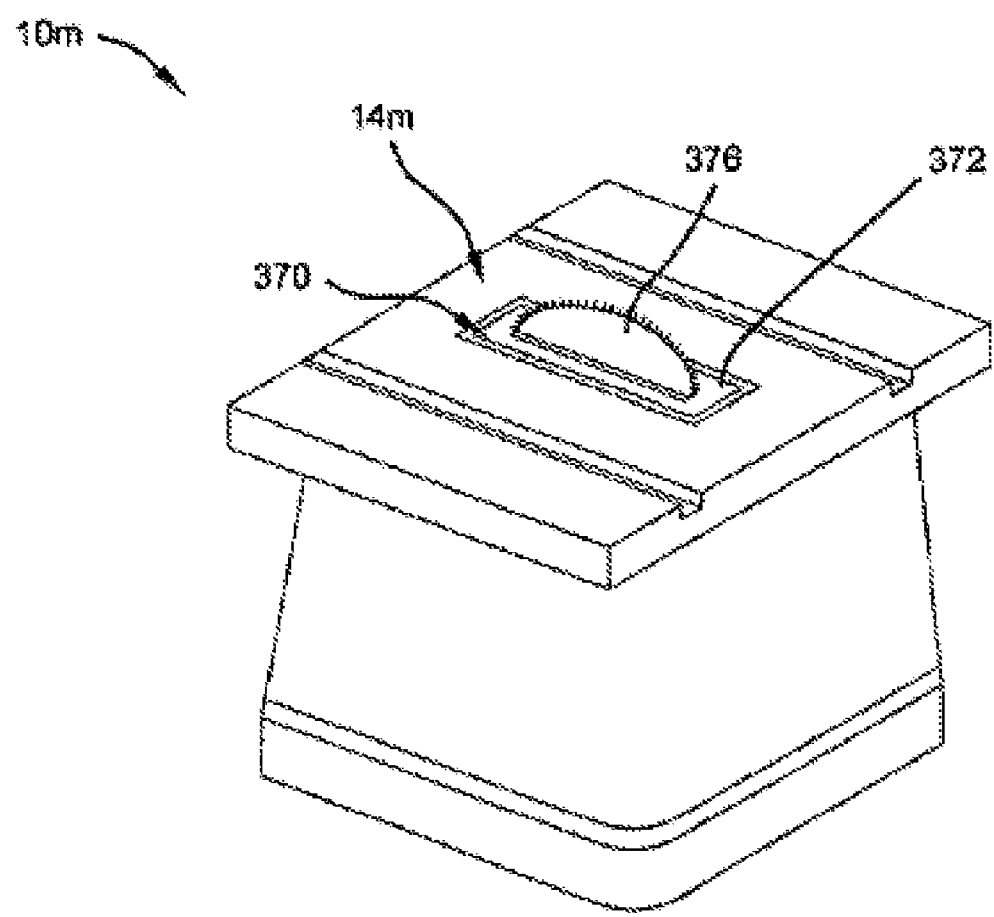
FIG. 27 is a perspective view of a safety mechanism according to a fourth embodiment of the present invention.
Figure 28:
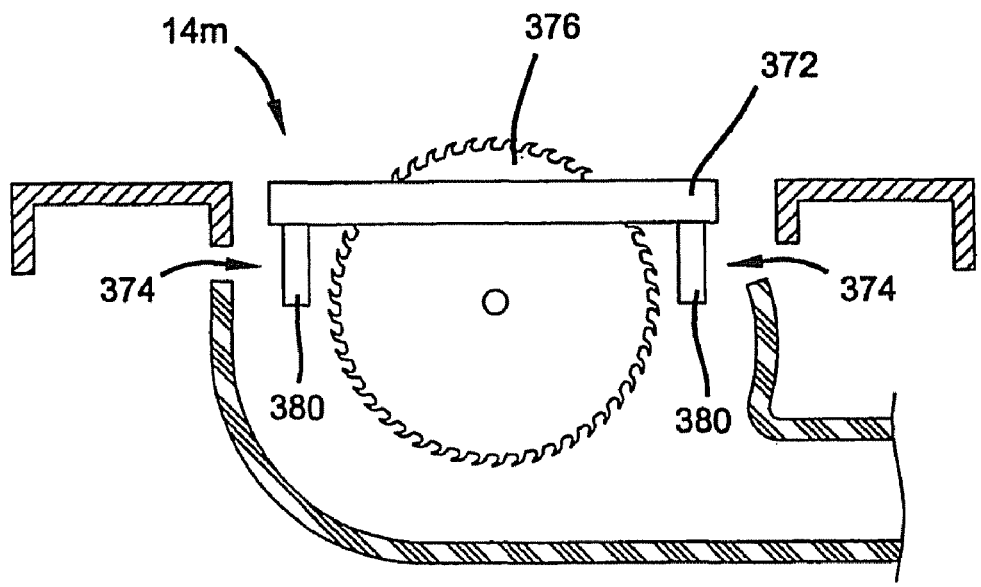
FIG. 28 is a cutaway view of the safety mechanism of FIG. 27 shown prior to actuation.
Figure 29:
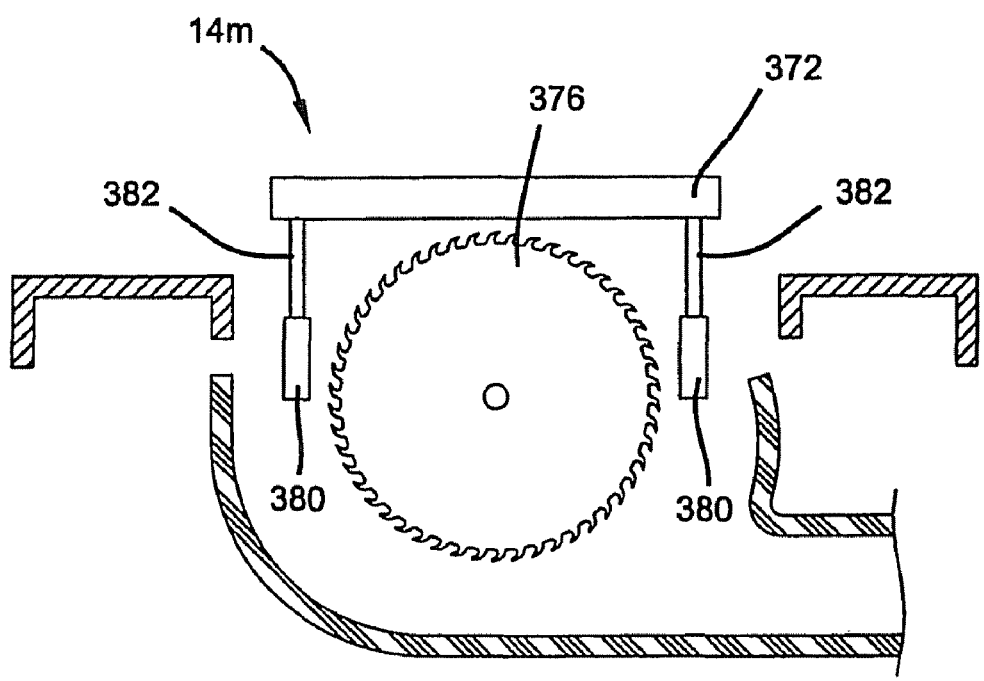
FIG. 29 is a cutaway view of the safety mechanism of FIG. 27 shown subsequent to actuation.

FIG. 27 shows a safety mechanism 14m operatively associated with table saw 10m. Safety mechanism 14m includes a kerf guard 370 for preventing contact between a user and the blade 376 of a table saw 10m. Kerf guard 370 is composed of a kerf plate 372 and an actuation mechanism 374. In operation, if it is sensed (by for example one of the sensing mechanisms 12 disclosed herein) that a portion of the user's body is in close proximity to the saw blade 376, the kerf plate 372 is driven from a position diagrammatically shown in FIG. 28 upward to a protective configuration as shown in FIG. 29. This configuration prevents the operator from contacting the blade 376 of the saw 10m. As shown in FIGS. 28 and 29, actuation mechanism 374 includes cylinders 380 having shafts 382 which linearly expand therefrom. Shafts 382 may be influenced into a position shown in FIG. 29 by springs, explosives, fluids or other means. It is readily appreciated that actuation mechanism 374 may alternatively include other fast acting actuation mechanisms such as hydraulic actuators, rack and pinion actuators or any other sufficient mechanism.

Figure 30:
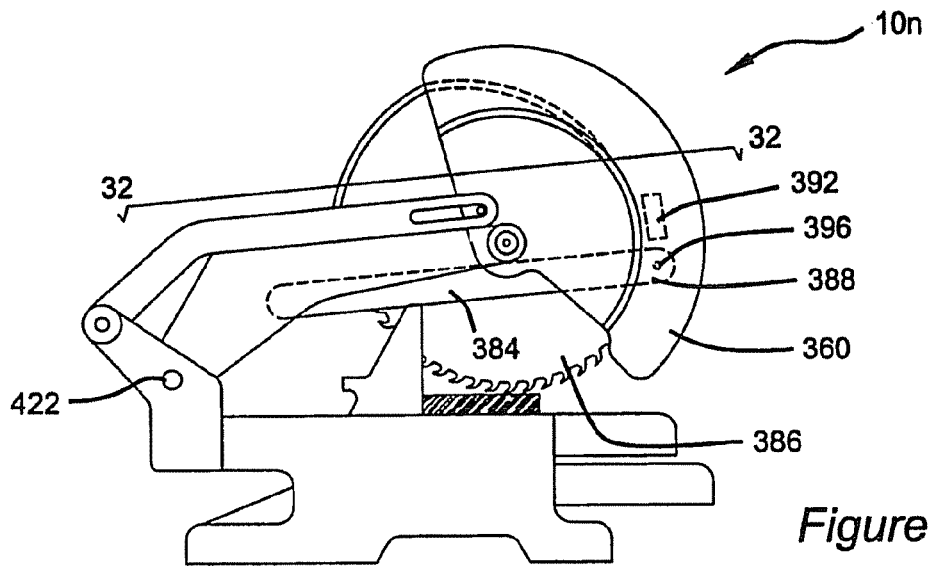
FIG. 30 is a side view of a safety mechanism according to a fifth embodiment of the present invention shown prior to actuation.
Figure 31:
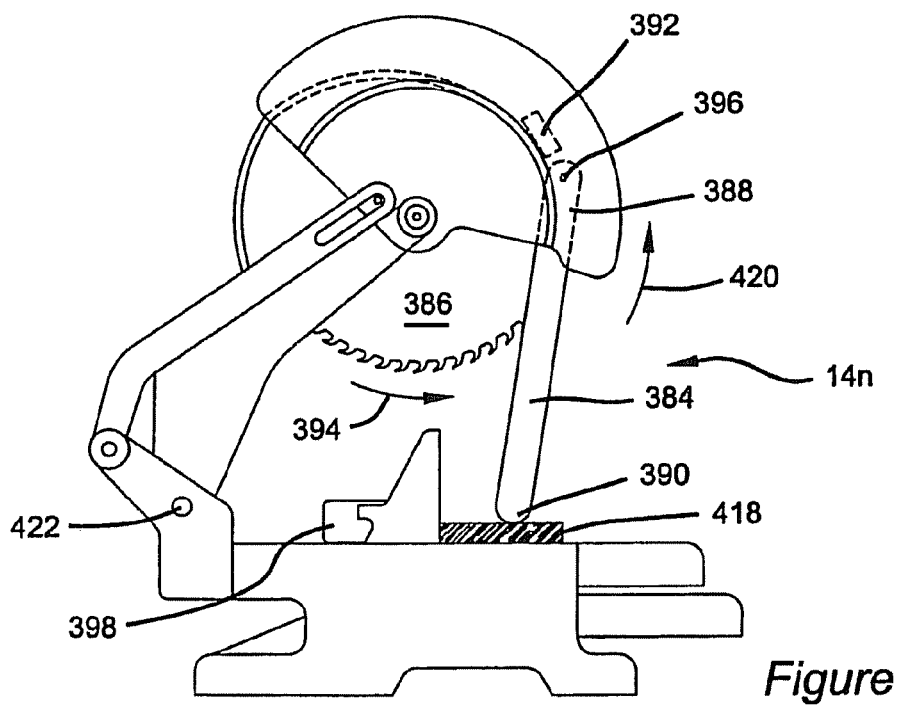
FIG. 31 is a side view of a safety mechanism of FIG. 30 shown subsequent to actuation.
Figure 32:
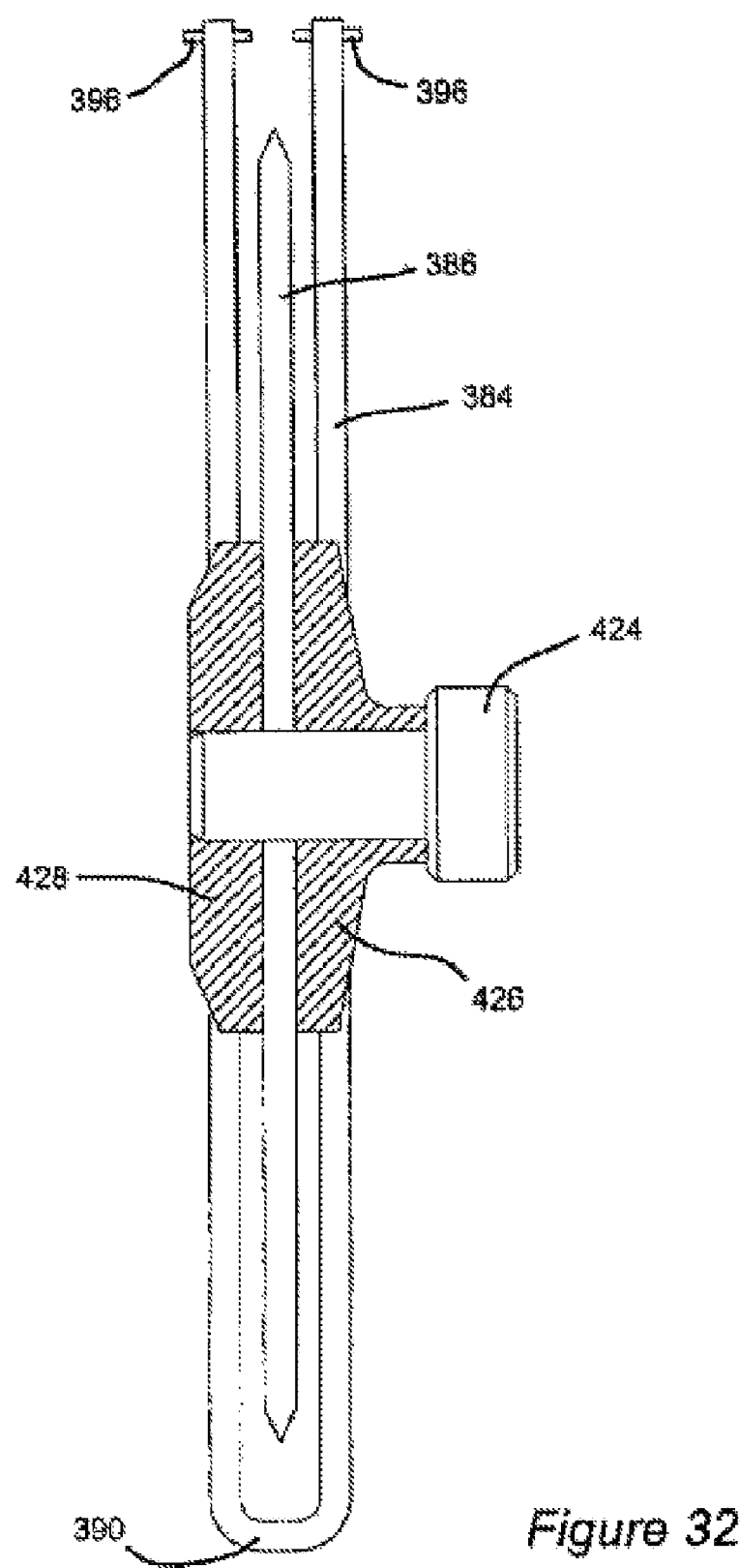
FIG. 32 is a cutaway view of the safety mechanism of FIG. 30 taken along line 32-32 of FIG. 30.

FIGS. 30-32 illustrate a safety mechanism 14n for rapidly moving the hand of the user away from a rotating blade, hinge bar 384. Hinge bar 384 is composed of a U-shaped bar positioned around the center of a saw blade 386 and having the distal ends 388 of the bar 384 attached at hinge 396 to a portion 360 of the saw 10n. The proximal portion 390 of the U-shaped member is oriented to oppose the distal hinged ends 388. Mounted near the distal ends 388 of hinge bar 384 is an electronically activated charge module 392. Although it is shown that charge module 392 is mounted near hinge 396, it will be appreciated that charge module 392 may be mounted in any adequate position adjacent to the top of hinge bar 384 sufficient to force hinge bar 384 downward.

The operation of safety mechanism 14n will now be described in greater detail. If it is determined by for example one of the sensing mechanisms 12 disclosed herein that a dangerous condition exists, charge 392 is electrically activated. Once the charge 392 has been activated, hinge bar 384 is rapidly driven downward by the force of the charge (from a position diagrammatically depicted in FIG. 30 to a position diagrammatically depicted in FIG. 31). In this way, hinge bar 384 swings in a direction identified by arrow 394 about hinge 396. Consequently, hinge bar 384 contacts the table portion 398 of saw 10n or alternatively the work-piece 418 thereby displacing saw blade 386 in an upward direction identified by arrow 420 about hinge 422.

With continued reference to FIGS. 30 and 31 and continued reference to FIG. 32, the orientation of bar 384 will be described. Bar 384 is preferably positioned below arbor 424 and inner and outer blade clamps 426, 228. In this regard, bar 384 may swing unimpeded from hinge 396.

It will be appreciated that hinge bar 384 may alternatively comprise different geometries or be arranged in other locations on saw 10n while reaching similar results. Furthermore, charge 392 may alternatively comprise other mechanical or electrical configurations adequate to deploy arm 384 downward with significant force to urge saw blade 386 upward about pivot 422.

Figure 33:
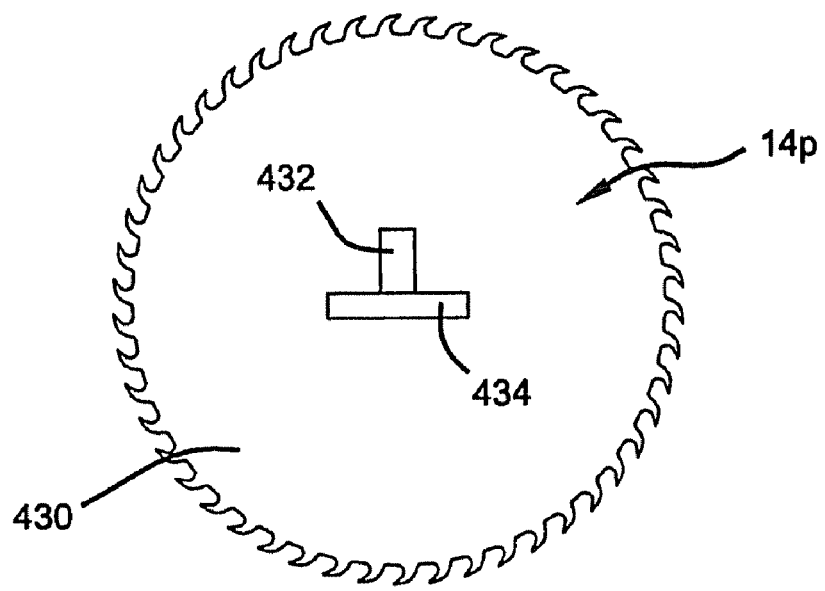
FIG. 33 is a side view of a safety mechanism according to a sixth embodiment of the present invention prior to activation.
Figure 34:
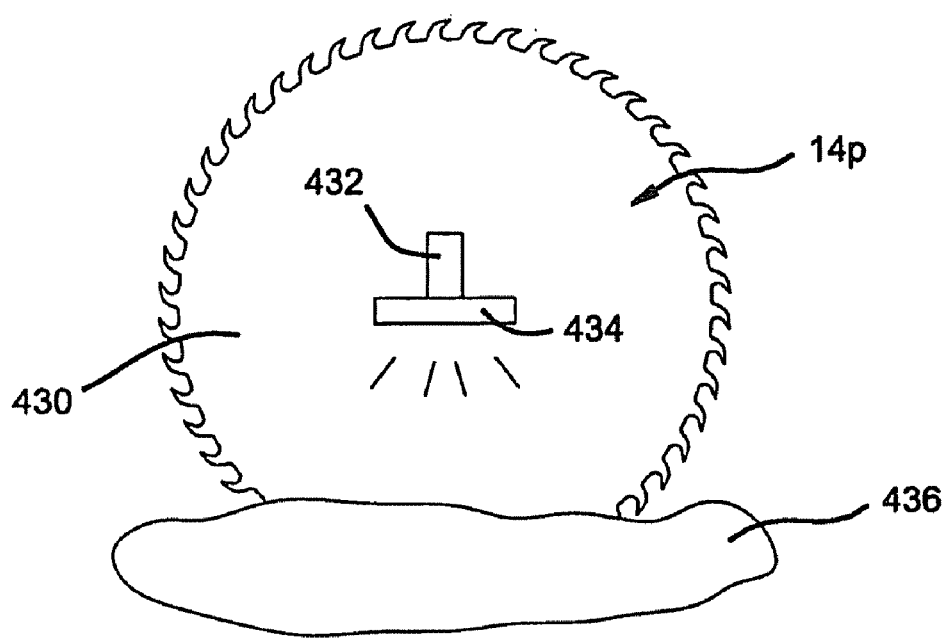
FIG. 34 is a side view of the safety mechanism of FIG. 33 shown subsequent to activation.

FIGS. 33 and 34 illustrate a safety mechanism 14p shown operatively associated with saw blade 430. Saw blade 430 is shown removed from a miter saw. Safety mechanism 14p includes an inflation device 432 and an air bag housing 434 for housing air bag 436. Air bag 436 is deployed from housing 434 by inflation device 432 upon sensing of a dangerous condition by for example one of the sensing mechanisms 12 disclosed herein for rapidly moving the hand of the user away from the rotating blade 430. Air bag 436 is composed of a rapidly inflatable vessel that is positioned adjacent to the saw blade 430. If it is desirable to move the hand of the user away from the saw blade 430, inflation device 432 rapidly inflates air bag 436 that expands outward from a position shown in FIG. 33 to a position shown in FIG. 34 to drive the hands of the user away from the blade 430. Alternatively, a second inflation device 432 and air bag 436 may be concurrently employed with safety mechanism 14p. As a result, an air bag 436 may be placed proximate both sides of saw blade 430 to achieve more uniform push.

Figure 35:
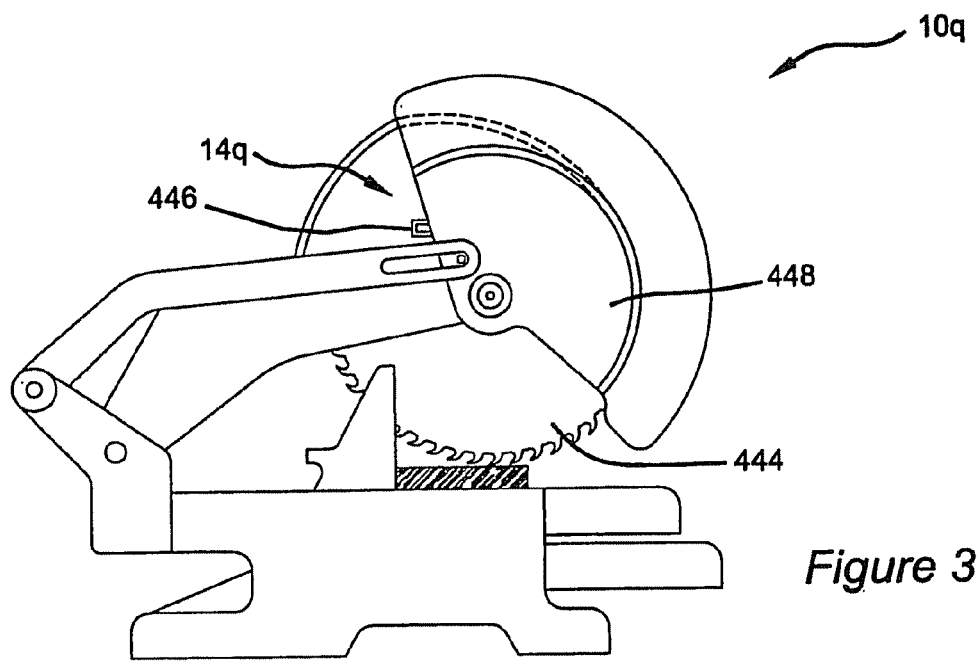
FIG. 35 is a side view of a safety mechanism according to a seventh embodiment of the present invention shown prior to activation.
Figure 36:
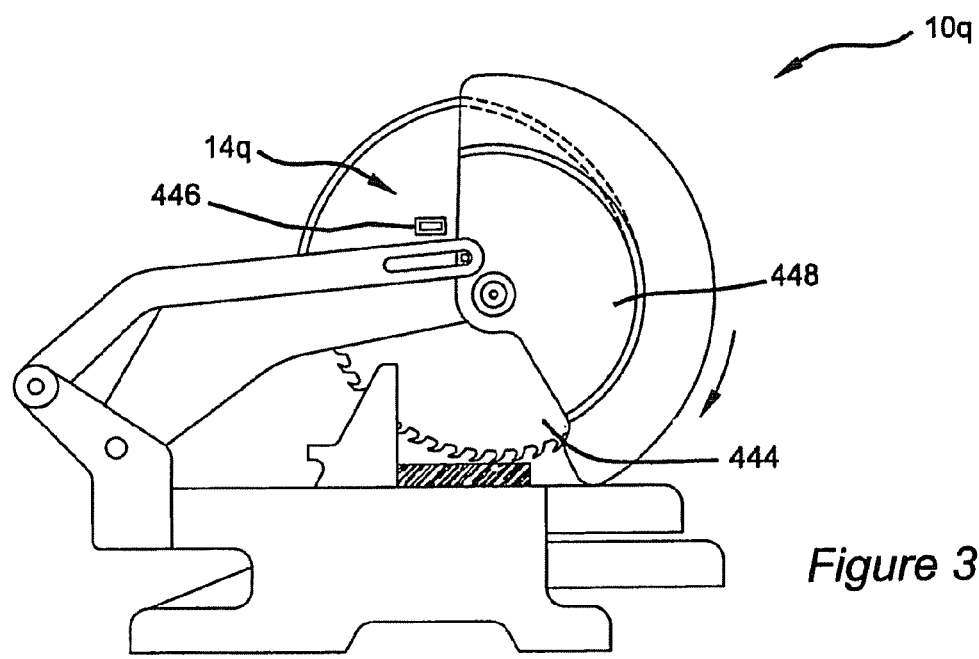
FIG. 36 is a side view of the safety mechanism of FIG. 35 shown subsequent to activation.

FIG. 35 illustrates a safety mechanism 14q for rapidly moving the hand of the user away from a rotating blade 444. Safety mechanism 14q includes a charge 446 that is mounted to the lower guard 448 of a miter saw 10q. It will be appreciated that safety mechanism 14q may also be used with a portable circular saw or other saws employing a guard. The charge 446 is of the electrically activated type and is oriented to fire from the rear of the saw 10q to the front of the saw 10q. It will be appreciated that charge 446 may alternatively be an explosive device or other suitable device sufficient to move guard 448. If it is determined by for example one of the sensing mechanisms 12 disclosed herein, that a dangerous condition exists, charge 446 is operated. Charge 446 rapidly propels the lower guard 448 clockwise from an open position (as diagrammatically depicted in FIG. 35) to a closed position (as diagrammatically depicted in FIG. 36) to prevent user contact with a portion of saw blade 444.

Figure 37:
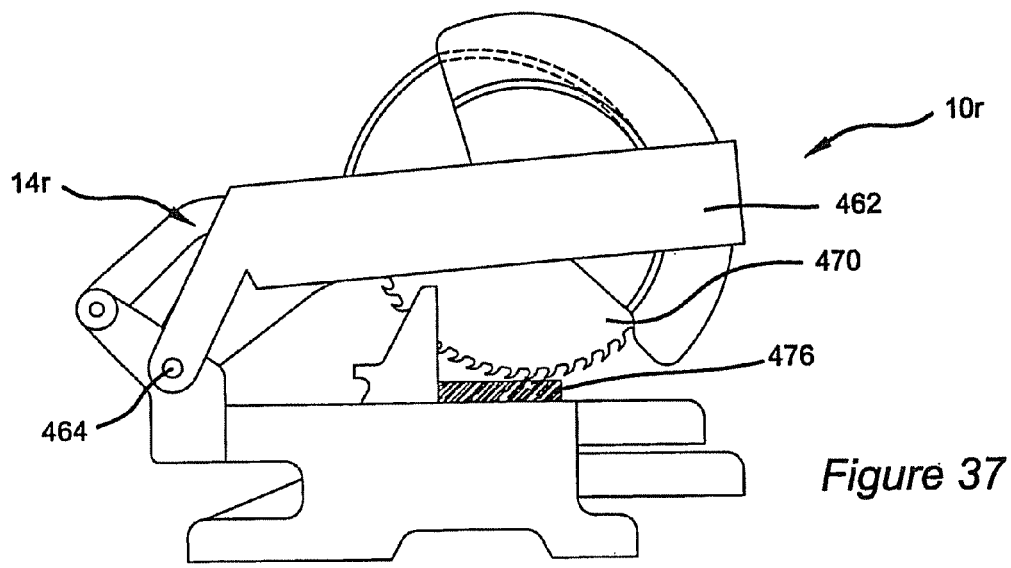
FIG. 37 is a side view of a safety mechanism according to a eighth embodiment of the present invention shown prior to activation.
Figure 38:
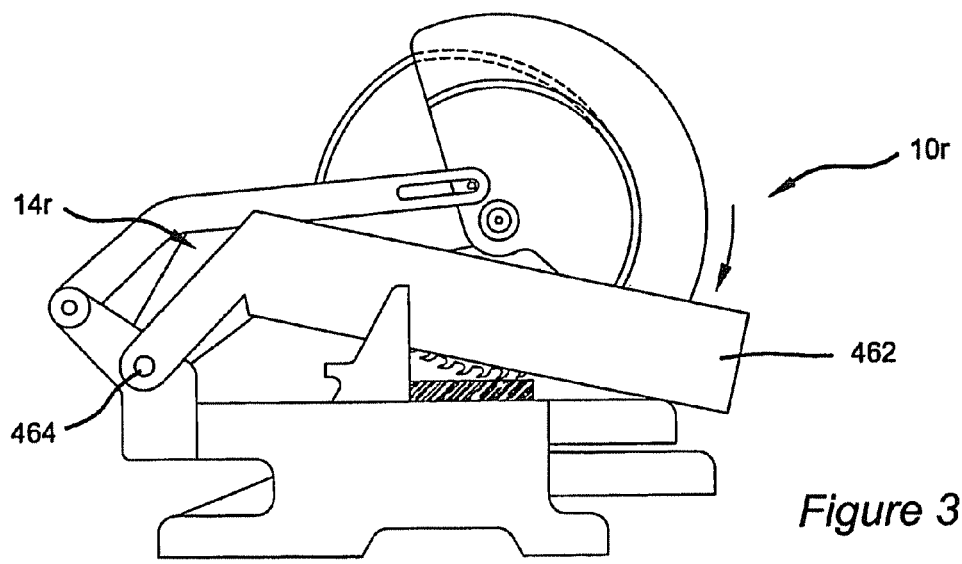
FIG. 38 is a side view of the safety mechanism of FIG. 37 shown subsequent to activation.

FIG. 37 illustrates a safety mechanism 14r shown associated with miter saw 10r for rapidly moving the hand of the user away from a rotating blade 470. Safety mechanism 14r includes auxiliary upper guard 462 rotatably coupled to saw 10r by way of hinge 464 at the rear of saw 10r. Guard 462 extends around the front of the saw 10r and includes a downward firing charge device (not specifically shown) mounted thereto. The firing device may include for example an electrically actuated charge similar to charge 446 used in relation to safety mechanism 14q. Alternately, a torsion spring may be implemented at hinge 464 for actuating auxiliary guard 462 from a position shown in FIG. 37 to a position shown in FIG. 38. In this regard, if a dangerous condition is detected by for example one of the sensing mechanisms 12 described herein, the firing device fires causing the auxiliary guard 462 to rotate downward from a position diagrammatically shown in FIG. 37 to a position diagrammatically shown in FIG. 38, moving the operators hand away from the saw blade 470 to prevent further contact therewith. It will be appreciated that auxiliary upper guard 462 may comprise alternative shapes which cooperate with a given saw provided guard 462 may move unimpeded from an open position (away from a workpiece 476) to a position sufficient to block human interaction with blade 470.

Figure 39A:
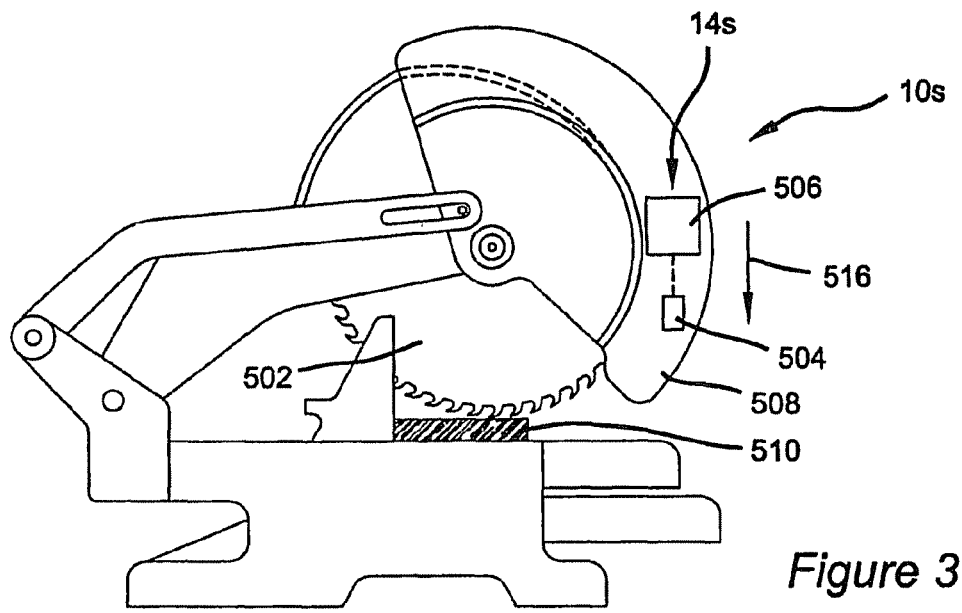
FIG. 39a is a side view of a safety mechanism according to a ninth embodiment of the present invention shown immediately after activation.
Figure 39B:
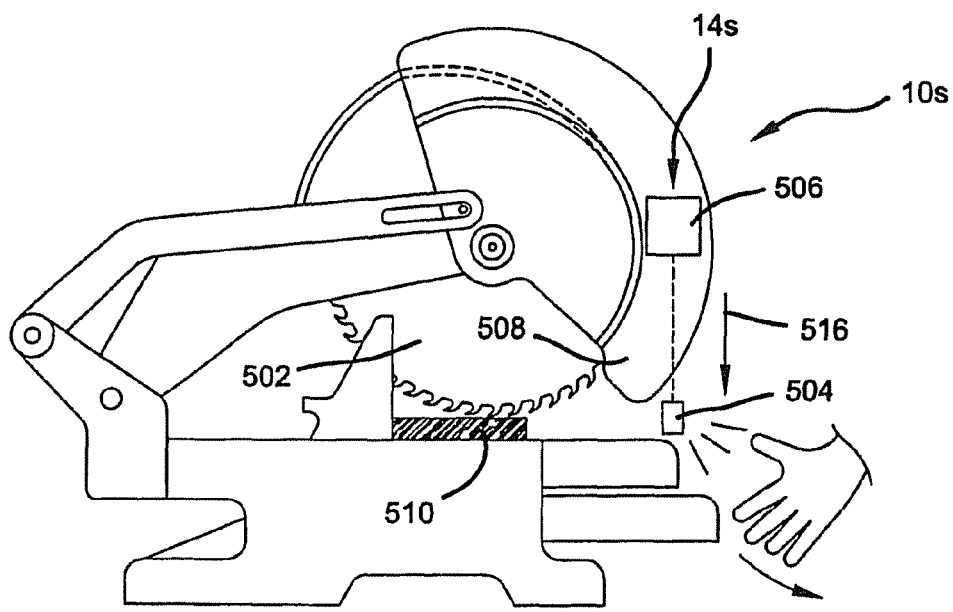
FIG. 39b is a side view of the safety mechanism of FIG. 39a shown after engagement with a user.

FIGS. 39a and 39b illustrate a safety mechanism 14s shown associated with miter saw 10s for rapidly moving the hand of the user away from a rotating blade 502. Safety mechanism 14s includes projectile magnet 504. Projectile magnet 504 is deployed from a large electromagnet 506 positioned above the front portion of the blade 502. Projectile magnet 504 is coupled to a rigid portion of saw 10s such as guard 508 or the frame of the saw 10s whereby it may be sufficiently aimed toward the saw blade 502 and workpiece 510 interface. If it is determined by for example one of the sensing mechanisms 12 disclosed herein, that a dangerous condition exists, the polarity of the electromagnet 506 is switched to force the projectile magnet 504 downward in the direction of arrow 516. The force of the electromagnet 506 and the gravitational forces combine to increase the momentum of the projectile magnet 504. During operation, the projectile magnet 504 moves from a position adjacent to electromagnet 506 downward (arrow 516) to a position as shown in 39b to engage the hand of the user. Once the projectile magnet 504 contacts the hand of the user, the momentum of the magnet 504 will drive the hand of the user away from the blade 502.

Moving Blade Away with Inertia

Figure 40:
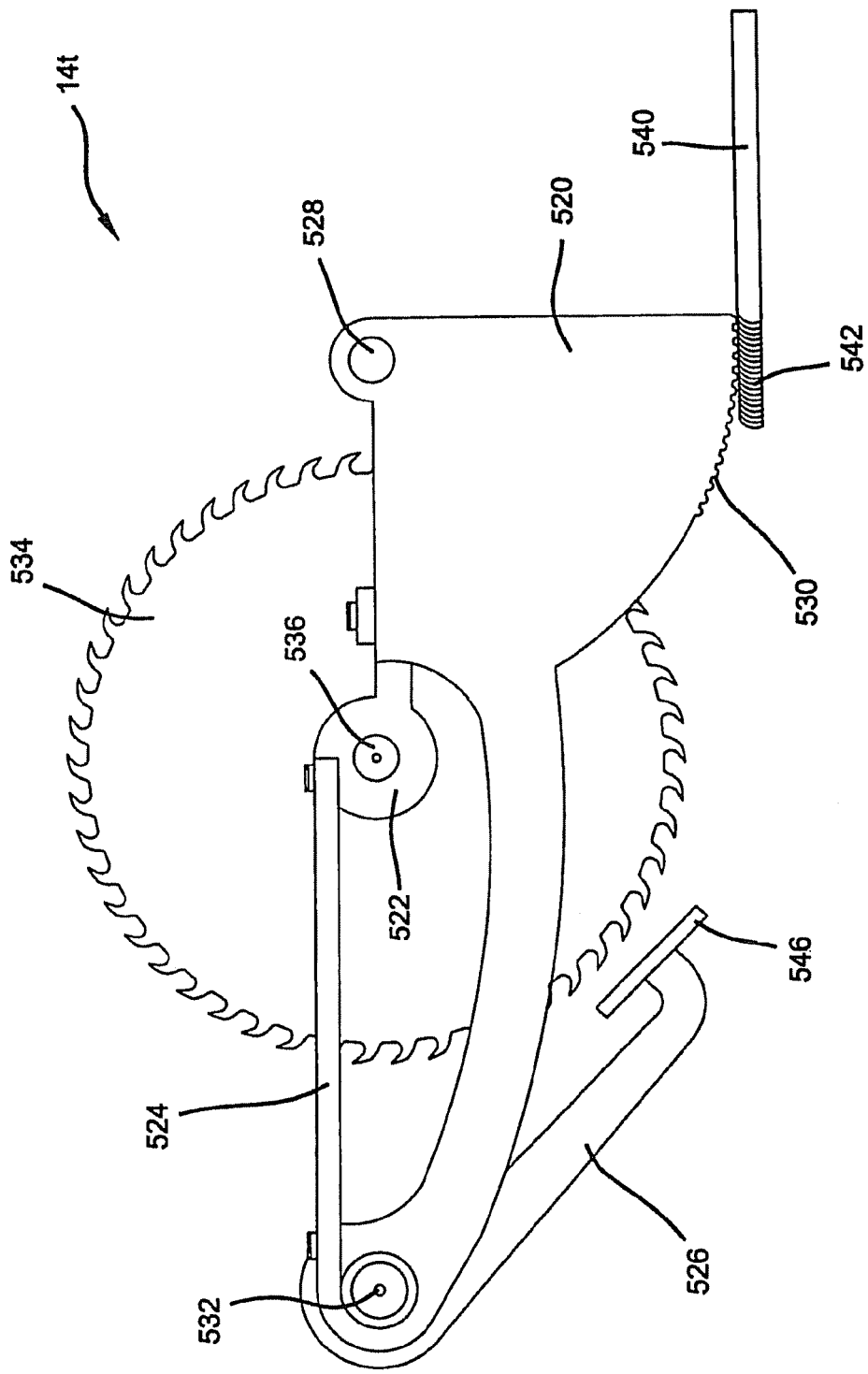
FIG. 40 is a side view of a safety mechanism according to a tenth embodiment of the present invention shown prior to activation.

FIG. 40 is an illustration of a safety mechanism 14t configured to stop a saw blade of a table saw and effectively manage the conservation of momentum associated with rapid deceleration. As shown in FIG. 40, a safety mechanism 14t is shown to include a frame 520, a collar 522 interconnected to frame 520 by a spring member 524, and a blade stop 526. Frame 520 is operatively connected to the table saw (not specifically shown) at point 528 by way of a fastener and through gearing 530 for selective rotation of safety mechanism 14t about arbor 536 through an infinite number of angles corresponding to an infinite number of positions for saw blade 534. In operation, if a dangerous condition is detected by for example one of the sensing mechanisms 12 disclosed herein, worm gear 540 is actuated allowing teeth 542 to urge gearing 530 toward a counterclockwise rotation. Worm gear 540 may be actuated by for example an electric motor. As a result, blade stop 526 is actuated counterclockwise thereby allowing foot 546 to engage saw blade 534. Once saw blade 534 has been engaged, the rotational inertia of saw blade 534 is transferred to linear inertia in the downward direction. The linear inertia drives collar 522 in a downward direction away from the user and possible additional contact with the operator. Spring member 524 is also forced downward to absorb and dissipate a portion of the linear inertia in a controlled manner. Although spring member 524 is depicted as a single leaf spring, it is appreciated that additional leaf springs may be employed or alternatively other biasing members that may provide a force dissipating function in addition to inhibiting twisting motion between the axis defined by arbor 536 and joint 532.

Figure 41:
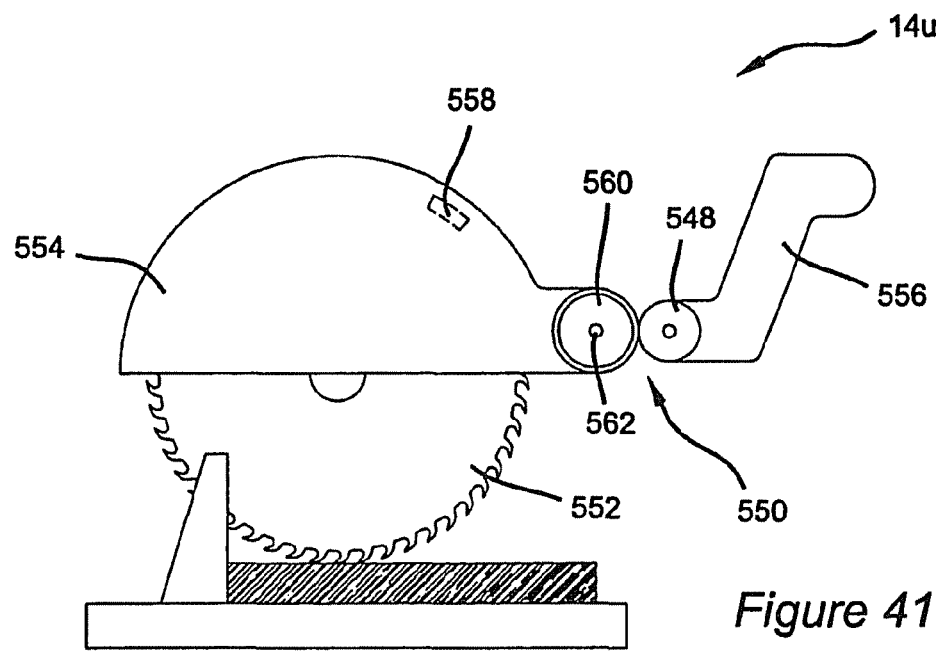
FIG. 41 is a side view of a safety mechanism according to a eleventh embodiment of the present invention shown prior to activation.
Figure 42:
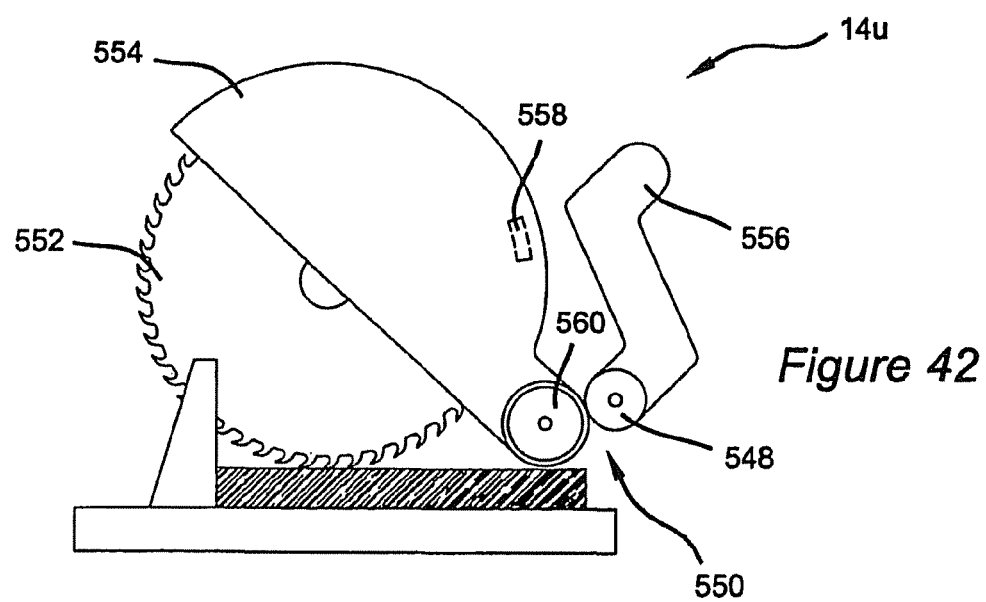
FIG. 42 is a side view of the safety mechanism of FIG. 41 shown after activation.

Turning now to FIGS. 41 and 42, a safety mechanism 14u including a ratcheting head 550 is shown. As will be described in greater detail, ratcheting head 550 actuates to prevent contact of the user with the saw blade 552. Ratcheting head 550 is composed of a saw guard 554, a ratcheting handle 556 and a stop 558. Saw guard 554 includes a gearing portion 560 rotatably attached to the frame of the saw about a fastener 562. Stop 558 is positioned along the top front of the saw blade 552, which is rotating clockwise. Ratcheting handle 556 includes a ratcheting gearing portion 548 that is intermeshed with gearing portion 560. In operation, if a dangerous condition is detected by for example one of the sensing mechanisms 12 disclosed herein, stop 558 engages blade 552. The rotational inertia of the rotating saw blade 552 causes the saw guard 554 to be translated upward from a position diagrammatically depicted in FIG. 41 to a position diagrammatically depicted in FIG. 42. As guard 554 is translated upward, the gearing portion 560 operatively engages the ratcheting gearing portion 548 of handle 556. The ratcheting of gearing portion 560 locks the saw guard 554 at it's highest position and prevents the saw blade 552 from coming in contact with the operators hand. Although not specifically shown, it is appreciated that gearing portion 550 is coupled to the frame of a miter saw and cooperates with the frame to translate downward to a position shown in FIG. 42.

Figure 43:
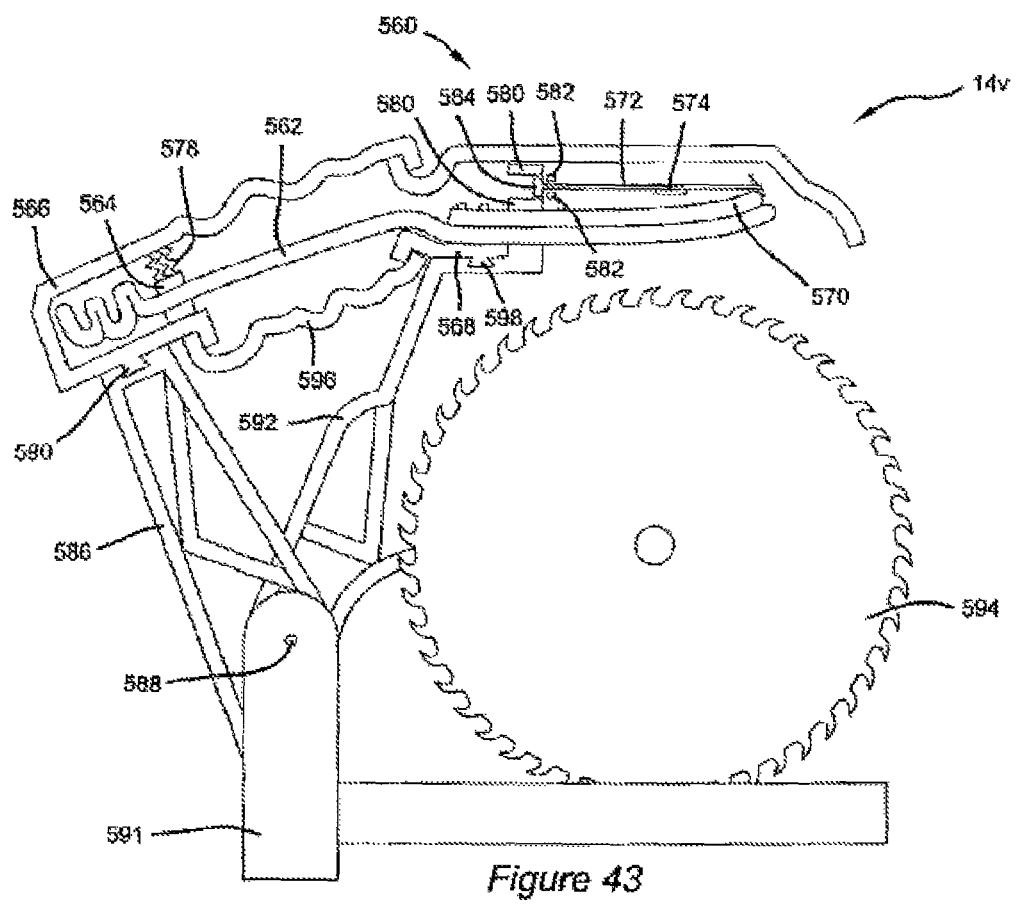
FIG. 43 is a side view of a safety mechanism according to a twelfth embodiment of the present invention shown prior to activation.
Figure 44:
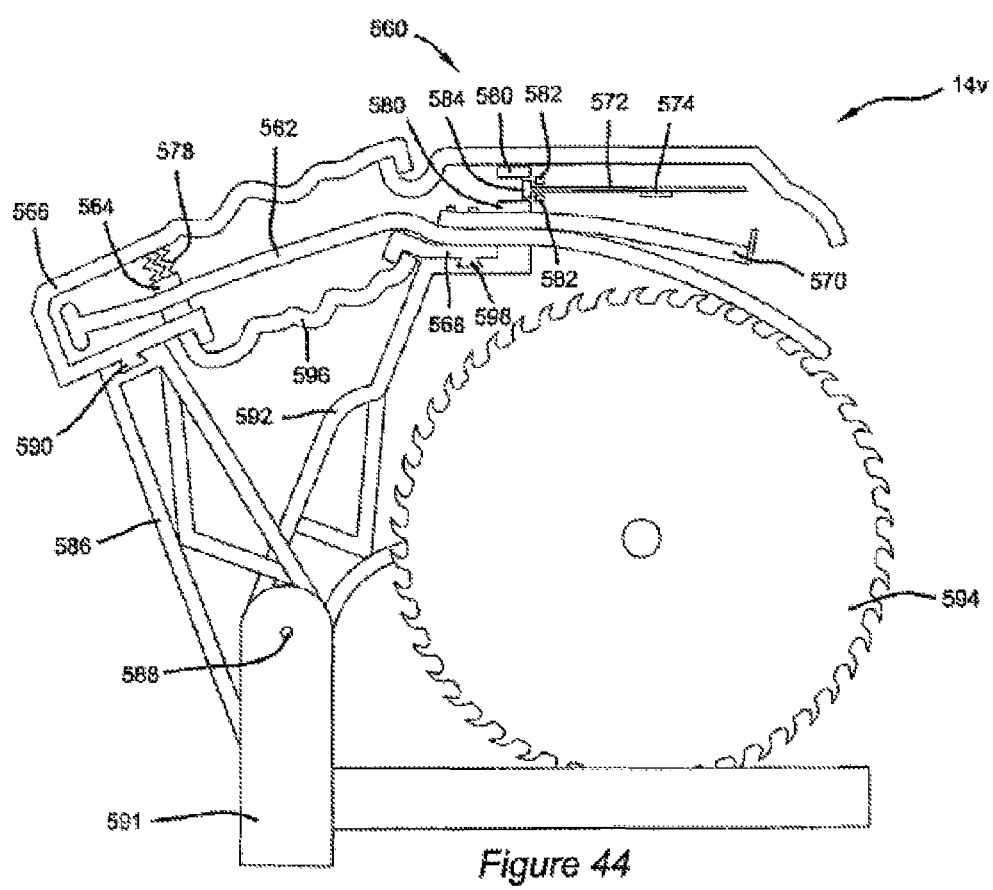
FIG. 44 is a side view of the safety mechanism of FIG. 43 shown after activation.

As shown in FIGS. 43 and 44, safety mechanism 14v is shown. Safety mechanism 14v includes a strap deployment mechanism 560. Deployment mechanism 560 includes a strap 562 made of a durable material such as Kevlar. Strap 562 passes through a moveable clutch 564 disposed in a housing arm 566. Clutch 564 is compressed onto the strap 562 with a series of biasing members 578. Biasing members 578 are preferably springs adequate to pinch the strap 562 with sufficient force such as belleville springs. Strap 562 includes an adequate amount of slack coiled within housing 566 to accommodate a deployment event as will be described in greater detail. Strap 562 is guided through an actuator mount 568 whereby a spring 570 bounds the strap on an upper side. Spring 570 is retained in an upward position on an opposite end by a release 572. In this regard, strap 562 also is displaced toward release 572. Release 572 is supported for linear movement by a guide 574. A coil 580 is disposed in housing 566 adjacent release catch 584. Release catch 584 includes a magnet fastened thereon for communicating with coil 580. In addition, magnets 582 are disposed in housing 566 to attract catch 584 in an at rest position (FIG. 43).

Extension arm 586 is coupled at a dovetail 590 on housing 566. Dovetail 590 allows housing 566 to be easily replaced. Extension arm 586 is mounted to trunnion 591 at joint 588. A movable arm 592 extends from trunnion 591 and connects at actuator mount 568. The operation of safety mechanism 14v will now be described. If a dangerous condition is detected by for example one of the sensing mechanisms 12 disclosed herein, a signal is sent to coil 580. Coil 580 then builds a counter flux opposing magnets 582. The flux pushes the release 572 to the left (from a position diagrammatically depicted in FIG. 43 to a position diagrammatically depicted in FIG. 44). The spring 570 with the strap 562 releasably attached is rapidly deployed downwardly past the periphery of the blade 594. Strap 562 is caught by the teeth of blade 594. The rotation of the blade 594 (clockwise as viewed from FIG. 43) pulls the strap 562 around its perimeter further engaging additional teeth to distribute the force to stop blade 594. Clutch 564 is concurrently engaged providing a clamping force. As blade 594 rotates and pulls any slack up due to the angle of the arm when spring 570 is deployed, the strap 562 begins to slide through the clutch 564 with a constant force to decelerate blade 594. After blade 594 is stopped, the user must replace the deployment mechanism 560. As such, the housing 566 is slid laterally out of dovetail 590 and 598. The assembly of clutch 564 and bellows 596 is then replaced.

Figure 45:
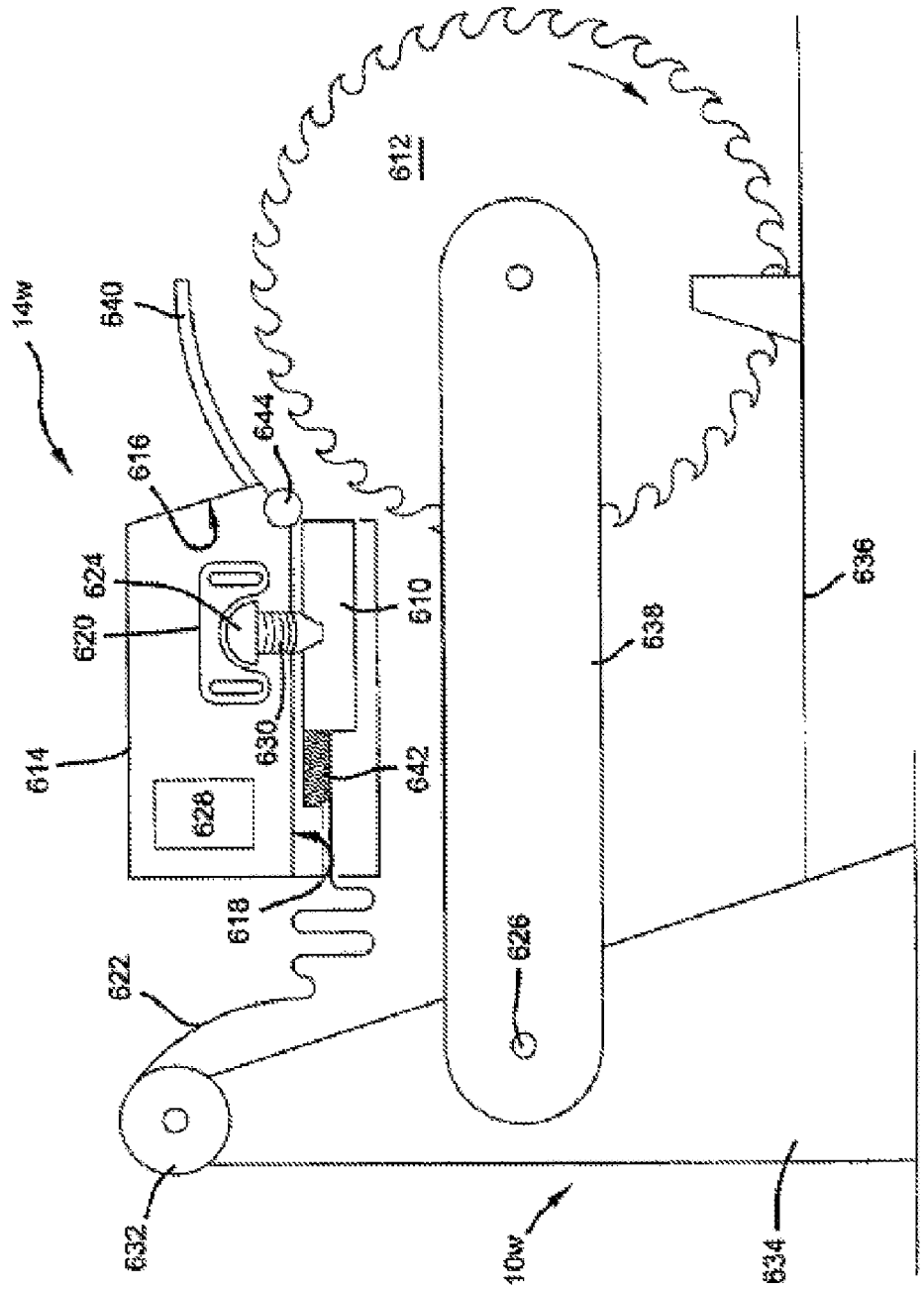
FIG. 45 is a side view of a safety mechanism according to a thirteenth embodiment of the present invention shown prior to activation.
Figure 46:
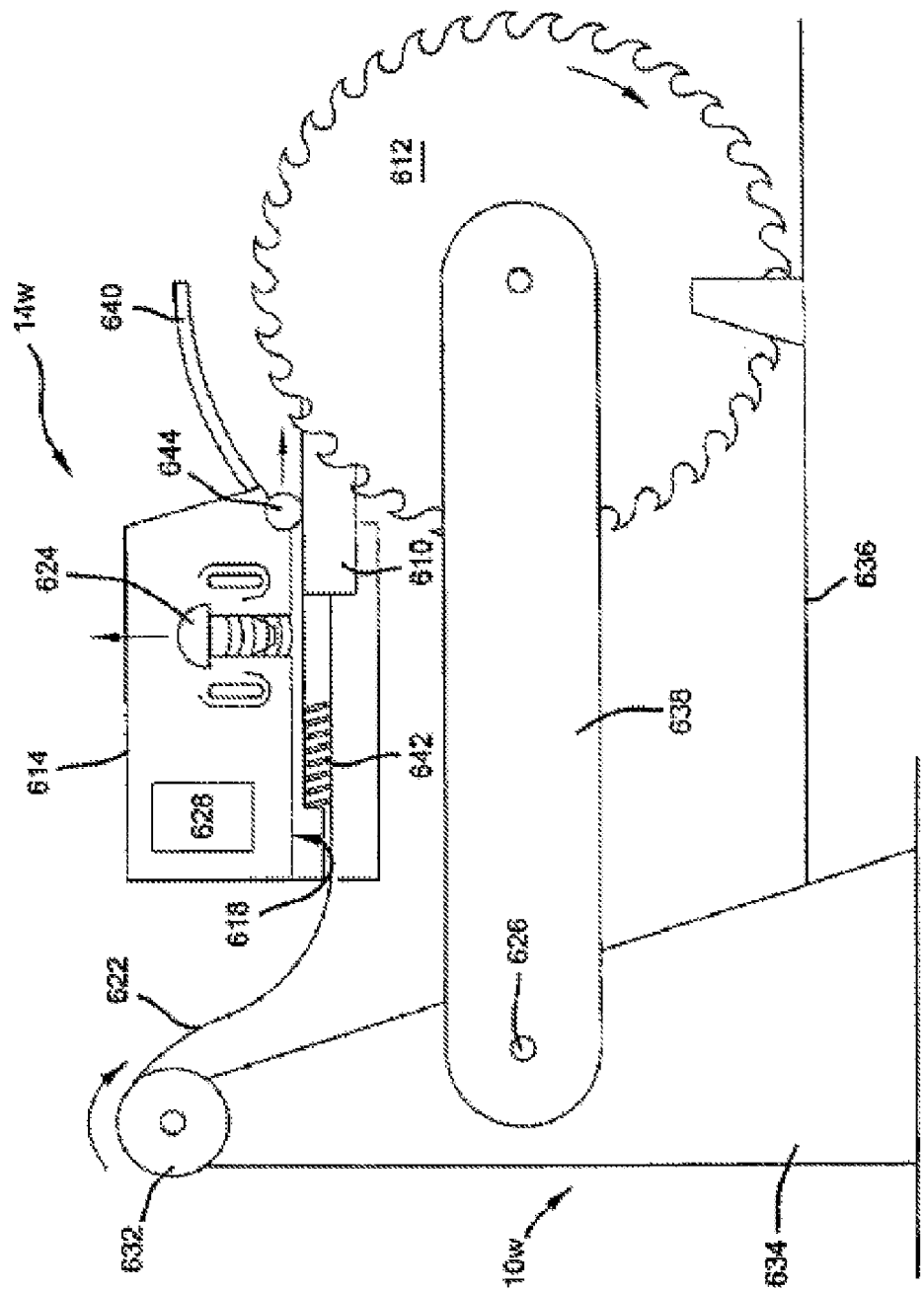
FIG. 46 is a side view of the safety mechanism of FIG. 45 shown after activation.

Turning now to FIGS. 45 and 46, a safety mechanism 14w including a shuttle stop 610 is shown. Safety mechanism 14w is shown in conjunction with a miter saw 10w. As will be described in greater detail, shuttle stop 610 is projected into rotating blade 612 to stop its rotation and thereby prevent contact of the user with a rotating saw blade 612. Safety mechanism 14w includes a housing 614 having an upper chamber 616 and lower chamber 618. A fuse member 620 is positioned in the upper chamber 616. Shuttle stop 610 is positioned in the lower chamber 618 and connected to the frame of the saw 10w by a strap 622. A stop pin 624 connects the fuse 620 and the biased shuttle 610 together. Shuttle 610 is positioned so that the leading edge is adjacent to the upper rear portion of the clockwise rotating saw blade 612. A truss 634 extends from a table portion 636 and supports horizontal support arm 638. Guard 640 extends over saw blade 612.

The operation of safety mechanism 14w will now be described in greater detail. If a dangerous condition is detected by for example one of the sensing mechanisms 12 disclosed herein, a high current charge is sent to fuse 620 by control 628. As fuse 620 is blown, stop pin 624, which was retained by fuse 620 is urged upwards by biasing member 630 from a position diagrammatically depicted in FIG. 45 to a position diagrammatically depicted in FIG. 46. Once the lower portion of the stop pin 624 has cleared the top of shuttle 624, the shuttle 624 is driven into the rotating teeth of the saw blade 612 (see FIG. 46) by biasing member 642. It will be appreciated that other force transfer mechanisms may be employed to urge shuttle 610 toward blade 612 such as but not limited to an explosive charge.

Upon deployment, strap 622 uncoils from reel 632 as the teeth of saw blade 612 grasp the shuttle 610 and force the shuttle 610 clockwise around the perimeter of the blade 612, creating tension on strap 622. Roller 644 guides shuttle 610 toward blade 612 during a deployment event. In addition to rapidly decelerating saw blade 612, as strap 622 is stretched to a maximum distance, the head of the saw 10w is driven upward about pivot by the transfer of the rotational inertia to liner inertia, moving away from the user.

Figure 47A:
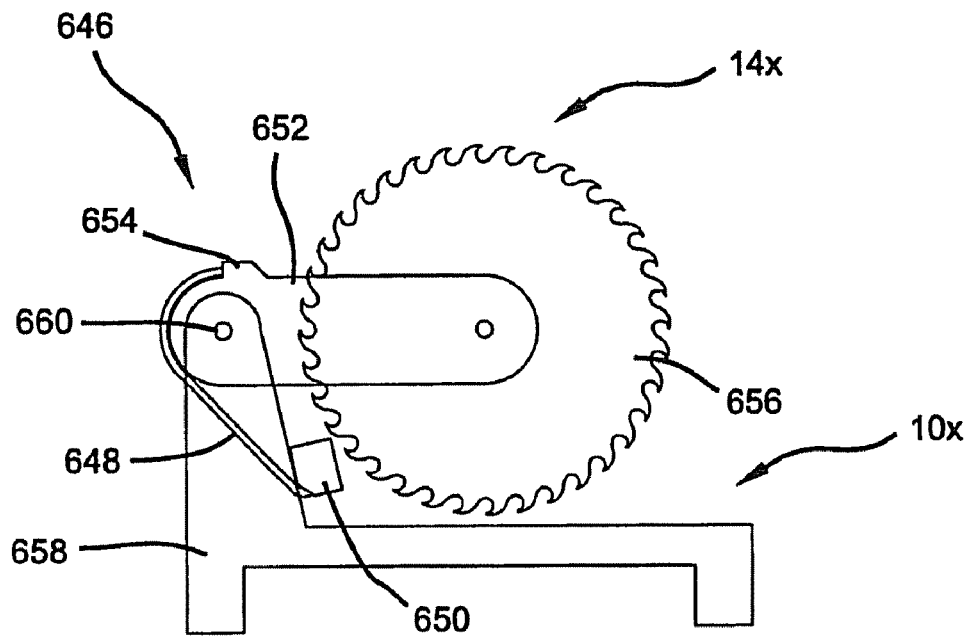
FIG. 47a is a side view of a safety mechanism according to a fourteenth embodiment of the present invention shown prior to activation.
Figure 47B:
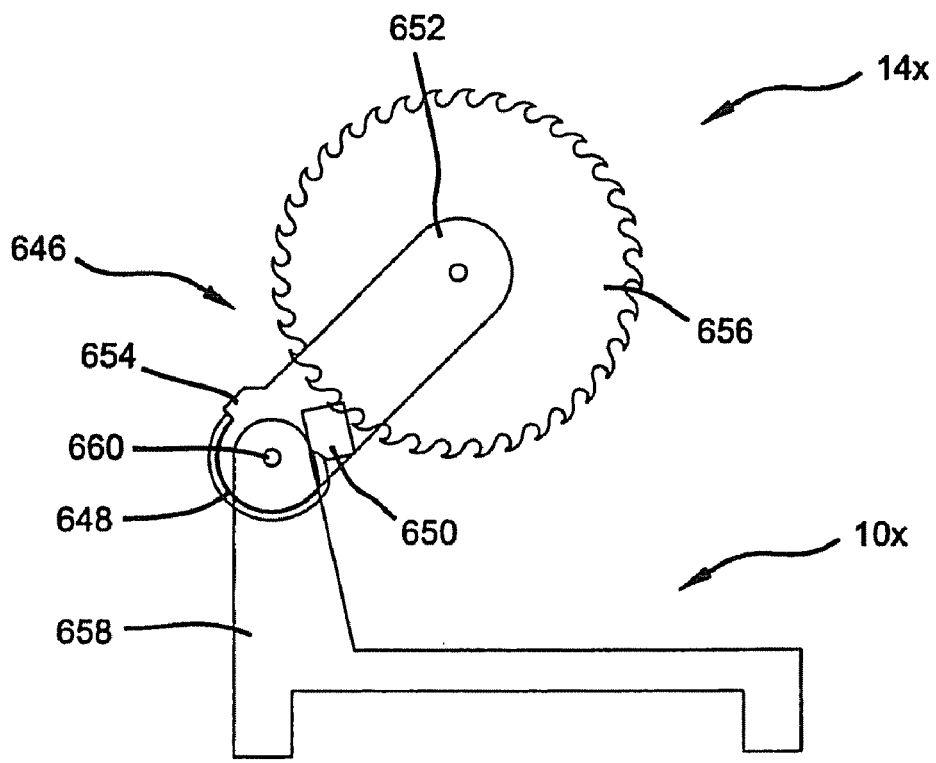
FIG. 47b is a side view of the safety mechanism of FIG. 47a shown after activation.

As shown in FIGS. 47a and 47b a safety mechanism 14x including a cable stop 646 is shown associated with miter saw 10x. Again, although safety mechanism 14x is shown associated with miter saw 10x, other power tools may be employed while reaching similar results. Cable stop 646 includes a cable 648 having an engagement member 650 coupled thereto. A first end of cable 648 is coupled at attachment 654 on the upper portion of arm 652. Cable 648 is routed around the rear of arm 652.

The operation of safety mechanism 14x will now be described. If a dangerous condition is detected by for example one of the sensing mechanisms 12 disclosed herein, engagement member 650 is fired upward into a gap defined by the space between blade 656 and support 658. During normal operation, blade 656 rotates in a clockwise direction as viewed from FIGS. 47a and 47b. As a result, the teeth of blade 656 grasp engagement member 650 thereby pulling cable 648 in a direction counterclockwise around the rear portion of arm 652. Once the slack of cable 648 is used, cable 648 pulls arm 652 at attachment 654 thereby urging arm 652 upward around pivot 660 from a position as diagrammatically depicted in FIG. 47a to a position as diagrammatically depicted in FIG. 47b.

It will be appreciated that engagement member 650 may alternatively be fired by other means such as but not limited to an explosive device or mechanical assembly. Engagement member 650 is preferably comprised of a hard pliable material such as hard plastic for example. It will also be appreciated that cable 648 may also be routed around an additional pivot point which may comprise a swing arm mounted on support 658.

Figure 47C:
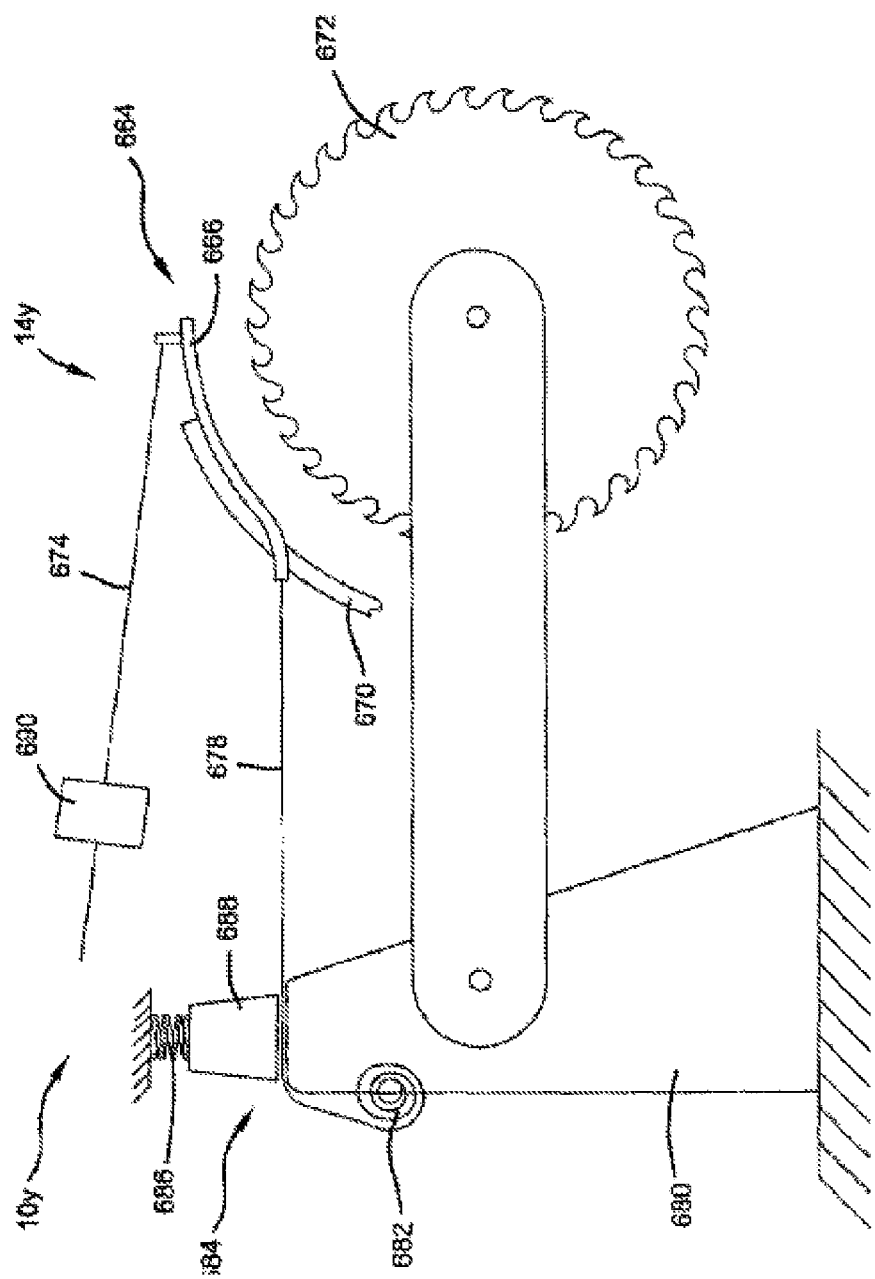
FIG. 47c is a side view of a safety mechanism according to a fifteenth embodiment of the present invention shown prior to activation.
Figure 47D:
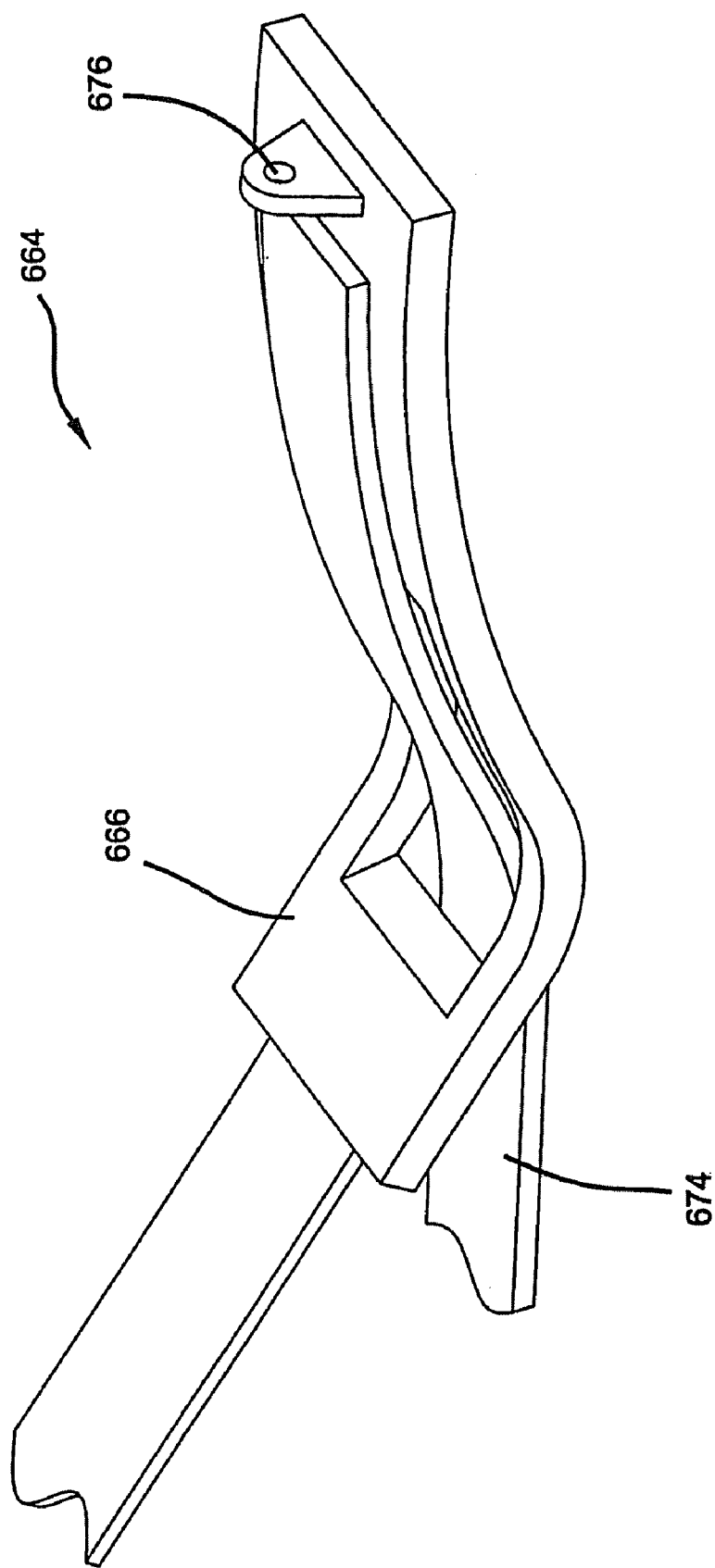
FIG. 47d is a perspective view of the leaf spring stop of the safety mechanism of FIG. 47c.

Turning now to FIGS. 47c and 47d, a safety mechanism 14y employing a leaf spring stop 664 is shown operatively associated with miter saw 10y. Leaf spring stop 664 includes a leaf spring 666, and cable 668. Leaf spring 666 is disposed around a mounting hub 670 proximate to the perimeter of saw blade 672. Cable 674 is coupled at eyelet 676 and biases leaf spring 666 in a direction away from saw blade 672. Deployment actuator 690 is coupled (not specifically shown) to a portion of the miter saw 10y and maintains adequate tension on cable 674 during normal operation. Strap 678 is coupled to leaf spring 666, on a first end and is mounted to support 680 at spool 682 on an opposite end. A friction device 684 includes friction block 688 urged against an upper portion of support 680 by biasing member 686. In this way, friction device 684 provides smooth deployment of strap 678 while dissipating much of the stopping energy during a stopping event as will be described in greater detail.

If a dangerous condition is detected by, for example one of the sensing mechanisms 12 disclosed herein, deployment actuator 690 releases cable 674. Deployment actuator 690 may comprise any adequate releasing means such as but not limited to a coil and magnet configuration as discussed in safety mechanism 14v or a fuse and stop pin configuration as discussed in safety mechanism 14w. Upon release of cable 674, leaf spring 666 displaces toward rotating saw blade 672 causing the teeth of saw blade 672 to pierce strap 674. In turn, saw blade 672 pulls strap 674 in a clockwise direction unraveling spool 682. Friction device 684 slows the travel of strap 674 until saw blade 672 comes to a complete stop.

Moving Blade Away without Inertia

Figure 48:
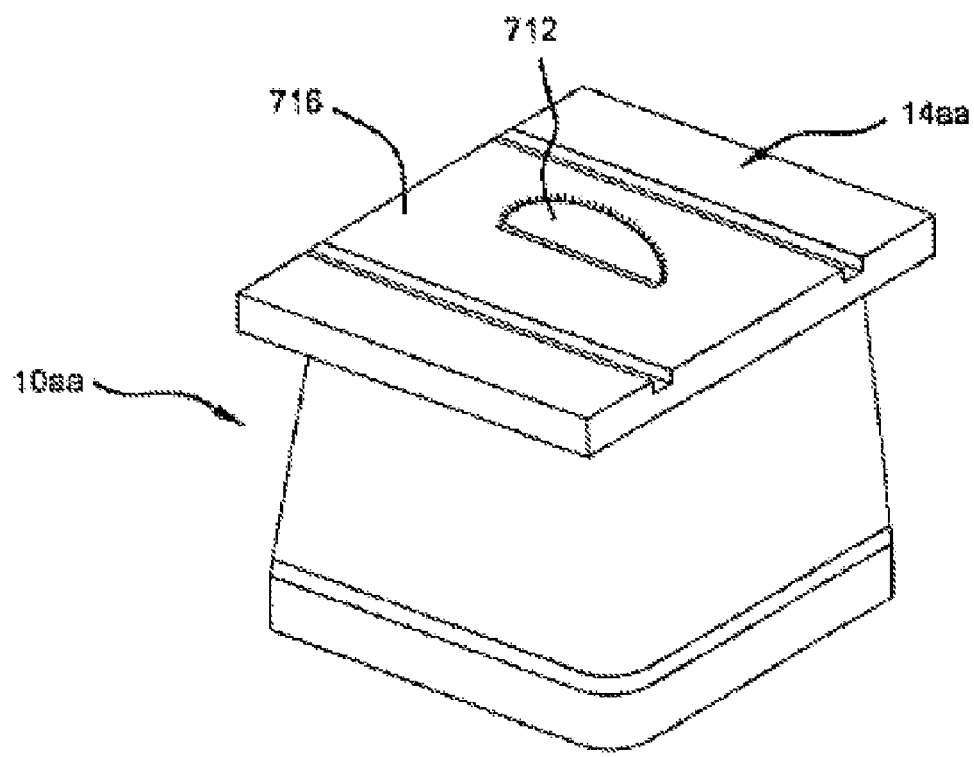
FIG. 48 is a perspective view of a safety mechanism according to a sixteenth embodiment of the present invention.
Figure 49:
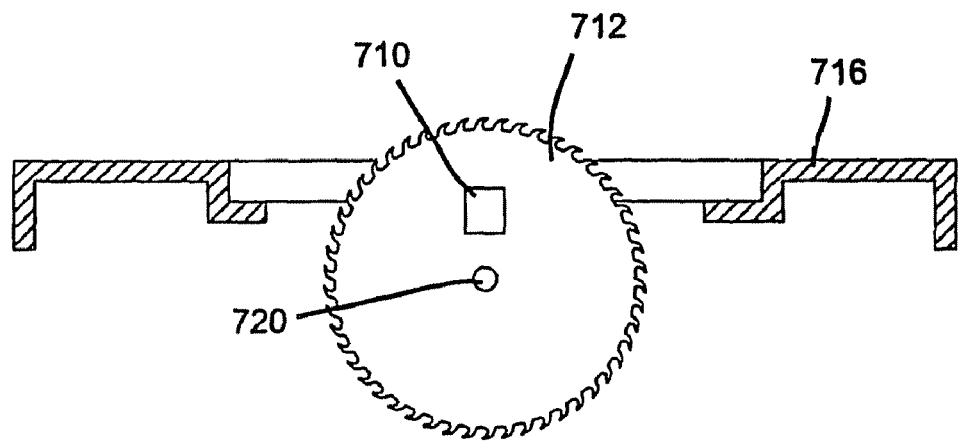
FIG. 49 is a cutaway view of the safety mechanism of FIG. 48 shown prior to actuation.
Figure 50:
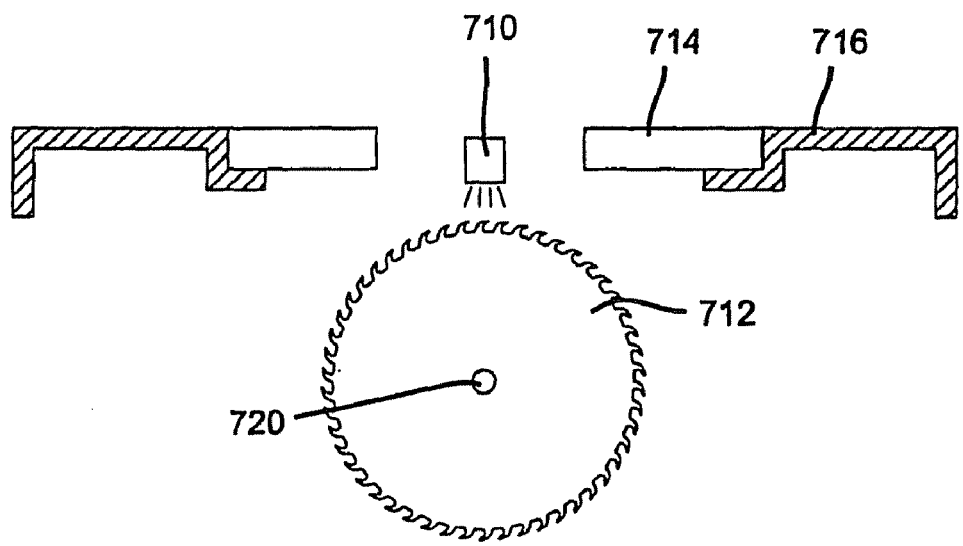
FIG. 50 is a cutaway view of the safety mechanism of FIG. 48 shown subsequent to actuation.

Turning now to FIGS. 48-50, a safety mechanism 14aa is shown. Safety mechanism 14aa is illustrated in cooperation with a table saw 10aa. Safety mechanism 14aa includes a displacement mechanism 710 for urging saw blade 712 downward to a position below opening 714 of table surface 716. Displacement mechanism 710 includes a sufficient displacement means such as, but not limited to, an electronic charge, or a mechanical actuator for example. It will also be appreciated the displacement mechanism 710 may alternatively be placed below hub 720 of blade 712 for attracting blade 712 toward the displacement mechanism 710. Such a configuration may include, but is not limited to electromagnets placed at the displacement mechanism 710 and at the saw blade hub 720.

During operation, if a dangerous condition is detected, by for example on of the sensing mechanisms 12 disclosed herein, displacement mechanism 710 is actuated. As a result, saw blade 710 moves from a position diagrammatically depicted in FIG. 49 to a position diagrammatically depicted in FIG. 50. While not specifically shown, it is appreciated that the support structure operatively engaged to blade 712 includes vertical displacement ability to accommodate the vertical travel of blade 712 during a retraction event.

Figure 51:
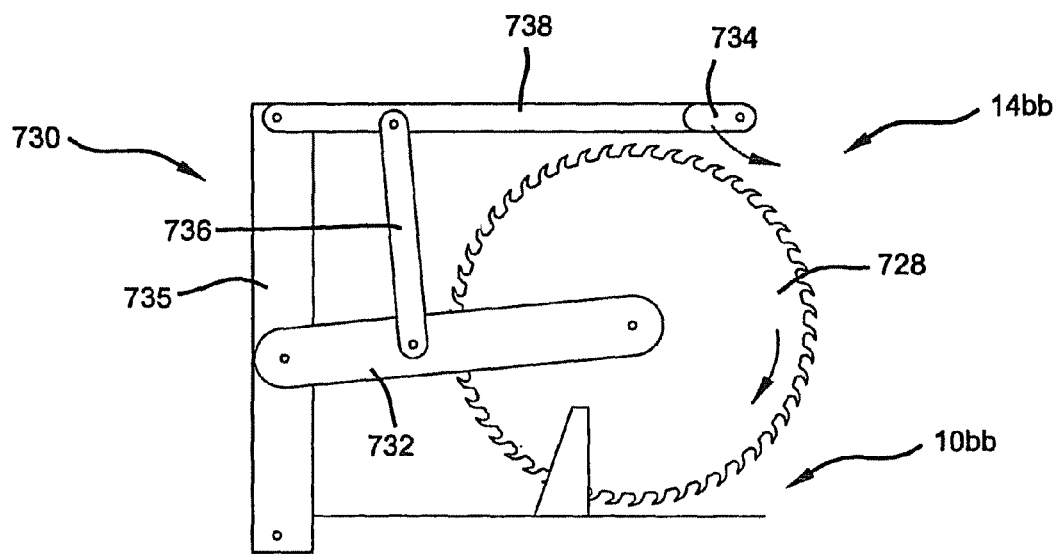
FIG. 51 is a side view of a safety mechanism according to a seventeenth embodiment of the present invention shown prior to activation.
Figure 52:
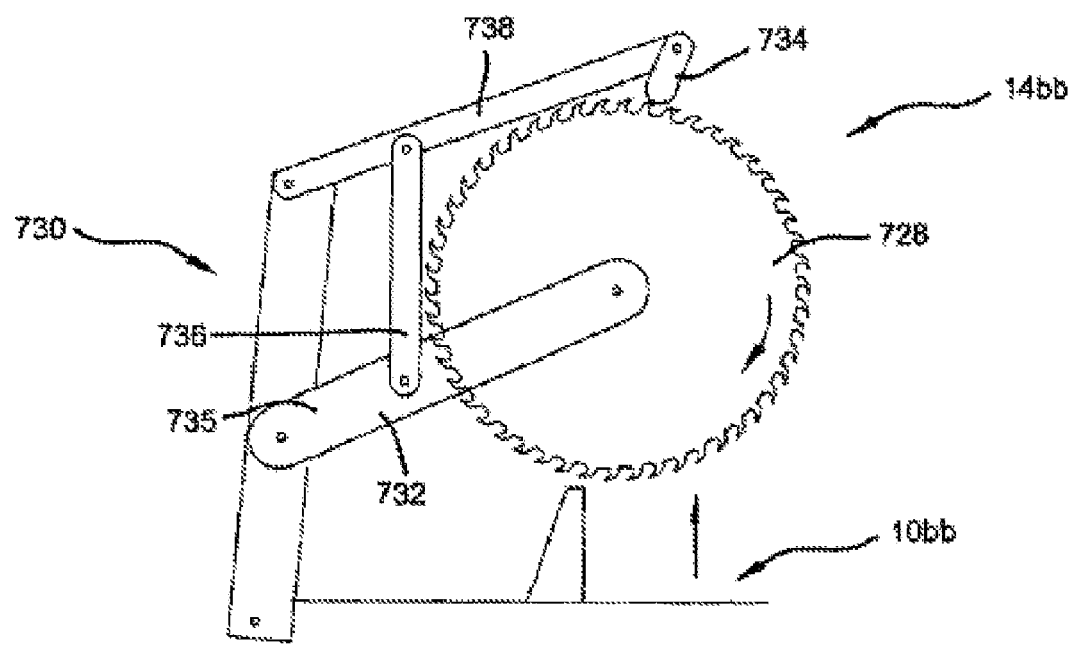
FIG. 52 is a side view of the safety mechanism of FIG. 51 shown after activation.

Referencing now FIGS. 51 and 52, a safety mechanism 14bb is shown operatively associated with miter saw 10bb. Safety mechanism 14bb shows a blade retraction and stop mechanism, linkage 730, that prevents contact of the user with the saw blade 728. Linkage 730 is composed of a saw arm 732, a saw stop 734, a frame 735, a stabilizing link 736 and a brake link 738. Frame 735 is a generally upwardly extending member having a first and a second attachment points. Connected to the first attachment point is the first end of saw arm 732. The other end of saw arm 732 is connected to a saw blade 728. Connected to the second attachment point is brake link 738. Brake link 738 is interconnected to saw arm 732 through stabilizing link 736 and includes a saw stop 734 attached to a distal end.

In operation, if a dangerous condition is detected by for example one of the sensing mechanisms disclosed herein, the saw stop 734 is actuated toward the rotating blade 728 to stop the rotation thereof. Saw stop 734 may be actuated by adequate means such as, but not limited to a mechanical actuator, or may alternatively be gravity induced for example. Once the saw stop 734 engages saw blade 728, the rotational inertia of saw blade 728 is transferred to linear inertia, driving the saw blade 728 upward. The saw arm 732 and brake link 738 are driven upward and away from contact with the user. It will be appreciated that although linkage 730 is depicted as a four bar mechanism, other linkages may be employed yielding similar results.

Figure 53:
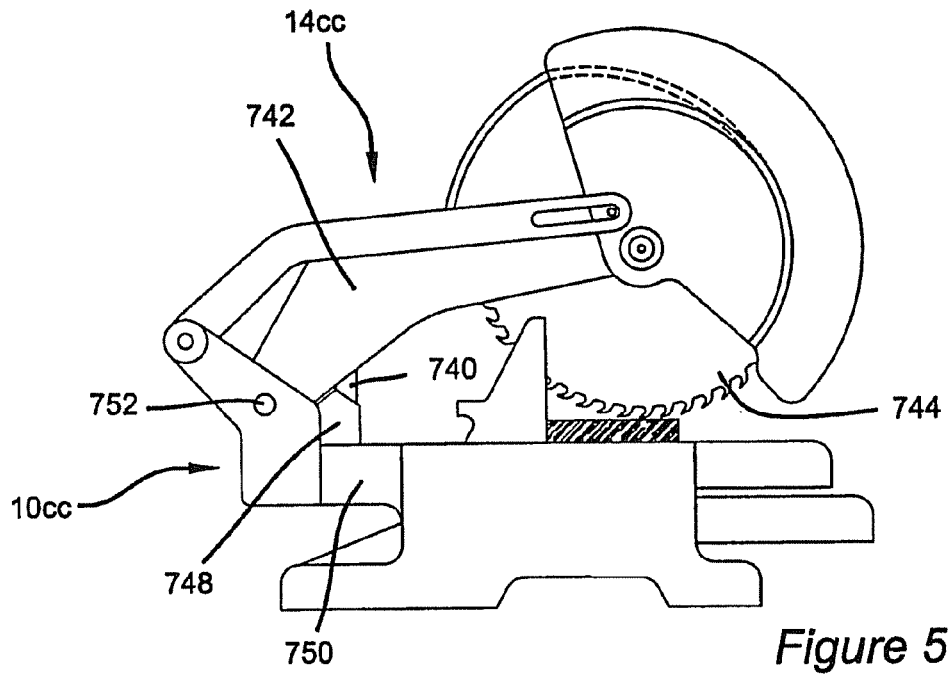
FIG. 53 is a side view of a safety mechanism according to a eighteenth embodiment of the present invention shown prior to activation.
Figure 54:
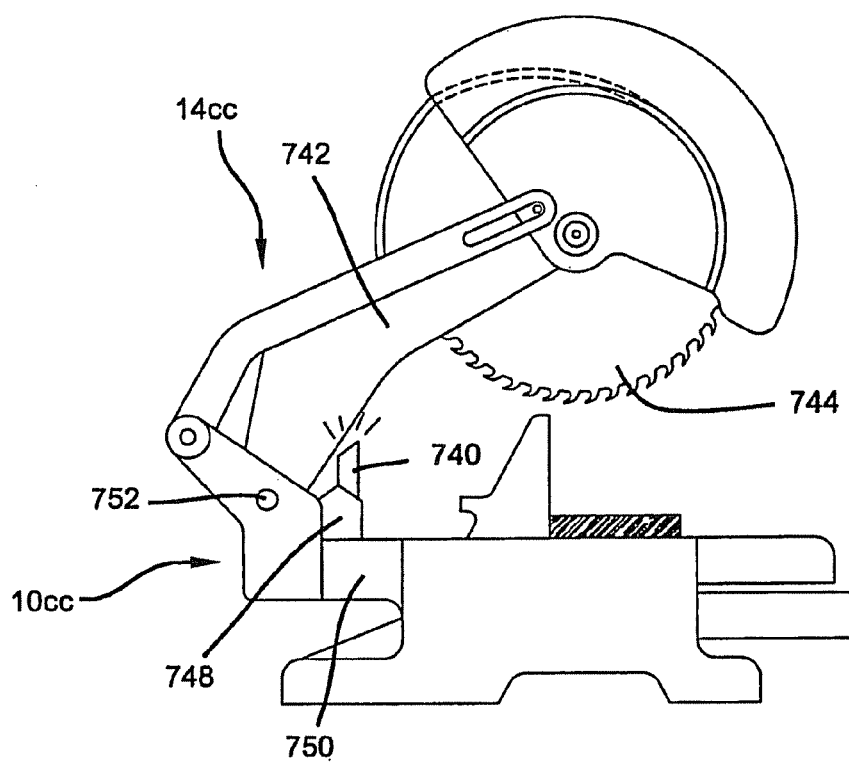
FIG. 54 is a side view of the safety mechanism of FIG. 53 shown after activation.

Turning now to FIGS. 53 and 54 a safety mechanism 14cc is shown. Safety mechanism 14cc is shown operatively associated with miter saw 10cc. Safety mechanism 14cc includes a deployment mechanism 740 for advancing arm 742 and therefore saw blade 744 of saw 10cc upward and away from contact with a user. Deployment mechanism 740 is preferably disposed on the base 748 of table portion 750 adjacent hinge 752.

Deployment mechanism 740 may include any sufficient mechanism capable of displacing arm 742 about pivot 752 such as, but not limited to, an explosive device, a mechanical spring, compressed gas or the like. In operation, if a dangerous condition is detected, by for example one of the sensing mechanisms 12 disclosed herein, deployment mechanism 740 is actuated. As such, the force generated onto arm 742 urges arm 742 upward about pivot 752 from a position diagrammatically depicted in FIG. 53 to a position diagrammatically depicted in FIG. 54.

Engaging the Blade with a Pawl Stop

Figure 55:
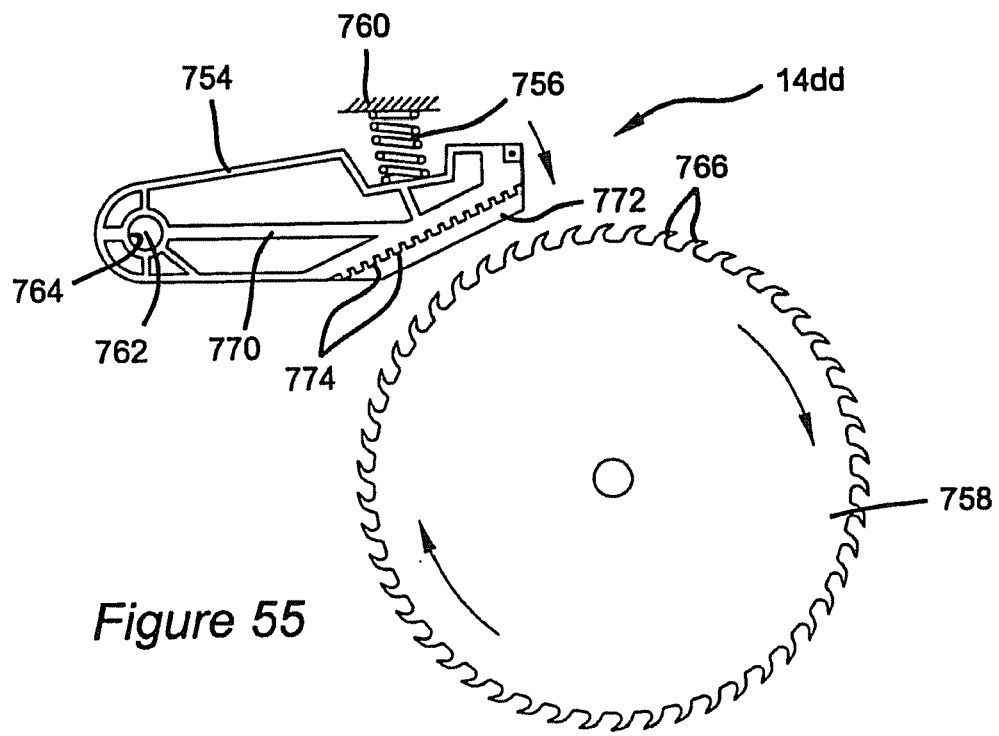
FIG. 55 is a side view of a safety mechanism according to a nineteenth embodiment of the present invention shown prior to activation.

FIG. 55 provides a fragmentary view of a safety mechanism 14dd that may be adapted for use with a power tool. The safety mechanism 14dd includes a pawl 754 pivotally coupled to the housing 760 of the power tool and a biasing device 756 operably coupled to the pawl 754. As will be further described below, the safety mechanism 14dd is operable to engage and thus stop the rotary motion of the saw blade 758. While the following description is provided with reference to a safety mechanism 14dd, it is readily understood that the pawl of the present invention may be adapted for use with different types of braking mechanisms and/or power tools.

More specifically, the pawl 754 is pivotally mounted to a frame portion 760 of the saw housing on an axle 762 that extends through a bore 764 formed in the frame portion of the housing 760. The pawl 754 is adapted to pivot into the teeth 766 of the blade 758 under the influence of biasing mechanism 756. In a preferred embodiment, the biasing mechanism 756 is a helical compression spring. Additionally, the pawl 754 is adapted to be self locking, i.e., draw into tighter engagement with the teeth 766 of the blade 758 due to the relative geometry of the blade 758 and pawl 754 as they are drawn together.

In a first preferred embodiment, the pawl 754 is composed of a main body portion 770 and a contact portion 772. The main body portion 770 defines the structure of the pawl 754 and adds to the rigidity of the structure. The main body portion 770 of pawl 754 is preferably constructed of a polymeric material having a relatively high hardness, such as acrilonitrile-butadiene-styrene (ABS). However, it is contemplated other materials having suitable physical properties may be utilized to form the main body portion 770 of pawl 754.

The contact portion 772 is formed opposite bore 764 on the pawl 754 and is proximate to the teeth 766 of saw blade 758. The contact portion 772 of pawl 754 is preferably constructed of an elastomeric material, such as polyurethane. However, it is contemplated other materials having suitable physical properties may be utilized to form the contact portion 772 of pawl 754.

When a dangerous condition is detected by for example one of the sensing mechanisms 12 disclosed herein, and it is desirable to stop blade 758, pawl 754 is rotated into engagement with the teeth 766 of blade 758 by influence from biasing mechanism 756. Contact portion 772 of the pawl 754 engages the blade 758 initially. The elastomeric material of contact portion 772 grasps the blade 758 due to its inherent material properties such as a relatively low shear modulus. As the teeth 766 of the blade 758 grasp the contact portion 772 of the pawl 754, the blade 758 begins to slow down. As the blade 758 is drawn into further engagement with the contact portion 772 of the pawl 754, the blade 758 is increasingly slowed. If blade 758 is not completely slowed by the contact portion 772 of pawl 754, teeth 766 will engage a plurality of interlocking features 774 formed on main body portion 770. Interlocking features 774 extend outward from the main body portion 770 toward contact portion 772. As noted above, the main body portion 770 of pawl 754 is preferably constructed of a polymeric material having relatively high hardness. Therefore, as the blade 758 engages the interlocking features 774 of the pawl 754, the relative hardness of the polymeric material forming the interlocking features 774 will significantly slow and stop blade 758. In this way, the improved pawl 754 of the present invention employs the physical properties of two materials to slow the rotation of the blade 758.

Interlocking features 774 also increase the surface area between the contact portion 772 and the main body portion 770 for purposes of adhesion. In a preferred embodiment, interlocking features 774 of the pawl 754 are constructed in series of channels extending perpendicular to the plane defined by blade 758. However, it is appreciated that interlocking features 774 may be constructed in many different forms and not depart from the scope of the present invention.

Additionally, it is preferred that contact portion 772 be formed by an overmolding process. In an overmolding process an elastomeric material is injected onto a plastic body (main body portion 770). Overmolding allows the two materials (the elastomeric material and the plastic body) to be cohesively attached. Therefore, no external adhesive or fasteners are required.

Figure 56:
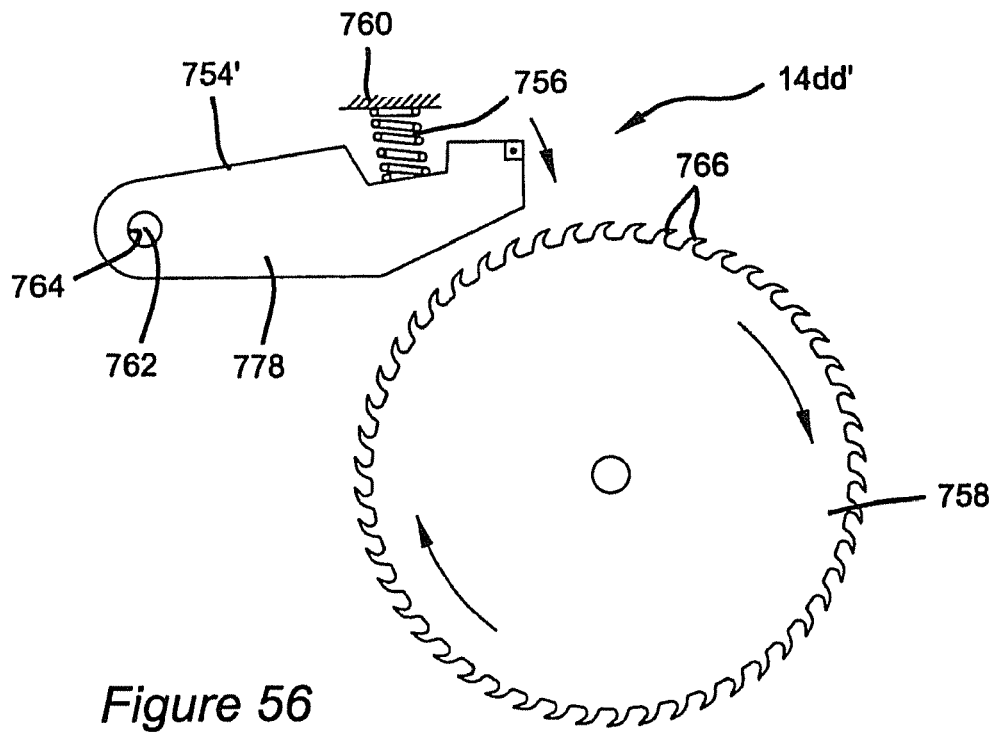
FIG. 56 is a side view of a safety mechanism according to a twentieth embodiment of the present invention shown prior to activation.

An alternative preferred embodiment for a safety mechanism 14*dd'* is shown in FIG. 56 wherein like components are referred to with like reference numbers. Safety mechanism 14*dd'* includes an improved pawl 754'. In this embodiment, the pawl 754' is formed as a unitary structure by injection molding of an elastomeric material 778 such as polyurethane. It is contemplated that pawl 754' may be formed of other elastomeric materials and not depart from the scope of the present invention. In forming pawl 754' through injection molding, it is desirable that the configuration of the mold be such that the fill (flow) path of the injected plastic is perpendicular to the direction that the pawl 754' will engage saw 758. The direction of the fill path is indicative of the direction that most of the polymer chains are oriented. As a result, the material having a fill path that is perpendicular to the direction of impact will have an increased impact strength, thereby improving the ability of the pawl to slow and/or stop the rotation of the blade 758.

It is envisioned that the pawl 754' may further include a fibrous material such as, but not limited to glass, graphite or KEVLAR coinjected with the elastomeric material 778 to form a fiber reinforced plastic. In this form, both the fibrous material and the elastomeric material retain their physical and chemical identities, yet produce a combination of properties that cannot be achieved by either of them individually. In a fiber reinforced plastic, the fibrous material is the principal load carrying members, while surrounding elastomeric material 778 keeps the fibrous material in the desired position and orientation. The elastomeric material 778 acts as a load transferring medium between the fibers and also protects them from environmental damage.

In fiber reinforced plastics, the fibers can be materials that are long directional filaments, particles that are small non-directional chunks or whiskers that are small directional filaments. In general, fibers tend to have very long lengths with respect to the surrounding material, and tend to have a significantly higher strength along their length. Preferably, fibrous materials include glass fiber, carbon fiber, and kevlar fiber. However, other types of fibrous materials are also within the scope of the present invention.

When it is desirable to stop blade 758, pawl 754' is rotated into engagement with the teeth 766 of blade 758 by influence from biasing mechanism 756. As pawl 754' engages blade 758, the elastomeric material 778 grasps the teeth 766 of blade 758 due to its relatively high elastic modulus and relatively low shear modulus. As the teeth 766 grasp the pawl 754', the blade 758 begins to slow down and is drawn into further engagement with the pawl 754'. As teeth 766 of blade 758 engage pawl 754', the fibrous material also engages teeth 766 of blade 758. As teeth 766 engage the fibrous material, the speed of blade 758 is increasingly slowed due to the relatively high strength of the fibrous material. The composite structure of pawl 754' effectively engages blade 758 through elastomeric material 778 and effectively slows and stops blade 758 through the fibrous material.

Figure 57:
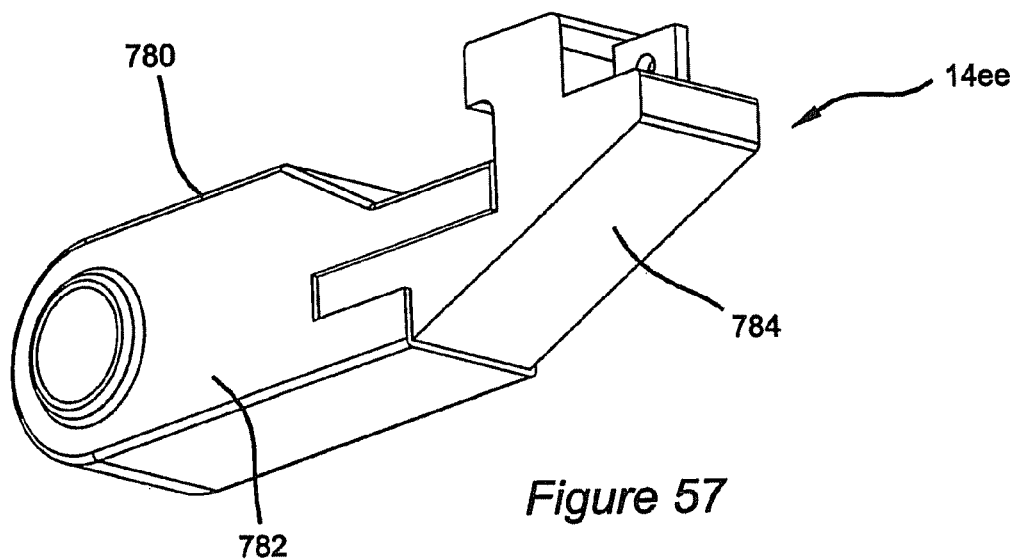
FIG. 57 is a perspective view of a safety mechanism according to a twenty-first embodiment of the present invention.
Figure 58:
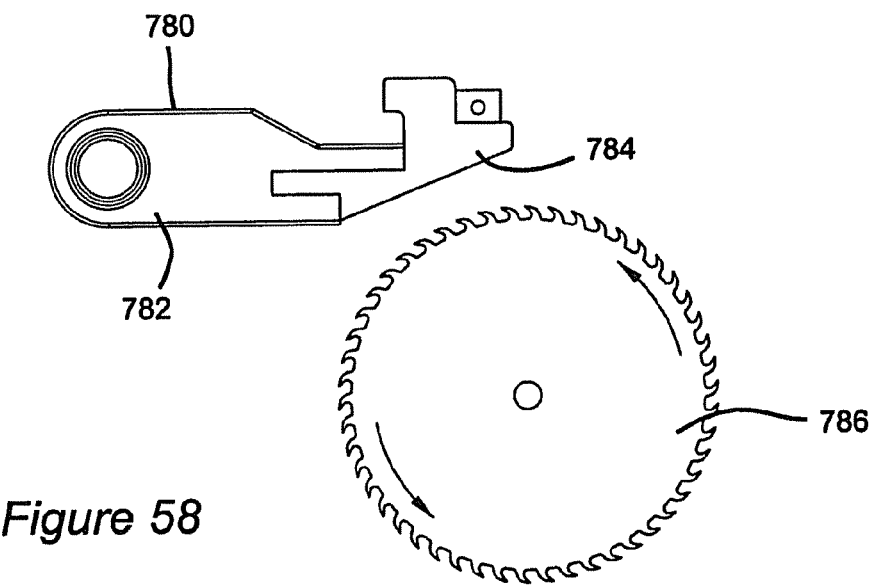
FIG. 58 is a side view of the safety mechanism of FIG. 57 shown prior to activation.

Referencing now FIGS. 57 and 58, a safety mechanism 14*ee* including an alternate pawl 780 is shown. The operation of safety mechanism 14*ee* is preferably employed similar to safety mechanism 14*dd*. Pawl 780 is comprised of a carrier 782 and an engagement portion 784. Engagement portion 784 is preferably made of a thermoplastic with high yield strength, but also a high percent elongation to allow it to stretch as it absorbs the energy from the saw blade 786 during a stop event. The material of engagement portion 784 is also conducive to absorb the initial impact of blade 786 while promoting uniform stopping times regardless of blade tooth geometry. Carrier 782 is comprised of a rigid lightweight material such as, but not limited to, rigid plastic. Carrier 782 is preferably a material conducive to minimize system inertia to facilitate rapid release of the safety mechanism 14*ee* and also provide necessary strength to maintain engagement portion 784 in firm contact with blade 786. The two piece pawl (i.e. one part carrier 782 and one part engagement portion 784) allows the user to remove the engagement portion 784 from carrier 782 after a stop event and replace it with a new engagement portion.

Pawl Activation

FIGS. 59*a*-61 illustrate exemplary activation systems for deploying a pawl type braking system, such as disclosed herein, upon a rotating saw blade. In general, the activation systems include a biasing member urging the pawl into contact with the active portion of the power tool and a release mechanism coupling the pawl to a portion of the power tool 12. The activation system is actuated upon signaling from a sensing mechanism such as described herein, that a dangerous condition exists. In this way, the pawl is uncoupled from a secure position and urged into engagement with the active portion of the power tool to prevent or reduce possible injuries caused by contact between a portion of the operator's body and the active portion of the power tool. While the activation system described herein is shown employing a pawl type stop, it is appreciated that other types of stops adapted to engage the active portion of a power tool may be utilized with the activation system of the present invention.

Figure 59A:
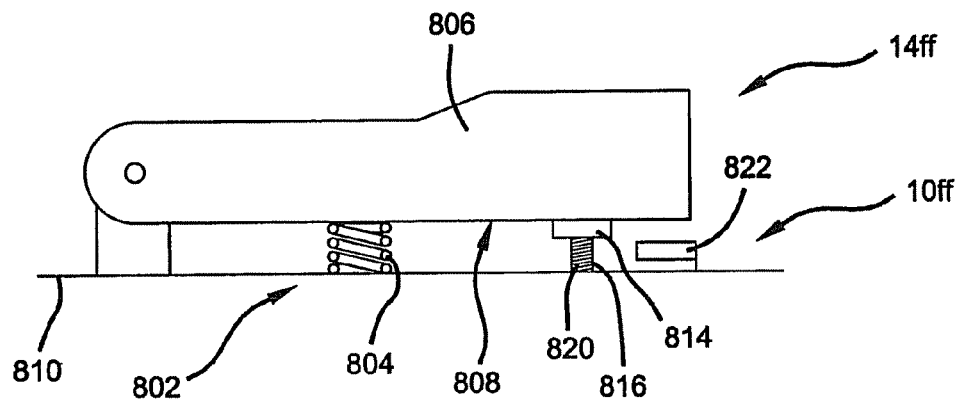
FIG. 59a is a side view of a safety mechanism according to a twenty-second embodiment of the present invention shown prior to activation.
Figure 59B:
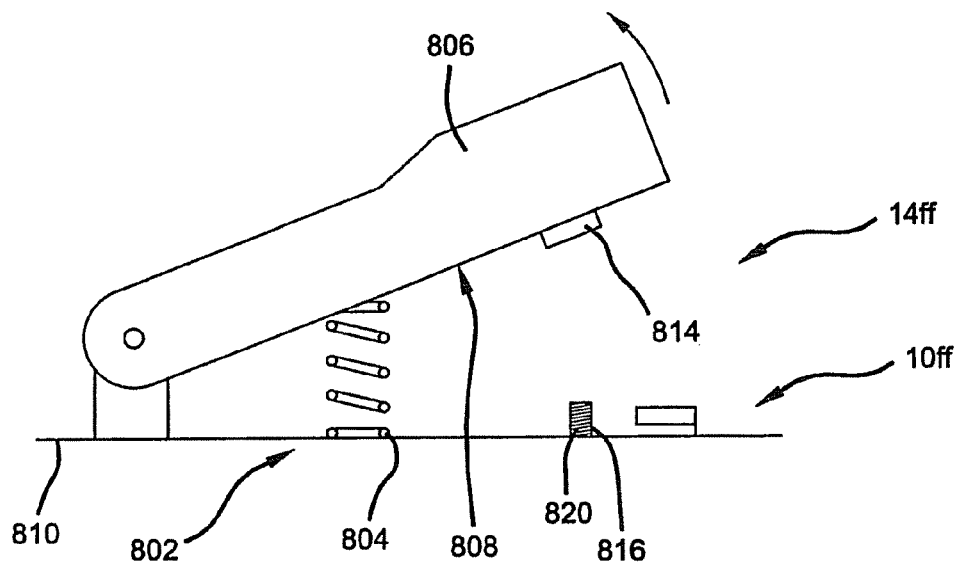
FIG. 59b is a side view of the safety mechanism of FIG. 59a shown after activation.

Turning now to FIGS. 59*a* and 59*b*, a safety mechanism 14*ff* employing a magnetic pawl release 802 is shown. Magnetic pawl release 802 includes a biasing member 804 for exerting a biasing force on pawl 806 to urge pawl 806 toward the active portion of the power tool. The biasing member 804 of the present invention is preferably a compression spring that is positioned between a portion of the power tool 10*ff* such as frame 810 and an opposing face 808 of pawl 806. It is also contemplated that other types of biasing members such as leaf springs may be utilized to urge the pawl into engagement with the active portion of the power tool. Also, it is appreciated that the biasing member may positioned in a variety of positions and still urge the pawl 806 into engagement with the active portion of the power tool 10ff such as a saw blade.

The release mechanism 802 is comprised of a first and second oppositely charged magnets 814, 816 attached to the pawl 806 and a portion of the power tool 810, respectively. The first magnet 814 is preferably coupled to the rear surface of the pawl 806 and extends in a generally parallel direction with respect to the rear surface of the pawl 806. The second magnet 816 is attached to a portion 810 of the power tool 10ff and preferably extends generally parallel to the first magnet 814 when the pawl 806 is in the secured position (FIG. 59a). In this manner, the face of the second magnet 816 is positioned to align substantially with the face of the first magnet 814 when the pawl 806 is in the secured position to optimize the attraction therebetween. The first and the second magnets 814, 816, due the opposite polarities, are attracted to one another and provide a second biasing force that is opposite in direction and at least as large in magnitude as the biasing force of the biasing member 804.

The second magnet 816 also includes a coil 820 formed from electrically conductive wire disposed around the outer surface of the magnet 816. The coil 820 is coupled to a power source (not specifically shown) for controlling the magnetic force of the second magnet 816 as is well known in electromagnetics.

When a dangerous condition is detected by for example one of the sensing mechanisms 12 disclosed herein, and it is desirable to activate the pawl 806 to stop the active portion of the power tool, an electrical voltage is applied to the wire 820. As the electrical charge is applied, the attractive force of the second magnet 816 is decreased. Once the attractive force of the first and the second magnets 814, 816 is less than the biasing force of the biasing member 804, the pawl 806 is released from the secured position (as diagrammatically depicted in FIG. 59a) into an engaging position (as diagrammatically depicted in FIG. 59b) with the active portion of the power tool 10ff.

The amount of time required to release the pawl is preferably minimized to reduce the overall time required to stop the active portion of the power tool 10ff. Therefore, it is desirable to apply a large electrical charge to the second magnet 816 to allow the attractive force to be rapidly reduced or eliminated. It is also appreciated that an electrical charge capable of changing the polarity of the second magnet 816 could be applied to the second magnet 816 causing the first and the second magnets 814, 816 to have a repulsion force, further reducing the period of time required release the pawl 806.

Sensor 822 of the present invention determines if the pawl 806 is in the secured position and if the coil 820 can be energized. The sensor shown in FIGS. 59a and 59b is a Hall-type sensor. The Hall sensor measures the magnetic induction field applied in relation to the current flow. Thus, the Hall sensor determines the amount of attraction forces between the first and the second magnets 814, 816 to determine, if the pawl 806 is in place and if the coil 820 can be energized. It is appreciated that other sensors may be employed within the scope of the present invention.

In operation, a controller (not specifically shown) for the power tool measures the sensor 822 to determine the location and status of the pawl 806. If the pawl 806 is in the secured position, the controller allows operation of the power tool 10ff. In the event of a dangerous condition, the controller applies an electrical charge to the coil 820 of the second magnet 816. Once the coil 820 is electrically charged, the attractive force of the first and second magnets 814 and 816 is reduced and the biasing member 804 urges the pawl 806 into engagement with the active portion of the power tool 10ff in a relatively short period of time.

Figure 60A:
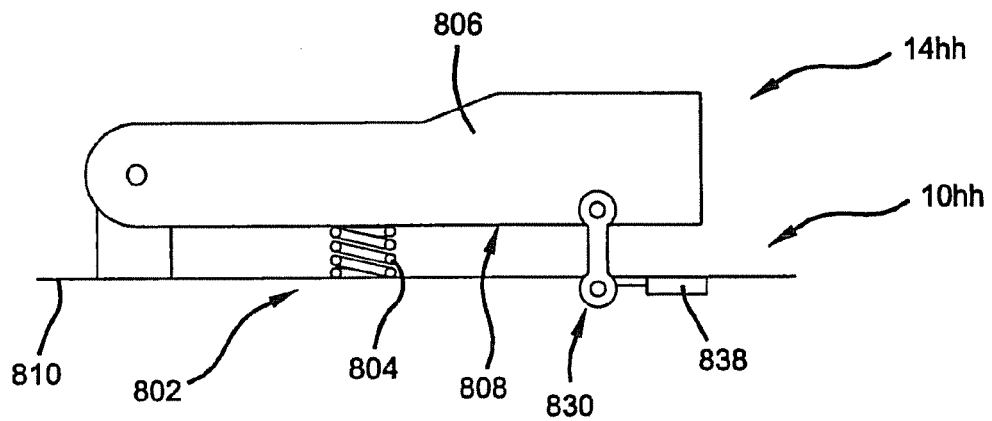
FIG. 60a is a side view of a safety mechanism according to a twenty-third embodiment of the present invention shown prior to activation.
Figure 60B:
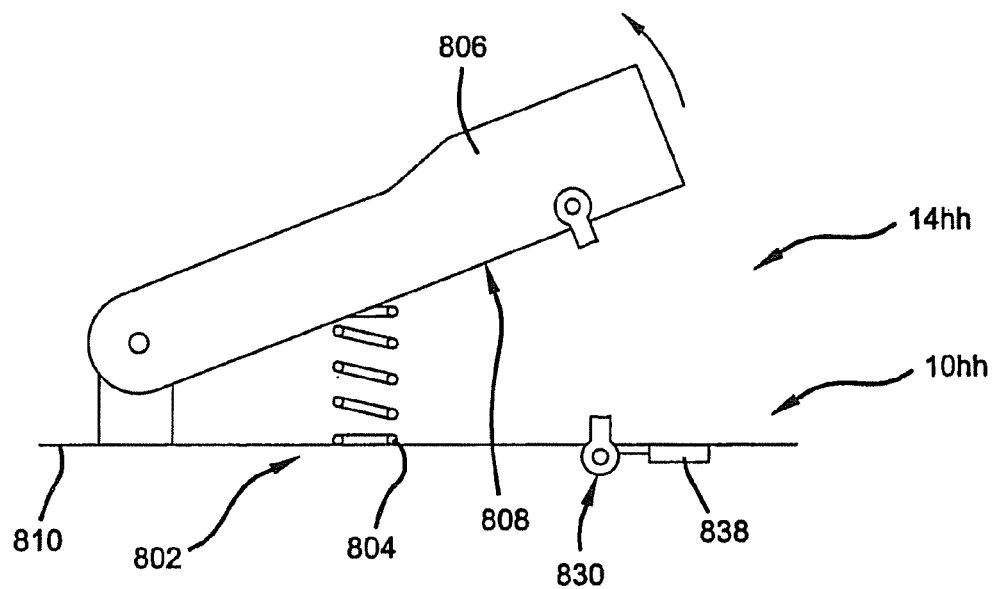
FIG. 60b is a side view of the safety mechanism of FIG. 60a shown after activation.
Figure 60C:
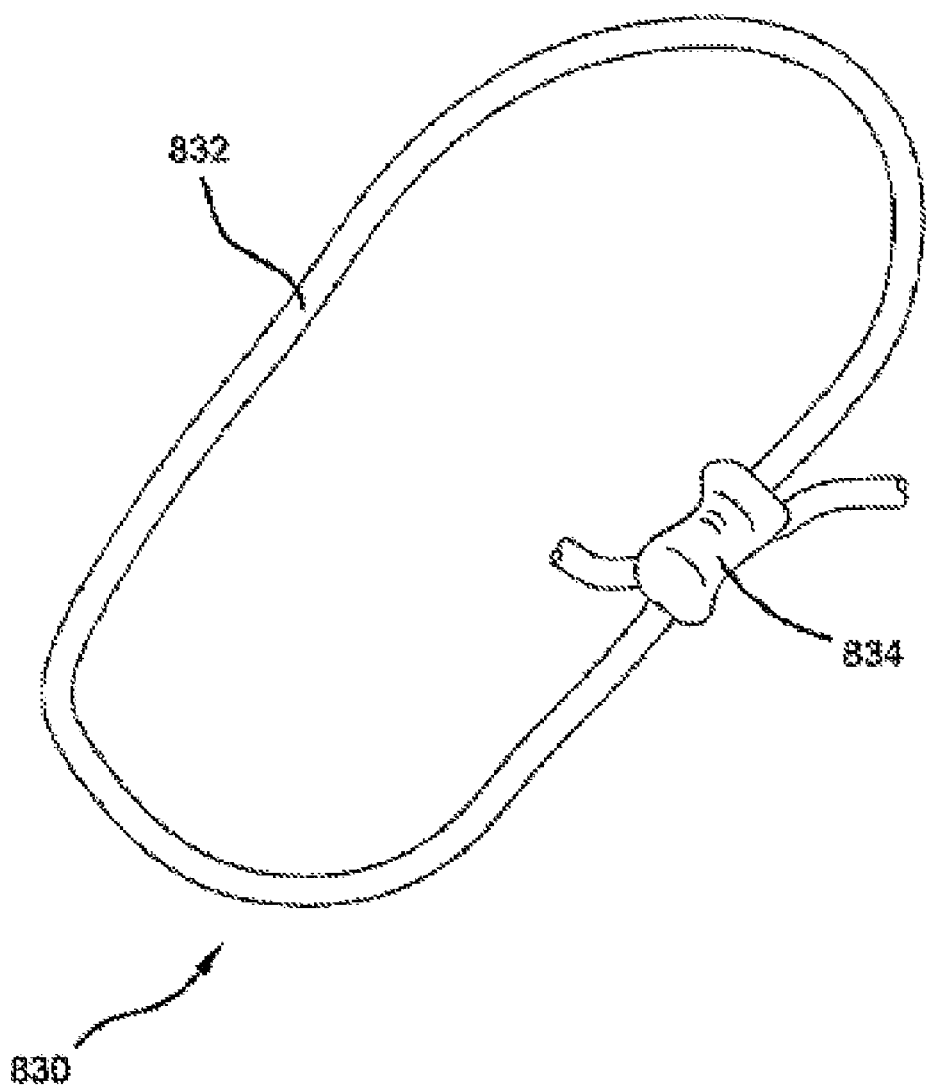
FIG. 60c is a detailed view of a fuse member used in the safety mechanism of FIGS. 60a and 60b.

Turning now to FIGS. 60a-60c, a safety mechanism 14gg employing a fuse member 830 is shown. Like components are referred to with like reference numbers as safety mechanism 14ff. The safety mechanism 14gg includes a biasing member 804 urging the pawl 806 into contact with the active portion of the power tool 10gg and a fuse member 830 coupling the pawl 806 to a portion of the power tool 10gg. The safety mechanism 14gg is designed, upon detection of a dangerous condition by for example one of the sensing mechanisms 12 disclosed herein, to uncouple pawl 806 allowing the pawl to engage the active portion of the power tool 10gg to prevent or reduce possible injuries caused by contact between a portion of the operator's body and the active portion of the power tool 10gg. While the activation system of the present invention is shown employing a pawl type stop, it is appreciated that other types of stops adapted to engage the active portion of a power tool may be utilized with the activation system of the present invention.

Safety mechanism 14gg including fuse member 830 extends from pawl 806 to a portion of the power tool 10gg. The fuse member 830 is generally comprised of an electrically conductive wire 832 formed into a loop shape and a crimp portion 834 coupling the ends of the wire together. The loop shape of the fuse member allows the fuse to be positioned around a desired point on each of the power tool 10gg and the pawl 806 as needed. The electrically conductive wire 832 is formed of a material that is deformable upon application of a relatively large electrical current to the wire 832. The crimp portion 834 is generally a unitary member that is positioned over the ends of the wire 832 and deformed to mechanically couple the first and second ends of the wire 832 together. The crimp portion 834 may be formed of any of a variety of materials exhibiting greater strength than the wire 832.

When a dangerous condition is detected by for example one of the sensing mechanisms 12 disclosed herein and it is desirable to activate the pawl 806, a relatively large electrical current is applied by controller 838 to the fuse member 830. Upon application of the electrical current, the fuse member 830 begins to weaken mechanically. Once the biasing force of the biasing member 804 exceeds the tensile strength of the electrified fuse member 830, the pawl 806 is urged toward the active portion of the power tool (FIG. 60b).

The electrical activation of the present invention allows the rapid release of the pawl stop of the braking system. Rapid release of the pawl 806 reduces the overall time required to stop the active portion of the power tool. Thus, the possibility for injurious contact between the active portion of the power tool and a portion of the operator's body is reduced or eliminated.

Figure 61A:
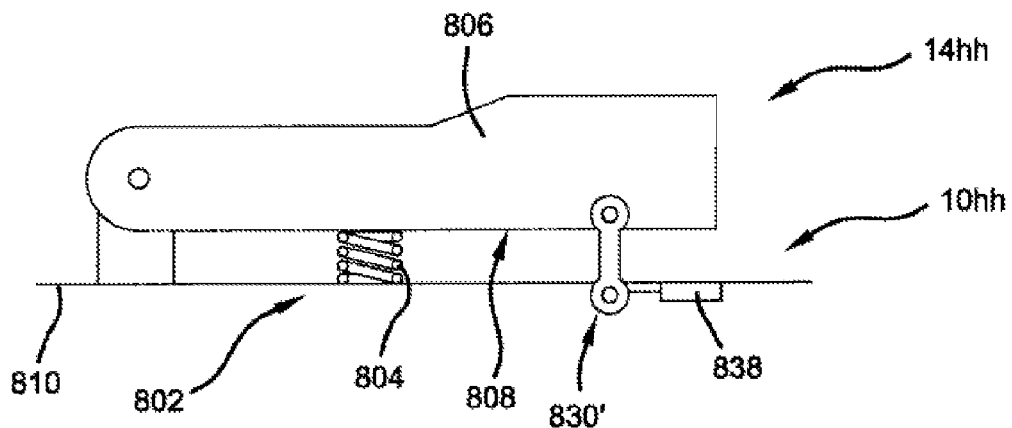
FIG. 61a is a side view of a safety mechanism according to a twenty-forth embodiment of the present invention shown prior to activation.
Figure 61B:
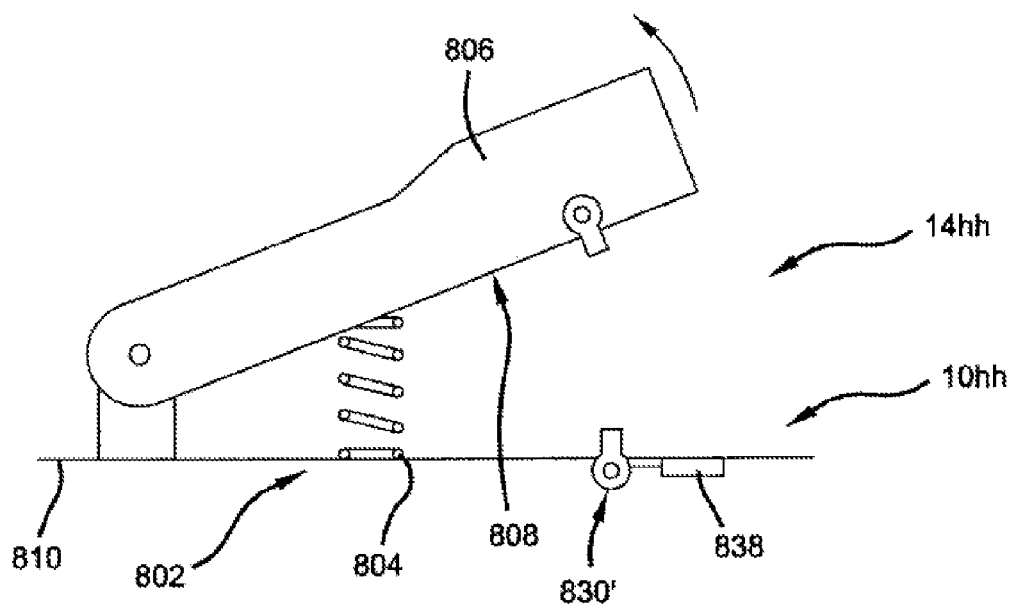
FIG. 61b is a side view of the safety mechanism of FIG. 61a shown after activation.
Figure 61C:
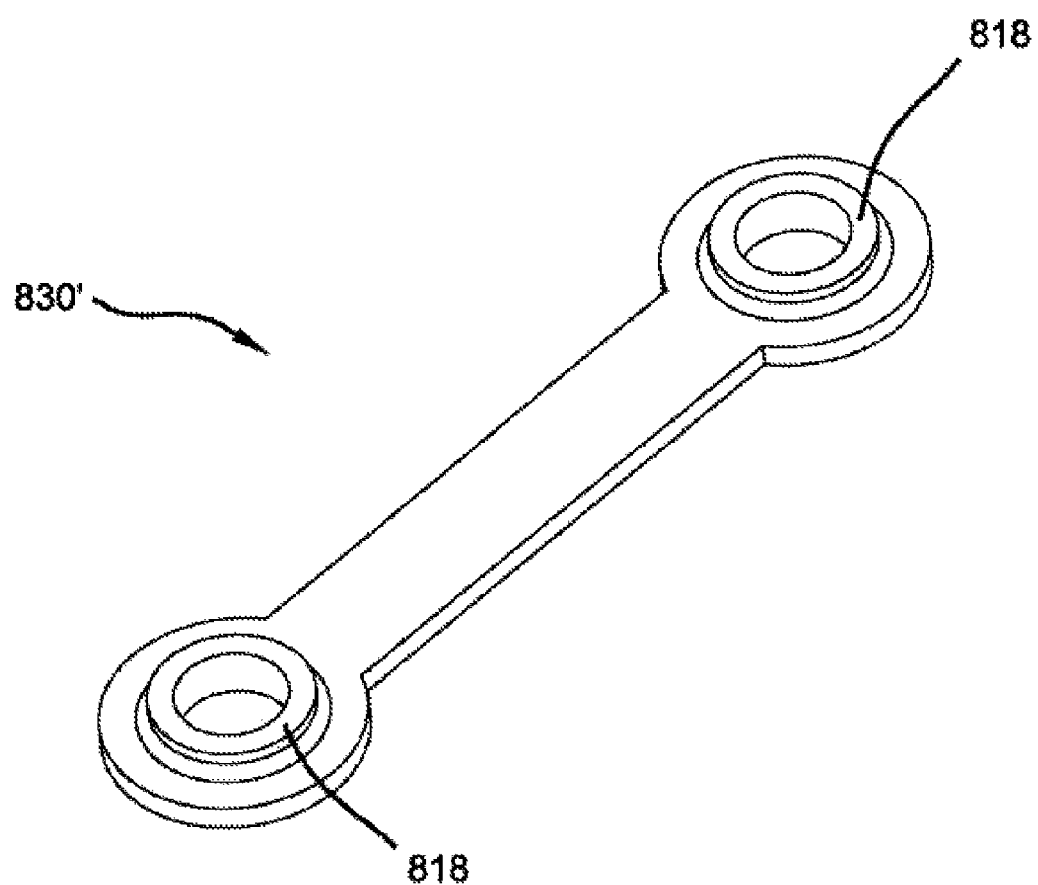
FIG. 61c is a detailed view of a fuse member used in the safety mechanism of FIGS. 61a and 61b.

FIGS. 61a-61c illustrates a safety mechanism 14hh including an alternative fuse member 830'. Fuse 830' includes a unitary stamped metal body portion. Mounting bores 818 are disposed on opposite ends of fuse 830' for mounting to pawl 806 and tool 10hh respectively. The operation of safety mechanism 14hh is similar to the operation of safety mechanism 14gg. Fuse 830' presents several advantages over a traditional wire fuse. In this regard, no additional assembly is needed with unitary fuse member 830'. In addition, the length of the fuse 830' is controlled by tooling rather than during assembly of the fuse 830'.

Figure 62A:
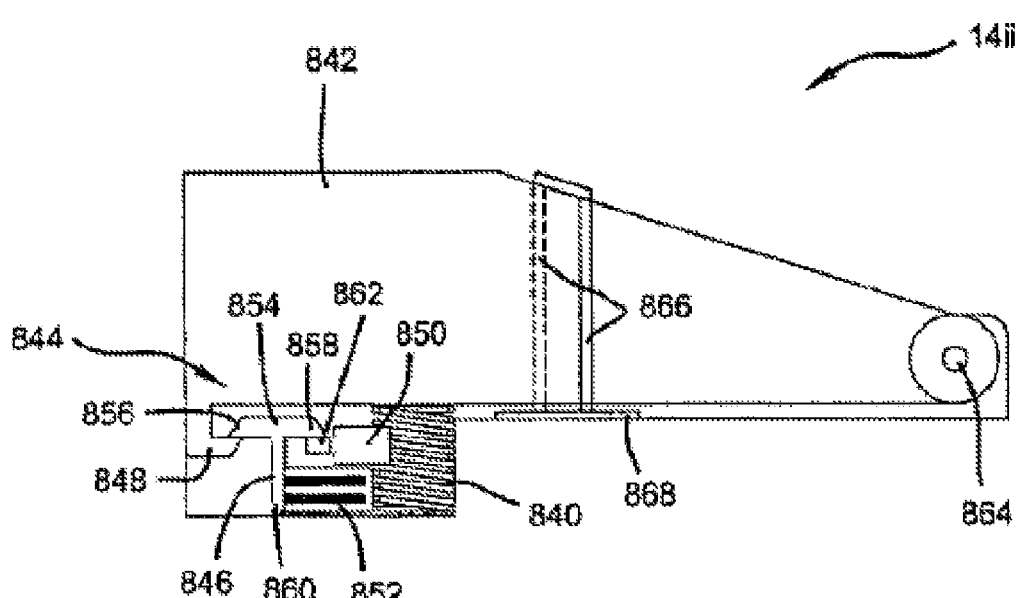
FIG. 62a is a side view of a safety mechanism according to a twenty-fifth embodiment of the present invention shown prior to activation.
Figure 62B:
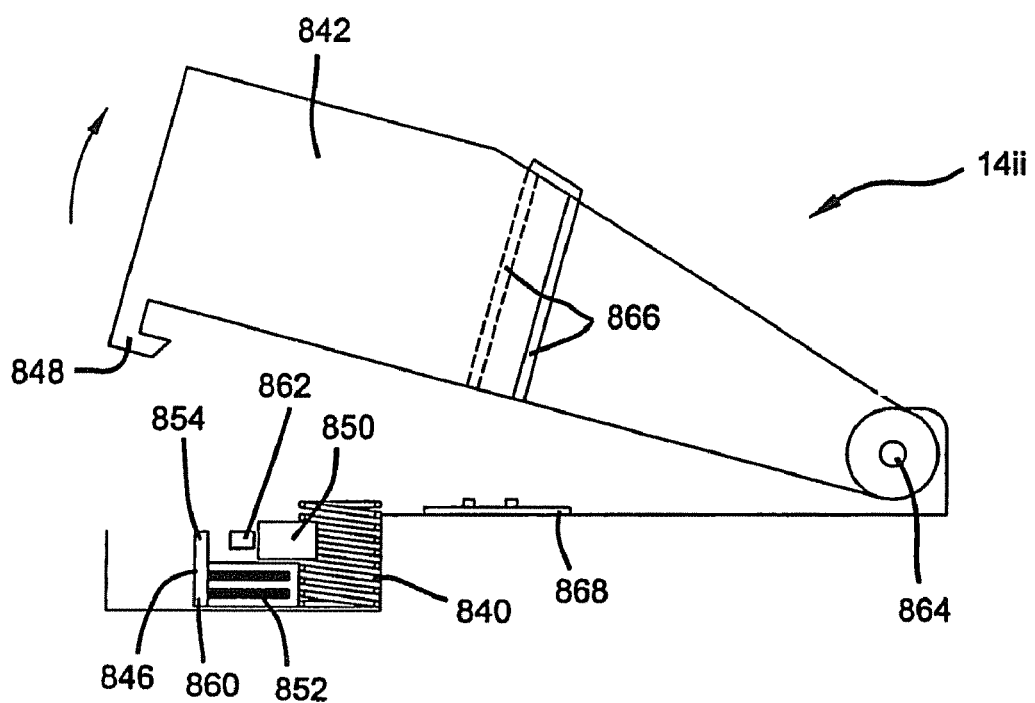
FIG. 62b is a side view of the safety mechanism of FIG. 62a shown after activation.

A second embodiment of a pawl type activation system is shown in FIGS. 62a-62b. Safety system 14ii includes a biasing member 840 urging a pawl 842 into contact with the active portion of the power tool and an activation system 844 coupling the pawl 842 to a portion of the power tool. The safety system 14ii is designed, upon signaling from for example a sensing mechanism 12 disclosed herein, to uncouple the pawl 842 allowing the pawl 842 to engage the active portion of the power tool to prevent or reduce possible injuries caused by contact between a portion of the operator's body and the active portion of the power tool. While the activation system 844 of the present invention is shown employing a pawl type stop, it is appreciated that other types of stops adapted to engage the active portion of a power tool may be utilized with the activation system of the present invention.

The activation system 844 includes a rotatable latch 846 engaging a finger portion 848 of the pawl 842 and first and second solenoids 850, 852 actuating the latch 846. The latch 846 is rotatably coupled about an axis of rotation to a portion of the power tool to support the latch 846 and the pawl 842 in the secured position. The latch 846 includes an engagement arm 856, a support arm 858 and an activation arm 860 extending generally from the axis of rotation in a "T" shaped configuration. The engagement arm 856 of the latch 846 operatively engages finger portion 848 of the pawl 842. The support arm 858 engages the first solenoid 850 to restrain the pawl 842 in the secured position via the engagement arm 856. The activation arm 860 is in contact with the second solenoid 852 which operatively rotates the latch 846 to allow the pawl 842 to engage the active portion of the power tool.

The first solenoid 850 operates as a protective device to prevent inadvertent activation of the pawl 842. In operation, the plunger portion 862 of the first solenoid 850 is placed in the extended position to engage the support arm 858 of the latch 854 during the initial unstable operation of the power tool. The plunger portion 862 of the solenoid 850 prevents the latch 854 from rotating and releasing the engagement arm 856 from engagement with finger 856 of the pawl 842.

Once the power tool has stabilized, the second solenoid 852 is magnetically coupled to activation arm 860 by an electromagnet for preventing rotation of the latch 854 and release of the pawl 842. Next, the plunger portion 862 of the first solenoid 850 is retracted. If a dangerous condition has been detected by for example one of the sensing mechanisms 12 disclosed herein and it is desirable to release the pawl 842, the magnetic coupling between the activation arm 860 and the second solenoid 852 is reduced. Once the magnetic coupling is reduced, latch 846 rotates and the biasing member 840 urges the pawl 842 about pivot 864 (from a position diagrammatically depicted in FIG. 62a to a position diagrammatically depicted in FIG. 62b) into engagement with the active portion of the power tool. The electromagnetic coupling of the pawl 842 allows the pawl 842 to be activated relatively rapidly. Rapid activation of the pawl 842 reduces the overall time required to stop the active portion of the power tool. Thus, the period of time that injurious contact may take place between the active portion of the power tool and a portion of the operator's body is also reduced.

In the event of interruption to the electrical power of the activation system 844 the pawl 842 will not engage the active portion of the power tool. Once electrical power is removed from the activation system 844, the plunger portion 862 of the first solenoid 850 will return to the extended position. In the extended position, the plunger 862 prevents rotation of the latch 860, which will release the pawl 846. Once a deployment event has occurred, pawl contacts 866 detach from trigger printed circuit board 868. Pawl contacts 866 must be reattached to trigger printed circuit board 868 after a deployment event.

Strap Stops

Braking systems are well known for use with many devices. Conventional braking systems either engage the portion of the device that is desired to be stopped or a segment of the device that is connected to the portion of the device that is desired to be stopped. However, many braking systems require a lengthy period of time to stop the portion of the power tool. Braking systems in power tools must be able to stop the active portion of the power tool in a very rapid period of time to reduce and/or eliminated the amount of injury to the operator of the power tool due the relatively high speeds of the power tool and the dangerous nature of the active portion of the power tool.

Figure 63B:
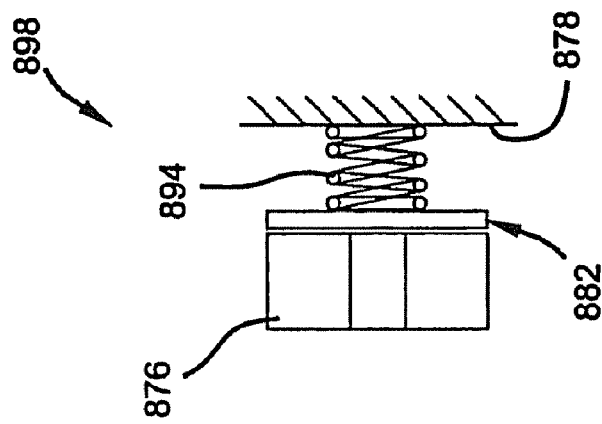
Figure 63A:
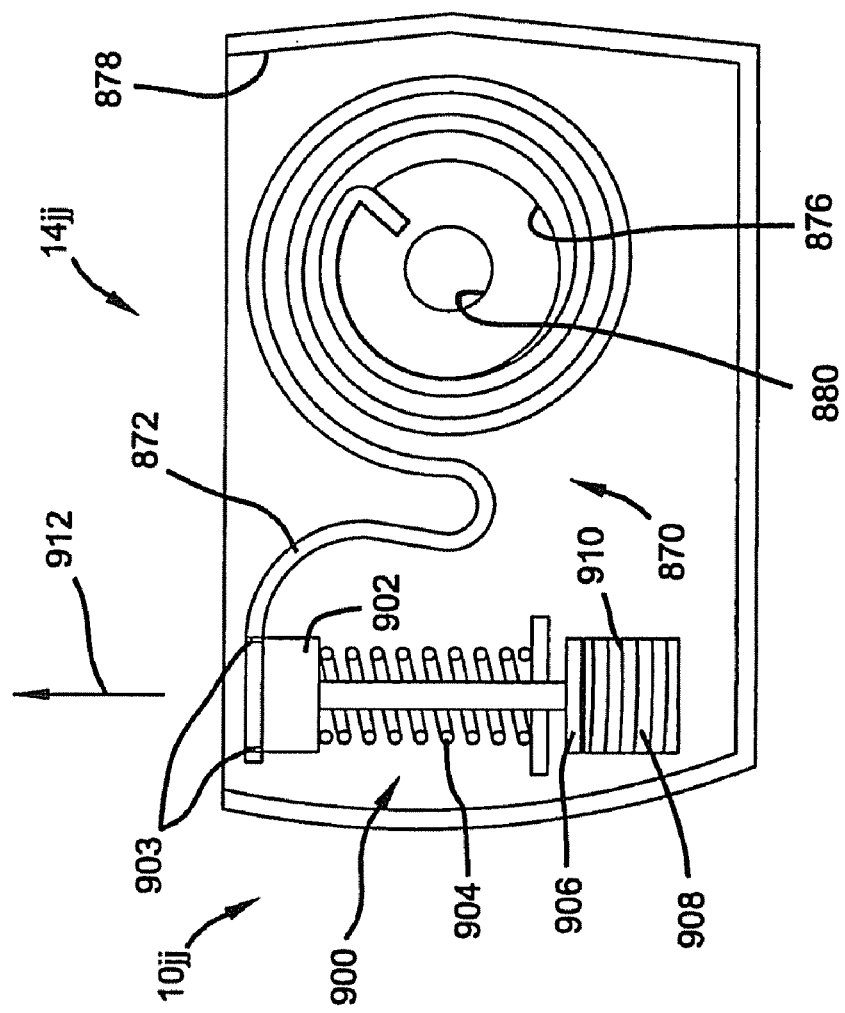
FIG. 63a is a view of a safety mechanism according to a twenty-sixth embodiment of the present invention.

Turning now to FIGS. 63a and 63b, a safety mechanism 14jj employing a strap stop 870 is shown operatively associated with miter saw 10jj. The exemplary power tool embodied herein is a miter saw, however it is appreciated that the safety system of the present invention may be adapted for use with a variety of power tools. In general, miter saw 10jj includes a strap 872 employed to provide braking force upon engagement with a saw blade not specifically shown. Strap 872 is preferably made of a strong flexible material such as Kevlar. A friction stopping device 898 includes a friction disk 882 and drum 876.

Housing 878 includes strap 872 shown wound around drum 876 which is rotatably disposed on shaft 880. Strap 872 is wrapped around drum 876 in sufficient supply to accommodate a single blade stop event. Friction disk 882 is fixed from rotation with drum 876. A spring 894 biases friction disk 882 into engagement with drum 876. In a safety event the strap 872 is moved into engagement with a saw blade causing the strap 872 to be pulled by the blade. As such, the strap 872 will uncoil from drum 876 as the drum 876 rotates in a counterclockwise direction as viewed from FIG. 63a. The friction disk 882 provides a predetermined amount of friction to resist excessive rotation of the spool 876 in a deployment event. Friction disk 882 includes friction material disposed thereon for cooperating with biasing member 894 urging friction disk 882 into drum 876. It is appreciated that alternatively or additionally, friction material may be incorporated on the engaged surface of drum 876. Friction spool 876 is preferably placed in a location favorable to unabated unwinding. Accordingly, the friction provided by the interaction between friction disk 882 and drum 876 generates the force necessary to stop rotation of the saw blade.

Deployment mechanism 900 includes carrier 902 supporting two edges of the strap 872. The center of the strap 872 is unengaged and suspended between the two edges 904. Edges 904 are secured in channels providing adequate resistance to the removal of the strap 872 laterally or perpendicularly to the straps orientation. This resistance however is insignificant relative to the friction provided by friction disk 882.

The strap carrier 902 is preferably deployed by one of the following deployment means. A preferred embodiment includes a spring 904, first and second magnets 906, 908 and a coil 910. The spring 904 is compressed which provides the deployment force. First magnet 906 is coupled to the strap carrier 902 and the second magnet 908 is coupled to the housing 878. Second magnet 908 exerts sufficient attractive force on the first magnet 906 to overcome the spring 904. The coil 910 is used to degrade the field in the fixed magnet 908 so that at the desired time, the spring force overcomes the magnetic force and the strap 872 moves up to engage the saw blade. Alternatively, the first and second magnet 906 and 908 may be replaced with a fuse wire such as disclosed in relation to safety mechanism 14w for example. While not specifically shown in relation to this embodiment, a first end of the fuse wire may be attached to the strap carrier 902 and a second end attached at two electrical contact points on the housing 878. A small gap extends between the two electrical contact points. When sufficient voltage is applied at the two contacts, a large current is induced in the fuse wire heating and weakening the segment of wire between the contacts. The spring force then breaks the fuse wire and the strap carrier 902 is released to engage the saw blade 874. It will be appreciated that other deployment mechanisms may be employed within the scope of the present invention.

When a dangerous condition is detected by for example one of the sensing mechanisms 12 disclosed herein, coil 910 degrades the magnetic field between magnets 906 and 908 allowing spring 904 to force carrier 902 toward the saw blade into the direction depicted by arrow 912, and thus strap 872 into the saw blade. In this regard, the blade teeth engage the center unsupported section of the strap 872 causing the blade teeth to pierce the strap 872. Once the strap 872 is forcefully engaged to the blade teeth, the strap 872 is pulled out of the housing 878, the slack is used and the braking force generated by the friction clamping device 898 slows the blade 874 to a stop as the strap 872 unwinds from drum 876.

Figure 63C:
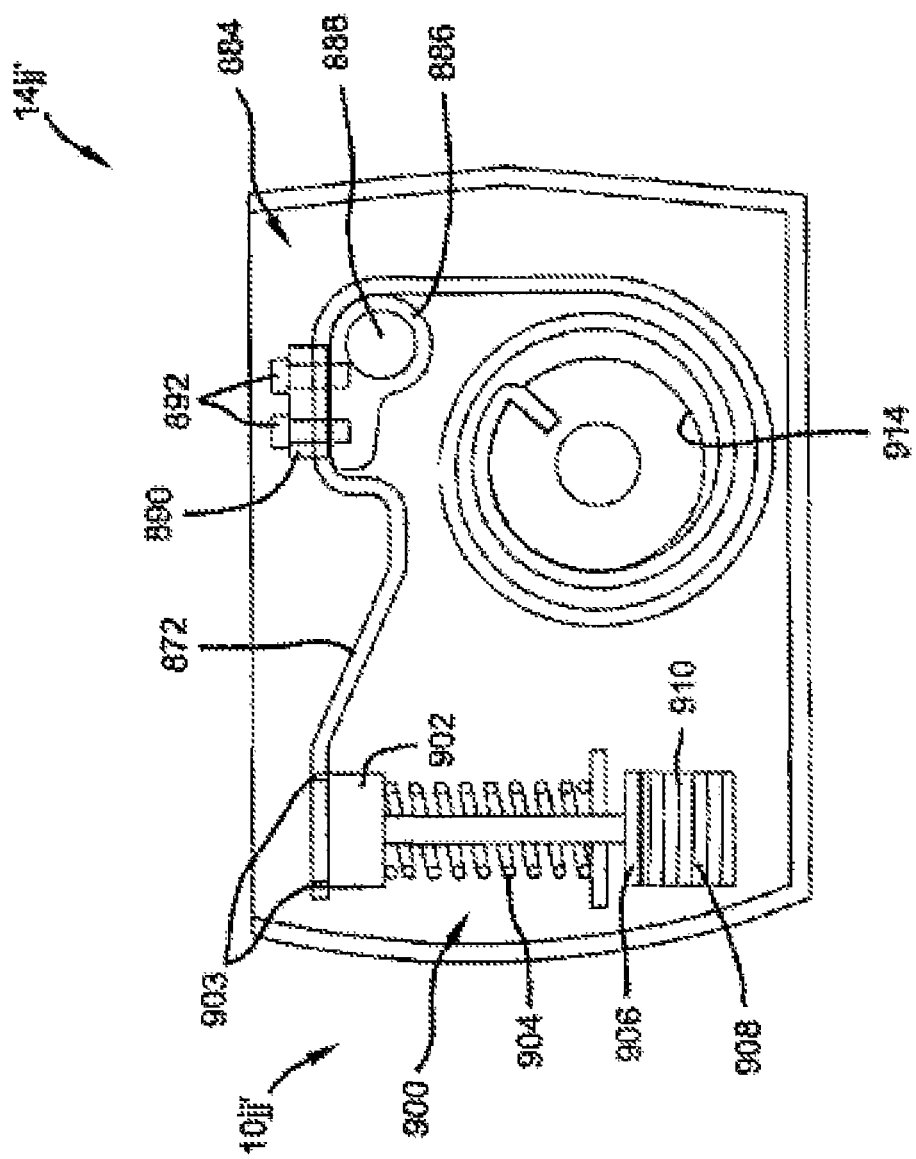
FIG. 63c is a view of a safety mechanism according to a twenty-seventh embodiment of the present invention.

In an alternate embodiment shown in FIG. 63c, safety mechanism 14jj' includes strap 872 routed through a freely pivoting friction clamping device 884. Like reference numbers are used to designate like components. Strap 872 is wrapped around spool 914. Clamping device 884 includes a pivoting steel block 886 on a large shaft 888, such as 0.75 inch diameter, with a plate 890 attached by conventional fasteners 892. The strap 872 is routed to pass between the plate 890 and the block 886. Plate 890 is secured to the steel block 886 with a predetermined amount of clamping force providing a frictional force to resist movement of the strap 872 through clamp device 884. A sufficient amount of slack is arranged in the strap 872 enabling the strap 872 to be wrapped around the blade 874 as necessary to generate a sound engagement between the strap 872 and the blade teeth.

As with safety mechanisms 14jj and 14jj', an adequate amount of strap 872 is wound around drum 876 and 914 to provide enough stopping travel. Furthermore, subsequent to a stopping event, strap 872 is preferably replaced by an unused strap and recoiled through the respective stopping mechanisms 14jj, 14jj'.

Swing Blade Away from Contact

Referencing now FIGS. 64a-64j, safety mechanisms 14kk-14ll' are described incorporating apparatus sufficient to displace a rotating saw blade and support arm about a pivot point on the saw structure. The resulting motion causes the saw blade to swing upwards and out of contact with the user. Although the exemplary descriptions are directed toward a miter saw, it will be appreciated that other power tools may be employed within the scope of this disclosure.

Figure 64A:
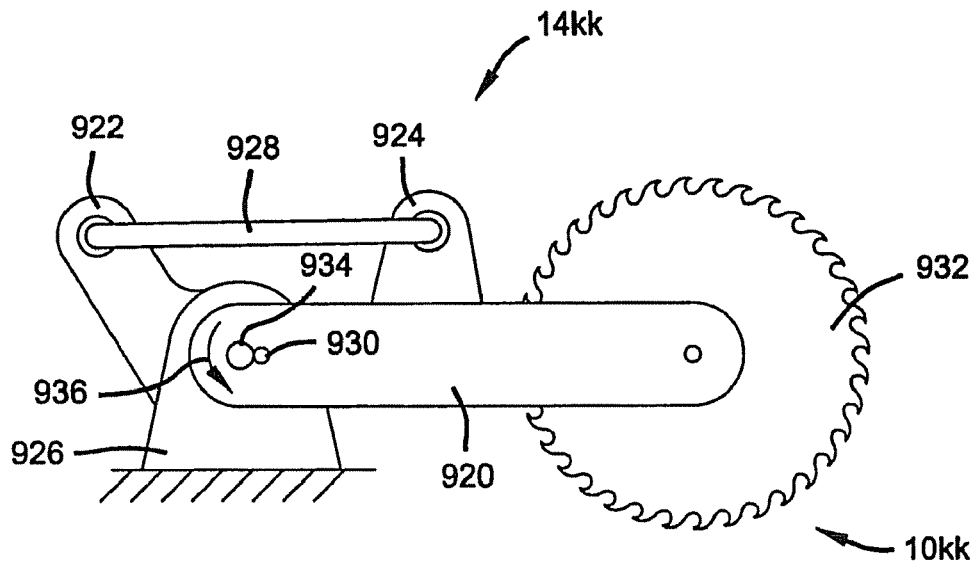
FIG. 64a is a side view of a safety mechanism according to a twenty-eighth embodiment of the present invention shown prior to activation.
Figure 64B:
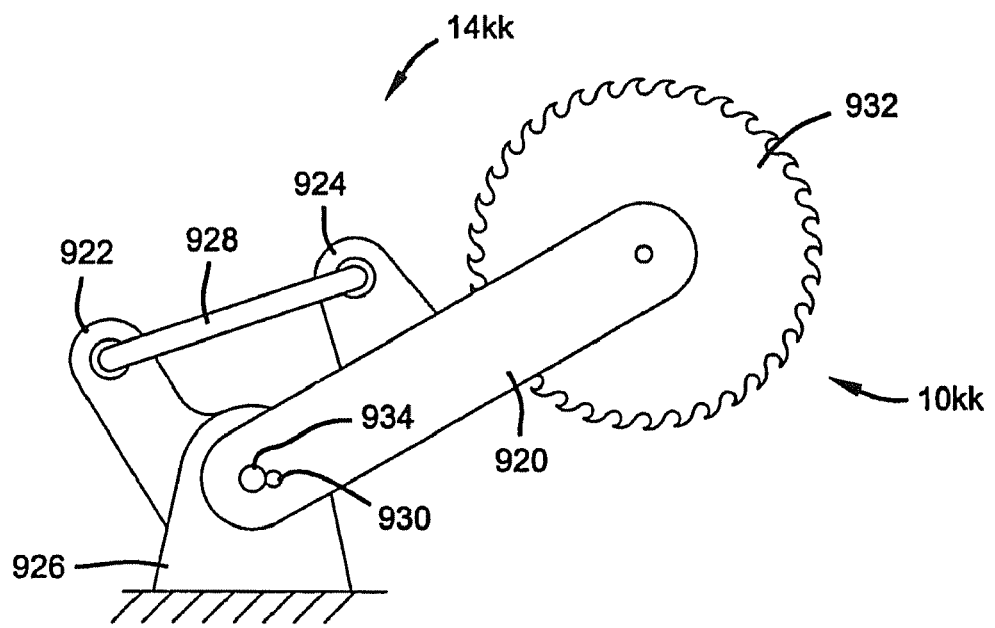
FIG. 64b is a side view of the safety mechanism of FIG. 64a shown after activation.

Safety mechanism 14kk as shown in FIGS. 64a and 64b includes swing arm 920 having fore and aft finger supports 922 and 924 respectively extending therefrom. Swing arm 920 is rotatably coupled at pivot gear 930 to frame 926 of miter saw 10kk. Support bar 928 connects finger supports 922 and 924. Saw blade 932 is coupled to a distal end of swing arm 920. Gear 934 is meshed for rotation with pivot gear 930 and cooperates therewith upon actuation of safety mechanism 14kk during a safety event.

The operation of safety mechanism 14kk will now be described in greater detail. If a dangerous condition is detected by for example one of the safety mechanisms 12 disclosed herein, gear 934 is activated in a counterclockwise direction (arrow 936). As a result, swing arm 920 swings upward and away from contact with the user from a position as diagrammatically depicted in FIG. 64a to a position as diagrammatically depicted in FIG. 64b. Gear 934 is preferably actuated with a motor (not specifically shown) with sufficient speed to rotate swing arm and thus saw blade 932 out of contact with the user in a minimal amount of time. It will also be appreciated that meshed gears 934 and 930 may also comprise other explosive, mechanical or electromechanical devices within the scope of this invention.

Figure 64C:
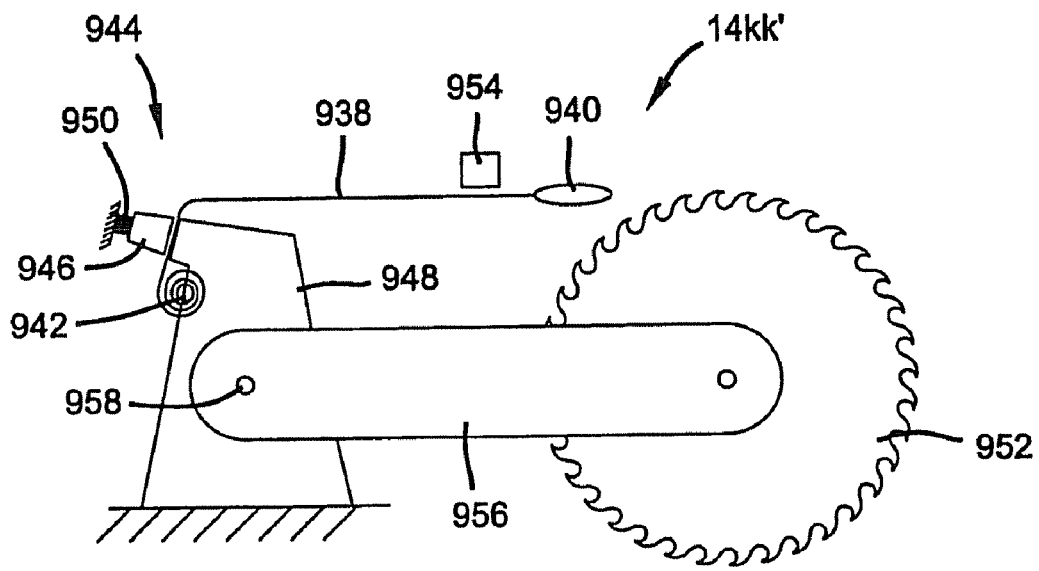
FIG. 64c is a side view of a safety mechanism according to a twenty-ninth embodiment of the present invention shown prior to activation.
Figure 64D:
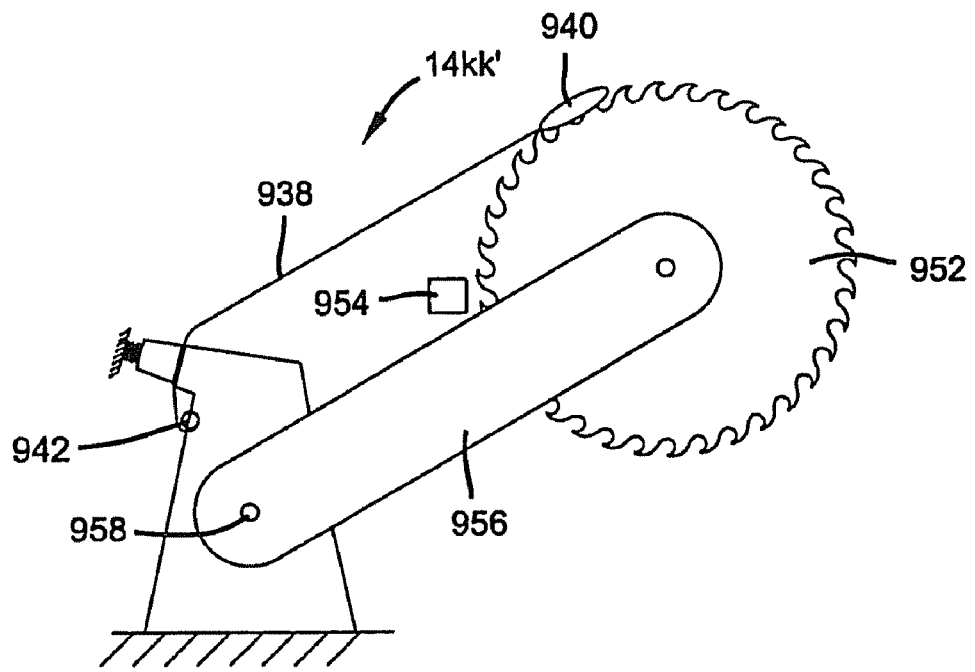
FIG. 64d is a side view of the safety mechanism of FIG. 64c shown after activation.

Turning now to FIGS. 64c and 64d, safety mechanism 14kk' incorporating cable 938 is shown. Cable 938 includes a first end having a loop 940 and an opposite end spooled around drum 942. An intermediate portion of cable 938 passes through friction device 944. Friction device 944 includes a friction block 946 biased against support arm 948 by biasing member 950.

If a dangerous condition is detected by for example one of the sensing mechanisms 12 disclosed herein, loop 940 of cable 938 is thrown toward rotating saw blade 952 by deployment module 954. In this way, loop 940 grasps the teeth of rotating saw blade 952 thereby uncoiling cable 938 from drum 942. Concurrently, friction device 944 slows the momentum of cable 938 allowing saw blade 952 to come to a complete stop. The angular momentum of rotating saw blade 952 causes arm 956 to rotate upward about pivot 958 from a position as shown in FIG. 64c to a position shown in FIG. 64d. It will be appreciated that an adequate amount of cable is stored around drum 942 to sufficiently uncoil during a stop event. Deployment module 954 may comprise any sufficient means to thrust loop 940 toward saw blade 952 such as but not limited to an explosive firing device.

Figure 64E:
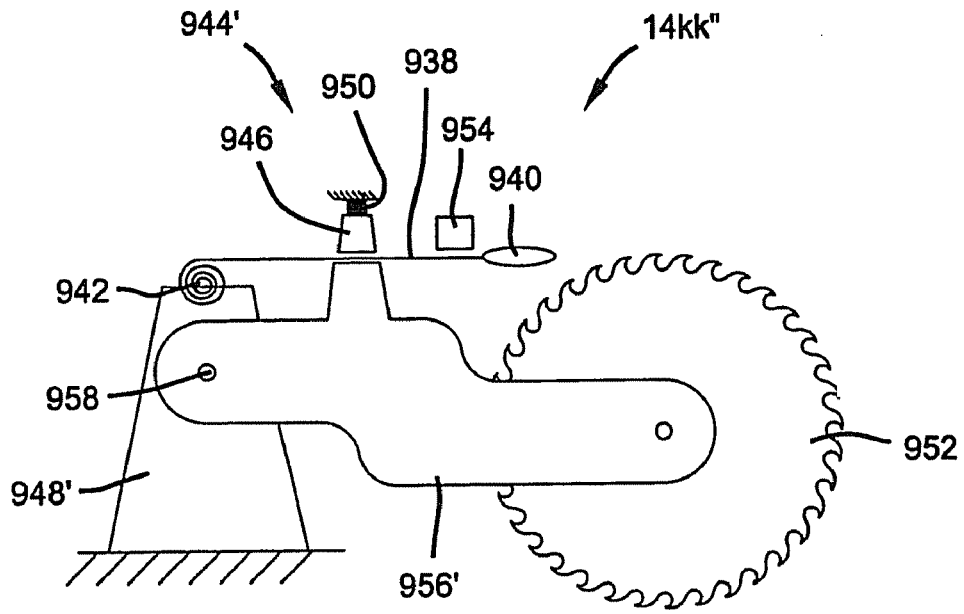
FIG. 64e is a side view of a safety mechanism according to a thirtieth embodiment of the present invention shown prior to activation.
Figure 64F:
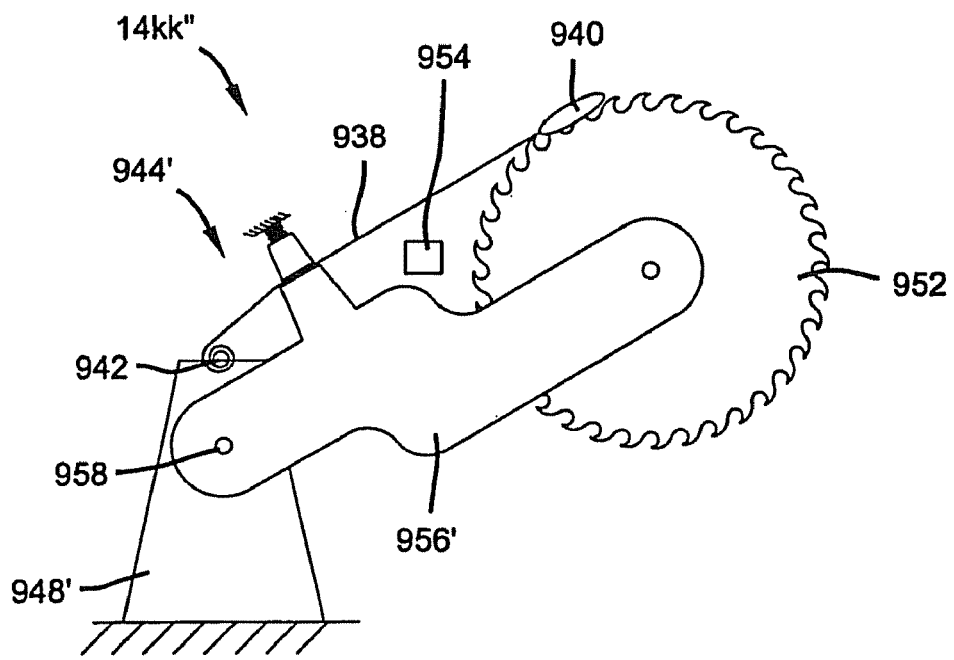
FIG. 64f is a side view of the safety mechanism of FIG. 64e shown after activation.

FIGS. 64e and 64f illustrate safety mechanism 14kk" having an alternative configuration from safety mechanism 14kk'. As such, like components will be referred to with like reference numerals. Friction device 944' is mounted for cooperation with arm 956'. Furthermore, drum 942 is mounted at an upper portion of support arm 948'.

The operation of safety mechanism 14kk" is substantially similar to safety mechanism 14kk'. The alternate placement of friction device 944 and drum 942 provides different braking and packaging advantages associated with a given miter saw configuration.

Figure 64G:
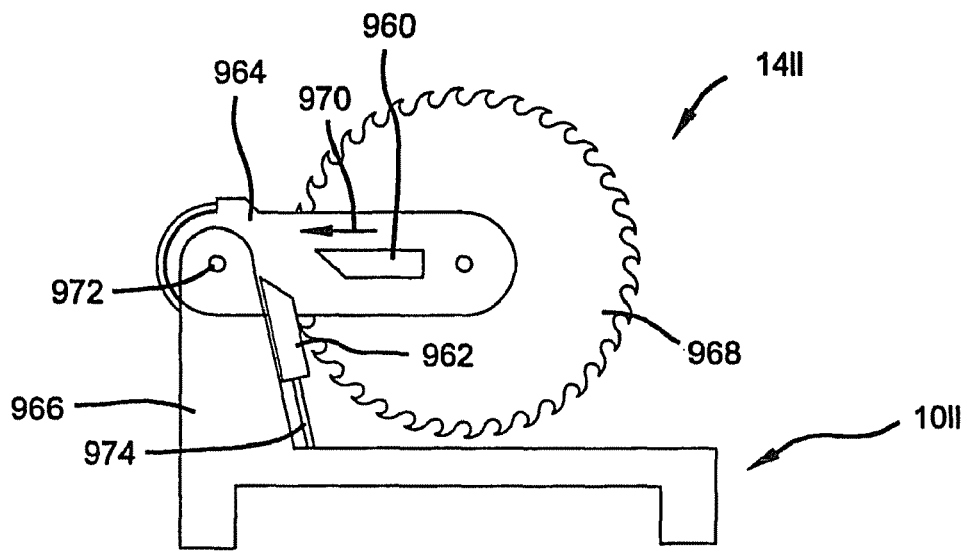
FIG. 64g is a side view of a safety mechanism according to a thirty-first embodiment of the present invention shown prior to activation.
Figure 64H:
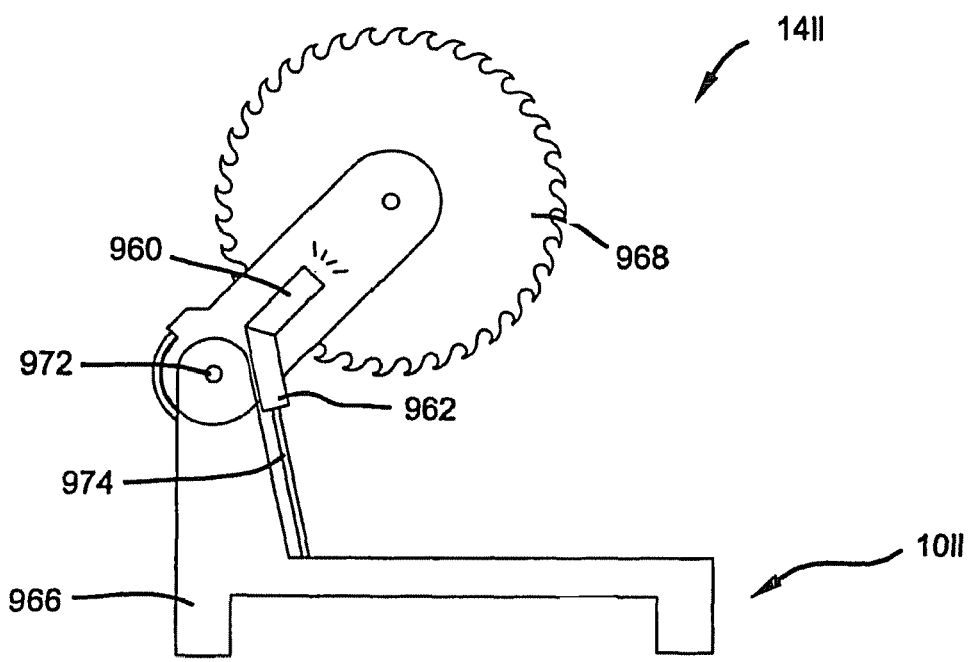
FIG. 64h is a side view of the safety mechanism of FIG. 64g shown after activation.

With reference to FIGS. 64g and 64h, safety mechanism 14ll will be described in cooperation with miter saw 10ll. Safety mechanism 14ll includes deployment wedge 960 and magneto-rheological fluid shock 962. Deployment wedge 960 is preferably slidably coupled to arm 964. Arm 964 is pivotally coupled to frame 966 at a first end and includes a saw blade 968 coupled at an opposite end.

If a dangerous condition is detected by for example one of the sensing mechanisms 12 disclosed herein, wedge 960 is deployed in a direction denoted by arrow 970 toward an upper portion of magneto-rheological shock 962. The force created from the impact of wedge 960 into shock 962 causes rod 974 to expel from shock 962 causing arm 964 and thus saw blade 968 to swing upwardly about pivot 972. Upon articulation of arm 964 about pivot 972, shock 962 expands from a position as diagrammatically shown in FIG. 64g to a position as diagrammatically shown in FIG. 64h. Once shock 962 has expanded to the position shown in FIG. 64h, a current is applied to the magneto-rheological fluid within shock 962 causing the shock to lock in an expanded position. As is well known, a magneto-rheological fluid damper utilizes a fluid which can have the viscosity altered through the application of a magnetic field. It will be appreciated that alternate configurations may be employed to maintain arm 964 in the position shown in FIG. 64h, for example, a master cylinder may be incorporated to fill a reservoir within shock 962 to lock the arm in a safe position. In addition, a biasing swing arm may be incorporated to encourage retention of cylinder 962 in an expanded position. In this way, a biasing swing arm may be employed between rod 974 and shock 962 to allow movement of rod 974 out of cylinder 962 in a first expanded position and resist movement of rod 974 back into shock 962.

Figure 64I:
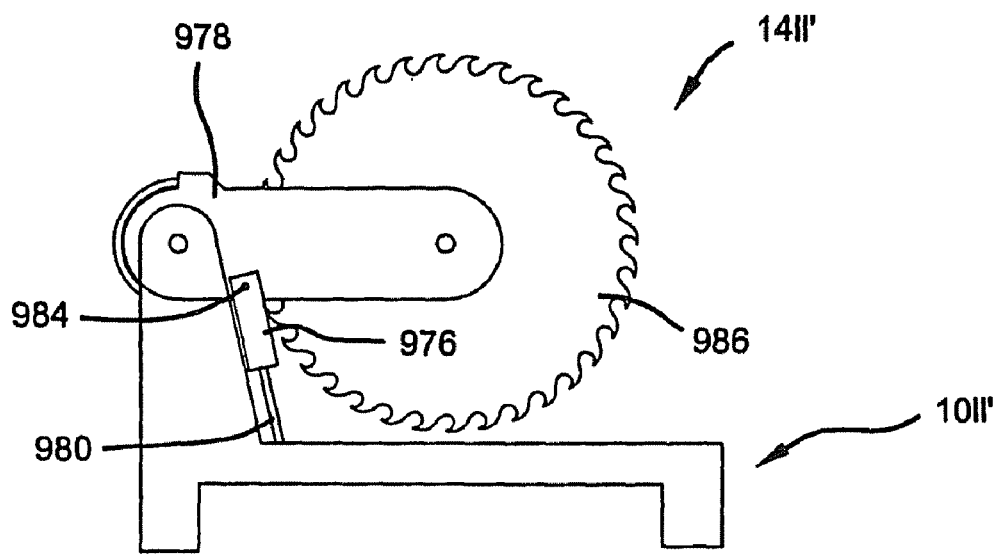
FIG. 64i is a side view of a safety mechanism according to a thirty-second embodiment of the present invention shown prior to activation.
Figure 64J:
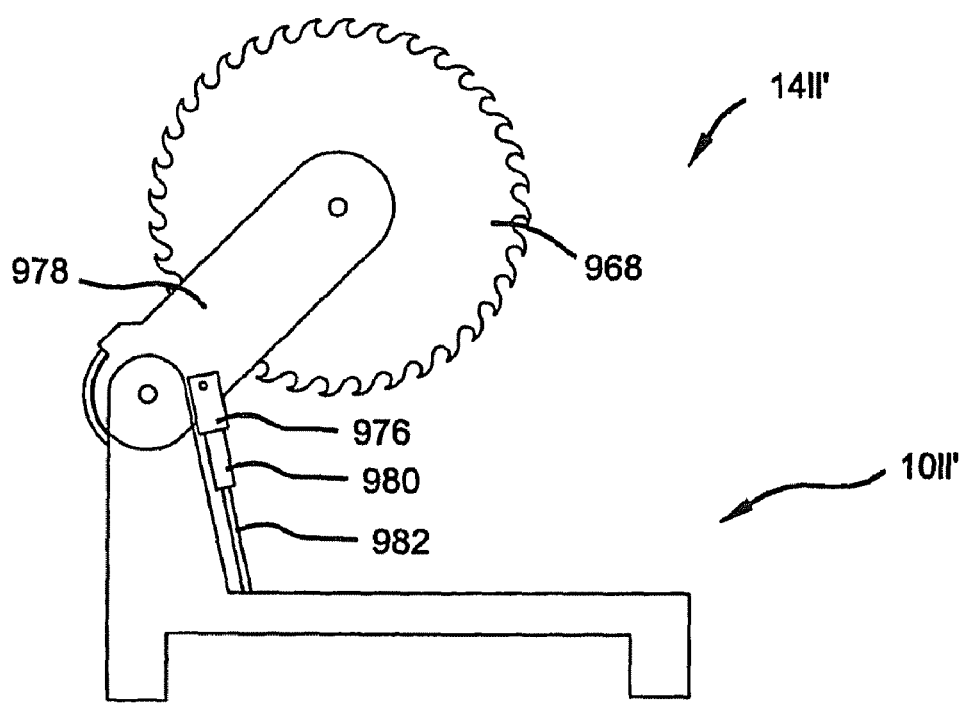
FIG. 64j is a side view of the safety mechanism of FIG. 64i shown after activation.

Safety mechanism 1411' incorporated into saw 1011' is depicted in FIGS. 64i and 64j and includes expansion shock 976. Expansion shock 976 includes first and second extension rods 980 and 982 selectively extending therefrom. Expansion shock 976 is pivotally coupled to arm 978 at pivot 984. During a safety event, rod 982 is expelled from rod 980 thereby rotating arm 978 and thus saw blade 986 up and away from contact with a user.

Rod 982 may be expelled by any sufficient means such as but not limited to an explosive propellant for example. It should be noted that although safety mechanism 14ll' is depicted as incorporating rod 980 and 982, an alternative amount of rods may be incorporated while reaching similar results. It is also appreciated that a magneto-rheological shock or a biased pivot arm as described in conjunction with safety mechanism 1411 may also be employed to maintain arm 978 in an upward orientation.

Projectile Stops

Figure 65A:
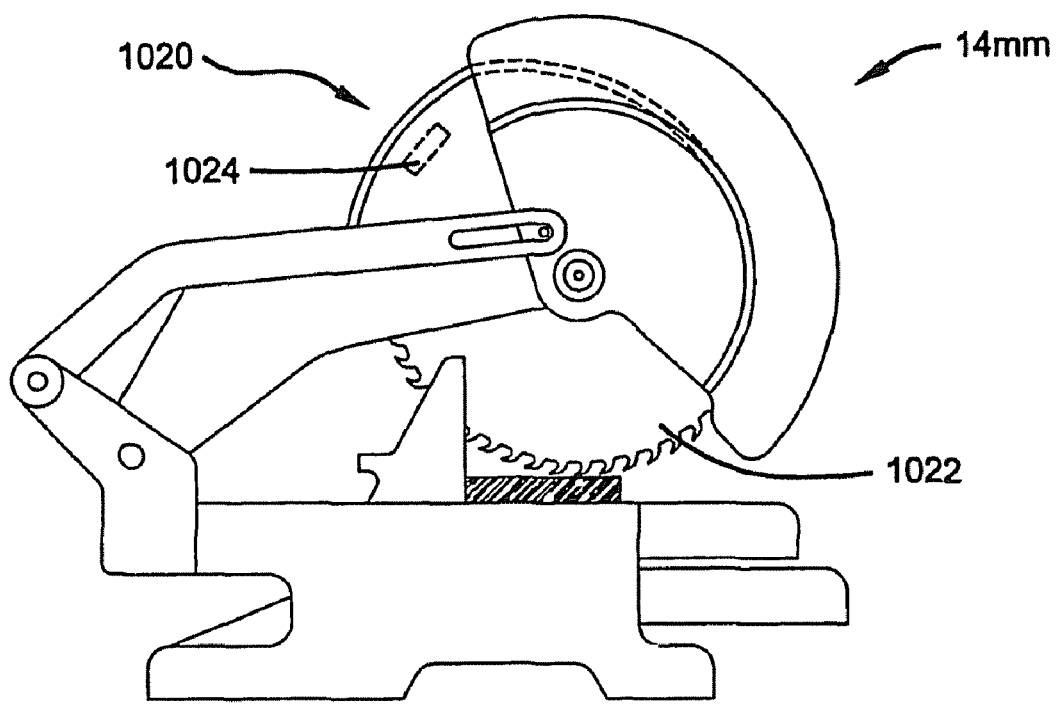
FIG. 65a is a view of a safety mechanism according to a thirty-third embodiment of the present invention.
Figure 65B:
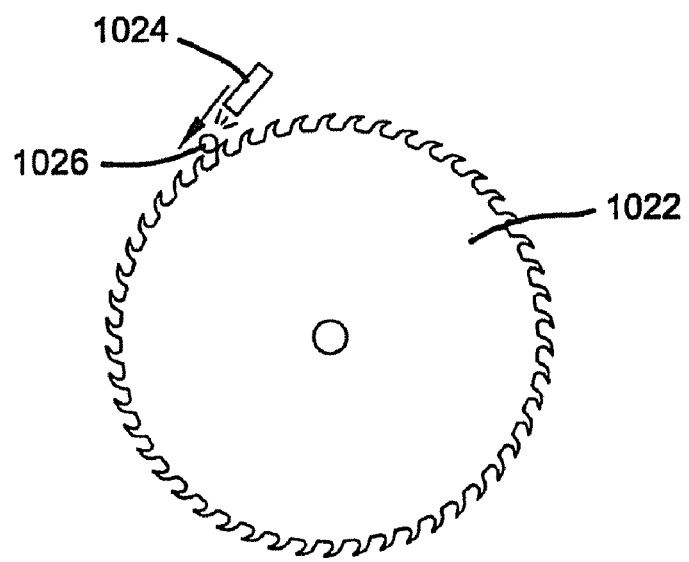
FIG. 65b is a view of the safety mechanism of FIG. 65a shown removed from the exemplary miter saw.

Turning now to FIGS. 65a and 65b, a safety mechanism 14 mm is shown. Safety mechanism 14 mm includes a projectile stop 1020, for selectively stopping a circular saw blade 1022 in a short period of time. In this case the angular momentum is transferred to an object that is not connected to the saw, and thus does not create any unwanted linear momentum leading to movement.

In general, projectile stop 1020 includes a firing device 1024 for expelling a projectile 1026. In operation, projectile 1026 is launched into the saw blade 1022 in an opposite direction of rotation of the saw blade 1022. When the projectile 1026 contacts the saw blade 1022, the kinetic energy and the rotational inertia of the blade 1022 are opposing and thus cancel each other. If the energy of the projectile 1026 matches the rotational inertia of the saw blade 1022, the blade 1022 will be completely stopped.

Firing device 1024 may comprise any deployment means sufficient to direct projectile 1026 toward blade 1022 with sufficient momentum. In this way, firing device may include an explosive device or a mechanical spring assembly for example. Projectile 1026 may comprise any suitable material having a mass sufficient to create adequate momentum upon a firing event to null the angular momentum of blade 1022.

The operation of projectile stop 1020 will now be described in greater detail. If a dangerous condition is detected by, for example, one of the sensing mechanisms 12 disclosed herein, firing device 1024 is activated. Projectile 1026 in turn is fired into the teeth of blade 1022 thereby countering the angular momentum of blade 1022 bringing the blade 1022 to a stop in a short period of time. Concurrently, power is cut from saw 10. An exhausted projectile stop 1020 must be replaced after a firing event with a new projectile stop.

Engage Blade not Teeth

Figure 66A:
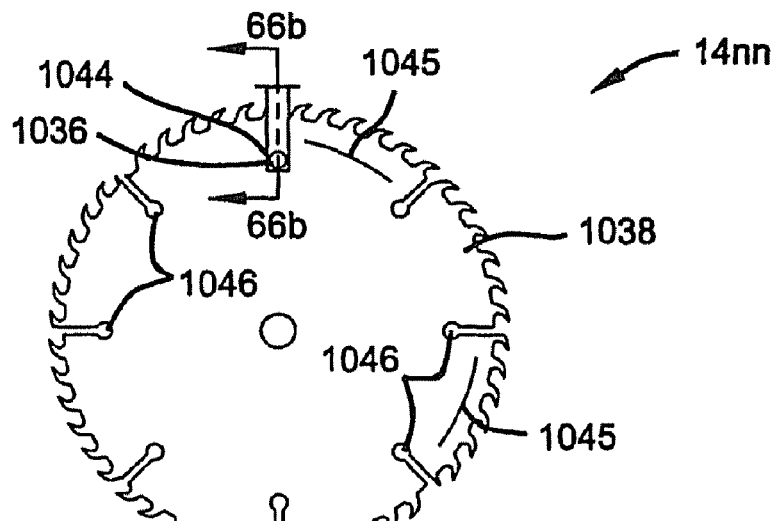
FIG. 66a is a view of a safety mechanism according to a thirty-fourth embodiment of the present invention.
Figure 66B:
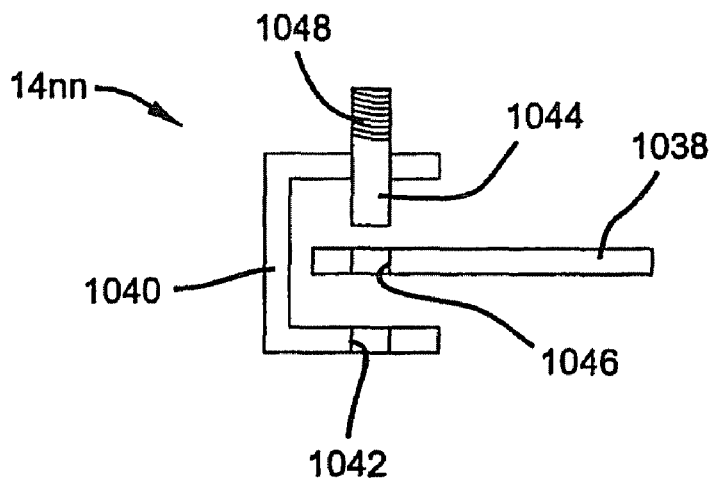
FIG. 66b is a sectional view of the safety mechanism of FIG. 66a taken about line 66b-66b of FIG. 66a shown prior to activation.
Figure 66C:
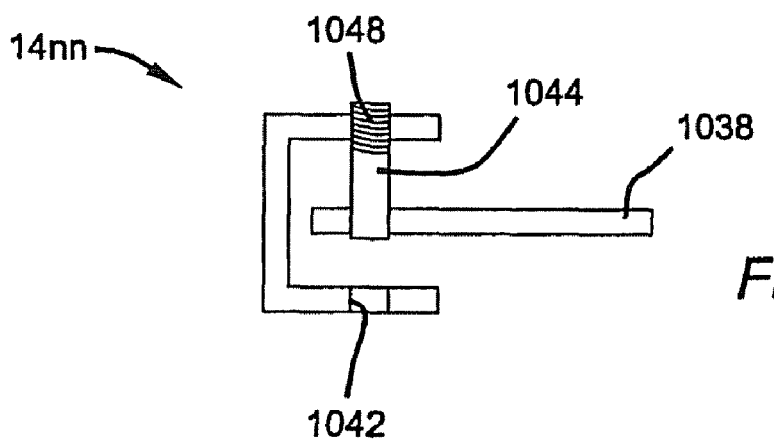
FIG. 66c is a sectional view of the safety mechanism of FIG. 66b shown after activation.

FIGS. 66a-66c show safety mechanism 14nn having a pin stop 1036, to stop a saw blade 1038 in a very short period of time. Safety mechanism 14nn is described with respect to a miter saw but it will be appreciated that safety mechanism 14nn may be employed with other saws and power tools. Pin stop 1036 is compressed of a channel 1040 that is disposed around the perimeter of the saw blade 1038 and connected to the frame (not shown) of the saw. Channel 1040 also includes a bore 1042 formed through both sides of the channel 1040 for operatively receiving pin stop 1036. If the operator or other system desires to stop the blade in a short period of time, a pin 1044 is driven into the bore 1042 and engages one of a plurality of holes 1046 along the edge of the saw blade 1038 to prevent further movement of the blade 1038. Explained further, pin 1044 engages blade 1038 along a outer path 1045 thereof. The blade 1038 continues to rotate until pin 1044 falls through an adjacent hole 1046. Once pin 1044 is thrust through a hole 1046 (FIG. 66c), blade 1038 immediately stops. Alternatively, if a blade not specifically having holes 1046 arranged around the perimeter of the blade, the pin 1044 may be driven into the teeth of the blade to stop further rotation of the blade 1038.

With specific reference to FIGS. 66b and 66c, the operation of safety mechanism 14nn will be described in greater detail. If a dangerous condition is detected by for example one of the safety mechanisms disclosed herein, pin 1044 is rapidly actuated toward saw blade 1038 consequently engaging one of the holes 1046 incorporated in saw blade 1038 thereby immediately stopping the rotation thereof. Pin 1044 may be deployed by any sufficient means such as but not limited to biasing member 1048.

Figure 67A:
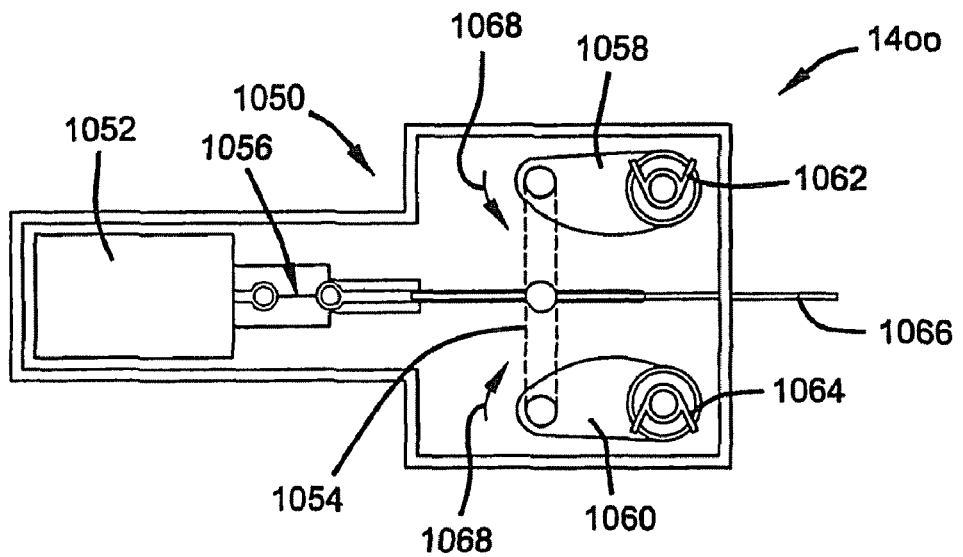
FIG. 67a is a top view of a safety mechanism according to a thirty-fifth embodiment of the present invention.
Figure 67B:
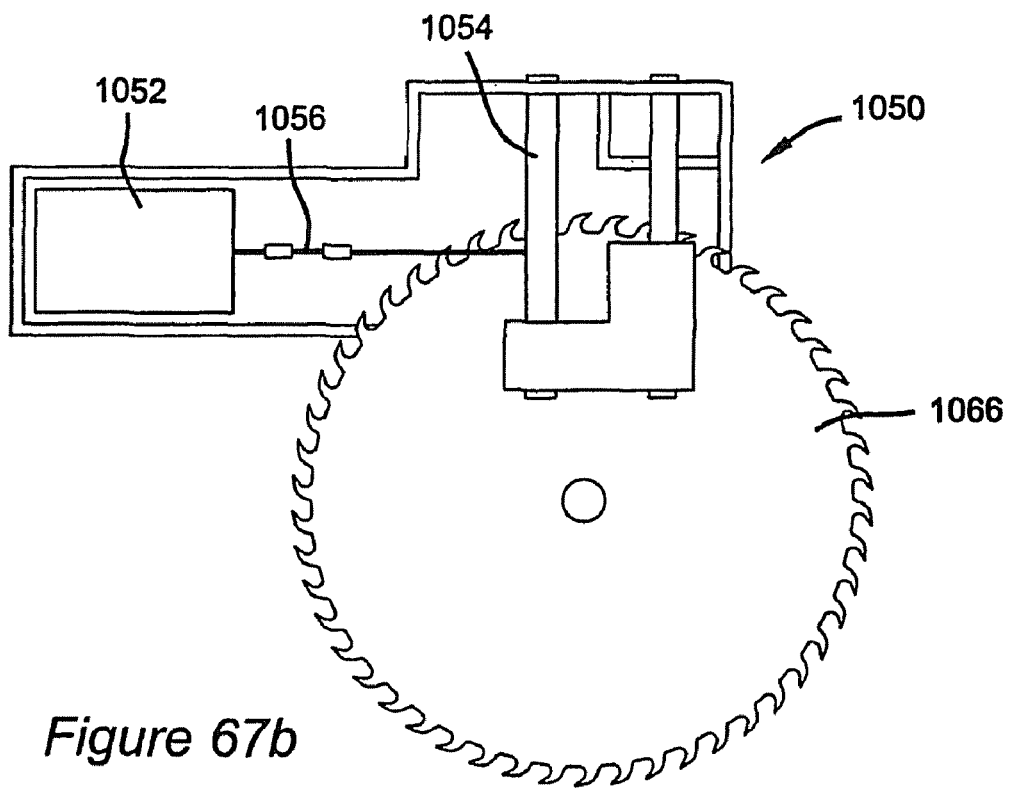

FIGS. 67a and 67b illustrate another safety mechanism 1400 having a cam stop 1050 to stop a saw blade 1066 in a very short period of time. Cam stop 1050 is generally composed of a electric module 1052, a fuse 1056 connected to a first end of the electric module 1052, a spacer 1054 connected to the other end of the fuse 1056, a first biased cam 1058 and second biased cam 1060 retained in a neutral position by the spacer 1054. In operation, the electric module 1052, upon signal from another device (such as a sensing mechanism 12 disclosed herein) releases a high current charge to fuse 1056. Once fuse 1056 is blown, spacer 1054 no longer restrains cams 1058 and 1060. Upon release from spacer 1054, cams 1058 and 1060 are rotated inward (in a direction depicted by arrows 1068) by torsional springs 1062 and 1064 to stop saw blade 1066.

Figure 68A:
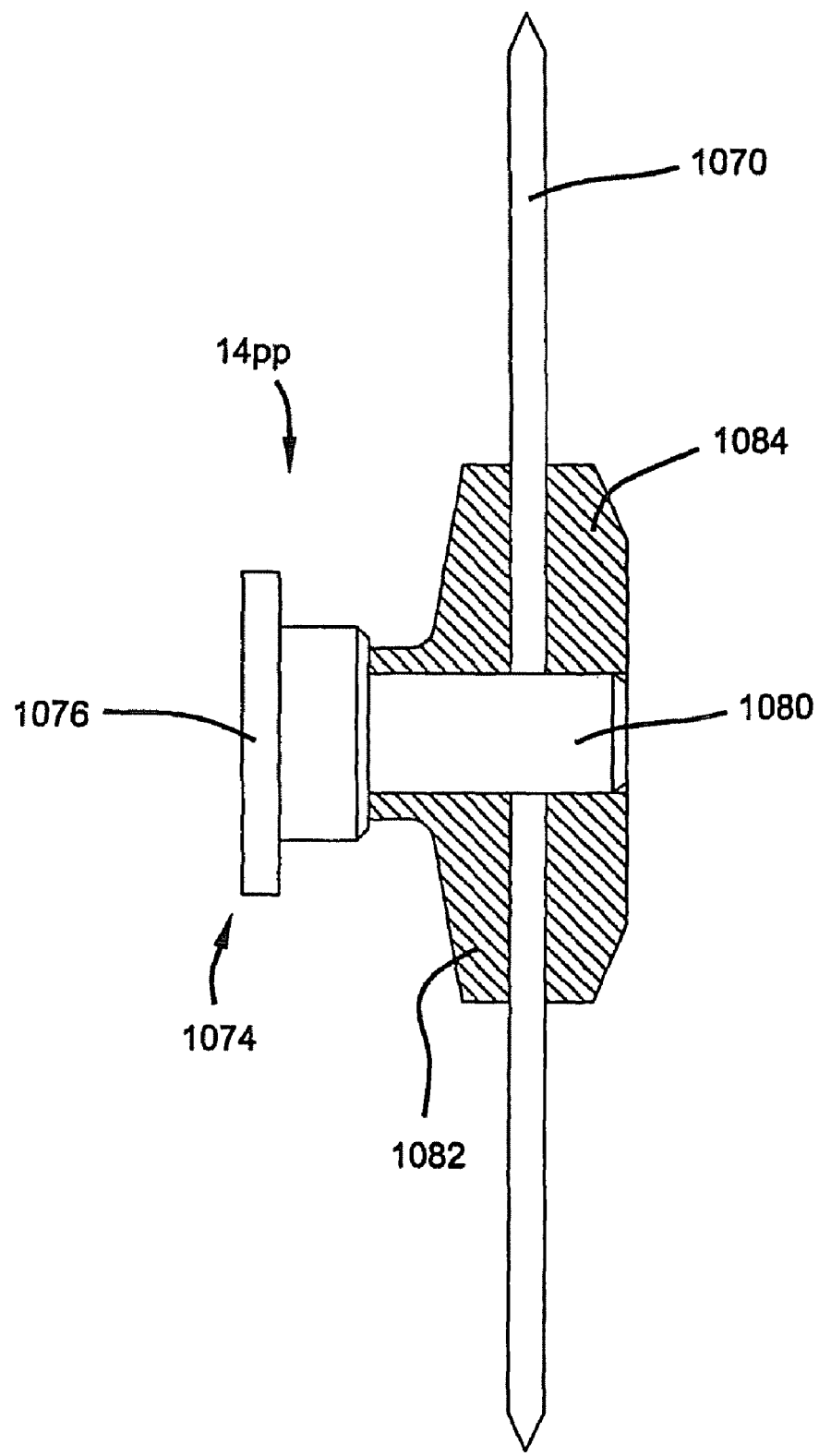
FIG. 68a is a side view of a safety mechanism according to a thirty-sixth embodiment of the present invention shown prior to activation.
Figure 68B:
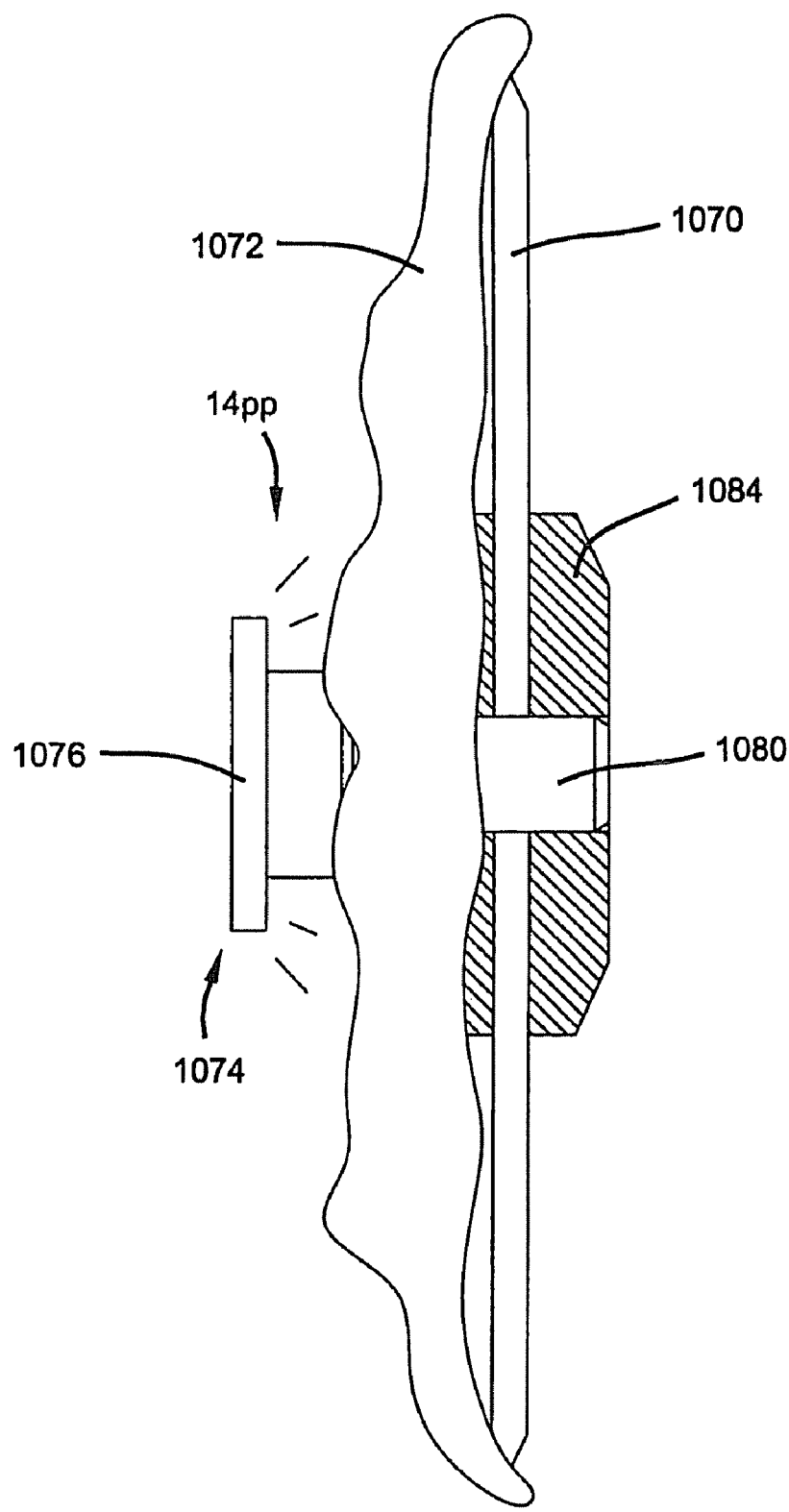
FIG. 68b is a side view of the safety mechanism of FIG. 68a shown after activation.

FIGS. 68a and 68b illustrate a safety mechanism 14pp including air bag device 1074 for rapidly moving the hand of the user away from the rotating blade 1070. Air bag 1074 is disposed proximate spindle 1080 and inner and outerblade clamps 1082, 1084. Air bag 1074 is compressed of a rapidly inflatable vessel 1072 that is positioned adjacent to the saw blade 1070 and an inflation device 1076 for rapidly inflating the inflatable vessel 1072.

Inflation device 1076 is preferably configured to inflate vessel 1072 with a fluid such as air. Inflation device 1076 may also be configured to inflate vessel 1072 with other fluids such as water, gel or the like without departing from the scope of the invention.

The operation of safety mechanism 14pp will now be described in greater detail. If a dangerous condition is detected by for example one of the sensing mechanisms 12 disclosed herein and it is desirable to move the hand of the user away from the saw blade, inflation device 1076 is operated. Inflation device 1076 rapidly inflates a vessel 1072 that expands outward from the tool (from a position diagrammatically depicted in FIG. 68a to a position diagrammatically depicted in FIG. 68b) to drive the hands of the user away from the blade 1070. In this way, vessel 1072 preferably expands to a distance greater than the length of blade 1070 to inhibit user interface with the teeth of blade 1070.

It will be appreciated that inflation device 1076 may alternatively be mounted in other areas adjacent to the saw blade 1070 such as for example to a portion of the frame. In this way, inflation device 1076 may be arranged to deploy vessel 1072 downward at the hand or extremity of the user to bat the same away from contact with the saw blade 1070.

Figure 69:
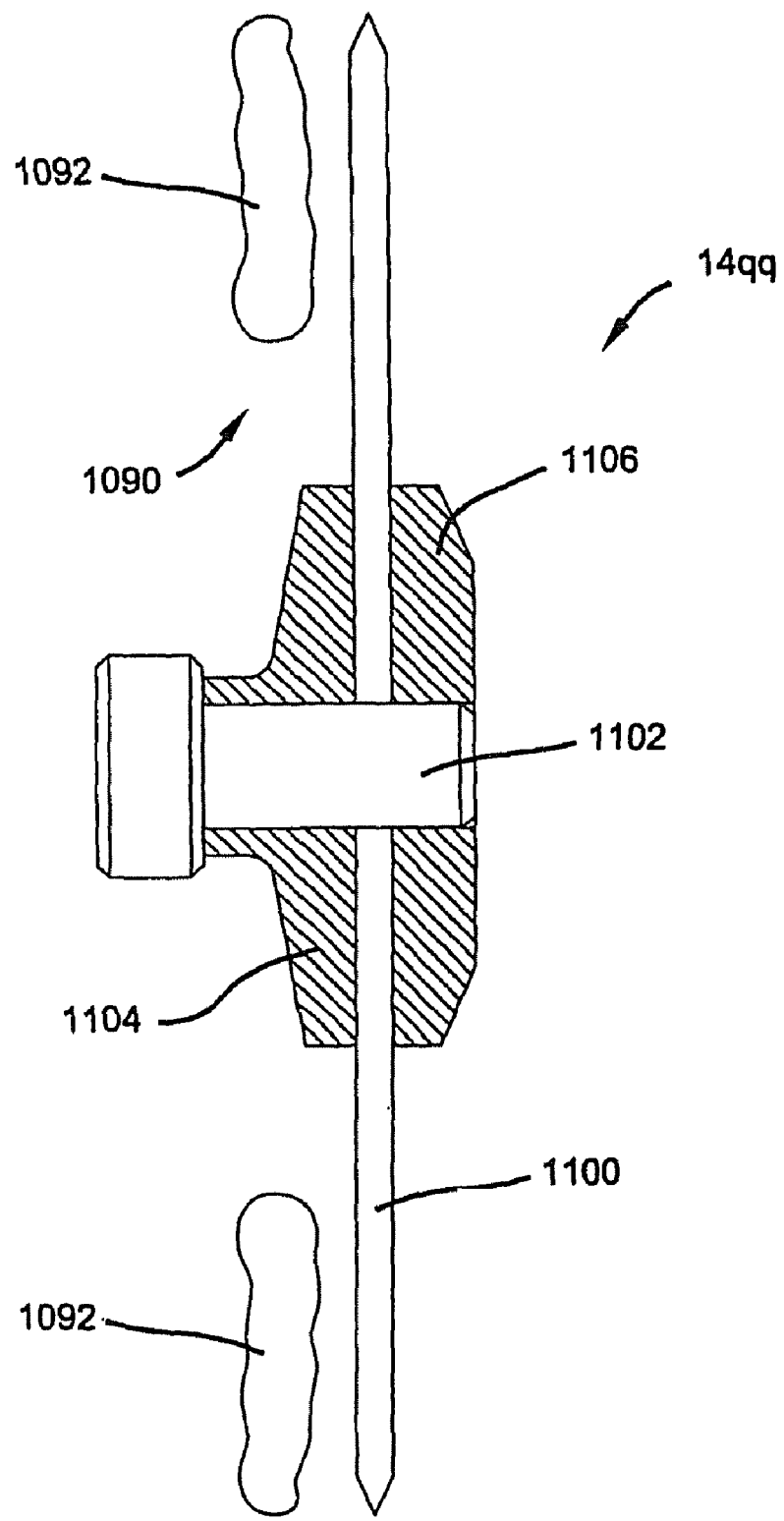
FIG. 69 is a side view of a safety mechanism according to a thirty-seventh embodiment of the present invention.

Referencing now FIG. 69, a safety mechanism 14qq including fluid bag 1090 is shown. Fluid bag 1090 is composed of at least one inflatable vessel 1092 positioned adjacent to saw blade 1100. Saw blade 1100 is shown disposed on arbor 1102 between inner and outer blade clamps 1104 and 1106. Fluid bag 1090 contains magneto-rheological fluid. Once the saw blade 1100 is desired to be stopped, a current is applied to the magneto-rheological fluid, the inflatable vessel 1092 inflates and contacts the saw blade 1100. Consequently, the friction generated between fluid bag 1090 and saw blade 1100 causes the saw blade to rapidly slow to a complete stop.

Not Engaging Blade

Figure 70:
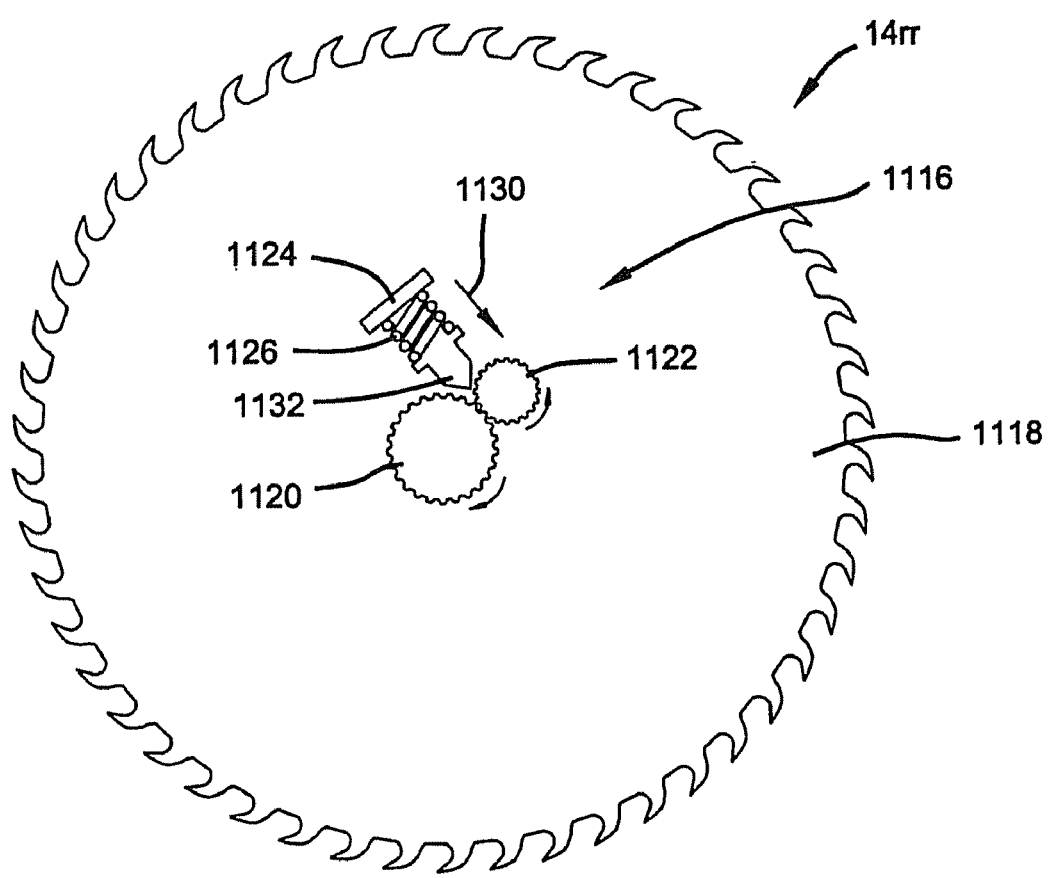
FIG. 70 is a side view of a safety mechanism according to a thirty-eighth embodiment of the present invention.

FIG. 70 shows a safety mechanism 14rr. Safety mechanism 14rr includes a jam stop 1116, to stop a saw blade 1118 in a very short period of time. Jam stop 1116 is composed of a first gear 1120 mounted to the rotating arbor (not specifically shown) and a second gear 1122 drivingly connected to the first gear 1120 and a wedge 1124. The first gear 1120 and second gear 1122, rotate in opposite directions to one another, due to the meshing of the gears.

If a dangerous condition is detected by, for example one of the safety mechanisms 12 disclosed herein, biasing member 1126 drives wedge 1124 in a direction depicted by arrow 1130 between the intermeshing gear teeth of the first gear 1120 and the gear teeth of the second gear 1122. Wedge 1124 efficiently stops the rotation of saw blade 1118 by precluding subsequent rotation of first and second 1120 and 1122. Tip 1132 of wedge 1124 is comprised of a rigid material suitable to effectively dissipate the rotational energy and momentum of saw blade 1118.

It will be appreciated that jam stop 1116 may comprise alternative configurations within the scope of the present invention. For example, a hub may be mounted to gear 1120 or 1122. In this regard, wedge 1124 may be configured to engage a hub extending from gear 1120 or 1122. The hub may also include protrusions extending around a circumference thereof. In this configuration, wedge 1124 is preferably comprised of a pliable material such as plastic allowing for the protrusions of the hub to dig into wedge 1124 in a stop event. Explained further, in a stop event, wedge 1124 is actuated into the hub causing protrusions to dig into the wedge 1124 until the hub stops rotating. In this manner, the gear having the hub disposed thereon stops rotating consequently stopping rotation of blade 1118.

Brake-Away Features for Braking Configurations

According to many of the safety mechanisms 14 employed herein, the safety mechanisms 14 are configured to rapidly stop a saw blade from rotating. In this manner, abruptly stopping a saw blade from rotating may cause damage to the motor of the saw 10 or other internal gearing such as the spindle for example. The following drive system protection mechanisms 16 are employed to limit the force a saw blade motor and related drive system must endure during a rapid stopping event. In general, the protection mechanisms 16 may be used concurrently with any sensing mechanism 12 or safety mechanism 14 disclosed herein. Protection mechanisms 16 include break away features which allow the saw blade to stop rapidly (upon actuation of a safety mechanism for example), while allowing the drive system to continue rotating.

Figure 71:
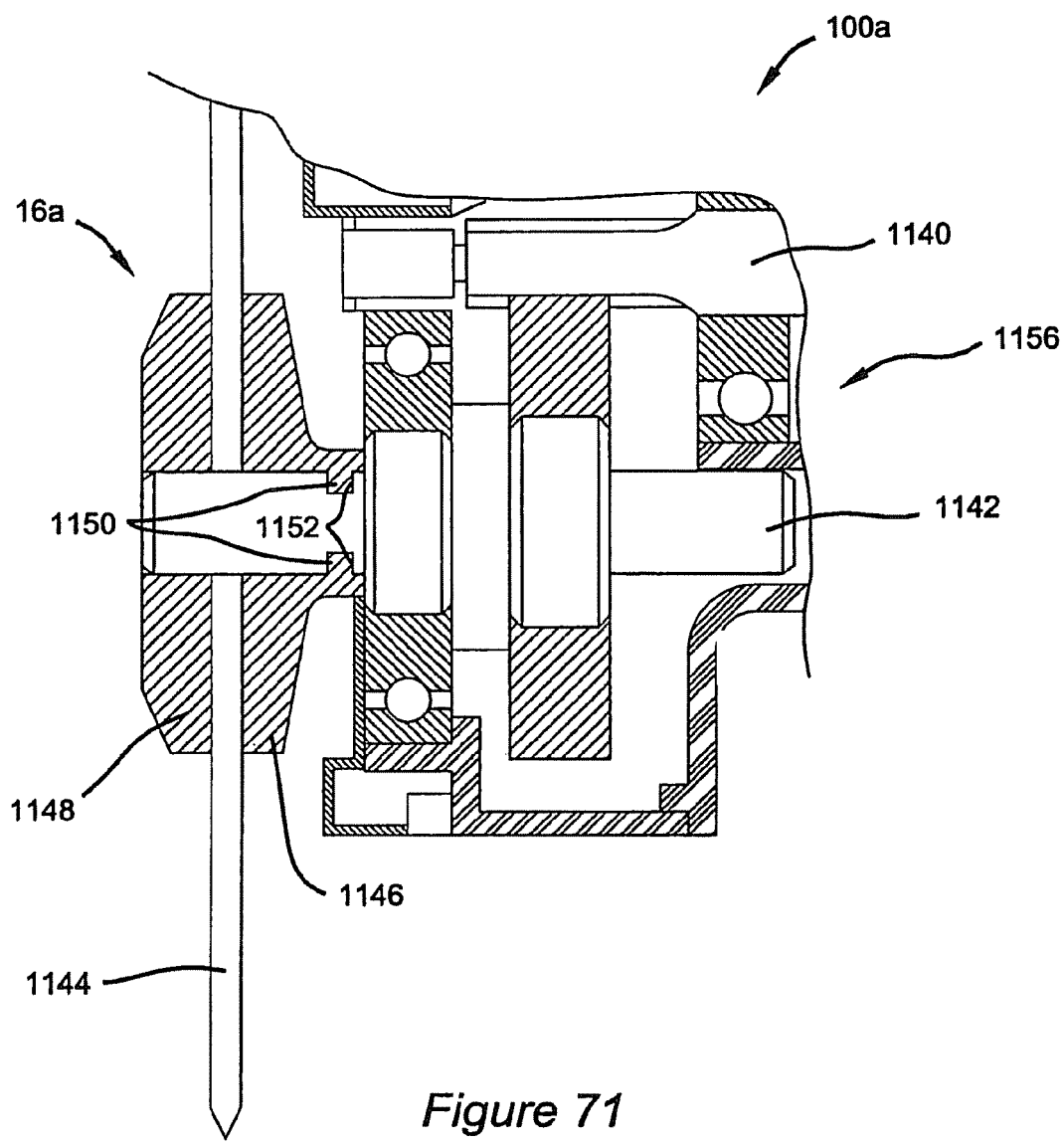
FIG. 71 is a sectional view of a protection mechanism according to a first embodiment of the present invention.

Referencing FIG. 71, a protection mechanism 16a is shown operatively associated with a miter saw 100a. Again, while protection mechanism 16a is shown associated with a miter saw, it will be appreciated that protection mechanism 16a may be employed with other power tools within the scope of this invention. Drive system 1156 of miter saw 10a includes a motor 1140 operatively coupled for rotation with a blade arbor shaft 1142. Blade 1144 is fixed for rotation between inner and outer blade clamps 1146 and 1148 respectively. Inner blade clamp 1146 includes a key 1150 extending into complimentary bores 1152 within spindle 1142. In this way, blade clamps 1146 and 1148, in turn, couple blade 1144 for rotation with spindle 1142.

During a stopping event, such as by implementation of one of the safety mechanisms 14 disclosed herein, blade 1144 is rapidly stopped. Concurrently, key 1150 shears from inner blade clamp 1146 thereby allowing the drive system 1156 including spindle 1142 and motor 1140 to continue rotating. As a secondary measure, the power may be cut to the saw 100a after a stopping event allowing the drive system 1156 to slowly spin to a complete stop. Nonetheless, in either scenario, inner and outer blade clamp 1146, 1148 together with blade 1144 remain stopped as drive system 1156 continues to operate or slowly comes to a stop.

After a stop event, the existing inner blade clamp 1146 is discarded and a new inner blade clamp having an integral key 1150 is employed. Key 1150 is preferably made of a material, such as but not limited to aluminum for example, having sufficient rigidity to maintain the blade clamp in a coupled relationship with the spindle 1142 during operation while also having characteristics allowing the key 1150 to be sheared from the blade clamp 1146 during a stopping event. It is appreciated that key 1150 may also include other details allowing for a selectively fixed relationship between the blade clamp 1146 and spindle 1142. In addition, it will be appreciated that outer blade clamp 1148 may alternatively be keyed to spindle 1142 yielding similar results. Moreover, while protection system 16 is described as cooperating with a safety mechanism 14 that negotiates the saw blade 1144 to stop the same, protection system 16 may also be employed to a safety system 14 which is alternatively configured to manipulate the saw clamp.

Figure 72:
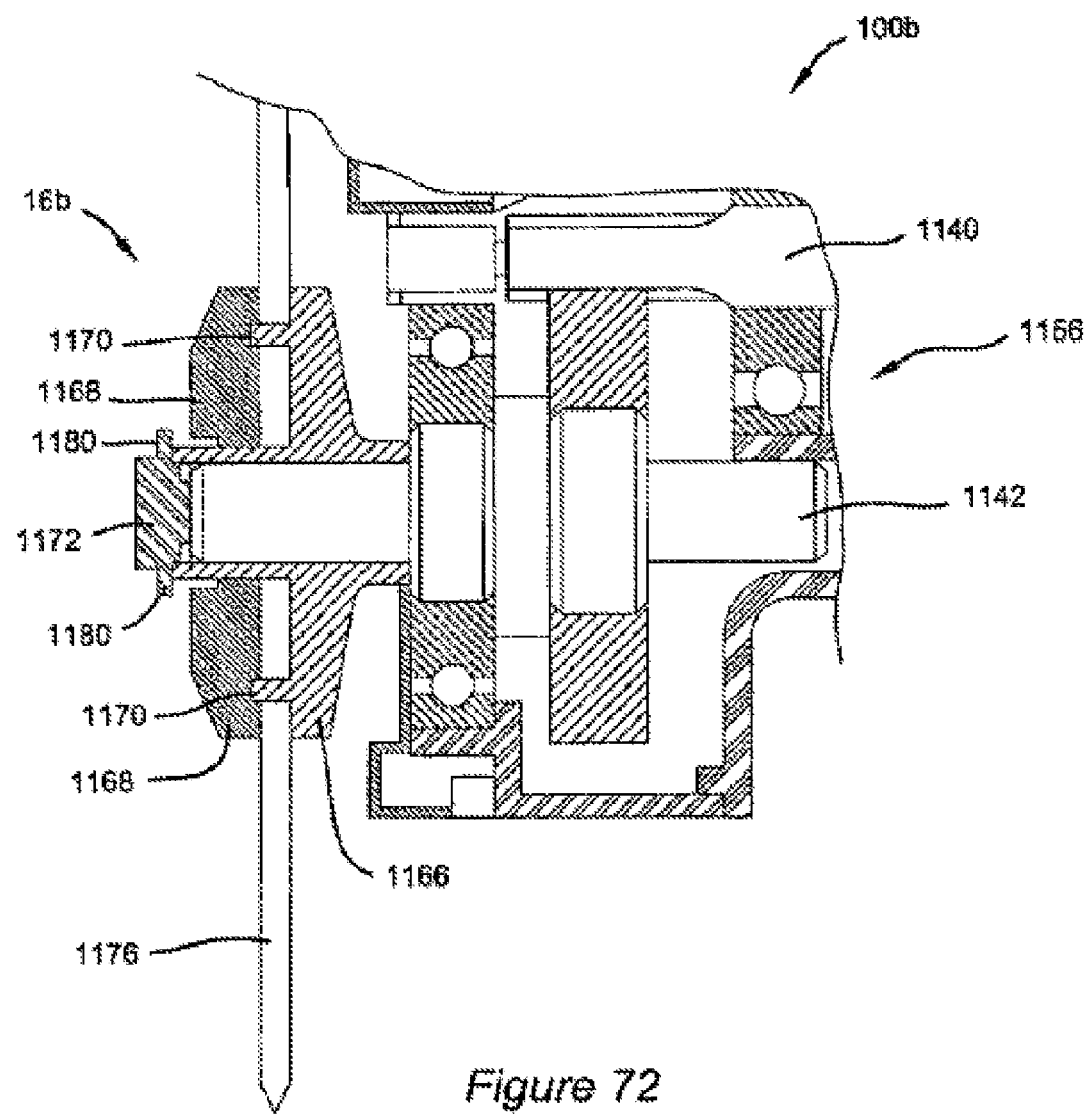
FIG. 72 is a sectional view of a protection mechanism according to a second embodiment of the present invention.

Turning now to FIG. 72, an alternative protection mechanism 16b is shown incorporated with power tool 100b. Like reference numerals will be used to designate like components of protection mechanism 16a. Inner blade clamp 1166 is keyed to outer blade clamp 1168 by feature 1170. Feature 1170 may include threaded fasteners such as screws or alternatively pins. In this way, feature 1170 is configured to shear upon a stopping event such that inner and outer blade clamp 1166, 1168 may rotate or stop independently of each other. Feature 1170 may alternatively be an adhesive bond capable of separating inner and outer blade clamp 1166, 1168 upon a stopping event. A blade bolt 1172 clamps inner blade clamp 1166 to the spindle 1142.

During a stopping event, blade 1176 is rapidly stopped by for example one of the safety mechanisms 14 disclosed herein. Rapid stopping of blade 1176 causes feature 1170 to shear thereby uncoupling the inner blade clamp 1166 from the blade 1176 and outer blade clamp 1168. In this regard, drive assembly 1156 including spindle 1142 and motor 1140 are free to continue rotation while blade 1176 is stopped minimizing injury to the operator and the power tool 100b. Lip 1180 extends from blade bolt 1172 outwardly beyond the inner diameter of outer blade clamp 1168. During a stop event, outer blade clamp 1168 and blade 1176 may have a tendency to travel toward blade bolt 1172. Lip 1180 retains outer blade clamp 1168 between blade bolt 1172 and inner blade clamp 1166 precluding the outer blade clamp 1168 and blade 1176 from falling off the spindle 1142.

In an additional embodiment, biasing members may be employed between inner blade clamp 1166 and blade 1176 for further urging blade 1176 and outer blade clamp 1168 away from inner blade clamp 1166.

Miscellaneous Braking

Figure 73:
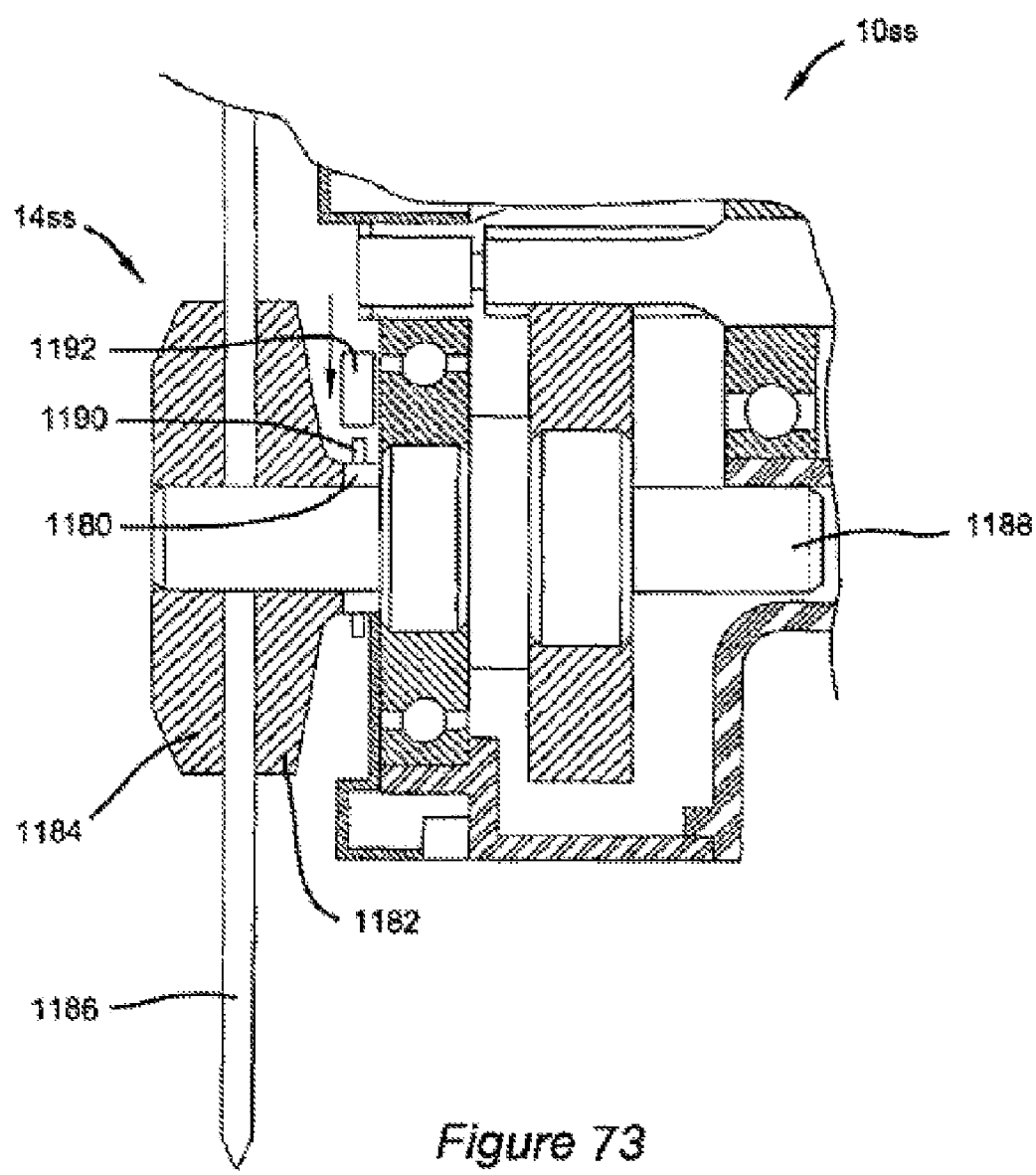
FIG. 73 is a sectional view of a protection mechanism according to a third embodiment of the present invention.

Referencing FIG. 73 safety mechanism 14*ss* having a secondary hub 1180 is shown operatively associated with miter saw 10*ss*. Secondary hub 1180 is coupled for rotation with spindle 1188 and is disposed adjacent inner blade clamp 1182. Blade 1186 is mounted for rotation between inner and outer blade clamp 1182 and 1184. Protrusions 1190 extend radially from secondary hub 1180. As will be described in greater detail, stopping device 1192 is disposed adjacent hub 1180 and is arranged to linearly engage protrusions 1190 of hub 1180 during a stopping event.

If a dangerous condition is detected by for example one of the sensing mechanisms 12 disclosed herein, stopping device 1192 is actuated into protrusions 1190 extending from hub 1180. Stopping device 1192 may be actuated by a firing device or a mechanical actuator for example. Further, stopping device 1192 is preferably comprised of a pliable material such as plastic sufficient to dig into protrusions 1190 during a stopping event. Hub 1180 and stopper 1192 must be replaced after a stopping event.

It will be appreciated that stopper 1192 may alternatively be configured to engage inner blade clamp 1182 directly. In this way, inner blade clamp 1182 may have a friction surface disposed on an outer circumference thereof for stopper 1192 to engage. Additionally, safety mechanism 14*ss* may also include a friction or keyed mating surface between the inner blade clamp 1182 and blade 1186 to further encourage blade 1186 to stop with inner blade clamp 1182 during a stop event.

Miscellaneous Stop

Figure 74A:
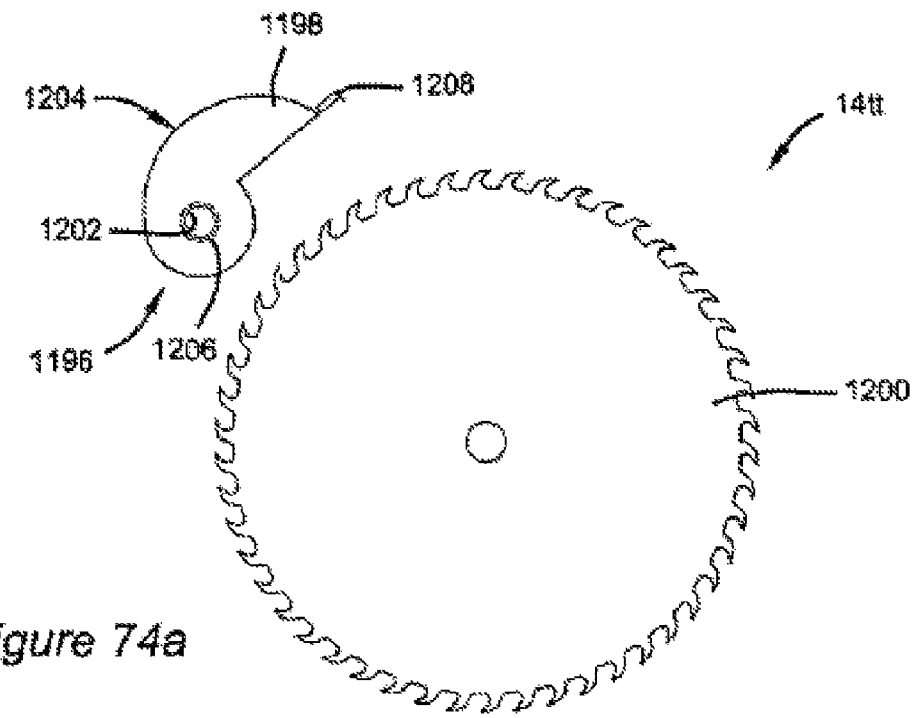
FIG. 74a is a side view of a safety mechanism according to a thirty-ninth embodiment of the present invention shown prior to activation.
Figure 74B:
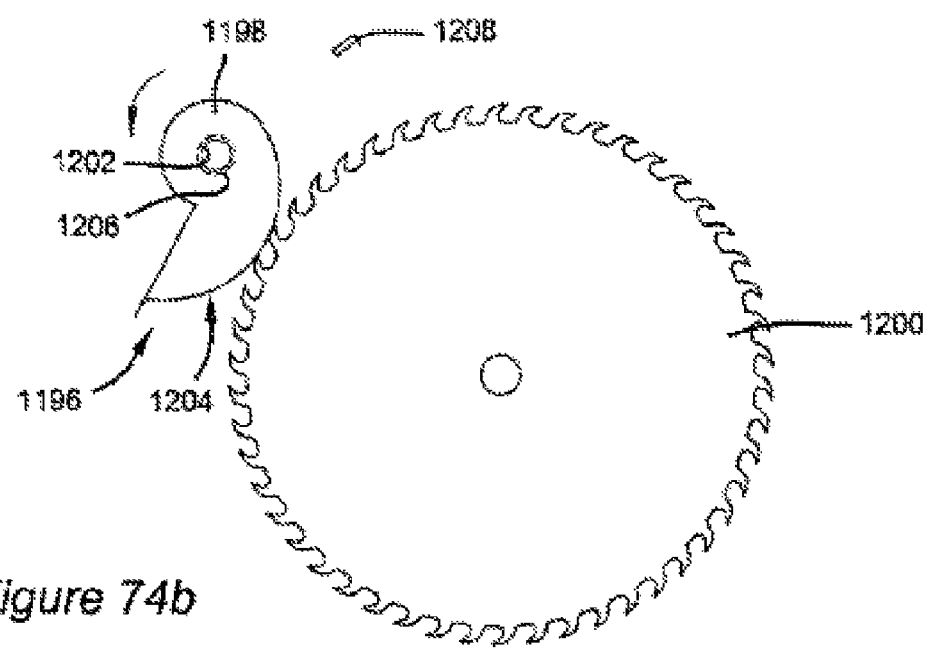
FIG. 74b is a side view of the safety mechanism of FIG. 74a shown after activation.

Turning now to FIGS. 74*a* and 74*b*, a safety mechanism 14*tt* employing nautilus stop 1196 is shown. Nautilus stop 1196 includes an involute spline shaped cam member 1198 disposed adjacent a saw blade 1200. A biasing member 1206 biases cam 1198 into the position diagrammatically depicted in FIG. 74*b*. In this regard, cam 1198 is retained or otherwise maintained in the position shown in FIG. 74*a* by a latch 1208 during normal operation of the tool. During a stop event, as will be described in greater detail, cam 1198 rotates about axis 1202 in a counterclockwise direction from the position as diagrammatically depicted in FIG. 74*a* to the position diagrammatically depicted in FIG. 74*b*. Cam 1198 is made of a strong material sufficient to absorb the rotational energy from blade 1200. Similarly, the material of cam 1198 must be sufficiently rigid to bring blade 1200 to a complete stop. Surface 1204 of cam 1198 is shown having a smooth radial contour, however, surface 1204 may alternatively have an irregular surface to encourage adequate gripping action between the cam 1198 and blade 1200.

The operation of safety mechanism 14*tt* will now be described. If a dangerous condition is detected by for example one of the sensing mechanisms 12 disclosed herein, latch 1208 releases cam 1198 from the position shown in FIG. 74*a*. As such, biasing member 1206 urges cam 1198 in a counterclockwise direction toward rotating saw blade 1200. Upon contact, the rotational energy of the blade 1200 (rotating in a clockwise direction) will encourage cam 1198 to further rotate counterclockwise progressively increasing engagement and deceleration of blade 1200. It will be understood that cam 1198 may comprise other geometries without departing from the scope of this invention. Additionally, it is appreciated that additional cams 1198 may be concurrently employed around the periphery of saw blade 1200.

Figure 75A:
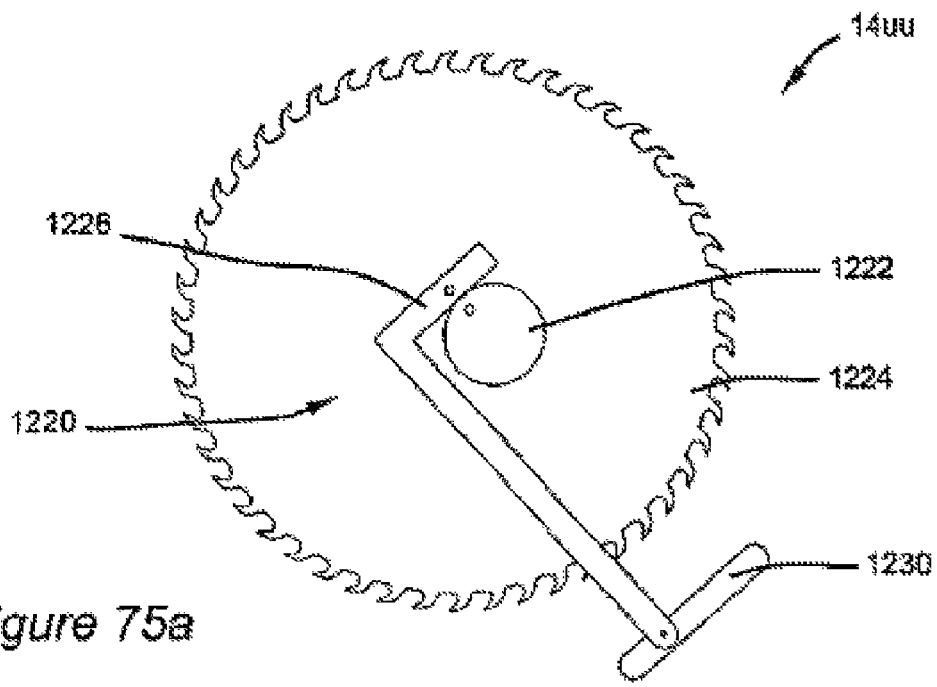
FIG. 75a is a side view of a safety mechanism according to a fortieth embodiment of the present invention shown prior to activation.
Figure 75B:
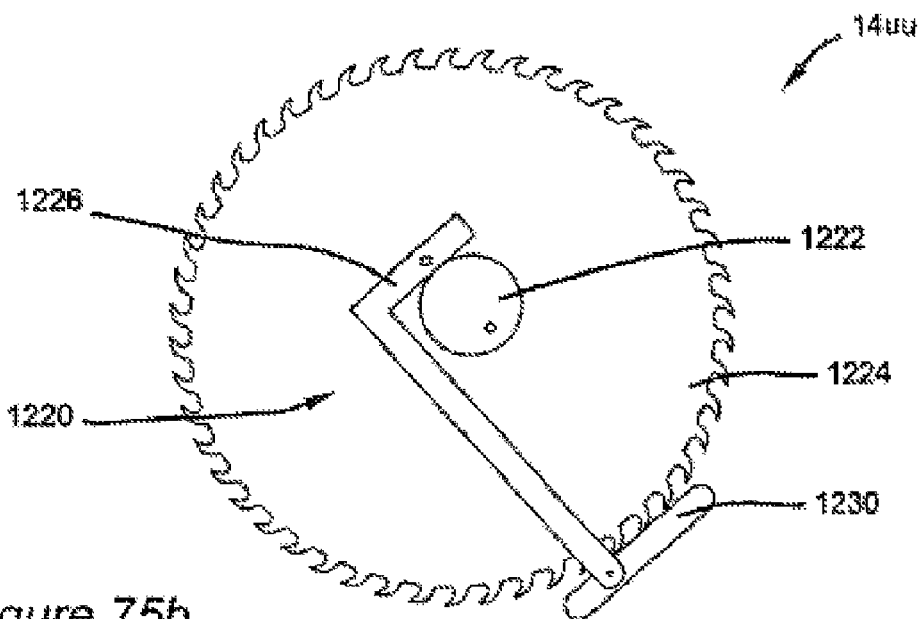
FIG. 75b is a side view of the safety mechanism of FIG. 75a shown after activation.

Turning now to FIGS. 75*a* and 75*b*, a safety mechanism 14*uu* including cam actuated brake 1220 is shown. An eccentric cam 1222 is fixed for rotation with blade 1224. Cam actuated brake 1220 includes a cam follower 1226 positioned adjacent the cam 1222 and near the smallest radius (as shown in FIG. 75*a*). Cam follower 1226 is disposed in an axially displaced position with respect to cam 1222 during normal operation of the tool. A brake arm 1230 is coupled to cam follower 1226 and extends in a direction generally tangential from blade 1224.

The operation of safety mechanism 14*uu* will now be described in greater detail. If a dangerous condition is detected by for example one of the sensing mechanisms 12 disclosed herein, cam follower 1226 is displaced axially toward blade 1224 whereby cam 1222 and cam follower 1226 are engaged. Axial displacement of cam follower 1226 may be achieved by any sufficient means such as a mechanical actuator or explosive firing event for example. Accordingly, clockwise rotation of cam 1222 will urge cam follower from a position diagrammatically depicted in FIG. 75*a* to a position diagrammatically depicted in FIG. 75*b*. As shown, brake arm 1230 is displaced into saw blade 1224 causing the teeth of saw blade 1224 to dig into arm 1230 until blade 1224 comes to an immediate stop.

It will be appreciated that cam 1222, cam follower 1226 and brake 1230 may comprise alternate geometries without departing from the scope of the present invention. Furthermore, cam follower 1226 and brake 1230 may alternatively be configured to engage another rotating element of the saw such as the arbor shaft or blade clamp for example.

Figure 76A:
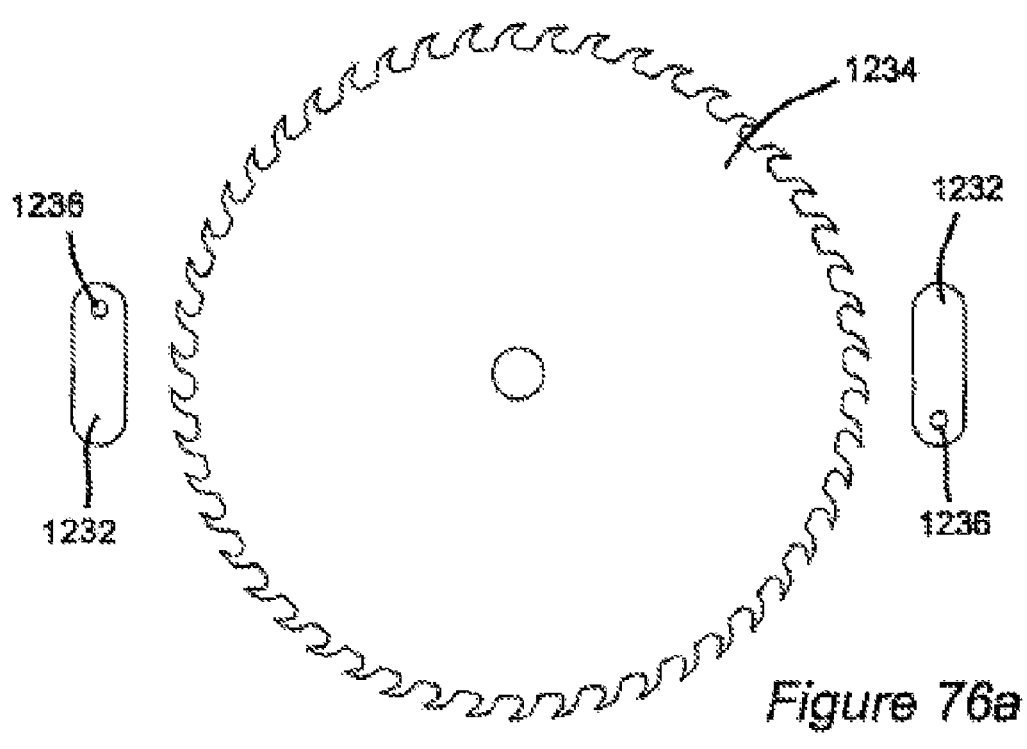
FIG. 76a is a side view of a safety mechanism according to a forty-first embodiment of the present invention shown prior to activation.
Figure 76B:
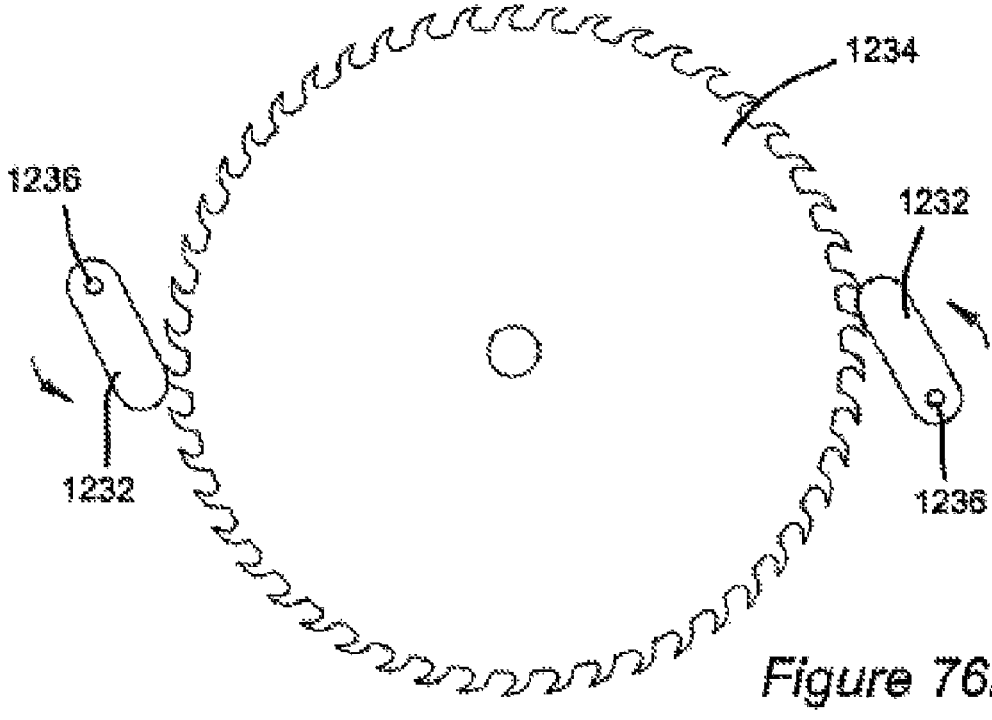
FIG. 76b is a side view of the safety mechanism of FIG. 76a shown after activation.

Referencing now FIGS. 76*a* and 76*b*, safety mechanism 14*vv* including brake pawls 1232 is shown. Brake pawls 1232 are disposed adjacent saw blade 1234 in a diametrically opposed relationship. Brake pawls 1232 are pivotally coupled to a portion of the saw (not specifically shown) at pivot joints 1236. During a stopping event pawls 1232 are pivotally displaced about pivot joints 1236 toward blade 1234.

The operation of safety mechanism 14*vv* will now be described in greater detail. If a dangerous condition is detected by for example one of the safety mechanisms 12 disclosed herein, brake pawls 1232 are thrust into blade 1234 from a position diagrammatically depicted in FIG. 76*a* to a position diagrammatically depicted in FIG. 76*b*. Preferably, pawls 1232 are rotated in a direction opposing rotation of blade 1234. In this way, pawls 1232 rotate counterclockwise into engagement with a clockwise rotating blade 1234. Brake pawls 1232 may be urged into engagement with blade 1234 by for example biasing members, mechanical actuators or explosive device for example.

Safety Blade

Figure 77A:
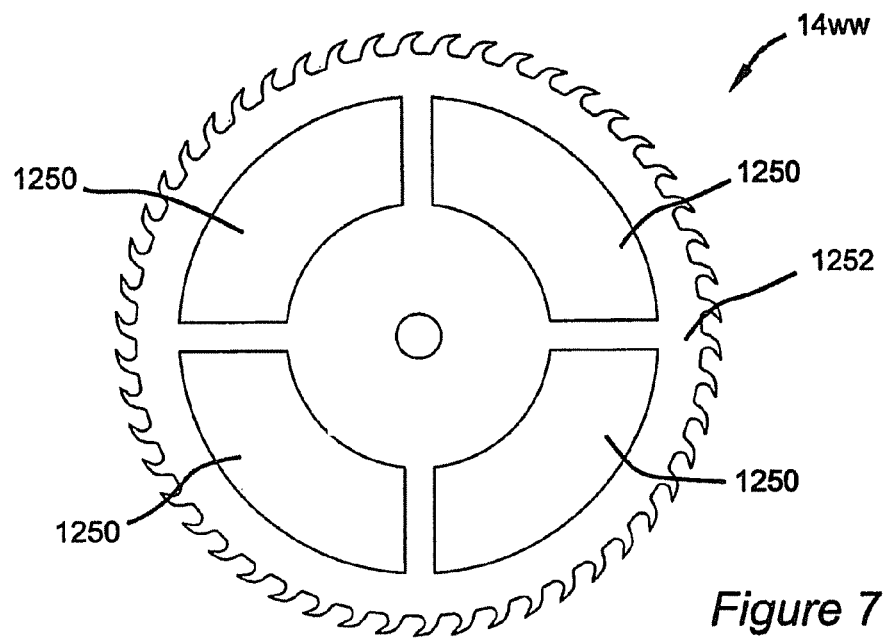
FIG. 77a is a side view of a safety mechanism according to a forty-second embodiment of the present invention shown prior to activation.
Figure 77B:
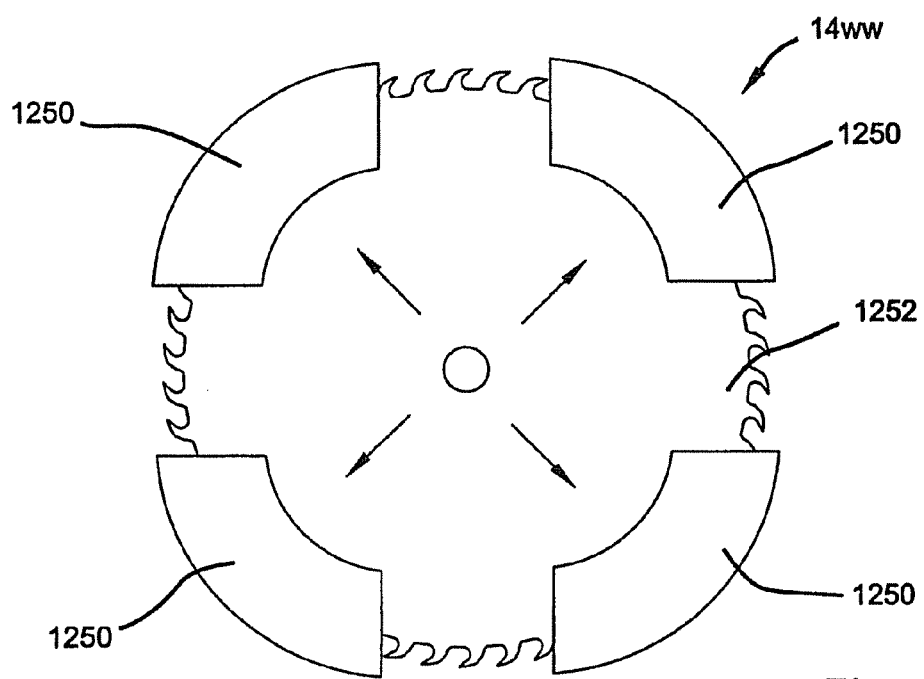
FIG. 77b is a side view of the safety mechanism of FIG. 77a shown after activation.

Referencing FIGS. 77*a* and 77*b*, safety mechanism 14*ww* is shown. Safety mechanism 14*ww* includes radially actuable guard sections 1250 disposed on saw blade 1252. Guard sections 1250 are configured to rapidly displace outwardly beyond the perimeter of blade 1252 during a stop event. Guard sections 1250 preferably are retained in a position as shown in FIG. 77*a* by a latch or similar retaining device (not specifically shown) during normal operation.

If a dangerous condition is detected by for example one of the sensing mechanisms 12 disclosed herein, guard sections 1250 are urged outwardly from a position as shown in FIG. 77*a* to a position as shown in FIG. 77*b*. Guard sections may be urged by any suitable means such as but not limited to mechanical biasing members or an explosive device. Guard sections are preferably comprised of a durable pliable material sufficient to displace a finger or a hand of a user away from the saw blade 1252.

It will be appreciated that alternative configurations of guard sections 1250 may be employed. For example an alternate amount of guard sections 1250 may be used or alternate geometries may be used for guard sections 1250.

External Forces Braking

Another consideration in preventing injury as a result of contact with the rotating blade of a saw is the size and configuration of the saw blade that is being used. In many applications a standard blade is used to make cuts through an entire piece of wood. However, additional types of circular saw blades are available to perform numerous other removal functions such as dado operations. These blades and conventional blades are often made in varying sizes, which may not function correctly with presently installed stop devices. Therefore, the present invention provides a device that allows a user to position a saw brake mechanism in a desired position depending on the size of the saw blade being used.

Figure 78A:
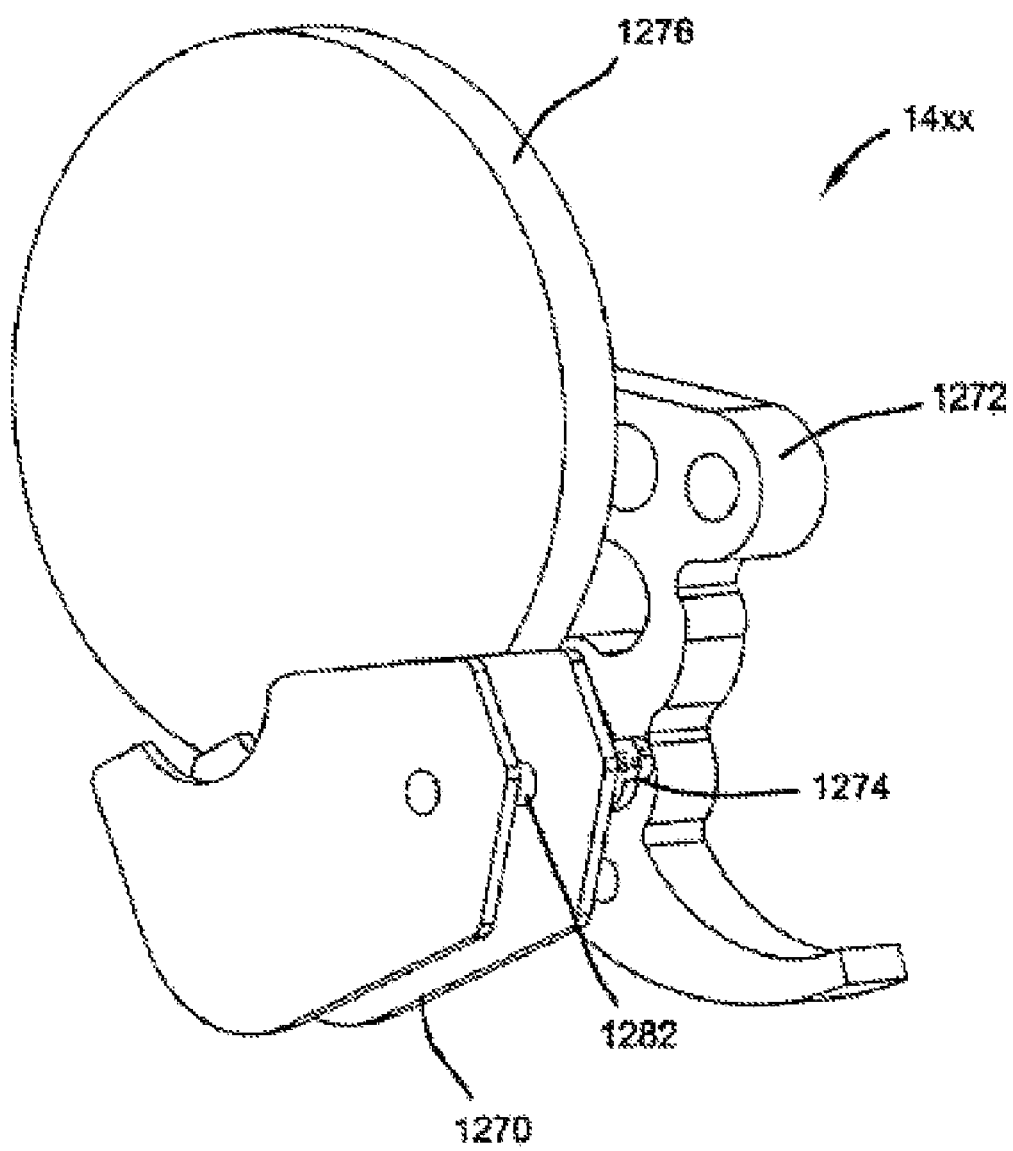
FIG. 78a is a perspective view of a safety mechanism according to a forty-third embodiment of the present invention.
Figure 78B:
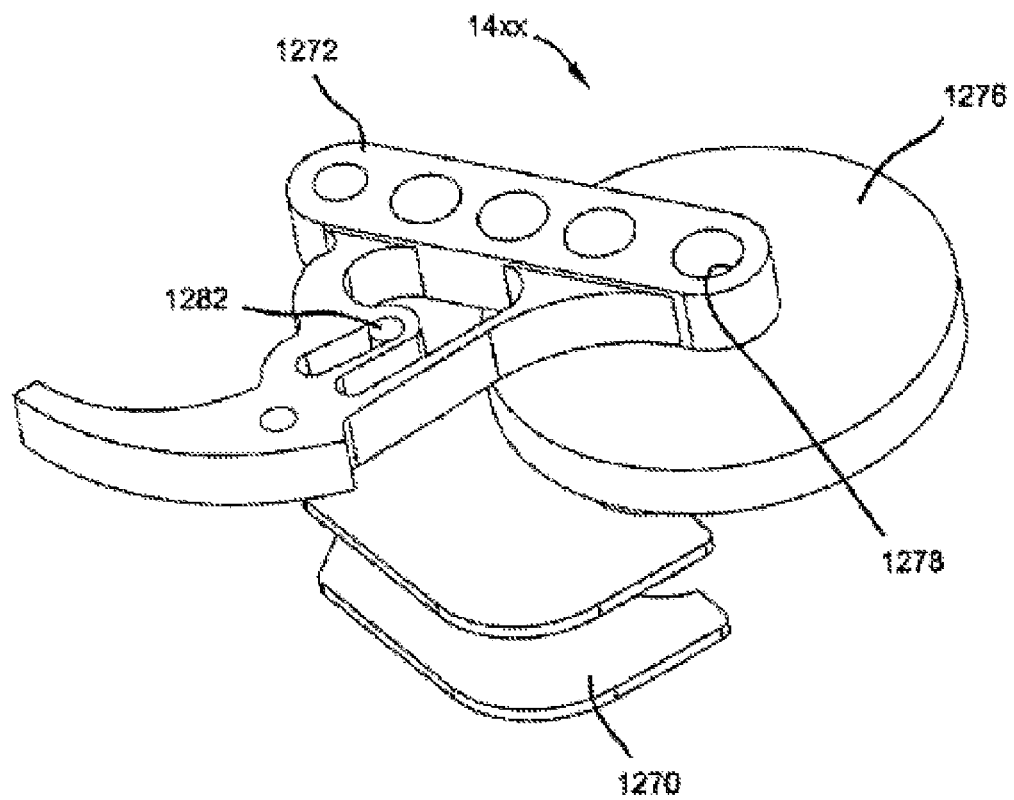
FIG. 78b is a side view of the safety mechanism of FIG. 78a shown adjusted to accommodate a small saw blade.
Figure 78C:
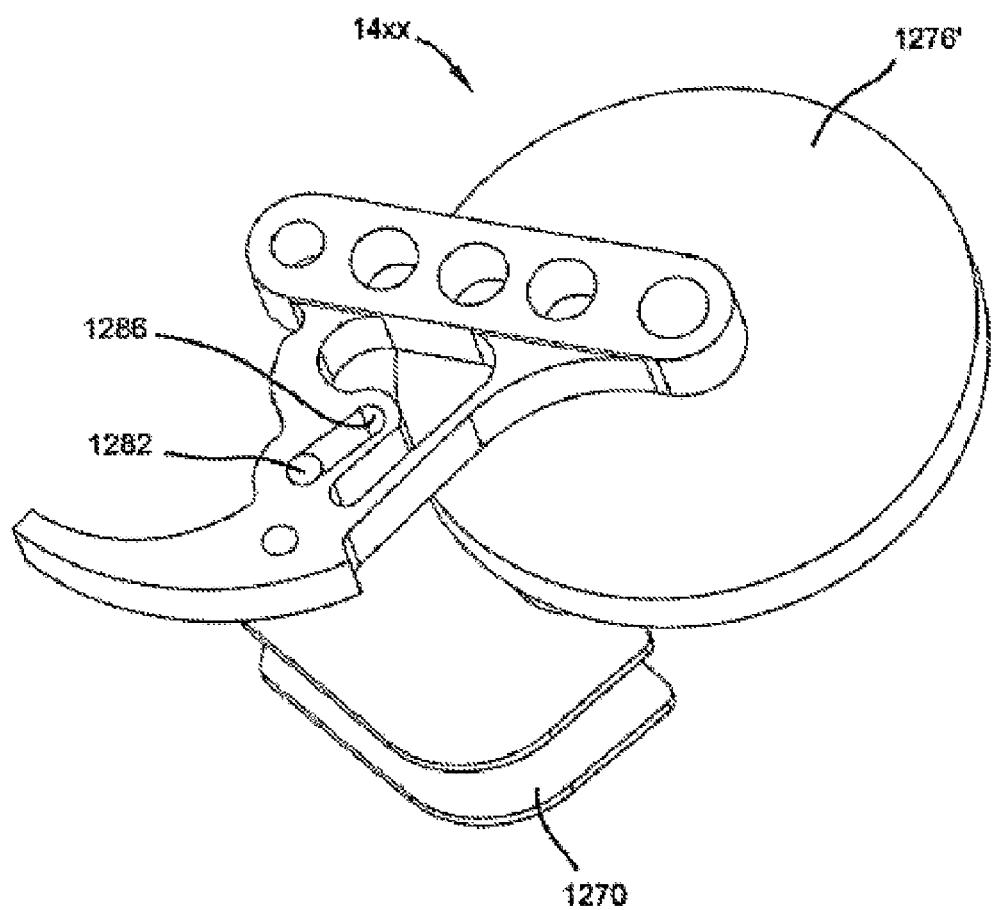
FIG. 78c is a side view of the safety mechanism of FIG. 78a shown adjusted to accommodate a large saw blade.

FIGS. 78a-78c show a safety mechanism 14xx employing brake module 1270. Brake module 1270 extends from arbor bracket 1272 and includes actuation fork 1274 attached thereto. Arbor bracket 1272 rotatably couples saw blade 1276 at shaft 1278. Brake module 1270 which is connected to arbor bracket 1272 through a pin 1282 in a slot 1286, engages the periphery of blade 1276 to rapidly slow it down during a stop event. If a large blade is used (referred to as 1276' in FIG. 78c), the pin 1282 in the slot 1286 is actuated by the actuation fork 1274 to the end of slot 1286 that is further away from the blade 1276 (FIG. 78c). If a smaller blade is going to be used (referred to as 1276 in FIG. 78b) the pin 1282 in the slot 1286 is actuated by the actuation fork 1274 to the end of slot 1286 that is nearest to the blade 1276 (FIG. 78b).

During a stopping event, brake module 1270 is rotated by suitable means toward rotating saw blade 1276. In this way, arbor bracket 1272 may pivot about shaft 1278 clockwise as viewed from FIG. 78b. Alternatively, brake module 1270 may rotate about shaft 1282 in a counterclockwise direction toward rotating saw blade 1276 as viewed from FIG. 78b.

While the following description is provided with reference to a table saw, it is readily understood that the contact detection system of the present invention is applicable to a variety of power tools and/or woodworking tools, including (but not limited to) miter saws, radial arm saws, circular saws, band saws, joiners, planars, nailers, drills, etc.

Woodworking power tools of the type described herein are typically powered by an electrical power system for connection to a commonly available electrical connection. Therefore the safety devices of the present invention are illustrated for use with power tools having a power source that utilizes electrical energy. However, it is contemplated that the woodworking power tools utilizing a different power source may also employ the safety systems described herein and not depart from the scope of the present invention.

Figure 79:
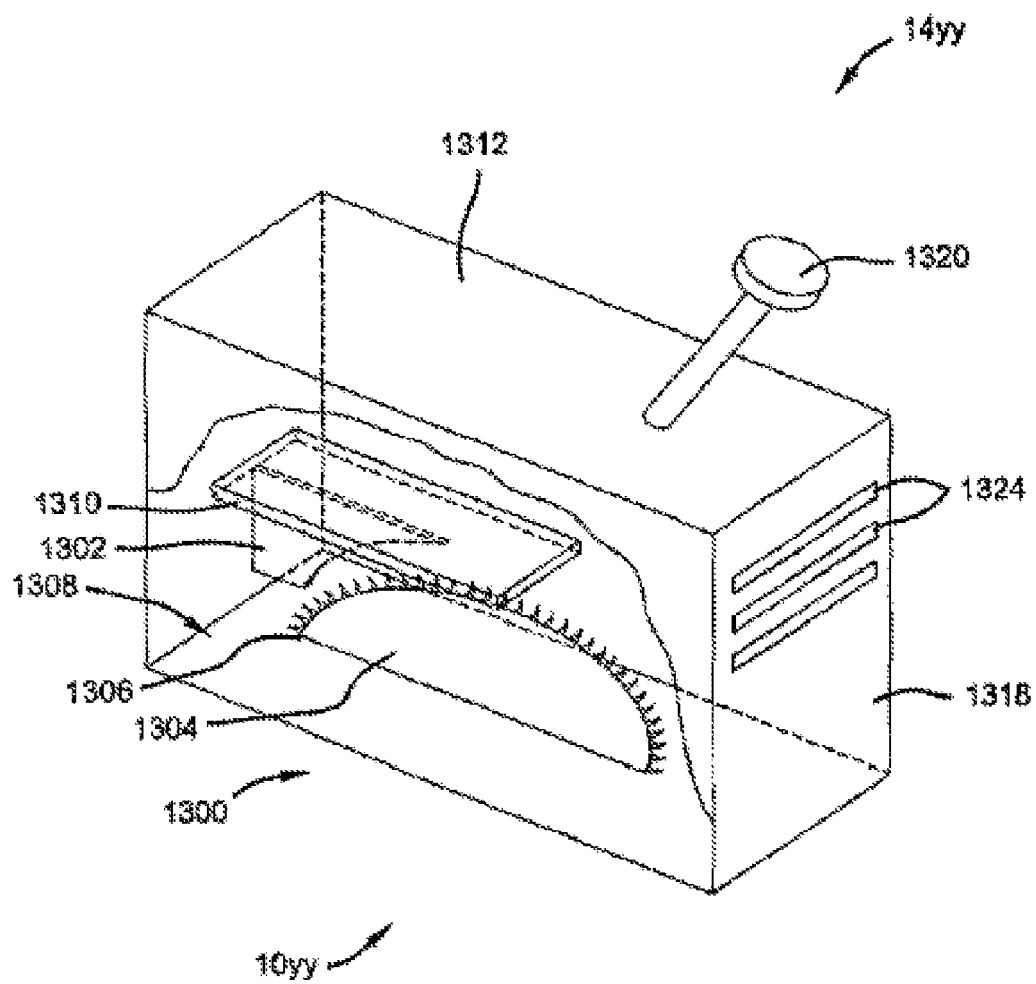
FIG. 79 is a perspective view of a safety mechanism according to a forty-fourth embodiment of the present invention.

FIG. 79 illustrates a safety mechanism 14yy for use with a table saw 10yy, box guard 1300. Box guard 1300 is generally compressed of a riving knife 1302 that is substantially similar in width to saw blade 1304. Riving knife 1302 is oriented coplanar with saw blade 1304 and positioned directly behind slot 1306. Riving knife 1302 preferably extends perpendicularly upward with respect to planar top surface 1308 to a height that is generally above saw blade 1304. Attached to the top of riving knife 1302 is a plate 1310. Plate 1310 is substantially rectangular in shape, having a width that is substantially wider than saw blade 1304 and a length that extends over the top portion of saw blade 1304. Plate 1310 is connected to a box 1312, which covers saw blade 1304.

In a preferred embodiment, box 1312 is constructed in a box shape having two adjacent sides removed. The first removed side is positioned adjacent to the planar top surface 1308 to allow saw blade 1304 to be housed therein. The second removed side is positioned adjacent to the back of saw blade 1304, near plate 1310 and riving knife 1302. Box 1312 is attached to plate 1310 by removable fasteners such as, bolts or pull pins, to form a hinge mechanism that allows box 1312 to be selectively raised to allow access to saw blade 1304. Box 1312 may include a ramp shaped guide portion 1318 formed on the front edge of the box 1312 to actuate box 1312 when in contact with a piece of material. Alternatively, a knob 1320 or actuator may be utilized to actuate box 1312 to an open position. Additionally, a set of louvers 1324 is provided to allow monitoring of the blade 1304 while limiting the size and number of objects that may contact saw blade 1304.

Figure 80:
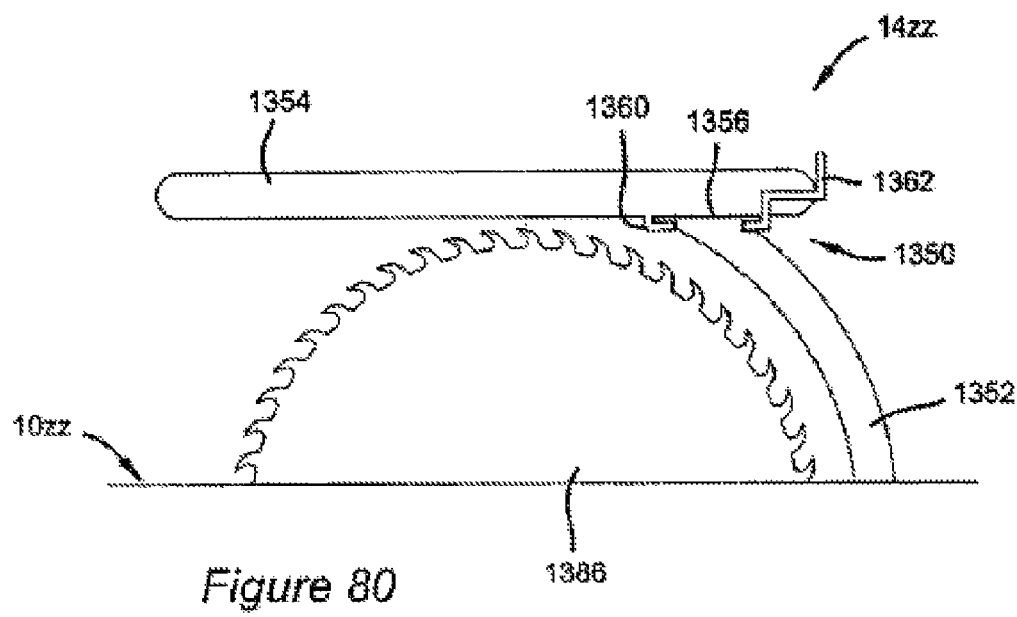
FIG. 80 is a perspective view of a safety mechanism according to a forty-fifth embodiment of the present invention.

FIG. 80 shows safety mechanism 14zz according to another embodiment of the present invention. Safety mechanism 14zz includes guard plate assembly 1350 including a riving knife 1352 mounted to table saw 10zz as known in the art for guiding a workpiece. Releasably attached to the distal end of riving knife 1352 is a guard plate 1354 that extends over saw blade 1386 to operatively prevent inadvertent contact with saw blade 1386. As shown guard plate 1354 includes a groove 1356 extending along the rear portion of guard plate 1354 to receive the top edge of riving knife 1352. Extending over groove 1356 is a yoke 1360 that retains the front end of riving knife 1352. Located at the rear of guard plate 1354 is manually rotatable latch 1362 to releasably attach guard plate 1354 to the rear end of riving knife 1352. If the use of guard plate 1354 is desired, the front end of riving knife 1352 is inserted into yoke 1360 and latch 1362 is actuated to engage the rear portion of riving knife 1352. In this configuration, guard plate 1354 provides a protective member that extends over the length of saw blade 1386. If the use of guard plate 1354 is not desired, guard plate 1354 may be removed by rotating latch 1362 to a disengaged position and sliding guard plate 1354 forward so that yoke 1360 is not in contact with the leading edge of riving knife 1352.

Figure 81:
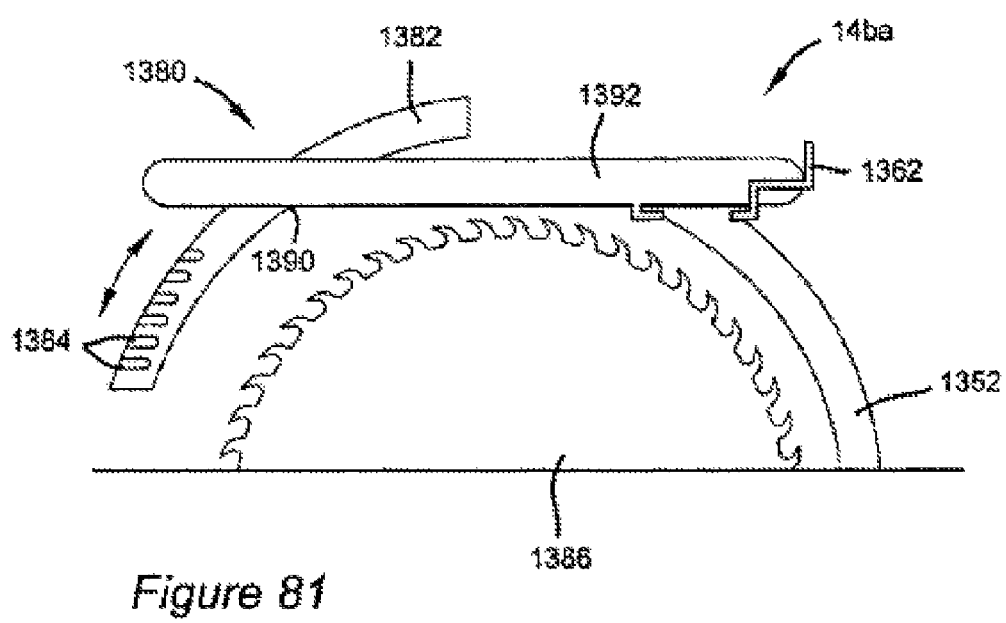
FIG. 81 is a perspective view of a safety mechanism according to a forty-sixth embodiment of the present invention.

As shown in FIG. 81, a safety mechanism 14ba is shown to include a sight guard 1380. Like components of safety mechanism 14zz are used to designate like components of safety mechanism 14ba. Sight guard 1380 is generally composed of a rectangular translating guard 1382 having a plurality of louvers 1384 disposed therethrough for observing the saw blade 1356. Translating guard 1382 extends through a simple slot 1390 in guard frame 1392 substantially similar in size to translating guard 1382. Sight guard 1380 is selectively positioned in an infinite number of positions ranging from fully closed, wherein the leading end of translating guard 1382 is adjacent to planar top surface 1394, to fully open, wherein the leading end of translating guard 1382 is adjacent to guard frame 1392. In operation, translating guard 1382 is actuated upward until the leading end is above the top surface of a workpiece (not shown). As the workpiece is moved toward the blade 1396, the leading edge of translating guard 1382 follows along the top surface of the workpiece. In this configuration, sight guard 1380 allows the user to view the interaction between the saw blade 1396 and the workpiece while prevented from contacting saw blade 1396.

Figure 82:
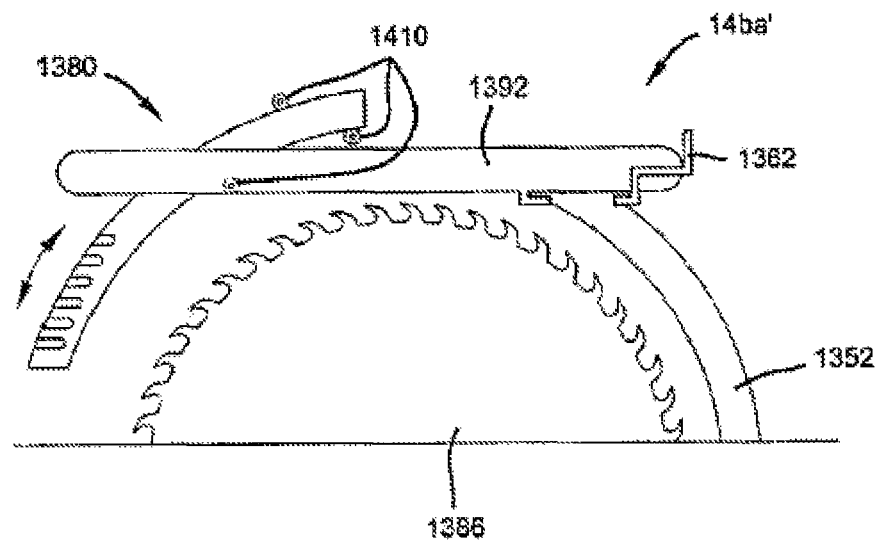
FIG. 82 is a perspective view of a safety mechanism according to a forty-seventh embodiment of the present invention.

FIG. 82 shows safety mechanism 14ba' incorporating a plurality rolling members 1410 that follow along the inner and outer surface of guard 1380 to promote smooth translation of guard 1380. Like reference numbers of safety mechanism 14ba are used to designate like components of safety mechanism 14ba'. In this regard, the operation of safety mechanism 14ba' is substantially similar to safety mechanism 14ba.

Figure 83:
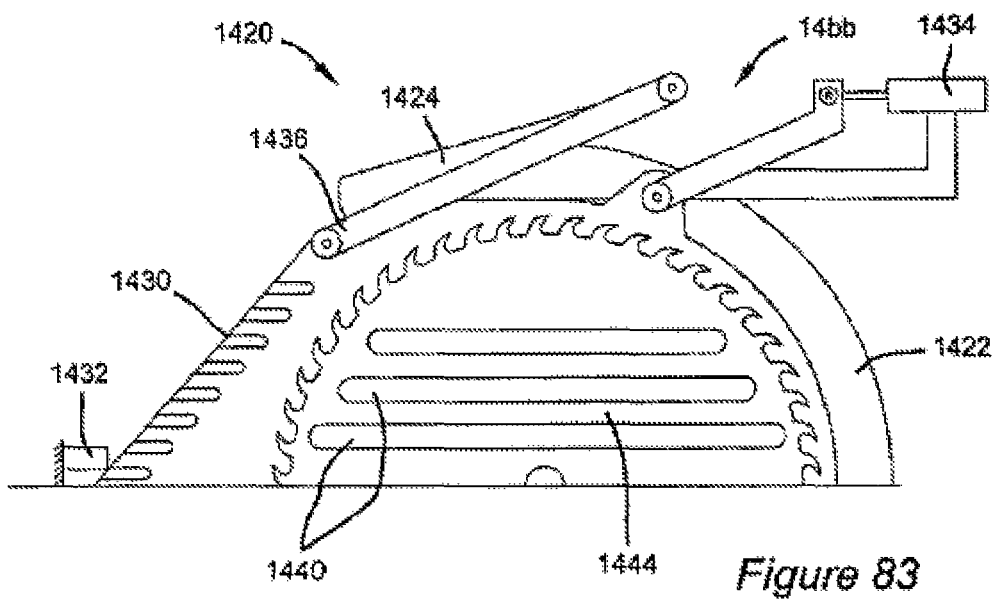
FIG. 83 is a perspective view of a safety mechanism according to a forty-eighth embodiment of the present invention.

FIG. 83 shows safety mechanism 14bb having sensing guard assembly 1420. Sensing guard assembly 1420 is generally comprised of a riving knife 1422 and a top plate 1424 mounted to a table saw as known in the art. A sight guard 1430 is rotatably attached to the front end of the top plate 1424, a sensing device 1432 is attached to the front end of sight guard 1430 and an actuation mechanism 1436 including motor or solenoid 1434 for selectively actuating the sight guard 1430. Sight guard 1430 is preferably formed to have a plurality of louvers 1440 to allow the user to inspect the interaction between the saw blade 1444 and the workpiece while precluding user interface with the saw blade 1444. Connected to the front of sight guard 1430 is sensor device 1432 oriented to detect in the downward direction. If sensor device 1432 detects a workpiece, it sends a signal to an actuation mechanism 1436 to open sight guard 1430. Actuation mechanism 1436 opens sight guard 1430 to allow a workpiece to access saw blade 1444. The downward orientation of sensor device 1432 prevents objects such as an operator's finger from contacting saw blade 1444 because the blade 1444 must be actuated upward by the person to allow for entrance with the blade 1444. Therefore, the operator would know that they were approaching the saw blade 1444. Alternatively, a sensing device that detects the difference between human tissue and a workpiece as is discussed herein may be installed to further prevent inadvertent contact with the saw blade 1444.

Figure 84:
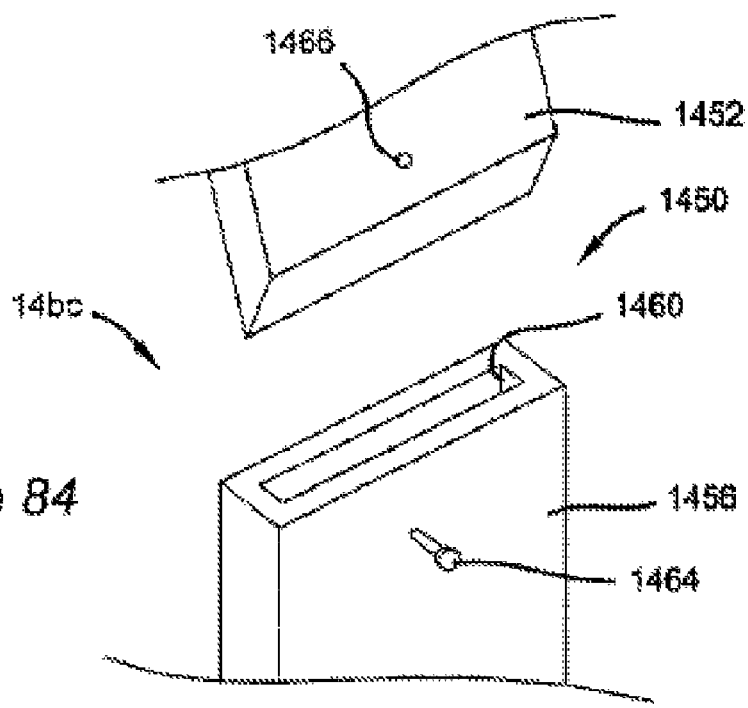
FIG. 84 is a perspective view of a safety mechanism according to a forty-ninth embodiment of the present invention.

As shown in FIG. 84 a safety mechanism 14*bc* including a riving knife assembly 1450 is shown. In operation of a table saw, it may be desired to utilize a riving knife 1452 to guide a workpiece while performing groove, finger joint, rabbit, or cheek cuts. However, riving knives are not able to be used to many other types of cuts. Safety mechanism 14*bc* allows for easy installation when using riving knife 1452 and easy removal when not using riving knife 1452. In a preferred embodiment, riving knife assembly 1450 includes a base member 1456 having a slot 1460 therein oriented coplanar and behind a saw blade (not specifically shown). Base member 1456 includes a pull pin 1464 mounted along an elongated side for selectively engaging a riving knife 1452 having a retention hole 1466 formed complementary to pull pin 1464.

If the use of riving knife 1452 is desired, the operator may slide the riving knife 1425 into the base member 1456 and actuate pull pin 1464 away from base member 1456 to install riving knife 1452. Once riving knife 1452 is fully seated, the operator may return pull pin 1464 to the original position to lock riving knife 1452 to base member 1456. If the use of riving knife 1452 is not desired, the operator actuates pull pin 1464 away from base member 1456 to extract riving knife 1452 from base member 1456.

Figure 85:
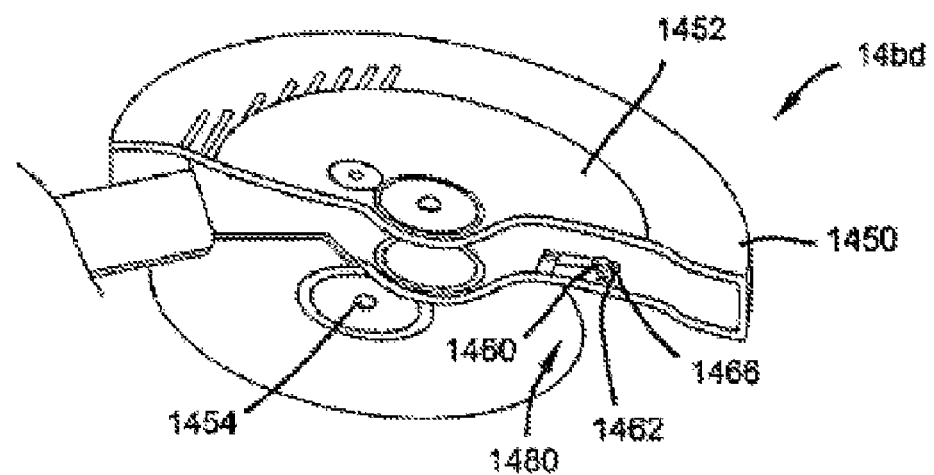
FIG. 85 is a perspective view of a safety mechanism according to a fiftieth embodiment of the present invention.

With reference to FIG. 85, a safety mechanism 14*bd* including guard retainer 1480 is shown. Guard retainer 1480 is configured to lock the blade guard 1450 to pivot plate 1452 and thus allow access to arbor bolt 1454. A screw 1460 maintains the guard and pivot plate 1452 in the position shown. During operation, lower guard 1450 is rotated upward in a counterclockwise direction. Screw 1460 is loosened to clear tab 1462 on pivot plate 1452. Concurrently, retainer 1466 biases guard 1450 counterclockwise thereby holding the guard 1450 in a retained position. Guard 1450 and pivot plate 1452 are further rotated together until pivot plate tab 1462 moves beyond screw 1460. Screw head 1460 then precludes blade guard 1450 and pivot plate 1452 from rotating clockwise. In this way, the user may gain unimpeded access to arbor bolt 1454 during a blade change.

Figure 86:
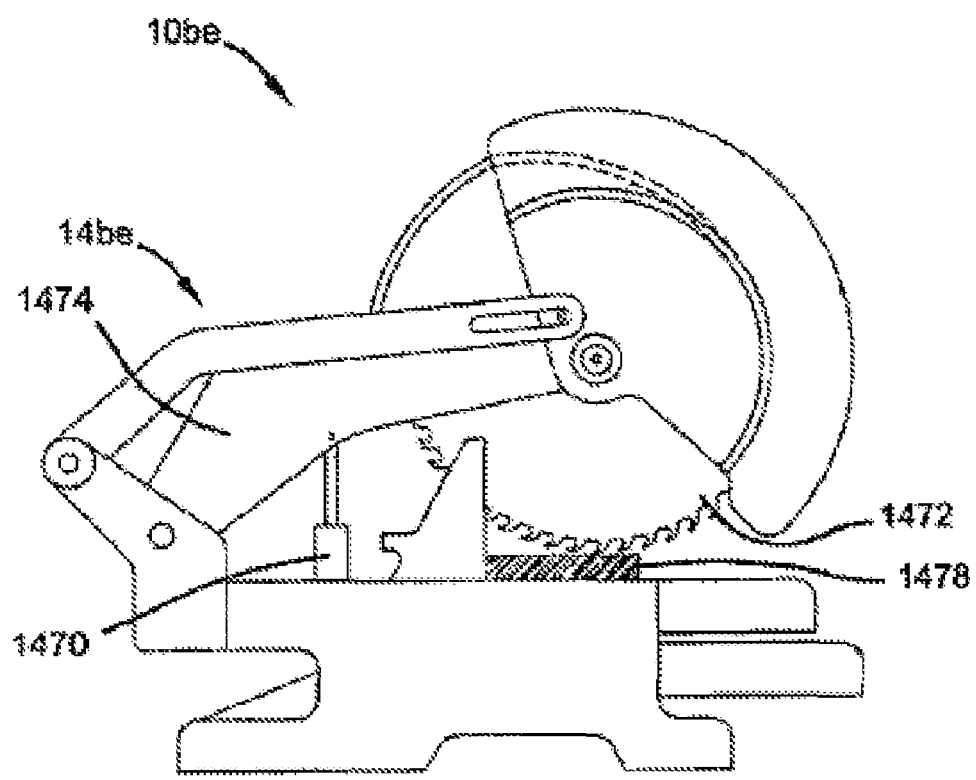

Turning now to FIG. 86, a safety mechanism 14*be* including magneto-rheological damper 1470 is shown operatively associated with a miter saw 10*be*. Safety mechanism 14*be* is preferably used in conjunction with another safety mechanism 14 disclosed herein. If a sensing mechanism 12 initiates a stop event by using a braking force such as those described in association with other safety mechanisms 12. During a stopping event, the rapid deceleration will tend to cause the blade 1472 and arm 1474 to travel downward in the direction of workpiece 1478 and also toward potential additional contact with a user. To counter this, magneto-rheological damper 1470 precludes downward travel of blade 1472 and arm 1474. As is well known, a magneto-rheological fluid damper utilizes a fluid which can have the viscosity altered through the application of a magnetic field. During a stop event, a signal is preferably sent to damper 1470 at the same time a sensing mechanism 12 senses a dangerous condition.

Figure 87:
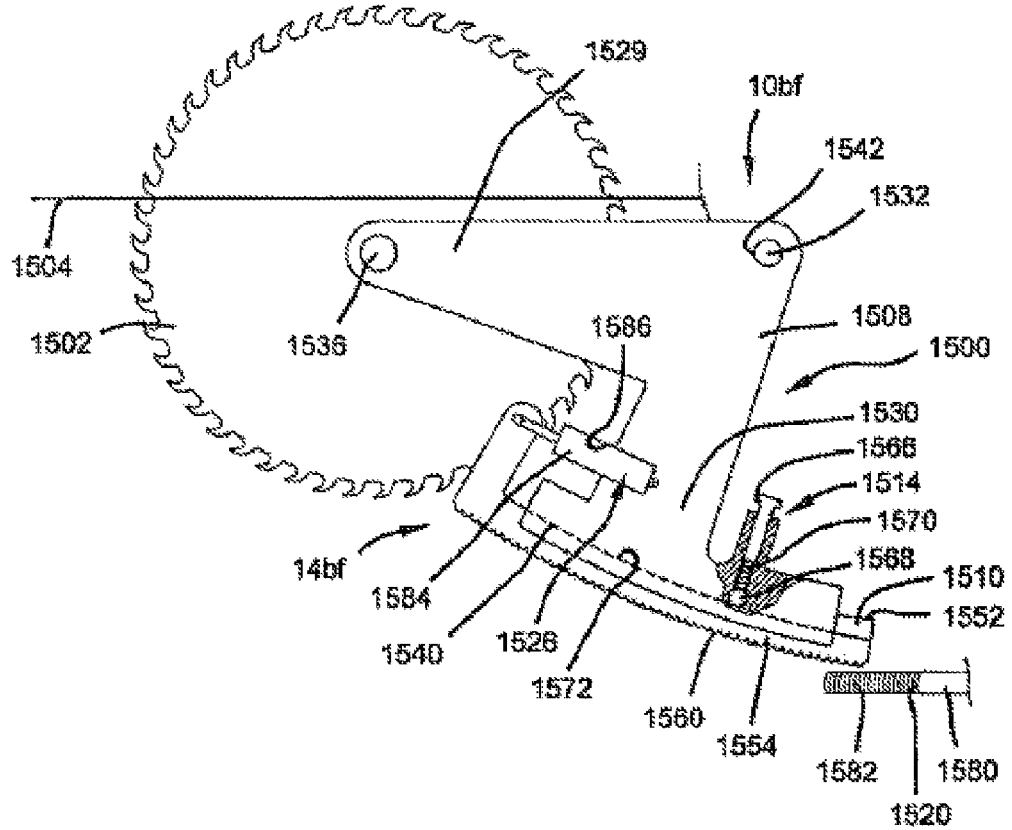
Figure 88:
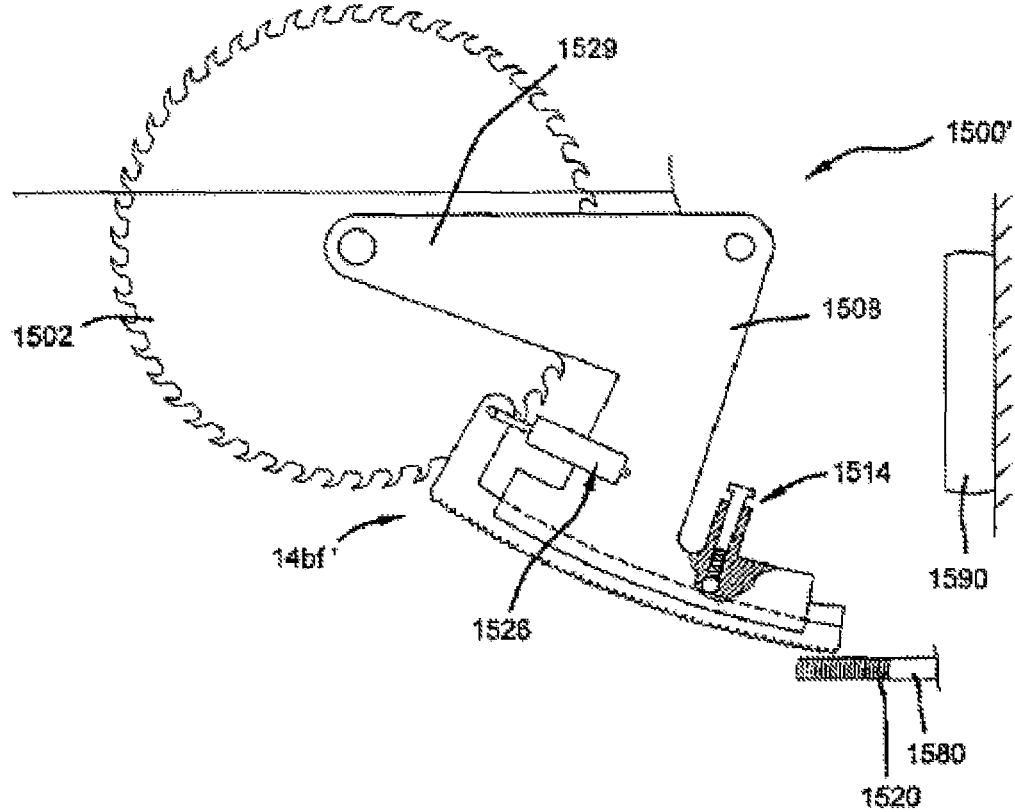

FIGS. 87 and 88 show a safety mechanism 14*bf* for use with a power table saw 10*bf* including blade retraction system 1500. Blade retraction system 1500 is designed to retract a saw blade 1502 under the table portion 1504 of a table saw 10*bf* to prevent or reduce injurious contact between the saw blade 1502 and an operator of the table saw 10*bf*. Again, although the present invention is shown in combination with a power table saw 10*bf*, it is appreciated that the teachings of the present invention may be applied to other types of power saws having a rotating saw blade, such as a miter saw, chop saw, or circular saw.

The blade retraction system 1500 is comprised of an arbor bracket 1508 supporting the saw blade 1502 and coupled to a portion of the table saw 10*bf*, a sector gear 1510 adapted to travel along a portion of the arbor bracket 1508, a clutch mechanism 1514 slidably coupling the sector gear 1510 to the arbor bracket 1508, a worm gear 1520 operable to adjust the position of the sector gear 1510 and an actuating device 1526 coupled to the sector gear 1510 and the arbor bracket operable to translate the arbor bracket 1508 relative to the sector gear 1510 to retract the saw blade 1502 beneath the table portion 1504 of the table saw 1504 to prevent injurious contact between the saw blade 1502 and the operator of the table saw 10*bf*.

The arbor bracket 1508 of the present invention is shown to be comprised of a support arm 1529 and an adjustment arm 1530 defined by a bore 1532. The support arm 1526 of the arbor bracket 1508 extends generally horizontal and includes a bore adapted to receive a spindle 1536. The spindle 1536 is adapted to be coupled to the saw blade 1502 and allow rotation of the saw blade 1502 relative to the arbor bracket 1508. The spindle 1536 also engages a belt or other device (not shown) that drivingly engages the saw blade 1502 to operatively rotate the saw blade 1502. The adjustment arm 1530 of the arbor bracket 1508 generally include an arc shaped surface 1540 that is substantially concentric with the bore 1532. The bore 1532 is adapted to engage a pivot pin 1542 that is coupled to a portion of the table saw 10*bf* to allow arbor bracket 1508 to rotate relative to the table saw 10*bf*.

The sector gear 1510 is formed to have a generally arcuate shape having a first surface 1552 substantially conforming to the arc shaped surface 1540 of the arbor bracket 1508 and a gearing portion 1554 also formed in an arcuate shape substantially concentric to the bore 1532 and having a plurality of gear teeth 1560. The sector gear 1510 is located to allow the first side of the sector gear 1510 to be adjacent to the arc shaped surface 1540 of the arbor bracket 1508 to allow relative translation therebetween.

The clutch mechanism 1514 is designed to couple the arbor bracket 1508 to the sector gear 1510, but allow relative translation therebetween when a requisite force is applied to either the arbor bracket 1508 or the sector gear 1510. The clutch mechanism 1514 is shown to include a biased detent mechanism 1566 extending from the arbor bracket 1508 and engaging the sector gear 1510. The detent mechanism 1566 is comprised of a detent member 1568 that is biased toward the sector gear 1510 by a biasing member 1570. The detent member 1568 engages the first surface 1572 of the sector gear 1510 to prevent translation between the sector gear 1510 and the arbor bracket 1508. It is contemplated that the other type of clutch mechanisms 1514, may be used to couple the arbor bracket 1508 to the sector gear 1510. Additionally, it is appreciated that the clutch mechanism 1514 may be attached to various locations on the sector gear 1510.

The worm gear 1520 is adapted to engage the sector gear 1510 to control movement of the sector gear 1510. The worm gear 1520 is generally comprised of a shaft member 1580 and a threaded gear portion 1852. The worm gear 1520 may to be rotated in one of a number of ways such as electric actuator or crank. The threaded gear portion 1582 of the worm gear 1520 is adapted to engage some of the plurality of teeth 1560 of the sector gear 1520. As the worm gear 1520 is rotated, the threaded gear portion 1582 meshes with the gear teeth 1560, thereby cause the arbor bracket 1508 and attached components to rotate clockwise or counterclockwise depending on the direction of rotation of the worm gear 1520. In operation, the worm gear 1520 is utilized to control the height of the saw blade 1502 relative to the top of the table portion 1504 of the table saw 10*bf*.

In a first embodiment, the actuating device 1526 is shown to be rotatably coupled to the sector gear 1510 and the arbor bracket 1508. The actuating device 1526 is comprised of a piston 1584 and a cylinder 1586. The piston 1586 is coupled to one of the sector gear 1510 and the arbor bracket 1508. The cylinder 1586 is coupled to the other of the sector gear 1510 and the arbor bracket 1508. The actuating device 1526 also includes a propellant material disposed in the cylinder 1586 and operable to expand upon the activation of a triggering device (not shown). Upon activation of the triggering device (not shown), the piston 1586 portion of the actuating device 1526 expands axially outward increasing the length of the actuating device 1526. The propellant material is preferably an electrically activated explosive material. However, it is contemplated that other types of propellant materials may be utilized in the present invention. It is also contemplated that a mechanical device may be utilized in the place of actuating device 1526.

In operation, the triggering device (not shown) is activated causing the actuating device 1526 to expand axially. As the actuating device 1526 expands, the arbor bracket 1508 and the sector gear 1510 are driven apart. As the actuating device 1526 expands, the arbor bracket 1508 is driven in a counter-clockwise direction. As the arbor bracket 1508 rotates, the support arm 1526 and the saw blade 1502 are rotated downward to a position under the table portion 1504 of the table saw 10*bf*. Once the saw blade 1502 is beneath the table portion 1504 of the table saw 10*bf*, the possibility of contact between the saw blade 1502 and the operator is eliminated.

As shown in FIG. 88, a bumper pad 1590 may be incorporated into the blade retraction system 1500 of safety mechanism 14*bf* of the present invention. It is appreciated that like reference numbers will be used to designate like components. The bumper pad 1590 is positioned rearward of the arbor bracket 1508 and is adapted to receive the rear end of the arbor bracket 1508 after activation of the actuating device 1526. The bumper pad 1590 dissipates the energy of the impacting arbor bracket 1508. The bumper pad 1590 is shown to be formed of a permanently deforming material such as a yielding plastic, a crushing foam or a deformable honeycomb structure. It is also contemplated that the bumper pad 1590 may be constructed of a dampening material such as an engineering foam, or a high friction engagement material such as elastomers.

Figure 89:
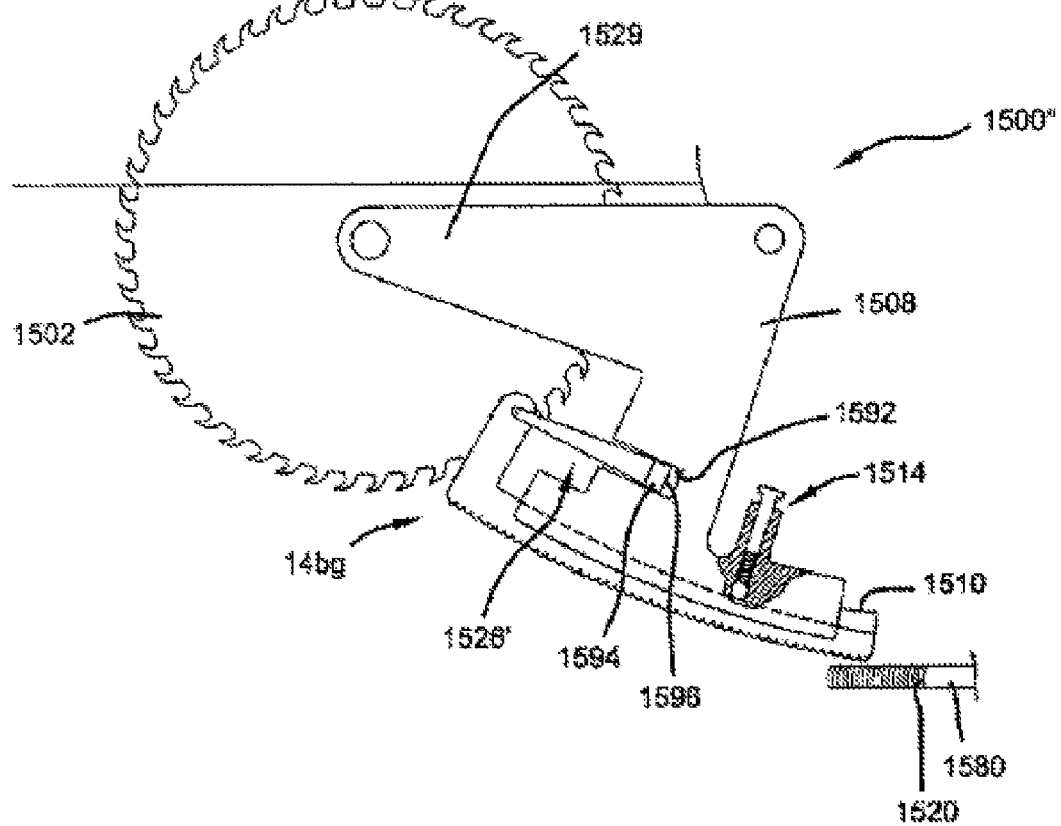

FIG. 89 illustrates a safety mechanism 14*bg* employing an alternate actuation mechanism 1526'. The basic structure of the blade retraction system 1500" is substantially similar to the previous embodiment described above. However, the actuating device 1526' is different. The actuating device 1526' includes a cylinder 1592 that is integrally formed in the arbor bracket 1508. A piston 1594 is adapted to engage the integral cylinder 1592. A first end 1596 of the piston 1594 is formed in a frustum spherical shape to allow the piston 1594 to maintain engagement with the inner walls of the cylinder 1592. The other end of the piston 1594 is rotatably coupled to the sector gear 1510. Additionally, it is contemplated that a piston having a compliant sealing cap engaging the inner walls of the cylinder may be used. The piston/cylinder arrangement operates substantially similar to the propellant actuated device 1526 described above. It is also contemplated that a mechanical device may be utilized in the place of actuating device 1526'.

Figure 90:
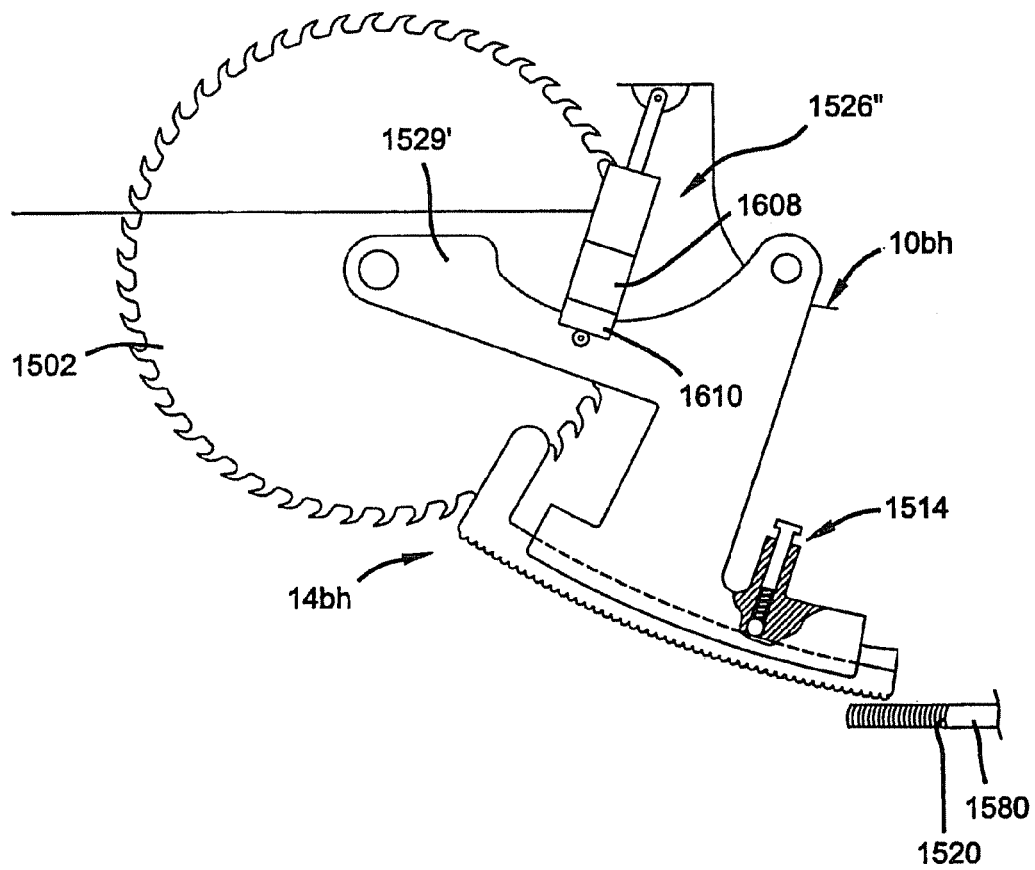

FIG. 90 illustrates safety mechanism 14*bh*. In this embodiment, an actuation device 1526" is coupled to the arbor bracket 1529' and a portion of the frame of the table saw 10*bh*. The actuation device is comprised of a piston 1608 and cylinder 1610 substantially similar to the piston/cylinder arrangement of the actuation device 1526'. The alternate positioning of the piston 1608 and cylinder 1610 arrangement operates in substantially similar to the actuation device disclosed above.

Figure 91:
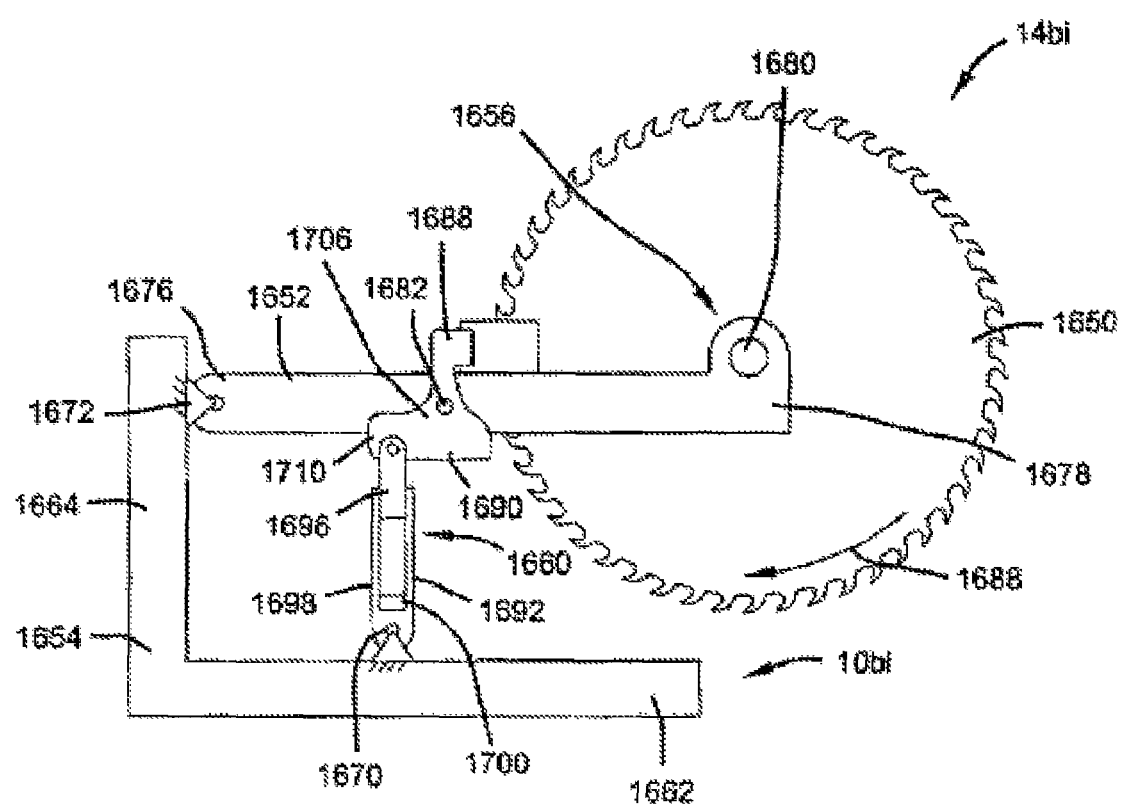
Figure 92:
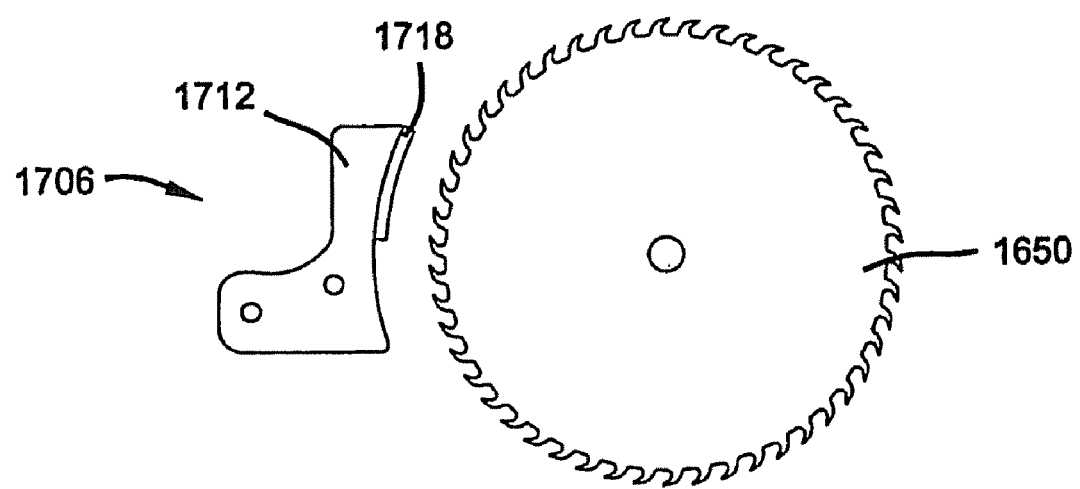

Referring to FIG. 91, a safety mechanism 14*bi* for a power tool 10*bi* having a circularly rotating blade 1650 is shown diagrammatically. The power tool 10*bi* is generally comprised of an arm 1652 rotatably coupled to a rigid base 1654 and having a power saw 1656 attached to the distal end of the arm 1652. The safety mechanism 14 *bi* includes a braking device 1660 coupled to the base 1654 and to the arm 1652 operable to engage the saw blade 1650 of the power saw 1656. The safety mechanism 14*bi* of the present invention is shown for use with a miter saw. It is contemplated that the present invention may be utilized with other types of power tools having a circular blade. For example, the safety mechanism 14*bi* of the present invention may be adapted for use with a radial arm saw, a table saw or a chop saw.

The base member 1654 of tool may be formed as an "L"-shaped member having a first and a second portions 1662 and 1664 that are substantially perpendicular. The outwardly extending first portion 1662 generally supports the safety mechanism 14*bi* and includes a first connection 1670 to rotatably couple a portion of the braking device 1660 to the base member 1654 to provide proper operation of the braking device 1660. The upwardly extending second portion 1664 includes a second connection 1672 to rotatably couple an end of the arm 1652 to the base member 1654 to allow articulation of the power saw 10*bi* coupled to the other end of the arm 1652. However, it is understood that the base member 1654 may be constructed in a variety of different configurations that allow for proper function of the arm 1652 and the braking device 1660.

The arm 1652 of the safety mechanism 14*bi* is generally formed in an "L"-shape having a first extending end 1676 and a second extending end 1678. The first extending end 1676 is rotatably coupled to the base member 1654 and the second upwardly extending end 1678 is adapted to locate the power saw 1656 and specifically the axis of rotation 1680 above the first extending end 1676. The arm 1652 also includes a brake connection 1682 for coupling a brake device thereto. The brake connection 1682 is located proximate to the saw blade 1650 of the power tool 10*bi*. The arm 1652 is designed to allow proper articulation of the saw blade 1650 with respect to a workpiece (not shown). The arm 1652 is shown to be formed of a rigid material having a relatively high strength such as steel. However, it is contemplated that the arm 1652 may be constructed of other material having suitable properties.

The power saw 1656 is attached to the distal end of the arm 1652. The arm 1652 allows the power saw 1656 to be articulated along a path defined by the distal end of the arm 1652. The power saw 1656 operatively rotates the saw blade 1650 in the clockwise direction indicated by arrow 1688.

The power saw 1656 portion of the present invention is shown to be constructed of a AC electric motor coupled to a saw blade 1650 by an arbor. However it is contemplated that many different varieties of power saws, such as DC electric and saws having a hydrocarbon based engine, may be used with the safety mechanism 14bi of the present invention.

The braking device 1660 includes a brake 1690, coupled to the arm 1652 and operable to engage the saw blade 1650 upon translation of an activation mechanism 1692. The activation mechanism 1692 is operable to be activated on the occurrence of a predetermined event, such as a signaling by the operator, jammed workpiece, or detection of a dangerous condition by a sensing mechanism 12 as disclosed herein.

The activation mechanism 1692 is generally comprised of a piston 1696 coupled to the brake connection 1682 of the arm 1652 and a cylinder 1698 having an explosive material 1700 disposed therein and coupled to the base 1654. The explosive material 1700 disposed in the cylinder 1698 may be activated in any number of ways known to activate explosives 1700 such as temperature or spark.

In a first preferred embodiment the brake 1690 is formed to have a link 1706 rotatably coupled to the arm 1652. The link is generally comprised of a connection arm 1710 and a push arm 1712. The connection arm 1710 is rotatably coupled to the distal end of the piston 1696. The push arm 1712 is located proximate to the edge of the saw blade 1650 and includes a brake pad 1718 adapted to engage the saw blade 1650.

Upon activation of the activation portion, the connection arm 1710 of the link 1706 is driven upward rapidly from the force of the explosives 1700. The use of explosives 1700 is preferred over many other commonly known biasing devices because explosives 1700 provide a large force very rapidly. This large and rapid force allows the saw blade 1650 of the power saw 10bi to be stopped in a short period of time, thereby reducing the chance of serious injury from contact with the saw blade 1650. As the connection arm 1710 of the link 1706 is driven upward, the pad 1718 located on the push end of the link 1706 is driven into engagement with the edge of the saw blade 1650. The saw blade 1650 is rapidly slowed as the teeth of the saw blade 1650 engage the pad 1718 until the saw blade 1650 is stopped.

Additionally, the relative location of the pad 1718, above the axis of rotation 1680 of the saw blade 1650 causes the rotational inertia of the saw blade 1650 to be dissipated in the upward direction, thus moving the saw blade 1650 and power saw 1656 away from the operator.

Figure 93:
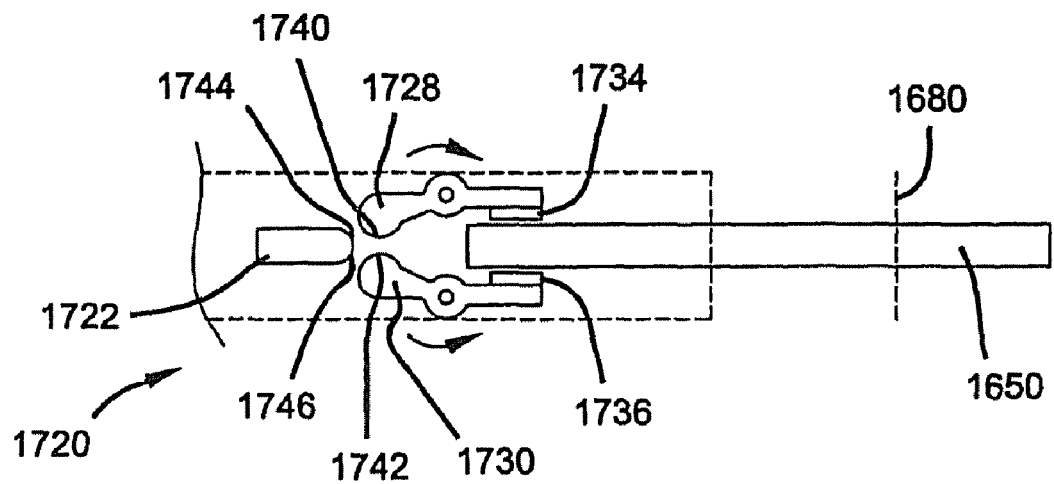

A second embodiment of a brake is shown in FIG. 93. The brake 1720 is similar to the brake 1690, and thus only portions of brake 1720 that are different will be discussed. The push arm 1722 of link 1706 is adapted to engage a first and a second pivoting break members 1728 and 1730. The brake members 1734 and 1736 are adapted to engage the edge of the saw blade 1650. The first and the second brake members 1728 and 1730 include a first and second cam surfaces 1740 and 1742 that engage a first and second edges 1744 and 1746 of the push arm 1722. As the first and second brake members 1734 and 1736 are activated to a first and second brake pads 1734 and 1736 engage the edge of the saw blade 1650.

Figure 94:
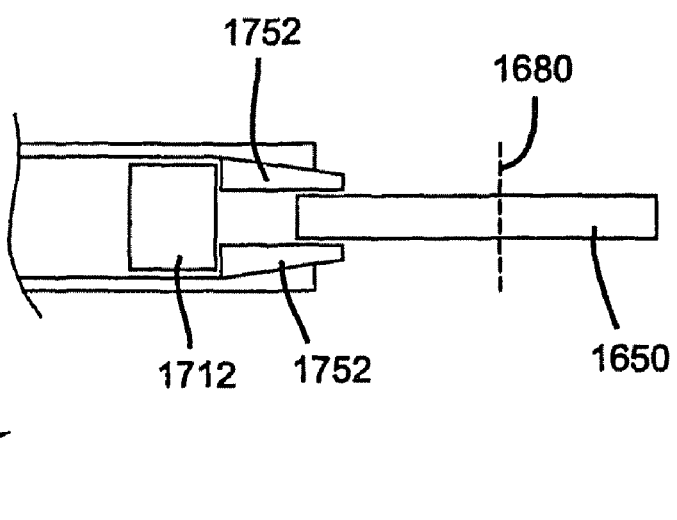

A third embodiment of a brake is shown in FIG. 94. The brake 1750 includes a wedge or panel brake 1752 adapted to engage the saw blade 1650. Upon activation of the brake 1750, push arm 1722 forces wedge 1752 into blade 1650. As wedge 1752 engages the saw blade 1650, the wedge 1752 engages the teeth of blade 1650. The wedge shape of wedge 1752 causes it to be drawn into further engagement with the saw blade 1650, until the saw blade 1650 is stopped.

While the invention has been described in its presently preferred form, it will be understood that the invention is capable of modification without departing from the spirit of the invention as set forth in the appended claims.

What is claimed is:

1. A table saw comprising:
   a frame structure with a generally flat work surface;
   a blade mounted on a spindle and being adapted to have at least a portion of the blade extending above the work surface;
   a drive motor mounted to the frame structure and configured to drive the spindle;
   a braking mechanism mounted to the frame structure and configured to brake the blade in response to an activation signal;
   a clamp detachably couples the blade to the spindle, the clamp having at least one tab in mesh with a complimentary bore formed in the spindle, where the tab maintains the blade in fixed relation to the spindle during normal operation of the saw but shears away from remainder of the clamp upon occurrence of a rapid stop event of the blade by the brake mechanism;
   a transmitter capacitively coupled to the blade and operable to transmit an electrical signal to the blade;
   a receiver capacitively coupled to the blade and operable to receive said electrical signal transmitted to the blade; and
   a controller connected to said receiver, said controller operable to detect a variation in said electrical signal and send an activation signal to the braking mechanism when said variation in said electrical signal exceeds a threshold value, where said controller adjusts said threshold value based on an electrical load associated with the operation of the blade.

2. A power tool comprising:
   an active portion detachably coupled by a clamp to a drive member, wherein the clamp maintains the active portion in fixed relation to the drive member in a first operating mode and disengages from at least one of the active portion and the drive member to thereby enable the drive member to operate independently of the active portion in a second operating mode;
   a drive motor configured to drive the drive member;
   a stopping mechanism configured to engage the active portion of the power tool in response to an activation signal and thereby cause a rapid stop event of the active portion and trigger the second operating mode of the clamp;
   a transmitter capacitively coupled to the active portion and operable to transmit an electrical signal to the active portion;
   a receiver capacitively coupled to the active portion and operable to receive said electrical signal transmitted to the active portion; and
   a controller connected to said receiver, said controller operable to detect a variation in said electrical signal and to generate the activation signal when said variation in said electrical signal exceeds a threshold value.

3. The power tool of claim 2 wherein the clamp includes a tab in mesh with a complimentary bore formed in the driver member, where the tab is configured to shear away from remainder of the clamp upon occurrence of a rapid stop event.

4. The power tool of claim 2 wherein the clamp includes a tab in mesh with a complimentary bore formed in the active portion, where the tab is configured to shear away from remainder of the clamp upon occurrence of a rapid stop event.

5. The power tool of claim 2 wherein the controller adjusts said threshold value based on parasitic capacitance load associated with the operation of the power tool.

6. The power tool of claim 5 wherein the controller increases the threshold value when the parasitic capacitance increases.

7. The power tool of claim 5 wherein the controller decreases the threshold value when the parasitic capacitance decreases.

8. A power tool; comprising:
a frame structure;
a blade mounted on a spindle that is supported by the frame structure;
a clamp detachably couples the blade to the spindle, the clamp configured to maintain the blade in fixed relation to the spindle during a first operating mode and to disengage from at least one of the blade and the spindle during a second operating mode such that the spindle rotates independently of the blade;
a drive motor mounted to the frame structure and configured to drive the spindle;
a stopping mechanism mounted to the frame structure and configured to engage the blade in response to an activation signal and thereby trigger the second operating mode of the clamp;
a transmitter capacitively coupled to the blade and operable to transmit an electrical signal to the blade;
a receiver capacitively coupled to the blade and operable to receive said electrical signal transmitted to the blade; and
a controller connected to said receiver, said controller operable to detect a variation in said electrical signal and to generate the activation signal when said variation in said electrical signal exceeds said threshold value.

9. The power tool of claim 8 wherein the clamp includes a tab in mesh with a complimentary bore formed in the spindle, where the tab is configured to shear away from remainder of the clamp upon occurrence of a rapid stop event.

10. The power tool of claim 8 wherein the clamp includes a tab in mesh with a complimentary bore formed in the blade, where the tab is configured to shear away from remainder of the clamp upon occurrence of a rapid stop event.

11. The power tool of claim 8 wherein the controller adjusts said threshold value based on an electrical load associated with operation of the blade tool.

12. The power tool of claim 11 wherein the controller adjusts said threshold value based on parasitic capacitance load associated with the operation of the power tool.

13. The power tool of claim 12 wherein the controller increases the threshold value when the parasitic capacitance increases.

14. The power tool of claim 12 wherein the controller decreases the threshold value when the parasitic capacitance decreases.

15. The power tool of claim 12 wherein the parasitic capacitance correlates to a drive voltage of the transmitter.

* * * * *

UNITED STATES PATENT AND TRADEMARK OFFICE
CERTIFICATE OF CORRECTION

| | | |
|---|---|---|
| PATENT NO. | : 8,408,107 B2 | Page 1 of 1 |
| APPLICATION NO. | : 13/441057 | |
| DATED | : April 2, 2013 | |
| INVENTOR(S) | : David A. Carrier et al. | |

It is certified that error appears in the above-identified patent and that said Letters Patent is hereby corrected as shown below:

In the Claims:

Column 50

Line 9 (Claim 8), delete "said" and insert -- a --.

Signed and Sealed this
Tenth Day of September, 2013

Teresa Stanek Rea
*Acting Director of the United States Patent and Trademark Office*